(12) United States Patent
Nakatsugawa et al.

(10) Patent No.: US 8,586,934 B2
(45) Date of Patent: Nov. 19, 2013

(54) RADIOGRAPHIC IMAGE CAPTURING APPARATUS AND RADIOGRAPHIC IMAGE CAPTURING SYSTEM

(75) Inventors: Haruyasu Nakatsugawa, Kanagawa-ken (JP); Naoyuki Nishino, Kanagawa-ken (JP); Yasunori Ohta, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 223 days.

(21) Appl. No.: 13/064,494

(22) Filed: Mar. 29, 2011

(65) Prior Publication Data
US 2011/0233415 A1 Sep. 29, 2011

(30) Foreign Application Priority Data

| Mar. 29, 2010 | (JP) | 2010-076235 |
| Mar. 29, 2010 | (JP) | 2010-076237 |
| Mar. 29, 2010 | (JP) | 2010-076406 |
| Dec. 3, 2010 | (JP) | 2010-270116 |
| Dec. 3, 2010 | (JP) | 2010-270122 |
| Dec. 3, 2010 | (JP) | 2010-270129 |

(51) Int. Cl.
*H01L 27/146* (2006.01)
*G01T 1/161* (2006.01)

(52) U.S. Cl.
USPC ............. 250/370.08; 250/363.02; 250/370.09

(58) Field of Classification Search
USPC ........................... 250/370.08, 363.02, 370.09
See application file for complete search history.

(56) References Cited

U.S. PATENT DOCUMENTS

| 7,768,002 | B2 | 8/2010 | Kitamura et al. | |
| 7,847,258 | B2 | 12/2010 | Yaegashi et al. | |
| 2006/0219926 | A1* | 10/2006 | Shoji et al. | 250/370.09 |
| 2007/0131867 | A1* | 6/2007 | Okada et al. | 250/370.09 |
| 2007/0262276 | A1* | 11/2007 | Kawashima et al. | 250/589 |
| 2008/0317197 | A1* | 12/2008 | Matsuzaki et al. | 378/9 |
| 2009/0046828 | A1* | 2/2009 | Ohta et al. | 378/1 |

FOREIGN PATENT DOCUMENTS

| JP | 2000-105297 | 4/2000 |
| JP | 2000-292546 | 10/2000 |
| JP | 2002-85392 | 3/2002 |
| JP | 2008-17965 | 1/2008 |
| JP | 2009-32854 | 2/2009 |
| JP | 2009-212389 | 9/2009 |

* cited by examiner

*Primary Examiner* — David Porta
*Assistant Examiner* — Abra Fein
(74) *Attorney, Agent, or Firm* — Jean C. Edwards; Edwards Neils PLLC

(57) ABSTRACT

In a radiographic image capturing apparatus, by interfitting each of panel accommodating units by means of connecting sections so that portions of respective radiation conversion panels are superimposed, and that each of the irradiated surfaces thereof are repeated alternately in a sequence of a first irradiated surface and a second irradiated surface thereof, an image capturing surface of the radiographic image capturing apparatus, which is constituted to include respective image capturing regions, is maintained in a substantially planar condition.

7 Claims, 73 Drawing Sheets

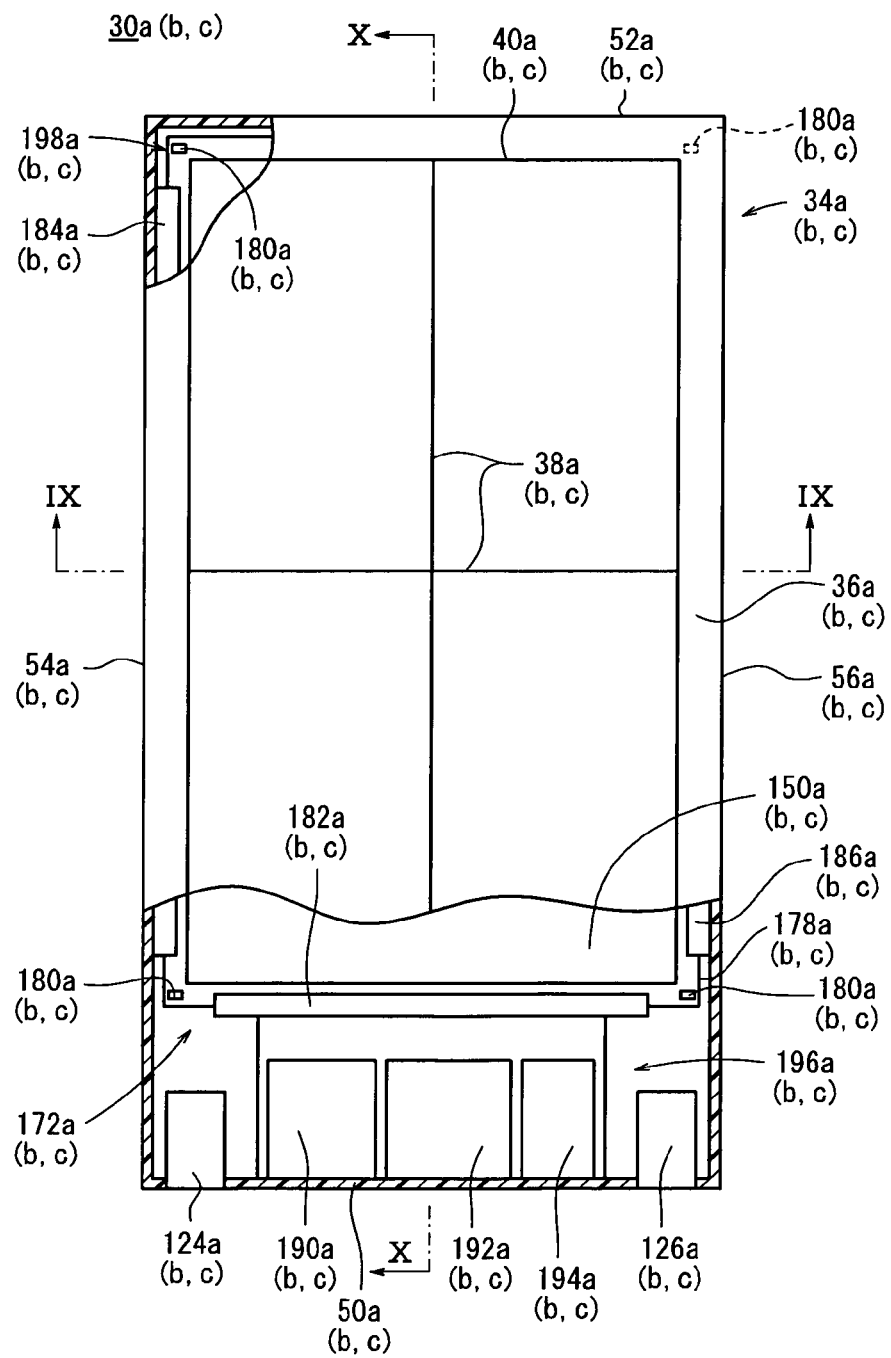

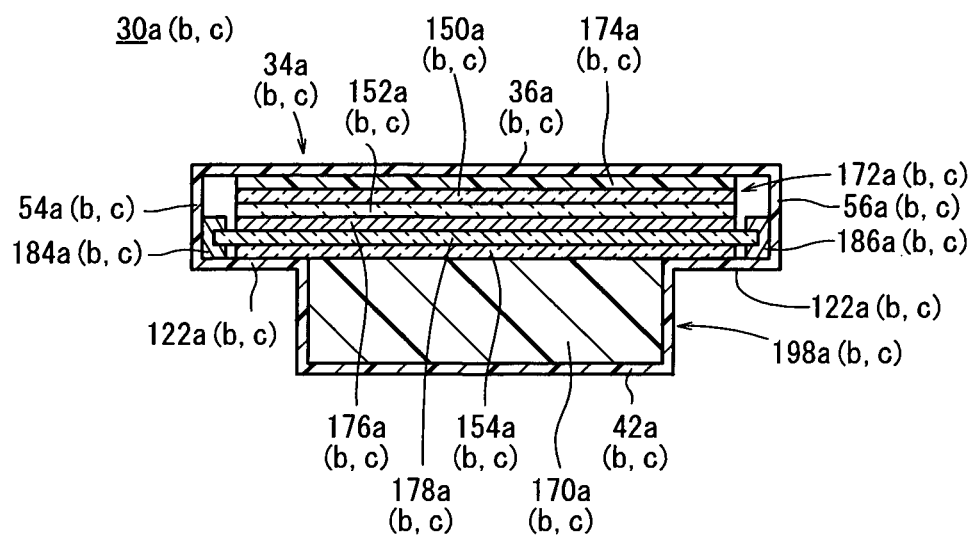

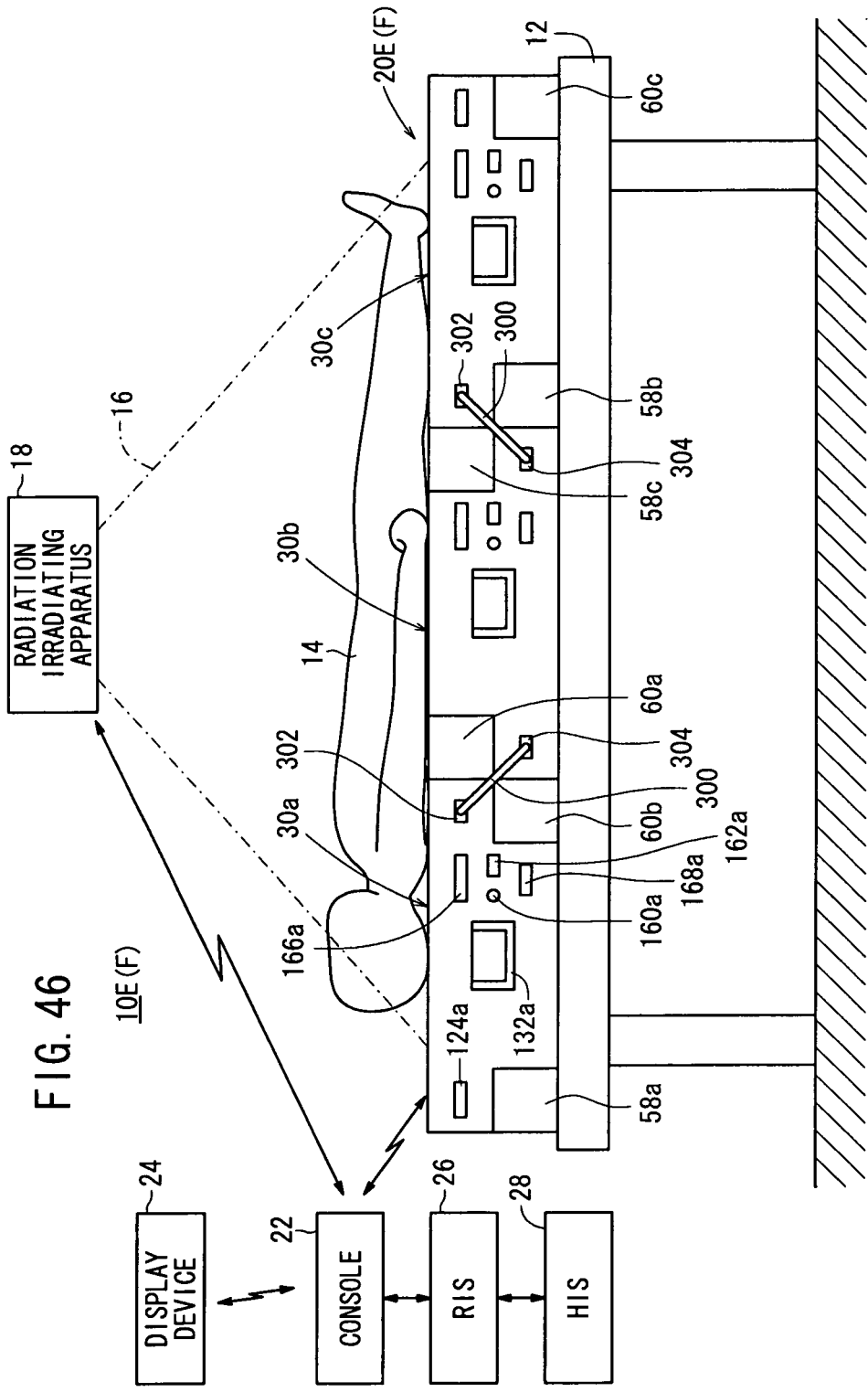

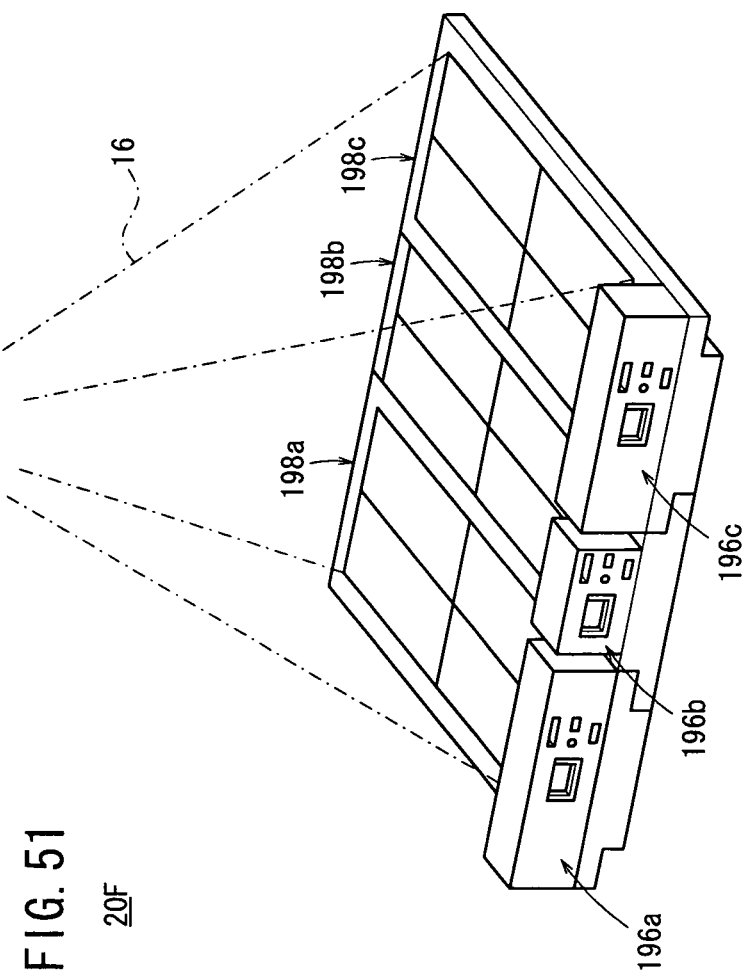

RADIOGRAPHIC IMAGE CAPTURING APPARATUS AND RADIOGRAPHIC IMAGE CAPTURING SYSTEM

CROSS-REFERENCE TO RELATED APPLICATION

This application is based upon and claims the benefit of priority from Japanese Patent Applications No. 2010-076235 filed on Mar. 29, 2010, No. 2010-076237 filed on Mar. 29, 2010, No. 2010-076406 filed on Mar. 29, 2010, No. 2010-270116 filed on Dec. 3, 2010, No. 2010-270122 filed on Dec. 3, 2010 and No. 2010-270129 filed on Dec. 3, 2010, of which the contents are incorporated herein by reference.

BACKGROUND OF THE INVENTION

1. Field of the Invention

The present invention relates to a radiographic image capturing apparatus constituted by interconnecting a plurality of radiation detection units by means of connecting units, each of the radiation detection units being equipped with a radiation conversion panel that converts radiation into radiographic images and a panel accommodating unit accommodating the radiation conversion panel therein, as well as to a radiographic image capturing system including the radiographic image capturing apparatus and a control apparatus for controlling the radiographic image capturing apparatus.

2. Description of the Related Art

In the medical field, there have widely been used radiographic image capturing apparatus, which apply radiation to a subject and guide radiation that has passed through the subject to a radiation conversion panel, which captures a radiographic image from such radiation. Known forms of radiation conversion panels include conventional radiation film for recording a radiographic image by way of exposure, and stimulable phosphor panels for storing radiation energy representing a radiographic image in a phosphor, and reproducing the radiographic image as stimulated light by applying stimulating light to the phosphor. Radiation film with the recorded radiographic image is supplied to a developing device to develop the radiographic image, or the stimulable phosphor panel is supplied to a readout device to read the radiographic image as a visible image.

On the other hand, in an operating room or the like, for the purpose of quickly and appropriately treating patients, it is necessary to be able to read out and display a radiographic image immediately from a radiation conversion panel after the radiographic image has been captured. As a radiation conversion panel that meets such a requirement, there have been developed a radiation conversion panel of a direct conversion type having a solid-state detection element for converting radiation directly into electric signals, and a radiation conversion panel of an indirect conversion type having a scintillator for temporarily converting radiation into visible light and a solid-state detection element for converting such visible light into electric signals.

Additionally, by accommodating the aforementioned direct conversion type or indirect conversion type of radiation conversion panel in a panel accommodating unit, a radiation detection unit, also referred to as an electronic cassette, is made up. Although such an electronic cassette is higher in cost compared to radiation detection units constructed with a radiation film or a stimulable phosphor panel accommodated in the panel accommodating unit, because radiographic images of high image quality can be obtained and display of the radiographic images can be carried out rapidly, electronic cassettes have experienced widespread use in recent years.

Incidentally, as methods for capturing images with respect to a subject, there exist an ordinary image capturing technique, in which radiation having passed through a predetermined imaging region of the subject is converted into a radiographic image using a single radiation detection unit, and an elongate image capturing technique in which a radiographic image is obtained of an elongated image capturing region (e.g., the entire body of the subject) which cannot be handled by a single image (see, Japanese Laid-Open Patent Publication No. 2002-085392, Japanese Laid-Open Patent Publication No. 2000-292546, and Japanese Laid-Open Patent Publication No. 2008-017965).

In Japanese Laid-Open Patent Publication No. 2002-085392, carrying out of an elongate image capturing technique is proposed under a condition in which a plurality of stimulable phosphor sheets are partially superimposed and accommodated inside a casing. In Japanese Laid-Open Patent Publication No. 2000-292546, carrying out of an elongate image capturing technique is proposed under a condition in which a plurality of indirect conversion type radiation conversion panels are partially superimposed. In the case of Japanese Laid-Open Patent Publication No. 2002-085392 and Japanese Laid-Open Patent Publication No. 2000-292546, by image synthesis of the radiographic images obtained by each of the radiation conversion panels, an elongate image of the subject can be obtained. In Japanese Laid-Open Patent Publication No. 2008-017965, taking into consideration the fact that electronic cassettes are higher in cost and thicker than other types of radiation detection units, it is proposed to obtain a single elongate radiographic image by combining respective radiographic images after moving a single electronic cassette relatively with respect to an image capturing region of a subject, and carrying out image capturing at each of the positions to which the electronic cassette has been moved.

With the technique of Japanese Laid-Open Patent Publication No. 2002-085392, because the thickness of the stimulable phosphor sheet is comparatively thin, even when a plurality of such stimulable phosphor sheets are partially superimposed, bumps (steps) at locations (connected portions) where the sheets are superimposed are not large, and accordingly, there is little to no concern over the thickness of the casing becoming too large. However, in order to enable display of an elongate image of the subject rapidly, elongate image capturing such as that disclosed by Japanese Laid-Open Patent Publication No. 2000-292546 and Japanese Laid-Open Patent Publication No. 2008-017965 is preferred over performing elongate image capturing by means of a plurality of stimulable phosphor sheets as disclosed in Japanese Laid-Open Patent Publication No. 2002-085392.

However, with the technique disclosed in Japanese Laid-Open Patent Publication No. 2000-292546, because portions of thick electronic cassettes are superimposed, bumps (steps) at such connected locations become large, and as a result, the thickness of the casing that accommodates the plurality of electronic cassettes therein also is enlarged, leading to a concern that the system as a whole is made large in scale. In contrast, in the case elongate image capturing is used in a condition where the plurality of electronic cassettes after interconnection thereof are not accommodated in a casing, there is a fear that during image capturing the subject may experience a sense of discomfort due to the presence of such bumps.

Further, with the technique disclosed by Japanese Laid-Open Patent Publication No. 2008-017965, because exposure to radiation (image capturing) is carried out with respect to the subject at each of respective positions to which the electronic cassette is moved, although the above-mentioned problem of bumps does not occur, the subject must be maintained in the same posture over a long period of time from initiation to completion of image capturing. Further, during image capturing, if movements of the subject occur, there is a concern that, following image capturing, a breakdown in image synthesis (combining of the images) may occur.

Furthermore, electronic cassettes also comprise controllers therein for controlling the radiation conversion panels thereof. Because such controllers are structural elements that do not contribute to detection of radiation (conversion of radiation into a radiographic image), so as not to be exposed to radiation, the controllers are arranged in the electronic cassettes at a location outside of the image capturing region thereof.

However, when a plurality of electronic cassettes are interconnected such that portions of the image capturing region mutually overlap, the controller of one electronic cassette may overlap with the image capturing region of another electronic cassette, and as a result, when radiation is applied to the controllers at a time when elongate image capturing is carried out, there is a fear that the controllers will become deteriorated as a result of exposure to radiation, together with the concern that the controllers themselves may be reflected in the radiographic images.

SUMMARY OF THE INVENTION

A first object of the present invention is to interconnect a plurality of radiation detection units to carry out elongate image capturing without causing bumps or steps to occur at locations where the radiation detection units are interconnected.

Further, a second object of the present invention is to carry out elongate image capturing in which controllers are not interposed over an image capturing region, thereby preventing the controller from becoming deteriorated due to exposure to radiation, while also preventing the controllers from being reflected in the radiographic image.

For achieving the aforementioned first object, a first aspect of the present invention provides a radiographic image capturing apparatus having a plurality of radiation detection units equipped with radiation conversion panels capable of converting radiation into radiographic images and panel accommodating units accommodating the radiation conversion panels therein, and connecting sections for connecting each of the radiation detection units together respectively, wherein:

the panel accommodating units each include, respectively, a front surface transmissive to the radiation, a rear surface opposed to the front surface and which is transmissive to the radiation, among the front surface and the rear surface of each of the panel accommodating units, certain ones of such surfaces are set respectively as irradiated surfaces on which the radiation that has passed through a subject is irradiated, and such that regions within the irradiated surfaces, which are irradiated by the radiation, make up image capturing regions capable of converting the radiation into radiographic images, and by interfitting the connecting sections in a state in which portions of each of the radiation conversion panels are superimposed, and in which each of the panel accommodating units are flipped over sequentially so that each of the irradiated surfaces thereof are repeated alternately in a sequence of the front surface and the rear surface, an image capturing surface of the radiographic image capturing apparatus, which is constituted to include the respective image capturing regions, is maintained in a substantially planar condition.

Further, the first aspect of the present invention also provides a radiographic image capturing system comprising:

a radiographic image capturing apparatus having a plurality of radiation detection units equipped with radiation conversion panels capable of converting radiation into radiographic images and panel accommodating units accommodating the radiation conversion panels therein, and connecting sections for connecting each of the radiation detection units together respectively, and a control apparatus for controlling the radiographic image capturing apparatus, wherein:

the panel accommodating units each include, respectively, a front surface transmissive to the radiation, a rear surface opposed to the front surface and which is transmissive to the radiation, among the front surface and the rear surface of each of the panel accommodating units, certain ones of such surfaces are set respectively as irradiated surfaces on which the radiation that has passed through a subject is irradiated, and such that regions within the irradiated surfaces, which are irradiated by the radiation, make up image capturing regions capable of converting the radiation into radiographic images, and by interfitting the connecting sections in a state in which portions of each of the radiation conversion panels are superimposed, and in which each of the panel accommodating units are flipped over sequentially so that each of the irradiated surfaces thereof are repeated alternately in a sequence of the front surface and the rear surface, an image capturing surface of the radiographic image capturing apparatus, which is constituted to include the respective image capturing regions, is maintained in a substantially planar condition.

In accordance with the foregoing inventions, a single radiographic image capturing apparatus is constructed by interconnecting sequentially through the connecting sections a plurality of radiation detection units of one type and of the same form, such that if elongate image capturing is carried out with respect to a subject by means of the radiographic image capturing apparatus, the respective radiation detection units are connected together through the connecting sections in the following manner.

More specifically, by using and interconnecting the connecting sections in a state in which portions of each of the radiation conversion panels are superimposed, and in which each of the panel accommodating units are flipped over sequentially so that each of the irradiated surfaces thereof are repeated alternately in a sequence of the front surface and the rear surface, an image capturing surface of the radiographic image capturing apparatus, which is made up of each of the image capturing regions, is maintained in a substantially planar condition without causing bumps (or steps) to occur at the connected locations.

In this case, the radiation detection units each are equipped mutually in the same form and make up electronic cassettes in which, if radiation is applied to the front surfaces or even to the rear surfaces thereof, such radiation can be converted into radiographic images by the radiation conversion panels. Consequently, according to the first aspect of the invention, concerning each of the radiation detection units of one type, by interconnecting them sequentially through the connecting sections in a state in which irradiated surfaces thereof are flipped alternately, so that each of the irradiated surfaces arranged in a sequence of front surface→rear surface→front surface→rear surface . . . (or rear surface→front surface→rear surface→front surface . . . ), the overall thickness of the radiographic image capturing apparatus can be suppressed to the thickness of each of the respective radiation detection units, and bumps (steps) are not generated at the connected locations therebetween.

Consequently, according to the first aspect of the invention, it is possible to carry out elongate image capturing by connecting a plurality of radiation detection units without causing bumps (steps) to occur at connected locations therebetween. More specifically, with the first aspect of the invention, although the radiation detection units are connected sequentially, an increase in scale of the radiographic image capturing apparatus can be avoided, and the image capturing surface can be kept in a flat and planar form.

Further, with the first aspect of the invention, as described above, the radiographic image capturing apparatus is constructed by interconnecting through the connecting sections radiation detection units of one type. Thus, compared to a situation of interconnecting radiation detection units of different types, upon connection thereof, a problem does not arise in which connection operations cannot be performed because radiation detection units of different types are not on hand.

Further, according to the first aspect of the invention, because the radiation detection units are connected respectively and sequentially in such a manner that bumps (steps) at the connected locations therebetween do not occur, compared to the case in which bumps occur at connected locations between the electronic cassettes as in Japanese Laid-Open Patent Publication No. 2000-292546, a problem in which the electronic cassettes are damaged by shocks (e.g., shocks due to falling) caused at the bumps (steps) of the connected locations in case that connections between the electronic cassettes are removed can be avoided.

Further, even in the case, as mentioned above, that radiation is irradiated with respect to the front surface or radiation is irradiated with respect to the rear surface, in either case, because each of the radiation detection units forms an electronic cassette capable of image capturing, by flipping over sequentially and interconnecting each of the panel accommodating units such that the irradiated surfaces are repeated alternately in a sequence of front and rear surfaces thereof, the radiographic image capturing apparatus can be assembled together easily and in a short period of time. Additionally, because the radiographic image capturing apparatus is constructed by connecting each of the panel accommodating units through the connecting sections, elongate image capturing can be carried out by applying radiation at one time with respect to the subject, so that shortening of the image capturing time can be realized.

Still further, according to the first aspect of the invention, for example, in case that one of the panel accommodating units with the front surface thereof serving as an irradiated surface and another of the panel accommodating units with the rear surface thereof serving as an irradiated surface are interconnected through the connecting sections, the one panel accommodating unit and the other panel accommodating unit are connected such that a portion of the radiation conversion panel accommodated in the one panel accommodating unit on the side of the other panel accommodating unit, and a portion of the radiation conversion panel accommodated in the other panel accommodating unit on the side of the one panel accommodating unit, are superimposed. In case that respective radiographic images obtained respectively by each of the radiation conversion panels are image-combined, and a single elongate radiographic image of the subject is obtained, image gaps or missing portions at connected locations of each of the radiographic images can be avoided.

Consequently, according to the first aspect of the invention, radiation detection units of one type are connected together sequentially, and without generating bumps or steps at the connected locations therebetween, the overall thickness of the radiographic image capturing apparatus is suppressed to the thickness of each of the radiation detection units, and the image capturing surface is maintained reliably in a planar condition. Thus, any sense of discomfort to the subject at the time of image capturing can be eliminated, and compared to conventional techniques, a thinner profile of the radiographic image capturing apparatus can be realized. Further, because the radiographic image capturing apparatus is constructed by interconnecting at the connecting sections each of the radiation detection units of one type, the time required for image capturing can also be shortened.

Each of the aforementioned radiation detection units forms an electronic cassette in which carrying out of image capturing is made possible respectively and even independently, and with the first aspect of the invention, the above-described effects are obtained by interconnecting at the connecting sections thereof a plurality of electronic cassettes of this type.

Further, preferably, side surfaces of each of the panel accommodating units are disposed respectively between an outer peripheral portion of the front surface and an outer peripheral portion of the rear surface of each of the panel accommodating units, the connecting sections are constituted by step portions that are formed at side surfaces of each of the panel accommodating units, and the panel accommodating units are connected together by interfitting each of the step portions in a state in which each of the panel accommodating units are flipped over sequentially.

Owing thereto, each of the panel accommodating units can be connected together easily.

In this case, each of the panel accommodating units may comprise substantially rectangular shaped casings, wherein parts of side portions of each of the casings are constructed respectively as blocks, which are removable from the casings, and the step portions are formed respectively by removing the blocks from the casings. Alternatively, each of the panel accommodating units may comprise a substantially rectangular shaped casing, wherein parts of side portions of each of the casings are constructed respectively as blocks, which are rotatable with respect to the casings, and the step portions are formed respectively by rotating the blocks with respect to the casings.

In this manner, since the step portions are formed easily simply by removing or rotating the blocks, interconnection of each of the panel accommodating units can be performed highly efficiently. Further, in case that the step portions are formed by rotating the blocks, since the blocks are not separated from the casings, accidental loss of the blocks can be prevented.

Furthermore, among the side surfaces of each of the panel accommodating units, handles are disposed respectively at locations where the aforementioned step portions are not formed, such that in case the respective panel accommodating units are connected, each of the panel accommodating units can easily be flipped over.

Further, in the aforementioned casings, surfaces proximate to the step portions may be defined as the rear surfaces, whereas surfaces that are opposite to the rear surfaces and are distanced from the step portions may be defined as the front surfaces. By predetermining the front and rear surfaces in this manner, in case the respective panel accommodating units are flipped over sequentially, connections between each of the panel accommodating units can be carried out efficiently.

Further, the radiographic image capturing apparatus may include irradiated surface detectors for detecting whether the irradiated surface of each of the panel accommodating units is constituted by either of the front surface or the rear surface thereof.

Owing thereto, since it is made clear whether or not the radiographic images obtained by each of the radiation conversion panels are images in which the front surface was the irradiated surface, or alternatively, images in which the rear surface was the irradiated surface, image processing in case that a single elongate image of the subject is formed by image-combining each of the radiographic images can be carried out with good efficiency.

In this case, preferably, the irradiated surface detector is capable of detecting whether the irradiated surface is constituted by either the front surface or the rear surface by using one of a gyroscope for detecting an angular speed of the panel accommodating units, a temperature sensor for detecting a temperature of the irradiated surfaces of the panel accommodating units, and a load sensor for detecting a load applied to the irradiated surfaces from the subject.

By using these sensors, it is possible to easily detect whether the radiographic images are images in which the front surface was the irradiated surface, or alternatively, images in which the rear surface was the irradiated surface. During image capturing, the subject comes into contact with the image capturing surface. Therefore, the temperature sensor detects the temperature of the irradiated surfaces caused by the heat transmitted from the subject to the panel accommodating units, while the load sensor detects a load applied to the irradiated surfaces from the subject.

The radiographic image capturing apparatus may also include a connection order information generating unit for detecting a connection order of the respective panel accommodating units interconnected by the connecting sections and for generating a detection result as the connection order information.

As described above, because the respective panel accommodating units are interconnected in a state in which they are flipped over sequentially, so that each of the image capturing surfaces thereof are arranged in a sequence of front surface→rear surface→front surface→rear surface . . . (or rear surface→front surface→rear surface→front surface . . . ), in case that a single elongate image of the subject is formed by image-combining each of the radiographic images, by referring to the aforementioned connection order information, it can be specified whether the radiographic images obtained by each of the radiation conversion panels are images in which the front surface was the irradiated surface, or alternatively, are images in which the rear surface was the irradiated surface. Consequently, formation of the single elongate image can be carried out highly efficiently.

Further, the control apparatus includes an image processor for generating an image of the subject based on the radiographic images obtained by each of the radiation conversion panels. The image processor, after having corrected each of the radiographic images based on a detection result of the irradiated surfaces in the irradiated surface detector, or based on the connection order information generated by the connection order information generating unit, combines each of the radiographic images after correction thereof and generates an image of the subject.

As a result thereof, an image (elongate image) of the subject of uniform image quality can be obtained.

Each of the radiation detection units may include a controller therein for controlling the radiation conversion panels.

In this case, assuming that each of the controllers are arranged at regions that lie outside of the image capturing regions or outside of the image capturing surface, application of radiation with respect to each of such controllers can be avoided.

More specifically, in case that application of radiation is performed under a condition in which the controllers are arranged within each of the image capturing regions or within the image capturing surface, inconveniences arise in that the controllers become deteriorated due to radiation, or the presence of the controllers themselves becomes reflected in the radiographic image. Consequently, as noted above, according to the first aspect of the invention, by avoiding application of radiation with respect to each of the controllers, the occurrence of such inconveniences can be prevented.

Further, each of the radiation detection units may include, respectively, a rotating mechanism, which enables rotation of the controllers with respect to the panel accommodating units. By rotation of the controllers with respect to the panel accommodating units by means of such rotating mechanisms, the controllers are arranged respectively so as not to overlap with each of the panel accommodating units when irradiated with radiation.

Owing thereto, application of radiation with respect to each of the controllers can reliably be avoided.

Furthermore, a thickness of each of the controllers may be of a thickness that is substantially flush with the image capturing surface in case that, by means of the rotating mechanisms, the controllers are arranged respectively so as not to overlap with each of the panel accommodating units. Thus, during image capturing, even if the subject comes into contact with the controllers, the subject does not experience any sense of discomfort.

Further, the radiographic image capturing apparatus may further include connectors, which provide connections between each of the panel accommodating units that have been interconnected through the connecting sections.

In this case, the connections provided by the connectors may include mechanical connections, electrical connections, optical connections (optic coupling), or magnetic connections. If the respective panel accommodating units are connected mechanically, the connections between each of the panel accommodating units can be reliably established. Further, if connected electrically, optically or magnetically, then signals can be sent and received between the panel accommodating units.

Further, in the aforementioned radiographic image capturing apparatus, preferably, each of the radiation conversion panels includes, respectively, a scintillator for converting radiation into visible light, solid state detecting elements for converting the visible light into electrical signals indicative of the radiographic image, switching elements for reading out the electrical signals from the solid state detecting elements, and a substrate on which the solid state detecting elements and the switching elements are formed. At least in the radiation conversion panels that are arranged on a side to which radiation is applied, the substrate preferably comprises a substrate made from a flexible plastic material, the solid state detecting elements are made up from an organic photoconductor, and the switching elements are formed from an organic semiconductor material.

Owing thereto, at least in radiation conversion panels arranged on a side to which radiation is applied, the solid state detecting elements and the switching elements can be provided on the substrate through low-temperature film formation, and the radiation conversion panels and the panel accommodating units that contain the radiation conversion panels can be made with a thin profile and be light in weight. As a result, in case that multiple panel accommodating units are interconnected, bumps (steps) at the connected locations therebetween can be kept small. Further, because plastic and organic materials tend not to absorb much radiation, large radiation doses to a certain extent can be made to reach the radiation conversion panels on a distal side along the direction in which the radiation is applied.

Moreover, if the aforementioned plastic and organic materials are used together with all of the radiation conversion panels, since any one of the radiation detection units is thin in profile, as a matter of course, bumps (steps) at the connected locations therebetween do not occur.

In this case, if the substrate, the switching elements, the solid state detecting elements and the scintillator made from CsI are arranged in this order along the direction in which radiation is applied, radiographic images and a single elongate image of high quality can be obtained. In addition, if used individually, such an expensive electronic cassette (radiation detection unit) is convenient to use.

Next, for achieving the aforementioned first object, a second aspect of the present invention provides a radiographic image capturing apparatus having a plurality of radiation detection units equipped with radiation conversion panels capable of converting radiation into radiographic images and panel accommodating units accommodating the radiation conversion panels therein, and connecting sections for connecting each of the radiation detection units together respectively, wherein:

the panel accommodating units each include, respectively, a front surface transmissive to the radiation, and a rear surface opposed to the front surface;

the front surfaces of each of the panel accommodating units comprise irradiated surfaces that are irradiated with radiation that has passed through the subject, and regions within the irradiated surfaces, which are irradiated by the radiation, make up image capturing regions capable of converting the radiation into radiographic images;

each of the panel accommodating units comprises a first panel accommodating unit having a first irradiated surface, and a second panel accommodating unit having a second irradiated surface; and by connecting each of the panel accommodating units through the connecting sections so that portions of each of the radiation conversion panels are superimposed, and that irradiated surfaces are repeated alternately in a sequence of the first irradiated surface and the second irradiated surface, an image capturing surface of the radiographic image capturing apparatus, which is constituted to include the respective image capturing regions, is maintained in a substantially planar condition.

Further, the second aspect of the present invention also provides a radiographic image capturing system comprising:

a radiographic image capturing apparatus having a plurality of radiation detection units equipped with radiation conversion panels capable of converting radiation into radiographic images and panel accommodating units accommodating the radiation conversion panels therein, and connecting sections for connecting each of the radiation detection units together respectively, and a control apparatus for controlling the radiographic image capturing apparatus, wherein:

the panel accommodating units each include, respectively, a front surface transmissive to the radiation, and a rear surface opposed to the front surface;

the front surfaces of each of the panel accommodating units comprise irradiated surfaces that are irradiated with radiation that has passed through the subject, and regions within the irradiated surfaces, which are irradiated by the radiation, make up image capturing regions capable of converting the radiation into radiographic images;

each of the panel accommodating units comprises a first panel accommodating unit having a first irradiated surface, and a second panel accommodating unit having a second irradiated surface; and by connecting each of the panel accommodating units through the connecting sections so that portions of each of the radiation conversion panels are superimposed, and that irradiated surfaces are repeated alternately in a sequence of the first irradiated surface and the second irradiated surface, an image capturing surface of the radiographic image capturing apparatus, which is constituted to include the respective image capturing regions, is maintained in a substantially planar condition.

According to the aforementioned inventions, a single radiographic image capturing apparatus is constructed by alternately repeating and interconnecting through the connecting sections a plurality of radiation detection units of two types, such that in case elongate image capturing is carried out with respect to a subject by means of the radiographic image capturing apparatus, the respective radiation detection units are connected together through the connecting sections in the following manner.

More specifically, using the connecting sections, each of the panel accommodating units are interconnected so that portions of each of the radiation conversion panels are superimposed, and that the first irradiated surface and the second irradiated surface, both of which are front surfaces, are repeated alternately and sequentially, whereby an image capturing surface of the radiographic image capturing apparatus, which is made up to include each of the image capturing regions, is maintained in a substantially planar condition without causing bumps (or steps) to occur at the connected locations.

Stated otherwise, in accordance with the second aspect of the invention, by interconnecting the respective radiation detection units of two types sequentially through the connecting sections, in a state in which the irradiated surfaces thereof are repeated alternately in a sequence of the first irradiated surface→the second irradiated surface→the first irradiated surface→the second irradiated surface . . . (or the second irradiated surface→the first irradiated surface→the second irradiated surface→the first irradiated surface . . . ), the overall thickness of the radiographic image capturing apparatus can be suppressed to the thickness of each of the respective radiation detection units, and bumps (steps) are not generated at the connected locations therebetween.

Consequently, according to the second aspect of the invention, in the same manner as the first aspect of the invention, it is possible to carry out elongate image capturing by connecting a plurality of radiation detection units without causing bumps (steps) to occur at connected locations therebetween. More specifically, with the second aspect of the invention as well, by connecting the radiation detection units together sequentially, an increase in scale of the radiographic image capturing apparatus can be avoided, and the image capturing surface can reliably be kept in a flat planar form.

In addition, because the radiographic image capturing apparatus is constructed by connecting each of the panel accommodating units through the connecting sections, it is possible to perform elongate image capturing by application of radiation at one time with respect to the subject, thus enabling shortening of the time required for image capturing to be realized.

Further, according to the second aspect of the invention, similar to the first aspect of the invention, because the radiation detection units are connected respectively and sequentially in such a manner that bumps (steps) at the connected locations therebetween do not occur, compared to the case in which bumps occur at connected locations between the electronic cassettes as in Japanese Laid-Open Patent Publication No. 2000-292546, a problem in which the electronic cassettes are damaged by shocks (e.g., shocks due to falling) caused at the bumps (steps) of the connected locations in case connections between the electronic cassettes are removed can be avoided.

Further, according to the second aspect of the invention as well, for example, in case that the first panel accommodating unit and the second panel accommodating unit are interconnected through the connecting sections, the first panel accommodating unit and the second panel accommodating unit are connected such that a portion of the radiation conversion panel accommodated in the first panel accommodating unit on the side of the second panel accommodating unit, and a portion of the radiation conversion panel accommodated in the second panel accommodating unit on the side of the first panel accommodating unit are superimposed. In case that respective radiographic images obtained respectively by each of the radiation conversion panels are image-combined, and a single elongate radiographic image of the subject is obtained, image gaps or missing portions at connected locations of each of the radiographic images can be avoided.

Consequently, according to the second aspect of the invention, radiation detection units of two types are connected together alternately, and without generating bumps or steps at the connected locations therebetween, the overall thickness of the radiographic image capturing apparatus is suppressed to the thickness of each of the radiation detection units and the image capturing surface is maintained reliably in a planar condition. Thus, any sense of discomfort to the subject at the time of image capturing can be eliminated, and compared to conventional techniques, a thinner profile of the radiographic image capturing apparatus can be realized. Further, because the radiographic image capturing apparatus is constructed by interconnecting at the connecting sections each of the radiation detection units of two types, the time required for image capturing can also be shortened.

Each of the aforementioned radiation detection units forms an electronic cassette in which carrying out of normal image capturing is made possible respectively and even independently, and with the second aspect of the invention as well, the above-described effects are obtained by interconnecting at the connecting sections thereof a plurality of electronic cassettes of this type.

Further, preferably, side surfaces of each of the panel accommodating units are disposed respectively between an outer peripheral portion of the front surface and an outer peripheral portion of the rear surface of each of the panel accommodating units, the connecting sections are constituted by step portions that are formed at side surfaces of each of the panel accommodating units, and the panel accommodating units are connected together by interfitting each of the step portions.

Owing thereto, each of the panel accommodating units can be connected together easily.

Further, in the second aspect of the invention as well, as explained in reference to the first aspect of the invention, blocks that are removable from the casings, or alternatively, blocks that are rotatable with respect to the casings may be provided. In this case as well, it is a matter of course that each of the effects made possible by providing such blocks can easily be obtained.

Furthermore, among the step portions of the first panel accommodating unit and the step portions of the second panel accommodating unit, projections may be provided on one of such step portions, whereas recesses in which the projections are fitted may be provided on the other of such step portions. In this manner, in case that each of the panel accommodating units is interconnected, the panel accommodating units can be connected together easily and reliably.

In the first panel accommodating units, a surface proximate to the step portions of the first panel accommodating unit defines a rear surface, whereas a surface opposite to the rear surface and distanced from the step portions defines the first irradiated surface (front surface). Further, in the second panel accommodating units, a surface proximate to the step portions of the second panel accommodating unit defines the second irradiated surface (front surface), whereas a surface opposite to the second irradiated surface and distanced from the step portions defines a rear surface. In this manner, by determining beforehand the front surface (irradiated surface) and the rear surface, connections of each of the panel accommodating units can be carried out with good efficiency.

Further, similar to the first aspect of the invention, in the second aspect of the invention as well, the radiographic image capturing apparatus may include a connection order information generating unit for detecting a connection order of the respective panel accommodating units interconnected by the connecting sections, and for generating a detection result as the connection order information.

As described above, because each of the panel accommodating units are connected sequentially such that each of irradiated surfaces that make up the image capturing surface are arranged in a sequence of the first irradiated surface→the second irradiated surface→the first irradiated surface→the second irradiated surface . . . (or the second irradiated surface→the first irradiated surface→the second irradiated surface→the first irradiated surface . . . ), in case that a single elongate image of the subject is formed by image-combining each of the radiographic images, by referring to the aforementioned connection order information, it can be specified whether the obtained radiographic images are images at the first irradiated surface, or alternatively, are images at the second irradiated surface. Consequently, formation of the single elongate image can be carried out highly efficiently.

Further, in the same manner as the first aspect of the invention, in the second aspect of the invention as well, the controller may include an image processor for generating an image of the subject based on the radiographic images obtained by each of the radiation conversion panels, and the image processor, after having corrected each of the radiographic images based on the connection order information generated by the connection order information generating unit, combines each of the radiographic images after correction thereof and generates an image of the subject.

As a result thereof, an image (elongate image) of the subject of uniform image quality can be obtained.

In each of the panel accommodating units, the radiation conversion panel, a radiation shielding member that prevents passage of radiation therethrough, and a controller for controlling the radiation conversion panel may be arranged in this order from the front surface toward the rear surface.

In this manner, by arranging the controllers behind the radiation conversion panels with the radiation shielding member intervening therebetween, any concerns over radiation being irradiated with respect to the controllers can be avoided.

Further, if the controllers are smaller than the radiation conversion panels as viewed in plan, concerns over radiation being applied to the controllers can reliably be prevented.

Alternatively, similar to the first aspect of the invention, in the second aspect of the invention as well, each of the radiation detection units may include, respectively, a rotating mechanism capable of rotating the controllers with respect to the panel accommodating unit, such that by rotation thereof with respect to the panel accommodating unit by means of the rotating mechanisms, the controllers may be arranged respectively so as not to overlap with each of the panel accommodating units when irradiated with radiation.

Owing thereto, application of radiation with respect to each of the controllers can reliably be avoided.

Further, for achieving the second object, a third aspect of the present invention provides a radiographic image capturing apparatus having a plurality of radiation detection units equipped with radiation conversion panels capable of converting radiation into radiographic images, panel accommodating units accommodating the radiation conversion panels therein, and controllers for controlling the radiation conversion panels, together with connecting sections for connecting each of the radiation detection units together respectively, wherein:

at the connecting sections, each of the panel accommodating units are connected sequentially such that portions of each of the radiation conversion panels are superimposed, and that the controllers do not overlap therewith respectively.

Further, the third aspect of the present invention also provides a radiographic image capturing system comprising a radiographic image capturing apparatus having a plurality of radiation detection units equipped with radiation conversion panels capable of converting radiation into radiographic images, panel accommodating units accommodating the radiation conversion panels therein, and controllers for controlling the radiation conversion panels, together with connecting sections for connecting each of the radiation detection units together respectively, and a control apparatus for controlling the radiographic image capturing apparatus, wherein:

at the connecting sections, each of the panel accommodating units are connected sequentially such that portions of each of the radiation conversion panels are superimposed, and that the controllers do not overlap therewith respectively.

According to the aforementioned inventions, each of the panel accommodating units are connected sequentially such that portions of each of the radiation conversion panels are superimposed, and that the controllers do not overlap therewith respectively. More specifically, even though portions of the image capturing regions are superimposed, the controllers, which do not contribute to detection of radiation (conversion to radiographic images), do not overlap with image capturing regions of each of the radiation detection units. Consequently, elongate image capturing can be carried out without the controllers overlapping the image capturing regions, and while preventing deterioration of the controllers due to being irradiated with radiation, and preventing the controllers from being reflected in the radiographic images. Further, because a single radiographic image capturing apparatus is constructed by interconnection of each of the radiation detection units through the connecting sections, elongate image capturing can be carried out by application of radiation one time with respect to the subject, whereby shortening of the image capturing time can be realized.

Further, for example, in case that one of the panel accommodating units and another of the panel accommodating units are connected through the connecting sections, a portion of the radiation conversion panel accommodated in the one panel accommodating unit on the side of the other panel accommodating unit overlaps with a portion of the radiation conversion panel accommodated in the other panel accommodating unit on the side of the one panel accommodating unit, and together therewith, the one panel accommodating unit and the other panel accommodating unit are connected such that each of the controllers do not overlap therewith. If each of the radiographic images obtained respectively by the radiation conversion panels are image-combined to thereby obtained a single elongate radiographic image of the subject, image gaps or missing portions at connected locations of each of the radiographic images can be prevented.

Each of the aforementioned radiation detection units forms an electronic cassette in which carrying out of normal image capturing is made possible respectively and even independently, and with the third aspect of the invention as well, the above-described effects are obtained by interconnecting at the connecting sections thereof a plurality of electronic cassettes of this type.

The panel accommodating units each are provided, respectively, with a front surface transmissive to the radiation, and a rear surface opposed to the front surface. The front surface of each of the panel accommodating units serves as an irradiated surface to which radiation having passed through the subject is applied, and a region within the irradiated surface irradiated by such radiation serves as an image capturing region capable of converting the radiation into radiographic images. In case that the connecting section interconnects one panel accommodating unit and another panel accommodating unit, the rear surface of the one panel accommodating unit on the side of the other panel accommodating unit is connected with the front surface of the other panel accommodating unit on the side of the one panel accommodating unit.

Owing thereto, in case that each of the radiographic images are image-combined to obtain a single elongate radiographic image of the subject, image gaps or missing portions at connected locations of each of the radiographic images can reliably be prevented.

Further, side surfaces of each of the panel accommodating units are disposed respectively between an outer periphery of the front surface and an outer periphery of the rear surface of the panel accommodating units, and the connecting sections are formed by projections, which are disposed on the front surface on a side of one side surface thereof, and recesses, which are disposed on the rear surface on a side of another side surface thereof that is opposite to the one side surface, wherein the one panel accommodating unit and the other panel accommodating unit may be connected by interfitting the recesses provided in the rear surface of the one panel accommodating unit and the projections provided in the front surface of the other panel accommodating unit.

Owing thereto, each of the panel accommodating units can be connected together reliably and easily. Moreover, since in each of the aforementioned radiation detection units, image capturing can be carried out respectively and even independently, if the projections are disposed on the front surface while the recesses are disposed on the rear surface thereof, backlash or slippage of the panel accommodating unit, in the case of independent usage thereof, can be prevented.

Further, if the length of each of the controllers in case the respective panel accommodating units are connected, as viewed in plan or from the side, is set to be shorter than the width of each of the panel accommodating units, then the respective panel accommodating units can be connected together reliably.

Additionally, the detailed positioning and arrangement of the controllers in each of the radiation detection units, as well as the relationship between the controllers and the panel accommodating units, preferably are established according to one of the following conditions (1) through (4).

(1) Each of the controllers is arranged at a region outside of the image capturing region on the front surface of the panel accommodating unit, so that, as viewed from the side, the controller is arranged between the projections and the recesses, or alternatively, between the projections and the other side surface. Then, in case that the recesses of the one panel accommodating unit and the projections of the other panel accommodating unit are interfitted, the side of the one panel accommodating unit proximate to the other panel accommodating unit abuts against the controller that is arranged on the other panel accommodating unit.

Owing thereto, in case that the recesses and the projections are fitted together, the one panel accommodating unit abuts against and is positioned by the controller of the other panel accommodating unit. Consequently, overlapping of each of the controllers and each of the image capturing regions can reliably be avoided, and together therewith, connection of the respective panel accommodating units can be carried out with high precision.

(2) Each of the controllers is arranged on a side surface of the panel accommodating unit and, as viewed from the side, between the projections and the other side surface. Then, in case that the recesses of the one panel accommodating unit and the projections of the other panel accommodating unit are interfitted, the controller arranged on the one panel accommodating unit abuts against the controller that is arranged on the other panel accommodating unit.

Owing thereto, in case that the recesses and the projections are fitted together, the controller of one panel accommodating unit and the controller of the other panel accommodating unit are positioned by abutment against each other. In this case as well, overlapping of each of the controllers and each of the image capturing regions can reliably be avoided, and together therewith, connection of the respective panel accommodating units can be carried out with high precision.

At this time, each of the radiation detection units may include, respectively, a first controller, which is arranged on a side surface of the panel accommodating units, and a second controller, which is arranged on a side surface opposite to the side surface on which the first controller is arranged, such that in case the recesses of one of the panel accommodating units are interfitted with the projections of another panel accommodating unit, the first controller that is arranged on the one panel accommodating unit abuts against the first controller that is arranged on the other panel accommodating unit, and the second controller that is arranged on the one panel accommodating unit abuts against the second controller that is arranged on the other panel accommodating unit.

In this case, because two controllers (the first controller and the second controller) are provided on each of the radiation detection units, in case that the recesses and projections thereof are interfitted, the first controllers abut against one another and are positioned thereby, and the second controllers also abut against one another and are positioned thereby. Consequently, connections between each of the panel accommodating units can be carried out more accurately.

(3) Each of the radiation detection units has, respectively, a rotating mechanism capable of rotating the controllers with respect to the panel accommodating units. By rotating each of the controllers with respect to the panel accommodating units by means of the rotating mechanism, the controllers do not overlap with the panel accommodating units when radiation is applied thereto.

Owing thereto, overlapping of the respective controllers and the respective image capturing regions during application of radiation can reliably be prevented.

In this case, a side of one of the side surfaces and a side of another of the side surfaces at each of the controllers are constructed respectively as blocks, which are removable from the controllers, such that in case each of such blocks are removed from the controllers, recesses in one of the panel accommodating units and projections in another of the panel accommodating units are made capable of being interfitted.

In this manner, since the recesses and the projections are permitted to be interfitted by removal of the blocks from each of the controllers, connections between each of the panel accommodating units can be carried out effectively.

(4) In the interiors of each of the panel accommodating units, the radiation conversion panel and a radiation shielding member preventing passage of radiation therethrough are arranged in this order from the front surface to the rear surface, the controllers are arranged respectively on the rear surface side of each of the panel accommodating units, and each of the controllers as viewed from the side, is disposed between the projections and the recesses, such that in case the recesses of one of the panel accommodating units and the projections of another of the panel accommodating units are interfitted, the controller abuts against the other panel accommodating unit.

Owing thereto, by disposing the controllers on backs of the radiation conversion panels with the radiation shielding member intervening therebetween, any concerns over radiation being irradiated with respect to the controllers can be avoided.

As explained above, according to the first and second aspects of the invention, a plurality of radiation detection units can be connected together and elongate image capturing can be carried out thereby without causing bumps (steps) to occur at the connecting locations. More specifically, even in case that the respective radiation detection units are connected sequentially, an increase in scale of the radiographic image capturing apparatus can be avoided, and the image capturing surface can reliably be kept in a flat planar condition.

Further, according to the third aspect of the invention, using the connecting sections, the respective panel accommodating units are connected sequentially such that portions of each of the radiation conversion panels are superimposed, and together therewith, each of the controllers do not overlap therewith. More specifically, even if portions of the image capturing regions are superimposed, the controllers, which do not contribute to detection of radiation (conversion of radiation into radiographic images), are arranged so as not to overlap with the image capturing regions of each of the radiation detection units. As a result thereof, the controllers do not overlap with the image capturing regions, whereby elongate image capturing can be carried out while preventing deterioration of the controllers due to being irradiated with radiation, and further preventing the presence of the controllers from being reflected in the radiographic image. Further, because a single radiographic image capturing apparatus is constructed by connecting together each of the radiation detection units at the connecting sections, elongate image capturing can be carried out by applying radiation one time with respect to the subject, so that shortening of the image capturing time can be realized.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 8 is a plan view, partially broken away, of the radiation detection units of FIG. 1;

FIG. 9 is a cross sectional view taken along line IX-IX of FIG. 8;

FIG. 46 is a schematic structural view of a radiographic image capturing system according to fifth and sixth embodiments of the present invention;

FIG. 51 is a perspective view of another radiographic image capturing apparatus;

DESCRIPTION OF THE PREFERRED EMBODIMENTS

A radiographic image capturing apparatus and a radiographic image capturing system according to a first aspect of the present invention, in relation to preferred embodiments (first through third embodiments) thereof, will be described in detail below with reference to FIGS. 1 through 27.

First, explanations shall be given with reference to FIGS. 1 through 19B concerning a radiographic image capturing system 10A according to a first embodiment.

Figure 1:
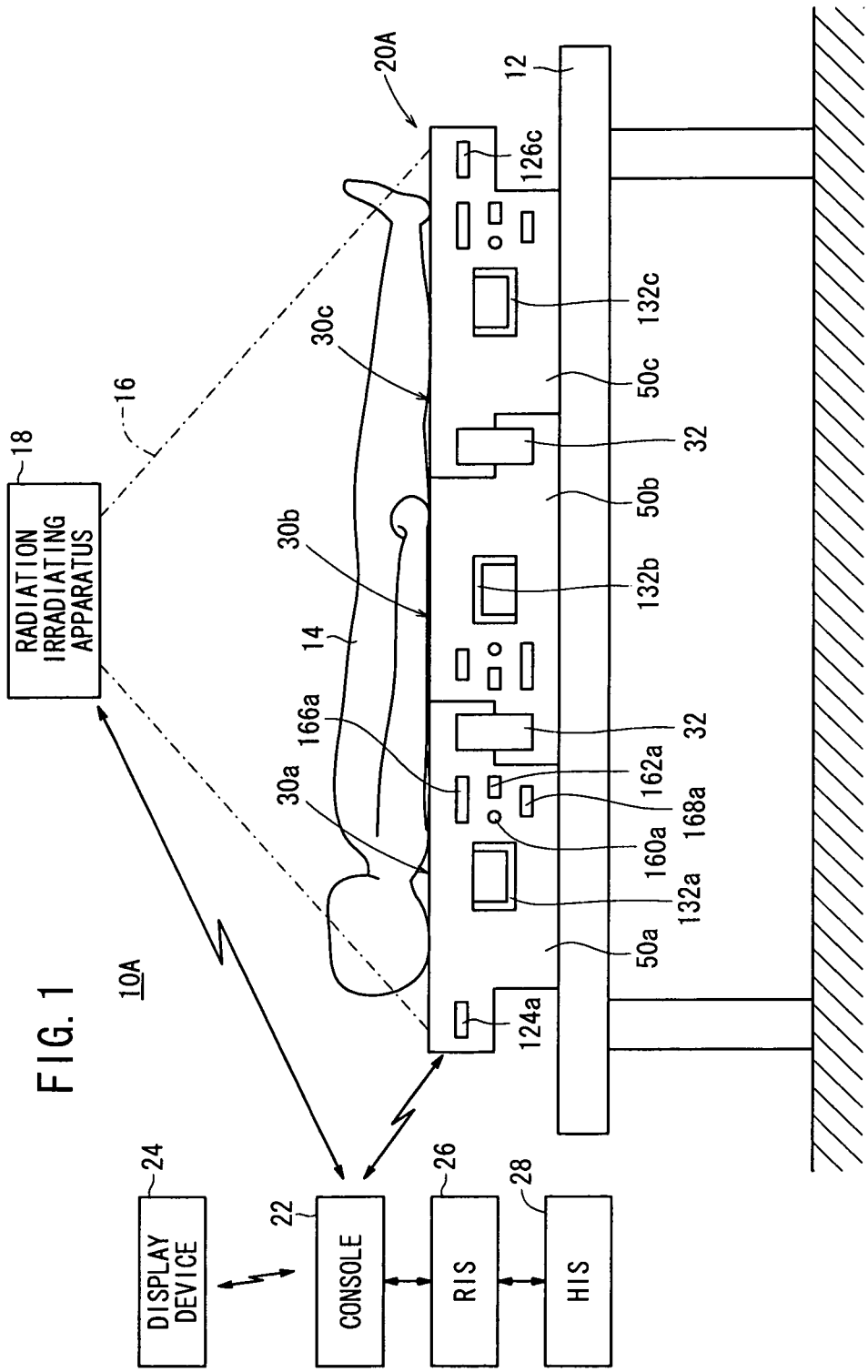
FIG. 1 is a schematic structural view of a radiographic image capturing system according to a first embodiment.

As shown in FIG. 1, the radiographic image capturing system 10A is equipped with a radiation irradiating apparatus 18 for applying radiation 16, which is of a radiation dose determined according to image capturing conditions, with respect to a subject 14 such as a patient or the like who is in a recumbent position on an image capturing base 12 such as a bed, a radiographic image capturing apparatus 20A, which converts radiation 16 having passed through the subject 14 into radiographic images, a console (control apparatus) 22 for controlling the radiation irradiating apparatus 18 and the radiographic image capturing apparatus 20A, and a display device 24 on which radiographic images are displayed.

Transmission and reception of signals is carried out between the console 22, the radiation irradiating apparatus 18, the radiographic image capturing apparatus 20A, and a display device 24 by way of wireless communications, for example, using a wireless LAN (local area network) based on UWB (ultra wide band), IEEE 802.11.a/g/n technology or the like, or via millimeter wave transmissions or the like. Of course, transmission and reception of signals between such components may also be carried out by way of wired communications over cables.

Further, a radiology information system (RIS) 26 for comprehensively managing radiographic images that are handled in the radiological department of a hospital as well as other information is connected to the console 22, and a hospital information system (HIS) 28 for comprehensively managing medical information in the hospital is connected to the RIS 26.

The radiographic image capturing apparatus 20A includes three radiation detection units 30a-30c disposed between the image capturing base 12 and the subject 14, and two connectors (connecting means) 32, which provide electrical and mechanical connections between the radiation detection units 30a-30c.

As shown in FIGS. 1 through 7A, the radiation detection units 30a-30c comprise electronic cassettes of one type, which are formed in the same shape and have the same width. On the image capturing base 12, the radiation detection units 30a-30c are connected sequentially in a line in a state of being flipped in turn, and make up a single radiographic image capturing apparatus 20A by being connected together electrically and mechanically by means of the two connectors 32.

Explanations shall be given in greater detail concerning each of the radiation detection units 30a-30c.

Figure 4:
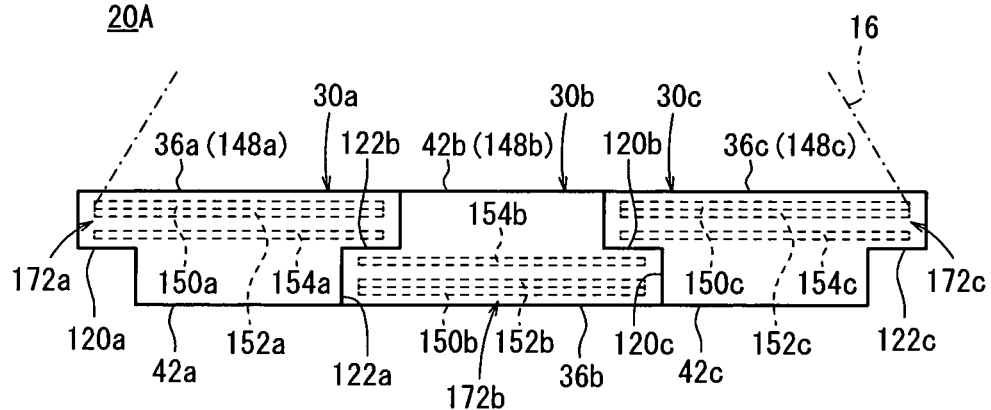
FIG. 4 is a side view showing schematically the radiographic image capturing apparatus of FIG. 1.
Figure 5A:
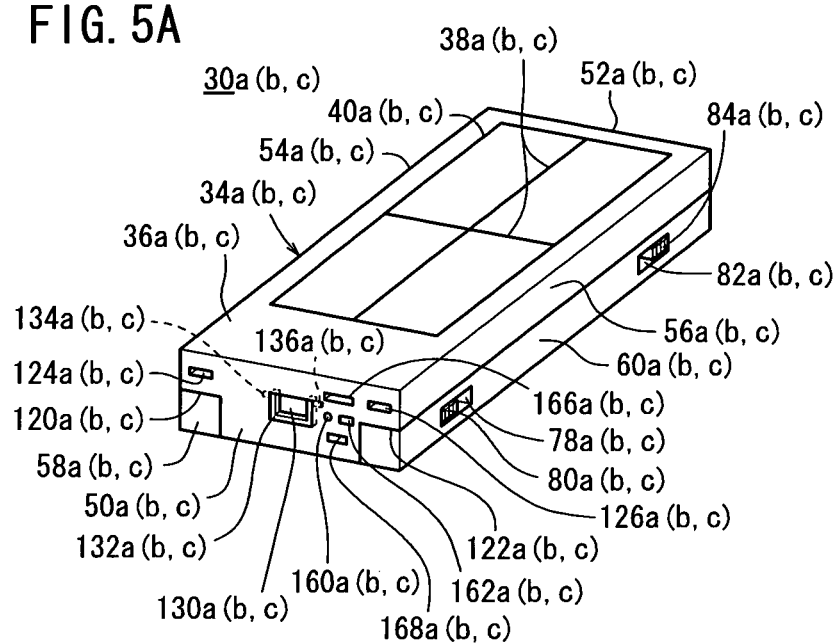
FIG. 5A and FIG. 5B are perspective views of a single radiation detection unit.
Figure 5B:
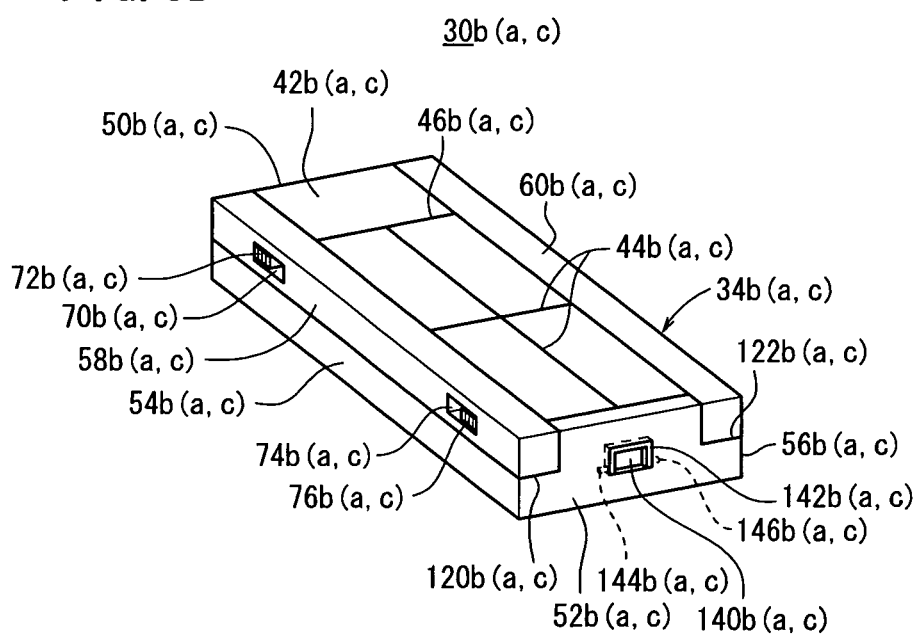

The radiation detection units 30a-30c each include substantially rectangular shaped casings (panel accommodating units) 34a-34c (see FIGS. 5A and 5B). The casings 34a-34c are transmissive to radiation 16, and accommodate therein radiation conversion panels 172a-172c (see FIG. 4), which are capable of converting radiation 16 into radiographic images. Additionally, inside the casings 34a-34c, panel portions 198a-198c thereof are constituted by structural elements apart from later described controllers 196a-196c (see FIG. 8).

Guide lines 38a-38c, which indicate an image capturing position for the subject 14, are formed respectively on front surfaces 36a-36c of the casings 34a-34c. An outer frame of the guide lines 38a-38c forms an image capturing region 40a-40c indicative of an irradiated field (irradiated range) of radiation 16 that is applied on the front surfaces 36a-36c. Further, a central position of the guide lines 38a-38c (i.e., an intersecting point of the two guide lines 38a-38c, which intersect in a cross-like shape) forms a central position for each of the image capturing regions 40a-40c.

On the other hand, guide lines 44a-44c, which indicate an image capturing position for the subject 14, also are formed respectively on rear surfaces 42a-42c that are opposed to the front surfaces 36a-36c, and an outer frame of such guide lines 44a-44c forms an image capturing region 46a-46c indicative of an irradiated field (irradiated range) of radiation 16 that is applied on the rear surfaces 42a-42c. Further, a central position of the guide lines 44a-44c (i.e., an intersecting point of the two guide lines 44a-44c, which intersect in a cross-like shape) forms a central position for each of the image capturing regions 46a-46c.

Accordingly, concerning the radiation detection units 30a-30c, even if radiation 16 is irradiated from the exterior with respect to the front surfaces 36a-36c, or alternatively, if radiation 16 is irradiated from the exterior with respect to the rear surfaces 42a-42c, in either of these cases, the radiation detection units 30a-30c constitute electronic cassettes, which are capable of converting radiation 16 in the radiation conversion panels 172a-172c into radiographic images.

In the following explanations, for facilitating description, irradiation of radiation 16 from the exterior with respect to the front surfaces 36a-36c will be referred to as "A surface irradiation," whereas irradiation of radiation 16 from the exterior with respect to the rear surfaces 42a-42c will be referred to as "B surface irradiation."

Figure 2:
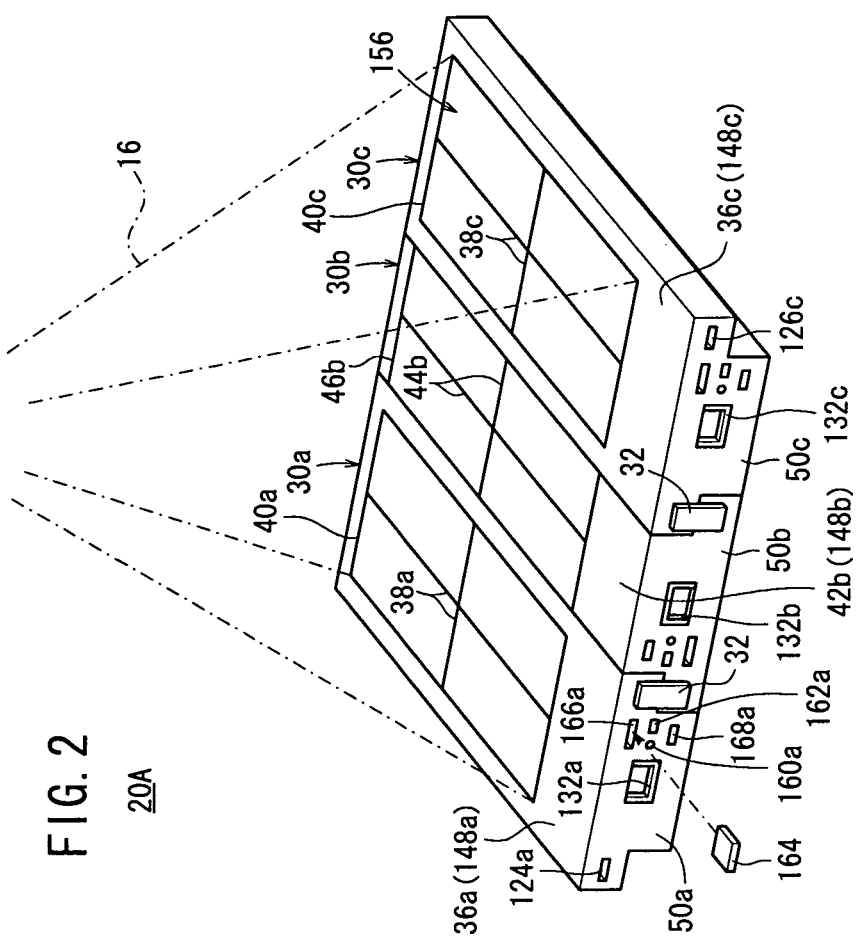
FIG. 2 is a perspective view of the radiographic image capturing apparatus of FIG. 1.
Figure 3:
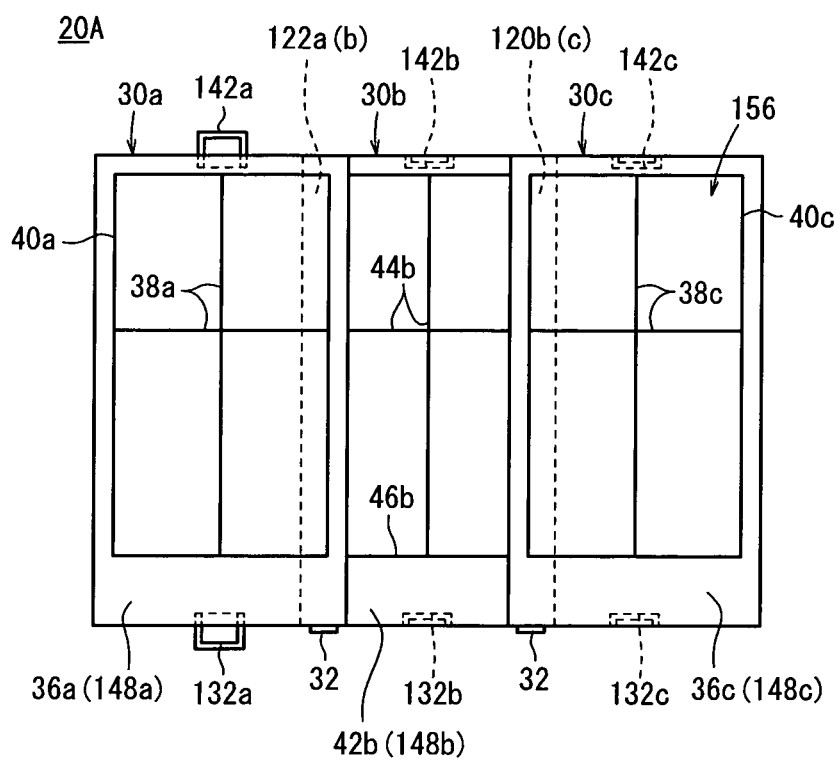
FIG. 3 is a plan view of the radiographic image capturing apparatus of FIG. 1.

Further as shown in FIGS. 2 and 3, even when the radiation detection units 30a-30c are connected, while the respective guide lines 38a-38c, 44a-44c thereof do not overlap, portions of the radiation conversion panels 172a-172c, which are accommodated in the casings 34a-34c, do overlap with each other (see FIG. 4).

Furthermore, the front surfaces 36a-36c and the rear surfaces 42a-42c have mutually the same area, and irradiation fields of the radiation 16 are essentially of the same size for each. However, the sides of the rear surfaces 42a-42c on side portions of the casings 34a-34c are formed as blocks 58a-58c, 60a-60c which, when removed from the casings 34a-34c, are capable of forming step portions (connecting portions) (see FIGS. 6A and 6B). Therefore, the guide lines 44a-44c and the image capturing regions 46a-46c correspond only to regions that are not separable from the casings 34a-34c at the rear surface 42a-42c. More specifically, in each of the casings 34a-34c, surfaces proximate (i.e., joined) to the step portions 120a-120c, 122a-122c define the rear surfaces 42a-42c, whereas surfaces opposed to the rear surfaces and which are distanced from the step portions 120a-120c, 122a-122c define the front surfaces 36a-36c.

Still further, on the casings 34a-34c, the outer periphery of the front surfaces 36a-36c and the outer periphery of the rear surfaces 42a-42c are connected respectively by four side surfaces 50a-50c, 52a-52c, 54a-54c, and 56a-56c. In this case, blocks 58a-58c, which are capable of being separated from the casings 34a-34c, are disposed respectively on sides of the side surfaces 54a-54c of the casings 34a-34c, and together therewith, blocks 60a-60c, which are capable of being separated from the casings 34a-34c, also are disposed respectively on sides of the side surfaces 56a-56c that are opposed to the side surfaces 54a-54c. Moreover, the overall length of the blocks 58a-58c, 60a-60c is set to a distance that lies between the side surfaces 50a-50c and the side surfaces 52a-52c that are opposed to the side surfaces 50a-50c.

Recesses 70a-70c are disposed respectively on a side of the side surfaces 50a-50c of the blocks 58a-58a, with manual operating elements 72a-72c being disposed in the recesses 70a-70c. Further, recesses 74a-74c, which are of the same shape as the recesses 70a-70c, are disposed respectively on a side of the side surfaces 52a-52c of the blocks 58a-58c, with manual operating elements 76a-76c being disposed in the recesses 74a-74c. On the other hand, in the blocks 60a-60c as well, recesses 78a-78c, 82a-82c are disposed respectively therein, which are opposed to the recesses 70a-70c, 74a-74c, with manual operating elements 80a-80c, 84a-84c being disposed in the recesses 78a-78c, 82a-82c.

Figure 6A:
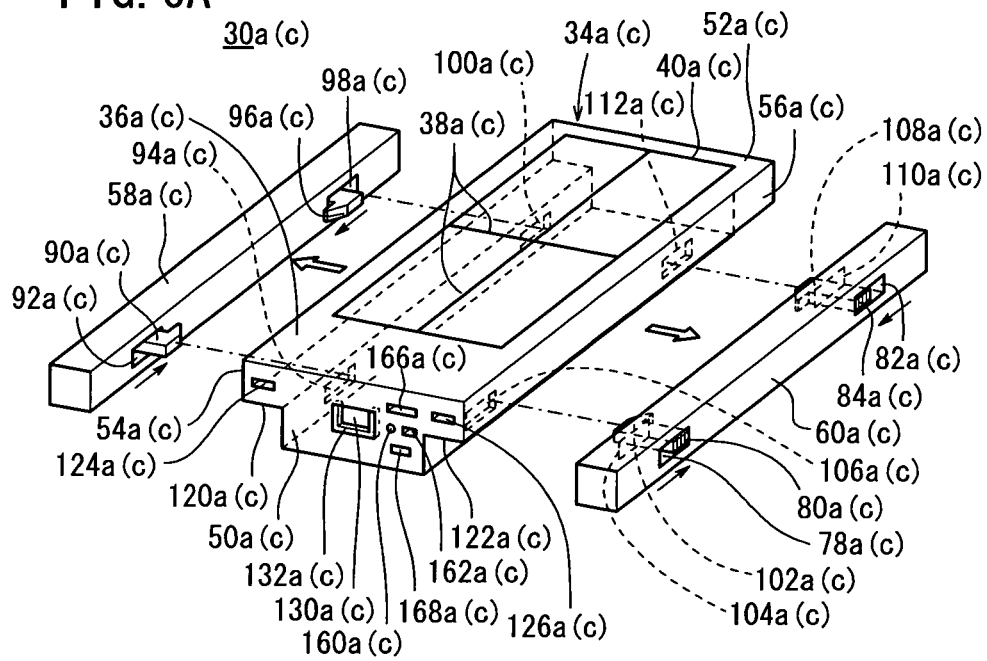
FIG. 6A is a perspective view showing a condition in which two blocks are separated from a single radiation detection unit.
Figure 6B:
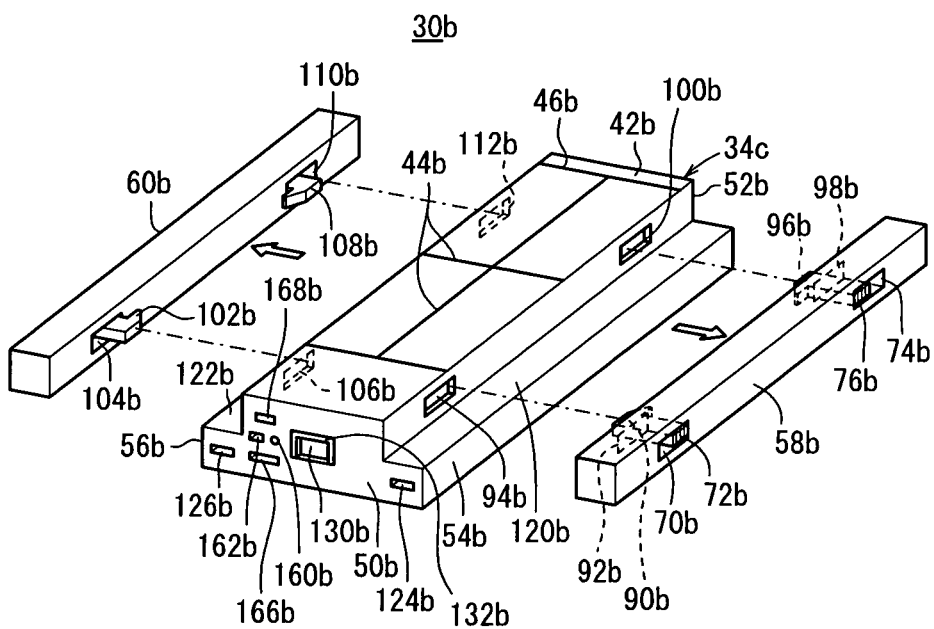
FIG. 6B is a perspective view showing a condition in which two blocks are separated from a single radiation detection unit, which is in a flipped over condition.

Claw members 90a-90c, which are connected to the manual operating elements 72a-72c, penetrate through holes 92a-92c and are disposed respectively on sides of the blocks 58a-58c facing the casings 34a-34c, and on the casings 34a-34c at locations opposed to the holes 92a-92c, holes 94a-94c are formed with which the claw members 90a-90c are engageable (see FIGS. 6A and 6B). Further, similar to the aforementioned claw members 90a-90c, claw members 96a-96c, which are connected to the manual operating elements 76a-76c, penetrate through holes 98a-98c and are disposed respectively on sides of the blocks 58a-58c facing the casings 34a-34c, and on the casings 34a-34c at locations opposed to the holes 98a-98c, holes 100a-100c are formed with which the claw members 96a-96c are engageable.

Similar to the aforementioned claw members 90a-90c, claw members 102a-102c, which are connected to the manual operating elements 80a-80c, penetrate through holes 104a-104c and are disposed respectively on sides of the blocks 60a-60c facing the casings 34a-34c, and on the casings 34a-34c at locations opposed to the holes 104a-104c, holes 106a-106c are formed with which the claw members 102a-102c are engageable. Further, similar to the aforementioned claw members 96a-96c, claw members 108a-108c, which are connected to the manual operating elements 84a-84c, penetrate through holes 110a-110c and are disposed respectively on sides of the blocks 60a-60c facing the casings 34a-34c, and on the casings 34a-34c at locations opposed to the holes 110a-110c, holes 112a-112c are formed with which the claw members 108a-108c are engageable.

Accordingly, in the state shown in FIGS. 5A and 5B, when a doctor or radiological technician displaces the manual operating elements 72a-72c, 76a-76c in directions to approach one another (i.e., to the positions shown in FIG. 6B), the claw members 90a-90c, 96a-96c, which are coupled with the manual operating elements 72a-72c, 76a-76c, are moved, and as a result, the state of engagement between the claw members 90a-90c, 96a-96c and the holes 94a-94c, 100a-100c is released, so that the blocks 58a-58c can be separated from the casings 34a-34c (see FIGS. 6A and 6B). Further, when a doctor or radiological technician displaces the manual operating elements 80a-80c, 84a-84c in directions to approach one another (i.e., to the positions shown in FIG. 6A), the claw members 102a-102c, 108a-108c, which are coupled with the manual operating elements 80a-80c, 84a-84c, are moved, and as a result, the state of engagement between the claw members 102a-102c, 108a-108c and the holes 106a-106c, 112a-112c is released, so that the blocks 60a-60c can be separated from the casings 34a-34c.

By separating and removing the blocks 58a-58c, 60a-60c from the casings 34a-34c, step portions 120a-120c, 122a-122c are formed on sides of the side surfaces 54a-54c, 56a-56c of the casings 34a-34c.

At locations on the side surfaces 50a-50c proximate to the step portions 120a-120c, connection terminals 124a-124c, which are capable of fitting in engagement with the connectors 32, are disposed respectively. Further, at locations on the side surfaces 50a-50c proximate to the step portions 122a-122c as well, connection terminals 126a-126c of the same form as the connection terminals 124a-124c are disposed respectively.

Furthermore, in a central portion of the side surfaces 50a-50c, recesses 130a-130c are formed respectively with handles 132a-132a being arranged in the recesses 130a-130c. On one end portion of the handles 132a-132c, posts 134a-134c are disposed that are inserted into the casings 34a-34c, and on the other end portion as well, posts 136a-136c that are coaxial with the posts 134a-134c are disposed, which are inserted into the casings 34a-34c (see FIG. 5A). Accordingly, as a result of a doctor or radiological technician rotating the handles 132a-132c about the posts 134a-134c, 136a-136c, the handles 132a-132c can be gripped.

Further, in a central portion of the side surfaces 52a-52c as well, recesses 140a-140c, which are the same as the recesses 130a-130c, and handles 142a-142c, which are the same as the handles 132a-132a, are arranged in the recesses 140a-140c. On one end portion of the handles 142a-142c, posts 144a-144c are disposed that are inserted into the casings 34a-34c, and on the other end portion as well, posts 146a-146c that are coaxial with the posts 144a-144c are disposed, which are inserted into the casings 34a-34c (see FIG. 5B).

Accordingly, as a result of a doctor or radiological technician rotating the handles 142a-142c about the posts 144a-144c, 146a-146c, the handles 142a-142c can be gripped. The doctor or radiological technician is thus capable of transporting the radiation detection units 30a-30c by gripping the handles 132a-132c, 142a-142c.

In the case that a single radiographic image capturing apparatus 20A is to be constituted by connecting together three of the radiation detection units 30a-30c, the doctor or radiological technician carries out an assembly operation for the radiographic image capturing apparatus 20A in the following manner.

First, the blocks 58a-58c, 60a-60c are separated from the casings 34a-34c to expose and thereby form the step portions 120a-120c, 122a-122c (see FIGS. 6A and 6B). In this state, the handles 132b, 142b are gripped and the casing 34b is flipped over, whereupon the step portion 122a of the casing 34a and the step portion 122b of the casing 34b are interfitted, and together therewith, the step portion 120b of the casing 34b and the step portion 120c of the casing 34c are interfitted (see FIGS. 7A and 7B). Next, the doctor or radiological technician fits the substantially U-shaped connector 32 into the connection terminals 126a, 126b at sides of the step portions 122a, 122b, and together therewith, fits the other connector 32 into the connection terminals 124b, 124c at sides of the step portions 120b, 120c.

As a result of being assembled in this manner, in the radiographic image capturing apparatus 20A, the radiation detection units 30a-30c are connected in a sequence of the radiation detection unit 30a→the radiation detection unit 30b→the radiation detection unit 30c from the left side to the right side, as shown in FIGS. 1 through 4. In this case, by connecting the radiation detection units 30a-30c while being flipped over sequentially, the upper surface of the radiographic image detecting apparatus 20A is formed by a sequence of the front surface 36a→the rear surface 42b→the front surface 36c, with the front and rear surfaces thereof being turned over alternately along one direction.

Further, as discussed above, because the respective casings 34a-34c are of the same shape and of uniform thickness, when each of the radiation detection units 30a-30c are connected to construct the radiographic image capturing apparatus 20A, bumps (steps) do not occur at the connecting locations between each of the casings 34a-34c (i.e., at the interfitted location of the step portions 122a, 122b and the interfitted location of the step portions 120a, 120c on the upper surface of the radiographic image capturing apparatus 20A), the thickness of the radiographic image capturing apparatus 20A can be the same as the thickness of each of the radiation detection units 30a-30c, and the upper surface of the radiographic image capturing apparatus 20A can remain substantially planar or flat (see FIGS. 1 through 4).

Furthermore, in the case that radiation 16 is irradiated onto the upper surface of the radiographic image capturing apparatus 20A on which the subject 14 lies in a recumbent position (see FIGS. 1 and 2), the front surface 36a, the rear surface 42b and the front surface 36c make up irradiated surfaces 148a-148c to which radiation 16 is applied, and together therewith, an irradiated range of the radiation 16 (i.e., an irradiation field including the image capturing regions 40a, 46b, 40c) is constituted as the image capturing surface (image capturing region) 156 of the radiographic image capturing apparatus 20A.

As shown in FIG. 4, in the interiors of the casings 34a-34c, in wide portions thereof at which the step portions 120a-120c, 122a-122c are not formed, radiation conversion panels 172a-172c, including scintillators 150a-150c, photoelectric conversion layers 152a-152c, and scintillators 154a-154c, which convert radiation 16 into radiographic images, are accommodated respectively. In this case, in each of the casings 34a, 34b, the step portions 122a, 122b are interfitted such that a portion on the side of the radiation conversion panel 172b proximate to the radiation conversion panel 172a overlaps (as viewed in plan) with a portion on the side of the radiation conversion panel 172a proximate to the radiation conversion panel 172b. Further, in each of the casings 34b, 34c as well, the step portions 120b, 122c are interfitted such that a portion on the side of the radiation conversion panel 172c proximate to the radiation conversion panel 172b overlaps (as viewed in plan) with a portion on the side of the radiation conversion panel 172b proximate to the radiation conversion panel 172c.

Furthermore, in the case that one from among each of the radiation detection units 30a-30c is used separately as a single electronic cassette, radiation 16 is applied to the image capturing region 40a, 46b, 40c (or to the image capturing region 46a, 40b, 46c) thereof. In contrast thereto, with the radiographic image capturing apparatus 20A, which is constituted by interconnecting and flipping over sequentially each of the radiation detection units 30a-30c, as stated above, radiation 16 is applied to an image capturing surface 156 that includes all of such image capturing regions 40a, 46b, 40c. Moreover, as shown in FIG. 8, as viewed in plan, the image capturing regions 40a-40c substantially agree with the scintillators 150a-150c (as well as the photoelectric conversion layers 152a-152c and the scintillators 154a-154c).

As shown in FIG. 2, FIG. 5A, and FIGS. 6A through 7A, input terminals 160a-160c of AC adapters for carrying out charging with respect to the radiation detection units 30a-30c from an external power source, USB (universal serial bus) terminals 162a-162c serving as interface means capable of signal transmission and reception of information with external devices, card slots 166a-166c for loading a memory card such as a PC card or the like, and electric power switches 168a-168c for energizing the radiation detection units 30a-30c, are disposed respectively on the side surfaces 50a-50c.

Figure 10:
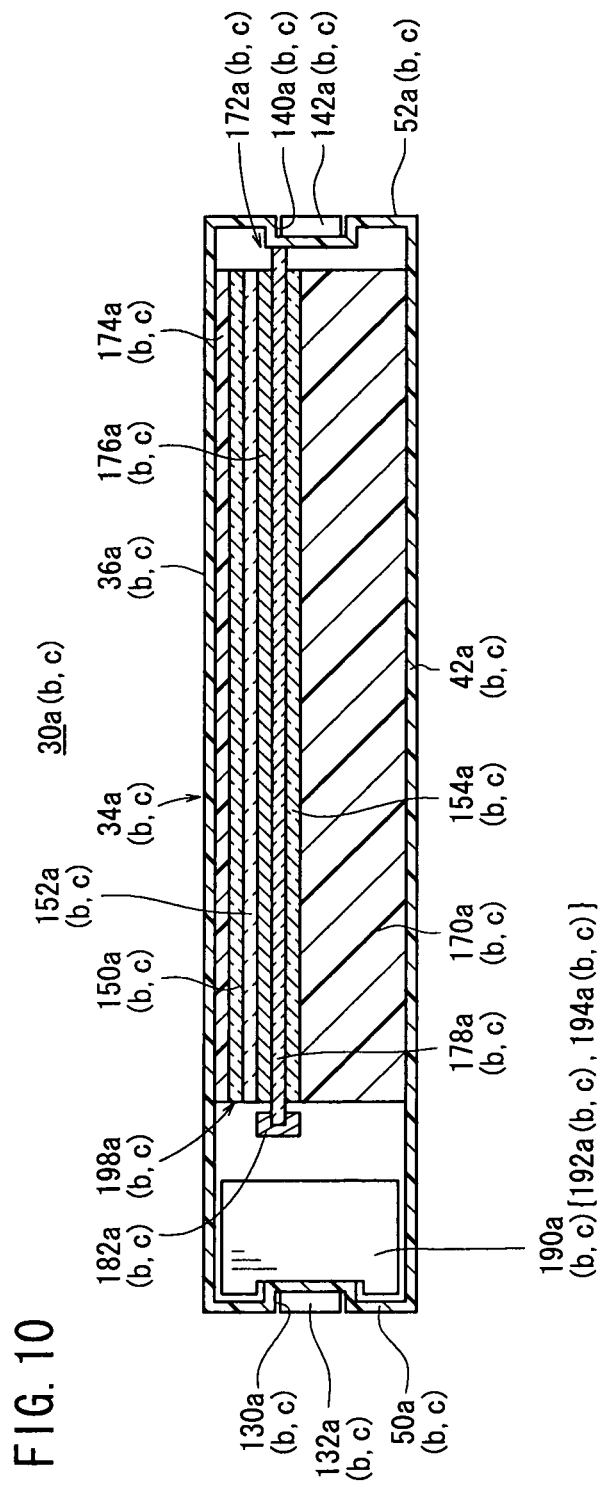
FIG. 10 is a cross sectional view taken along line X-X of FIG. 8.

As shown in FIGS. 8 through 10, on the narrow rear surface 42a-42c side in the interior of the casings 34a-34c, shock absorbing members 170a-170c are disposed respectively, with the radiation conversion panels 172a-172c and additional shock absorbing members 174a-174c being stacked in this order from the shock absorbing members 170a-170c toward the front surfaces 36a-36c.

The shock absorbing members 170a-170c absorb (buffer) shocks that are caused by loads, when such loads are imparted to the rear surfaces 42a-42c from the subject 14, with the rear surfaces 42a-42c serving as upper surfaces. Similarly, the shock absorbing members 174a-174c absorb (buffer) shocks that are caused by loads, when such loads are imparted to the front surfaces 36a-36c from the subject 14, with the front surfaces 36a-36c serving as upper surfaces.

The radiation conversion panels 172a-172c are constituted by stacking the scintillators 154a-154c, optically transparent and radiation transmissive substrates 178a-178c comprising glass substrates or the like, optically transparent TFT layers 176a-176c formed by transparent electrodes or the like, the photoelectric conversion layers 152a-152c, and the scintillators 150a-150c in this order from the shock absorbing members 170a-170c toward the shock absorbing members 174a-174c.

The scintillators 150a-150c, in the case that radiation (A surface radiation) is applied from the exterior with respect to the front surfaces 36a-36c, first convert the radiation 16, which has been irradiated from the front surfaces 36a-36c and through the shock absorbing members 174a-174c, into visible light, whereas, in the case that radiation (B surface radiation) is applied from the exterior with respect to the rear surfaces 42a-42c, the scintillators 150a-150c first convert the radiation 16, which has been irradiated from the rear surfaces 42a-42c through the shock absorbing members 170a-170c, the scintillators 154a-154c, the substrates 178a-178c, the TFT layers 176a-176c, and the photoelectric conversion layers 152a-152, into visible light.

On the other hand, in the case of A surface radiation, the scintillators 154a-154c first convert the radiation 16, which has been irradiated from the front surfaces 36a-36c through the shock absorbing members 174a-174c, the scintillators 150a-150c, the photoelectric conversion layers 152a-152, the TFT layers 176a-176c, and the substrates 178a-178c, into visible light, whereas, in the case of B surface radiation, the scintillators 154a-154c first convert radiation 16, which has been irradiated from the rear surface 42a-42c and through the shock absorbing members 170a-170c, into visible light.

The scintillators 150a-150c, 154a-154c may be constituted from the same materials, or may be made of different materials. In the case of different materials, for example, one of the scintillators may be constituted from cesium iodide (CsI), whereas the other of the scintillators may be constituted from gadolinium oxide sulfur (GOS). Further, in the case that elongate image capturing with respect to the subject 14 is carried out using the radiographic image capturing apparatus 20A, within the elongate image capturing region (the entire body of the subject 14), the scintillators 150a-150c, 154a-154c of radiation detection units that capture images of a specified region of interest may be constituted from CsI, whereas the scintillators 150a-150c, 154a-154c of others of the radiation detection units may be constituted from GOS.

The photoelectric conversion layers 152a-152c convert the visible light into electrical signals, which are signals representative of electric charges, using solid-state detectors (hereinafter also referred to as pixels) 200a-200c (see FIG. 11) made of amorphous silicon (a-Si) or the like.

The TFT layers 176a-176c are constituted by thin film transistors (TFTs) 210a-210c arranged in rows and columns, to which signal lines 204a-204c or signal lines 206a-206c (see FIG. 12) are connected to signal electrodes thereof, and gate lines 202a-202c are connected to gate electrodes thereof. The TFT layers 176a-176c are transmissive to radiation 16 as well as to the aforementioned visible light.

As described above, the radiation conversion panel (radiation detector), which is of an indirect type in which radiation 16 having passed through the subject 14 is first converted into visible light by a scintillator, and then the converted visible light is converted into electrical signals by solid state detecting elements (pixels), comprises a front surface reading type radiation detector, as well as a rear surface reading type radiation detector. Among such radiation detectors, a radiation detector of an ISS (Irradiation Side Sampling) type, serving as a front surface reading type, comprises solid-state detectors and a scintillator that are sequentially provided in this order along the irradiation direction of the radiation 16. Further, a radiation detector of a PSS (Penetration Side Sampling) type, serving as a rear surface reading type, comprises a scintillator and solid-state detectors that are sequentially provided in this order along the irradiation direction of the radiation 16.

The indirect conversion type of radiation conversion panels 172a-172c, as shown in FIGS. 8 through 12, are constituted by sandwiching in a vertical direction the photoelectric conversion layers 152a-152c, in which pixels 200a-200c are used between the scintillators 150a-150c and the scintillators 154a-154c. Owing thereto, in the case of A surface irradiation, the positional relationship of the scintillators 150a-150c and the photoelectric conversion layers 152a-152c is of a PSS type, whereas the positional relationship of the photoelectric conversion layers 152a-152c and the scintillators 154a-154c is of an ISS type. Further, in the case of B surface irradiation, the positional relationship of the scintillators 150a-150c and the photoelectric conversion layers 152a-152c is of an ISS type, whereas the positional relationship of the photoelectric conversion layers 152a-152c and the scintillators 154a-154c is of a PSS type. Accordingly, the radiation conversion panels 172a-172c shown in FIGS. 8 through 12 are constituted by radiation detectors including both ISS types and PSS types.

Further, in FIGS. 8 through 12, although indirect conversion types of radiation conversion panels 172a-172c are shown, a direct conversion type of radiation conversion panel can be adopted, in which the radiation dose is converted directly into electrical signals by means of solid state detecting elements made up from materials such as amorphous selenium (a-Se) or the like.

The substrates 178a-178c, as viewed in plan, are larger than the other materials that make up the radiation conversion panels 172a-172c (see FIG. 8), and in the four corners thereof, sensors 180a-180c are provided, which comprise gyroscopes for detecting an angular speed of the casings 34a-34c, temperature sensors for detecting temperature, or load sensors for detecting loads or distortions applied to the irradiated surfaces 148a-148c from the subject 14.

Further, on sides of the substrates 178a-178c proximate to the side surfaces 50a-50c, driving circuits 182a-182c are disposed for driving the radiation conversion panels 172a-172c, on sides of the substrates 178a-178c proximate to the side surfaces 54a-54c, readout circuits 184a-184c for reading out electric signals from the radiation conversion panels 172a-172c are disposed, and on sides of the substrates 178a-178c proximate to the side surfaces 56a-56c, readout circuits 186a-186c also for reading out electric signals are disposed. Additionally, the panel portions 198a-198c, which convert radiation 16 into radiographic images and output the same, are made up collectively from the radiation conversion panels 172a-172c, the driving circuits 182a-182c, and the readout circuits 186a-186c.

On the other hand, in the interiors of the casings 34a-34c in the vicinity of the side surfaces 50a-50c, there are arranged respectively electrical power sources 190a-190c made up of batteries or the like for supplying power to each of the internal components of the radiation detection units 30a-30c, cassette controllers 192a-192c for controlling the radiation conversion panels 172a-172c via the driving circuits 182a-182c and the readout circuits 184a-184c, 186a-186c, and communications devices 194a-194c, which are capable of sending and receiving signals wirelessly to and from the console 22, as well as sending and receiving signals to and from other radiation detection units via the connectors 32. Additionally, the controllers 196a-196c, which control the panel portions 198a-198c including the radiation conversion panels 172a-172c, are constituted collectively from the electrical power sources 190a-190c, the cassette controllers 192a-192c, and the communications devices 194a-194c. Moreover, the controllers 196a-196c are arranged at regions that lie outside of the panel portions 198a-198c, which are irradiated with radiation 16.

Figure 11:
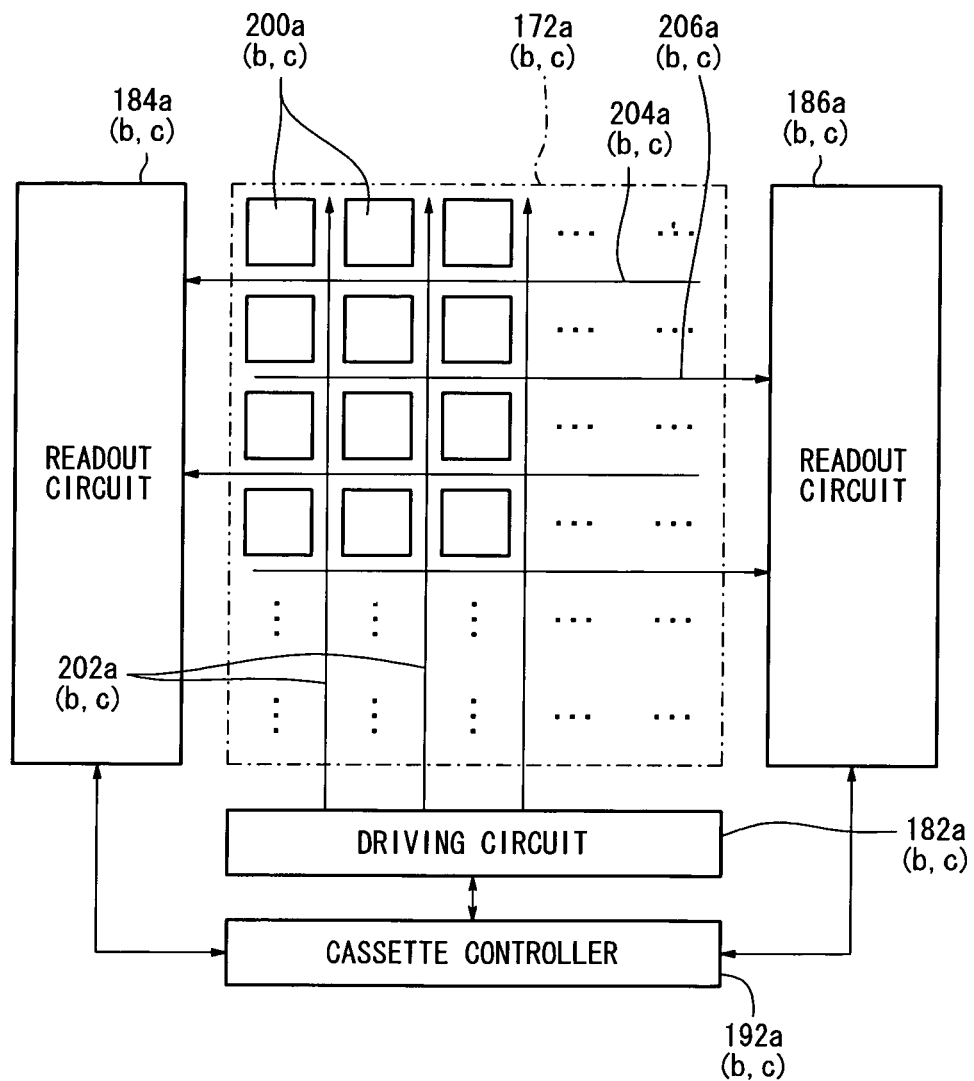
FIG. 11 is an explanatory drawing showing schematically an arrangement of pixels in a radiation conversion panel, and electrical connections between the pixels and a cassette controller.

As shown schematically in FIG. 11, in the interiors of each of the radiation detection units 30a-30c, as noted previously, at the radiation conversion panels 172a-172c, a number of pixels 200a-200c are arranged on the substrates 178a-178c through the TFT layers 176a-176c (see FIGS. 9 and 10). Further, a number of gate lines 202a-202c, which supply control signals to the pixels 200a-200c from the driving circuits 182a-182c, a number of signal lines 204a-204c that read electrical signals (signal charges) output from the plural pixels 200a-200c and output the same to readout circuits 184a-184c, and a number of signal lines 206a-206c that read out electrical signals output from the plural pixels 200a-200c and output the same to the readout circuits 186a-186c, are arranged therein as well.

From the top to the bottom in FIG. 11, electrical signals of odd row pixels 200a-200c are read out to the readout circuits 184a-184c through the signal lines 204a-204c, whereas electrical signals of even row pixels 200a-200c are read out to the readout circuits 186a-186c through the signal lines 206a-206c.

Next, concerning the circuit structure and block diagram of the radiographic image capturing apparatus 20A, details thereof shall be explained with reference to FIGS. 12 and 13.

The radiation conversion panels 172a-172c include structures in which the photoelectric conversion layers 152a-152c formed by respective pixels 200a-200c, which are made up from a substance such as a-Si or the like that converts electrical signals into visible light, are disposed on top of the array of TFTs 210a-210c, which are arranged in rows and columns. In this case, at each of the pixels 200a-200c to which bias voltages are supplied from a bias circuit 214 that constitutes part of the driving circuits 182a-182c, electric charges, which are generated by conversion of visible light into electric signals (analog signals), are stored, and by turning ON each of the TFTs 210a-210c each column at a time, the electric charges can be read out as image signals.

Figure 12:
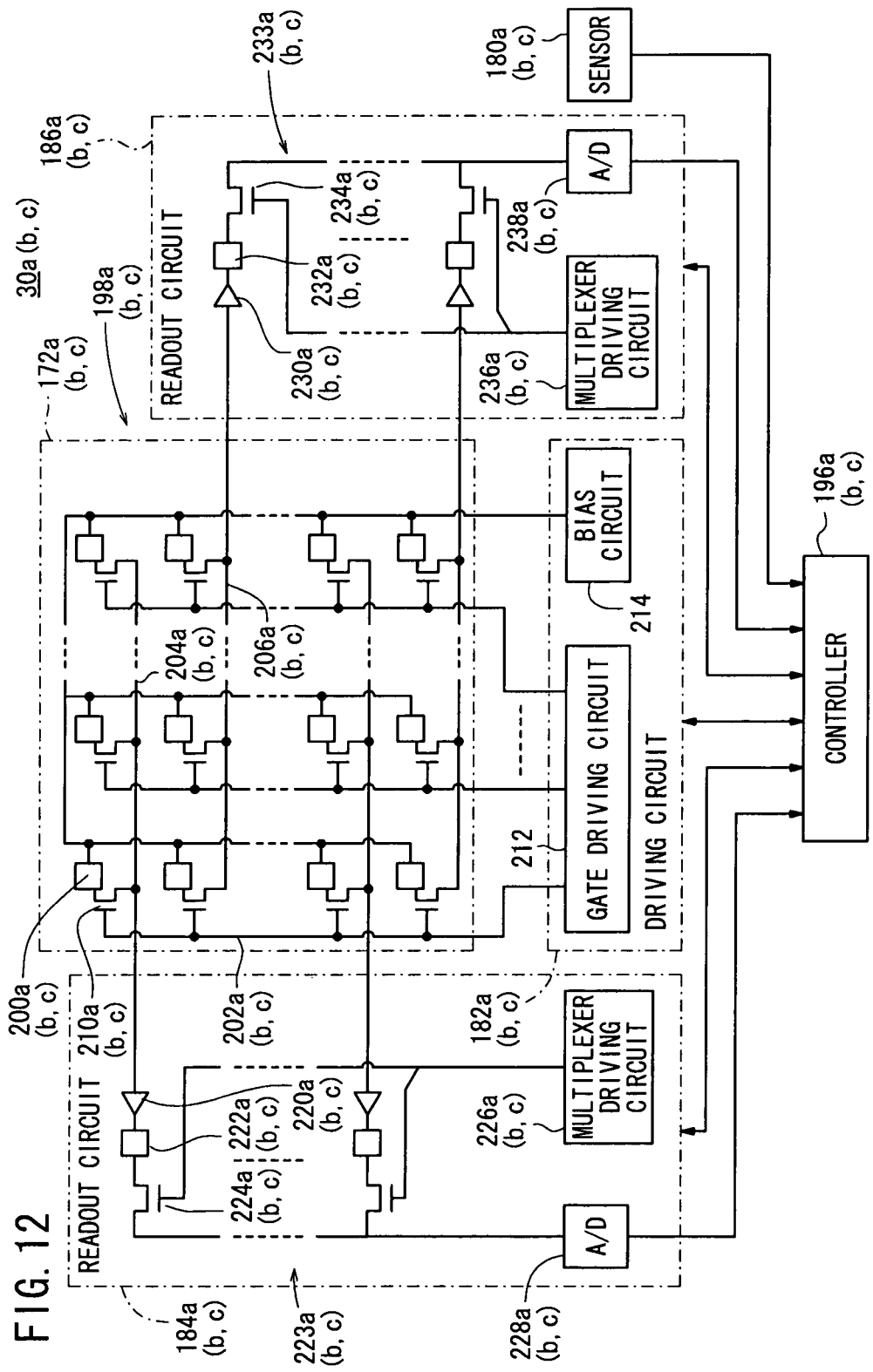
FIG. 12 is a block diagram of a panel accommodating unit.

Among the TFTs 210a-210c, which are connected respectively to the pixels 200a-200c, from the top to the bottom in FIG. 12, TFTs 210a-210c that are arrayed in odd numbered rows are connected to the gate lines 202a-202c that extend in parallel along the direction of the columns, and to the signal lines 204a-204c that extend in parallel along the direction of the rows. Further, TFTs 210a-210c that are arrayed in even numbered rows are connected to the gate lines 202a-202c, and to the signal lines 206a-206c that extend in parallel along the direction of the rows.

In this case, each of the gate lines 202a-202c are connected to a gate driving circuit 212, and the gate lines 202a-202c are supplied from the gate driving circuit 212 with control signals, which control ON and OFF switching of the TFTs 210a-210c that are arrayed in the direction of the columns. Address signals from the cassette controllers 192a-192c are supplied to the gate driving circuit 212.

Electric charges, which are retained in each of the pixels 200a-200c, flow out respectively to the signal lines 204a-204c, 206a-206c through the TFTs 210a-210c arranged in the rows. The electric charges are amplified respectively by amplifiers 220a-220c, 230a-230c. Multiplexers 223a-223c, 233a-233c are connected respectively to the amplifiers 220a-220c, 230a-230c through sample and hold circuits 222a-222c, 232a-232c. The multiplexers 223a-223c, 233a-233c each comprise respectively, FET (field effect transistor) switches 224a-224c, 234a-234c that switch between the signal lines 204a-204c, 206a-206c, and multiplexer driving circuits 226a-226c, 236a-236c that output selection signals for turning on one of the FET switches 224a-224c, 234a-234c at a time. Address signals from the cassette controllers 192a-192c (see FIGS. 11 and 13) are supplied to the multiplexer driving circuits 226a-226c, 236a-236c. A/D converters 228a-228c, 238a-238c are connected to the FET switches 224a-224c, 234a-234c, and radiographic images, which have been converted into digital signals by the A/D converters 228a-228c, 238a-238c, are supplied to the cassette controllers 192a-192c.

The TFTs 210a-210c, which function as switching devices, may be combined with another image capturing device, such as a CMOS (Complementary Metal-Oxide Semiconductor) image sensor or the like. Alternatively, the TFTs 210a-210c may be replaced with a CCD (Charge-Coupled Device) image sensor for shifting and transferring electric charges with shift pulses that correspond to gate signals in the TFTs.

Figure 13:
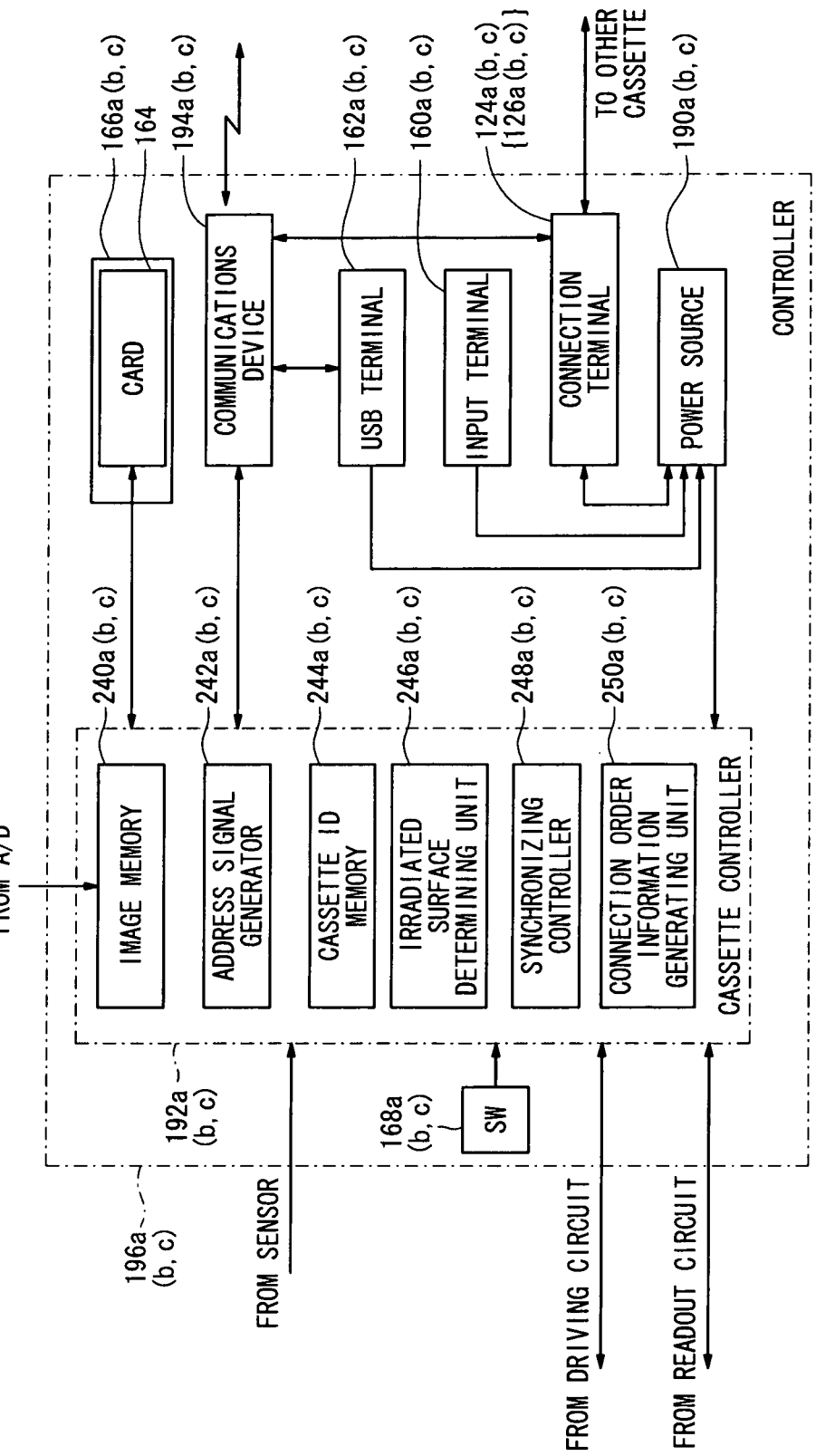
FIG. 13 is a block diagram of a controller.

As shown in FIG. 13, the cassette controllers 192a-192c comprise image memories 240a-240c, address signal generators 242a-242c, cassette ID memories 244a-244c, irradiated surface determining units (irradiated surface detectors) 246a-246c, synchronizing controllers 248a-248c, and connection order information generating units 250a-250c.

The image memories 240a-240c store radiographic images, which are detected by the radiation conversion panels 172a-172c.

The address signal generators 242a-242c supply address signals with respect to the gate driving circuit 212 and the multiplexer driving circuits 226a-226c, 236a-236c. The cassette ID memories 244a-244c store therein ID information for specifying the radiation detection units 30a-30c.

The irradiated surface determining units 246a-246c determine, based on outputs from the sensors 180a-180c, whether the irradiated surfaces 148a-148c are made up either of the front surfaces 36a-36c or the rear surfaces 42a-42c.

For example, if the sensors 180a-180c are gyroscopes, the irradiated surface determining units 246a-246c determine whether the irradiated surfaces 148a-148c are made up either of the front surfaces 36a-36c or the rear surfaces 42a-42c, based on an angular speed (inclination angle) of the casings 34a-34c, which is detected by the gyroscopes.

Further, during image capturing, because the subject 14 is in a recumbent position on the image capturing surface 156, heat in the interior of the radiation detection units 30a-30c is transmitted via the image capturing surface 156. Further, due to loads imposed on the radiation detection units 30a-30c via the image capturing surface 156, the radiation detection units 30a-30c are subject to distortions over the entirety thereof.

Consequently, assuming the sensors 180a-180c are temperature sensors, the irradiated surface determining units 246a-246c determine whether the irradiated surfaces 148a-148c are made up either of the front surfaces 36a-36c or the rear surfaces 42a-42c, based on the temperature detected by the temperature sensors at the installed locations thereof. Further, assuming the sensors 180a-180c are load sensors, the irradiated surface determining units 246a-246c determine whether the irradiated surfaces 148a-148c are made up either of the front surfaces 36a-36c or the rear surfaces 42a-42c, based on loads detected by the load sensors at the installed locations thereof.

The synchronizing controllers 248a-248c synchronize the image capturing times of each of the radiation detection units 30a-30c by performing transmission and receipt of synchronizing control signals between the radiation detection units via the communications devices 194a-194c and the connectors 32. More specifically, in the case that radiation 16 is irradiated onto the image capturing surface 156 from the radiation irradiating apparatus 18 while passing through the subject 14, at the timing indicated by the synchronizing control signals, prior to the aforementioned timing, the synchronizing controllers 248a-248c control the radiation conversion panels 172a-172c so as to be placed in a state capable of storing electric charges in each of the pixels 200a-200c of the radiation conversion panels 172a-172c.

The connection order information generating units 250a-250c specify (detect) a connection order of each of the radiation detection units 30a-30c in the radiographic image capturing apparatus 20A through signal transmission and reception of cassette ID information between adjacent radiation detection units via the communications devices 194a-194c and the connectors 32, and then generates the connection order information, which is indicated by the specified connection order, the ID information of each of the radiation detection units 30a-30c, and the irradiated surfaces 148a-148c determined by the irradiated surface determining units 246a-246c.

Figure 14:
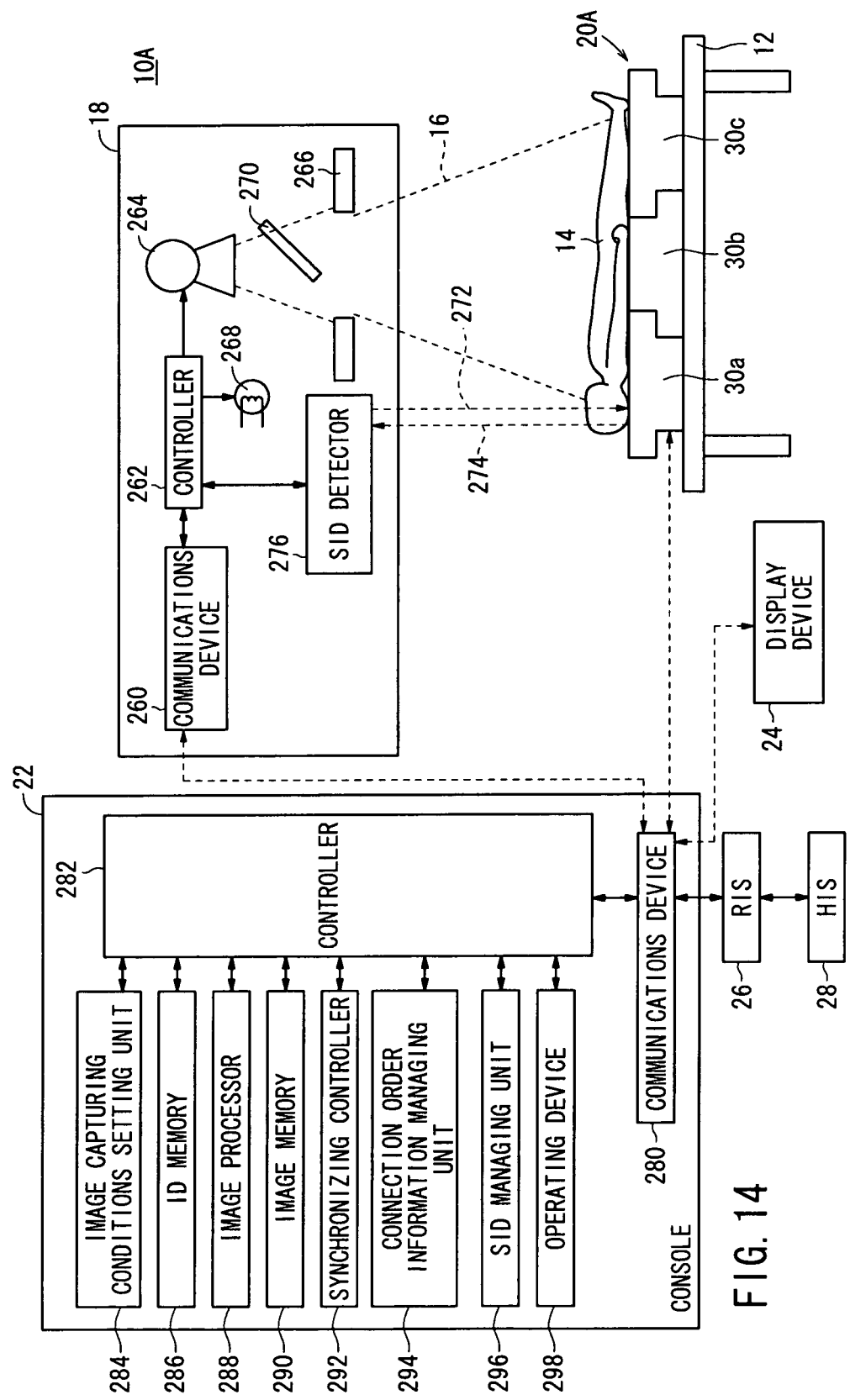
FIG. 14 is a block diagram illustrating details of the radiographic image capturing system of FIG. 1.

As shown in FIG. 14, the console 22 includes a communications device 280, a controller 282, an image capturing conditions setting unit 284, an ID memory 286, an image processor 288, an image memory 290, a synchronizing processor 292, a connection order information managing unit 294, an SID (source-to-image distance) managing unit 296, and an operating device 298. Note that the radiographic image capturing apparatus 20A is shown schematically in FIG. 14.

The communications device 280 carries out sending and receipt of signals between the radiographic image capturing apparatus 20A, the display device 24, the RIS 26, and the HIS 28. The controller 282 controls the console 22 totally.

In this case, the controller 282 stores order information for the images acquired from the RIS 26 in the image capturing conditions setting unit 284. Further, the controller 282 stores in the image capturing conditions setting unit 284 image capturing conditions for elongate image capturing with respect to the subject 14, which are acquired from the RIS 26, or are set by a doctor or radiological technician by operating the operating device 298, such as a keyboard, a mouse or the like.

The order information is created by a doctor utilizing the RIS 26, and in addition to subject information for specifying the subject, e.g., the name, age, gender, etc., of the subject 14, also includes the image radiographic capturing apparatus used for image capturing, the image capturing region, and image capturing conditions. Further, the image capturing conditions comprise conditions for determining a tube voltage, a tube current, a radiation applying time of the radiation 16, and the radiation dose to be applied to the subject 14, of the radiation source 264 that makes up the radiation irradiating apparatus 18.

Cassette ID information of the respective radiation detection units 30a-30c is stored in the ID memory 286. The synchronizing processor 292 generates synchronizing control signals, and transmits the synchronizing control signals to the radiation irradiating apparatus 18 and the radiographic image capturing apparatus 20A via the communications device 280. The connection order information managing unit 294 stores (manages) the connection order information, which is received through the communications device 280 from the radiographic image capturing apparatus 20A. The SID managing unit 296, based on the image capturing conditions at the time of image capturing, stores (manages) the distance (SID) between the radiation source 264 and (each of the radiation conversion panels 172a-172c of the) the radiographic image capturing apparatus 20A.

The image processor 288 image-combines the radiographic images of each of the radiation detection units 30a-30c, which are received from the radiographic image capturing apparatus 20A via the communications device 280, and stores in the image memory 290 an image (i.e., the elongate image-captured image) corresponding to the elongate image capturing region of the subject 14 upon completion of image combining, along with each of the radiographic images that were used to carry out image combining.

As described previously, the distances of each of the radiation conversion panels 172a-172c with respect to the radiation source 264 differ mutually from each other, and portions among adjacent radiation conversion panels are mutually superimposed. As a result, if image combining is carried out simply by connecting together sequentially each of the radiographic images according to the connection order of the radiation detection units 30a-30c, there is a concern that the combined image obtained thereby will be an image exhibiting a non-uniform image quality.

Consequently, the image processor 288 first refers to the connection order information stored in the connection order information managing unit 294 and the cassette ID information stored in the ID memory 286, and grasps the connection order of each of the radiation detection units 30a-30c, and then referring to the SID managing unit 296, specifies the source-to-image distances (SID) between the radiation source 264 and each of the radiation conversion panels 172a-172c.

Next, taking into consideration the differing attenuation of the radiation 16 corresponding to the SID, after image correction processing is carried out in view of the attenuation factor of the radiation 16 with respect to each of the radiographic images, the image processor 288 performs image combining in which the respective radiographic images are connected sequentially in accordance with the connection order information. As stated earlier, since, although the guide lines themselves of the adjacent casings do not overlap, portions among the adjacent radiation conversion panels are mutually superimposed, when the radiographic images are connected, portions of the images are superimposed on each other. However, by performing the aforementioned image correction process beforehand, a combined image (i.e., an elongate image-captured image produced by elongate image capturing) the image quality of which is uniformly equalized can be obtained.

The elongate image-captured image obtained in this manner is stored in the image memory 290 together with each of the radiographic images that were used to perform image combining.

The controller 282 sends the elongate image-captured image that was stored in the image memory 290 to the display device 24 via the communications device 280. The display device 24 displays the received elongate image-captured image.

On the other hand, the radiation irradiating apparatus 18 includes a communications device 260, a controller 262, a radiation source 264, a collimator 266, an exposure field lamp 268, a mirror 270, and a SID detector 276.

The communications device 260 carries out sending and reception of signals with the aforementioned communications device 280. The controller 262 controls respective parts of the radiation irradiating apparatus 18 according to instructions from the console 22. The radiation source 264, when synchronizing control signals are transmitted to the controller 262 from the console 22 via the communications devices 280, 260, outputs radiation 16 at a given timing indicated by the synchronizing control signals. The collimator 266 controls the irradiation range of the radiation source 264 by adjusting the radiation source aperture in accordance with controls from the controller 262.

The exposure field lamp 268 outputs exposure light (i.e., visible light indicative of an exposure field, not shown) prior to radiation 16 being output from the radiation source 264. Such exposure light is reflected toward the collimator 266 by the mirror 270, passes through the collimator 266, and is projected onto the image capturing surface 156.

In this case, if the distance between the radiation source 264 and each of the radiation conversion panels 172a-172c is adjusted, the exposure field (irradiation field of the radiation 16) of the exposure light on the upper surface of the radiographic image capturing apparatus 20A and the range (image capturing regions 40a, 46b, 40c) of the image capturing surface substantially match one another. Accordingly, the doctor or radiological technician adjusts the positional relationship between the radiographic image capturing apparatus 20A and the radiation irradiating apparatus 18 so that the aforementioned distance matches with the SID.

The SID detector 276 includes a range sensor in which ultrasonic waves or infrared light is used, whereby the distance between the radiation source 264 and the radiographic image capturing apparatus 20A is detected based on a time from transmission of a transmitter pulse 272 to the radiographic image capturing apparatus 20A and until a reflected pulse 274 therefrom is received. In this case, the controller 282 of the console 22 transmits the SID stored in the SID managing unit 296 to the controller 262 of the radiation irradiating apparatus 18 via the communications devices 280, 260. Accordingly, the SID detector 276 compares the distance between the radiation source 264 and the radiographic image capturing apparatus 20A with the distance detected by the SID detector 276, and when the two distances match each other, the SID detector 276 notifies the controller 262 of the result, which indicates that the distance between the radiation source 264 and each of the radiation conversion panels 172a-172c has been set to the SID. Upon the notification, the controller 262 stops the output of the exposure light from the exposure field lamp 268.

The radiographic image capturing system 10A according to the first embodiment is constructed basically as described above. Next, operations thereof shall be explained with reference to the flowcharts of FIG. 15 and FIG. 16.

In step S1, the communications device 280 (see FIG. 14) of the console 22 acquires order information from the RIS 26. The acquired order information is stored in the image capturing conditions setting unit 284. A doctor or radiological technician operates the operating device 298, whereupon the order information stored in the image capturing conditions setting unit 284 is displayed on the display device 24. Then, the doctor or radiological technician operates the operating device 298 while observing the order information displayed on the display device 24, and inputs cassette ID information of the radiation detection units 30a-30c, together with selecting an image capturing condition corresponding to elongate image capturing. As a result, the selected image capturing conditions are set in the image capturing conditions setting unit 284, and the input cassette ID information is stored in the ID memory 286. Further, a SID (source-to-image distance) responsive to the selected image capturing conditions also is stored in the SID managing unit 296.

Next, in step S2, the doctor or radiological technician carries out image capturing preparations for capturing a radiographic image of an elongate image capturing region of the subject (e.g., the entire body of the subject 14).

First, in step S21, which is a sub-step of step S2, concerning each of the radiation detection units 30a-30c, the doctor or radiological technician releases the condition of engagement between the claw members 90a-90c, 96a-96c and the holes 94a-94c, 100a-100c, and separates the blocks 58a-58c from the casings 34a-34c by displacing the manual operating elements 72a-72c, 76a-76c (see FIGS. 5A to 6B) in directions to mutually approach one another, thereby causing the claw members 90a-90c, 96a-96c to move.

Further, the doctor or radiological technician releases the condition of engagement between the claw members 102a-102c, 108a-108c and the holes 106a-106c, 112a-112c, and separates the blocks 60a-60c from the casings 34a-34c by displacing the manual operating elements 80a-80c, 84a-84c in directions to mutually approach one another, thereby causing the claw members 102a-102c, 108a-108c to move.

Figure 7A:
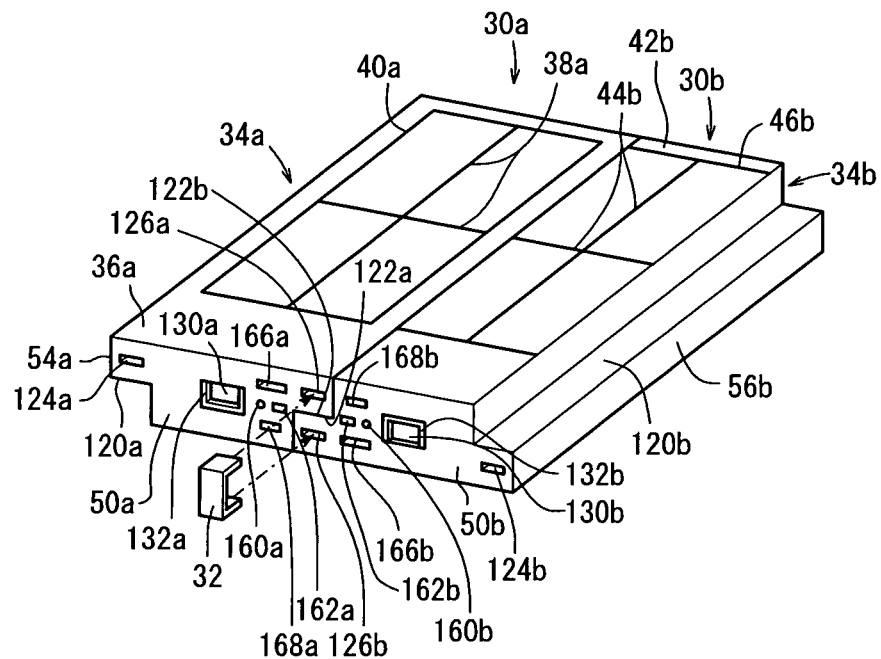
FIG. 7A is a perspective view showing a condition in which the radiation detection unit of FIG. 6A and the radiation detection unit of FIG. 6B are connected together.
Figure 7B:
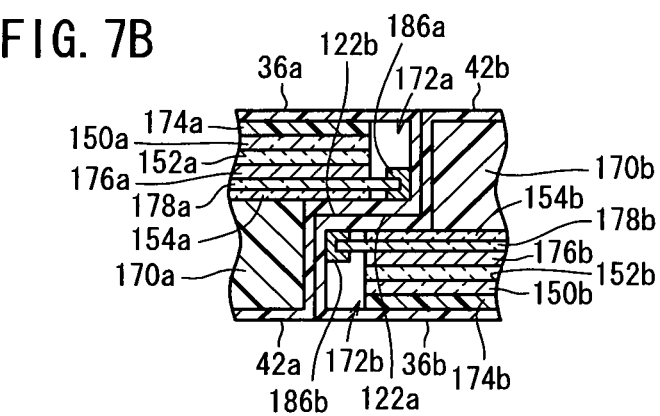
FIG. 7B is a cross sectional view showing a condition of a connection location between two radiation detection units.

In step S22, the doctor or radiological technician grips the handles 132b, 142b and flips the casing 34b over, so that in a state where the rear surface 42b serves as an upper surface, the step portion 122a of the casing 34a is interfitted with the step portion 122b of the casing 34b, and the step portion 120b of the casing 34b is interfitted with the step portion 120c of the casing 34c (see FIGS. 7A and 7B). Next, the doctor or radiological technician fits one connector 32 into the connection terminals 126a, 126b on the side of the step portions 122a, 122b, and also fits another connector 32 into the connection terminals 124a, 124b on the side of the step portions 120b, 120c. In this manner, the respective radiation detection units 30a-30c are flipped over sequentially and connected, whereby a single radiographic image capturing apparatus 20A can be constructed in which the image capturing surface 156 thereof is substantially planar, without causing bumps (or steps) to occur at the connected locations between the respective casings 34a-34c (see FIGS. 1 to 4).

In step S23, after the subject is placed in a recumbent position on the image capturing surface 156, the doctor or radiological technician turns on the electric power switches 168a-168c. As a result, supply of power to each of the radiation detection units 30a-30c from the electrical power sources 190a-190c is started.

In step S24, the sensors 180a-180c (see FIGS. 8 and 12), (1) if gyroscopes, detect the angular velocity of the casings 34a-34c, (2) if temperature sensors, detect the temperature at the installation locations of the temperature sensors, or (3) if load sensors, detect the load or amount of distortion at the installation locations of the load sensors. The irradiated surface determining units 246a-246c (see FIG. 13), based on the angular velocity detected by the gyroscopes, the temperature detected by the temperature sensors, or the load or amount of distortion detected by the load sensors, determines whether the irradiated surfaces 148a-148c are front surfaces 36a-36c or rear surfaces 42a-42c, and outputs the determination result to the connection order information generating units 250a-250c.

In step S25, the connection order information generating units 250a-250c specify the adjacent radiation detection units by transmission and reception of cassette ID information stored in the cassette ID memories 244a-244c between the adjacent radiation detection units, via the communications devices 194a-194c and the connectors 32. Owing thereto, the order in which each of the radiation detection units 30a-30c that make up the radiographic image capturing apparatus 20A are connected can be specified.

In step S26, the connection order information generating units 250a-250c generate connection order information, which indicates the specified connection order, the cassette ID information of the respective radiation detection units 30a-30c connected in sequence, and information of the irradiated surfaces 148a-148c as determined by the irradiated surface determining units 246a-246c. Thereafter, in step S27, the generated connection order information is sent to the console 22 via the communications devices 194a-194c. The connection order information managing unit 294 (see FIG. 14) of the console 22 stores the connection order information, which was received via the communications device 280 and the controller 282. Further, because the connection order information is information indicative of the connection order of the radiation detection units 30a-30c in the radiographic image capturing apparatus 20A, such information may also be transmitted with respect to the console 22 from any one of the communication devices 194a-194c from among the three radiation detection units 30a-30c.

In step S28, the controller 282, after having confirmed that the connection order information has been stored in the connection order information managing units 294, sends the SID (source-to-image distance) stored in the SID managing unit 296, and instruction signals to instruct setting of the irradiation field with respect to the radiation irradiating apparatus 18 via the communications device 280.

When the aforementioned instruction signal and SID are received via the communications device 260, the controller of the radiation irradiating apparatus 18 adjusts the aperture of the collimator 266 to control the irradiation field, together with activating the exposure field lamp 268. Owing thereto, the exposure field lamp 268 begins to output exposure light, and after being reflected by the mirror 270 to the side of the collimator 266, the exposure light passes through the collimator 266 and is projected onto the image capturing surface 156.

The doctor or radiological technician adjusts the position of the radiation irradiating apparatus 18 with respect to the image capturing surface 156 so as to bring the exposure field of the exposure light, which corresponds to the irradiation field of the radiation 16, into agreement with the image capturing surface 156.

Further, the controller 262 outputs the SID to the SID detector 276 and thereby activates the SID detector 276.

Based on a time from transmission of the transmitter pulse 272 to the image capturing surface 156 and until the reflected pulse 274 is received, the SID detector 276 detects the distance between the radiation source 264 and the radiographic image capturing apparatus 20A, together with determining whether or not the detecting distance matches the distance corresponding to the SID. In addition, in the case that the distance detected by the SID detector matches with the distance corresponding to the SID due to matching between the projected range of the irradiated light and the image capturing surface 156, the SID detector 276 notifies the controller 262 that both are in agreement.

Upon receipt of notification from the SID detector 276, the controller 262 stops driving the exposure field lamp 268. Owing thereto, since output of exposure light from the exposure field lamp 268 is stopped, the doctor or radiological technician can grasp immediately that the distance between the radiation source 264 and the radiation conversion panels 172a-172c has been set to the SID (source-to-image distance). Furthermore, the controller 262 also notifies the console 22 through the communications device 260 that the aforesaid distance has been set to the SID.

Figure 15:
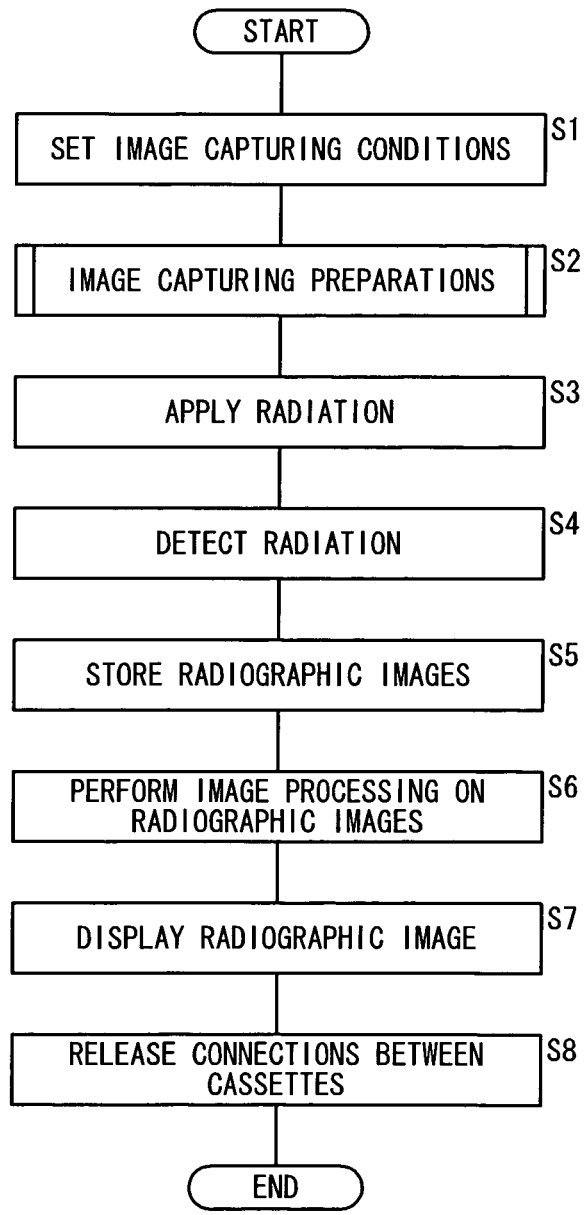
FIG. 15 is a flowchart for explaining a sequence of steps for carrying out elongate image capturing using the radiographic image capturing apparatus of FIG. 1.
Figure 16:
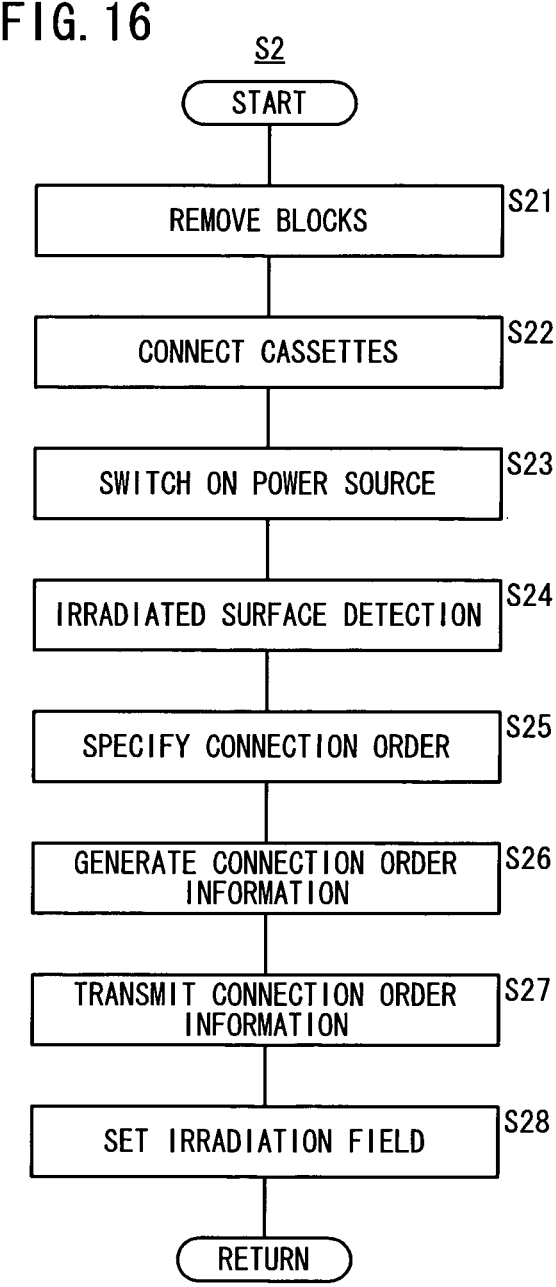
FIG. 16 is a flow chart for explaining further details of the process of step S2 in the flowchart of FIG. 15.

In this manner, after completion of image capturing preparations, in step S3 of FIG. 15, the doctor or radiological technician turns on a non-illustrated exposure switch (not shown), which may be comprised by the operating device 298 (see FIG. 14).

As a result thereof, the synchronizing processor 292 sends a synchronizing control signal, which indicates the timing at which radiation 16 is output from the radiation source 264 to the radiation irradiating apparatus 18 and to the radiographic image capturing apparatus 20A via the communications device 280.

When the synchronizing control signals are received therein via the communications devices 194a-194c, the synchronizing controllers 248a-248c (see FIG. 13) of each of the radiation detection units 30a-30c initiate supply of bias voltages to the respective pixels 200a-200c from the bias circuits 214 of the driving circuits 182a-182c (see FIGS. 11 and 12). As a result, the pixels 200a-200c are rendered capable of storing electric charges therein prior to being irradiated with radiation 16.

On the other hand, when the synchronizing control signals are received via the communications device 260, the controller 262 of the radiation irradiating apparatus 18 issues a request with respect to the console 22 to transmit the image capturing conditions, whereupon the console 22, in response to the transmission request from the controller 262, sends the image capturing conditions to the radiation irradiating apparatus 18 via the communications device 280.

When the image capturing conditions have been received via the communications device 260, the controller 262, in accordance with the image capturing conditions and at the timings indicated by the synchronizing control signals, applies radiation 16 having a predetermined dose toward the subject 14 for a predetermined exposure time. Radiation 16 output from the radiation source 264 passes through the collimator 266 and is irradiated onto the subject 14, whereupon the radiation 16 passes through the subject 14 and reaches the radiation conversion panels 172a-172c housed in the radiation detection units 30a-30c (see FIG. 4 and FIGS. 7B to 12).

In step S4, inside each of the radiation detection units 30a-30c, the scintillators 150a-150c, 154a-154c that constitute the radiation conversion panels 172a-172c emit visible light of an intensity corresponding to the intensity of the radiation 16, and the respective pixels 200a-200c that make up the photoelectric conversion layers 152a-152c convert the visible light into electrical signals, which are stored as electric charges. Thereafter, the electrical charge information stored in the pixels, which represents a radiographic image of the subject 14, is read out according to address signals, which are supplied from the address signal generators 242a-242c of the cassette controllers 192a-192c to the gate driving circuit 212 and to the multiplexer driving circuits 226a-226c, 236a-236c.

In this case, at the panel portions 198a-198c, simultaneously with reading out of charge information of each of pixels 200a-200c of odd numbered rows, charge information of each of pixels 200a-200c of even numbered rows is read out by the readout circuits 186a-186c, and such charge information is output to the controllers 196a-196c.

First, an explanation shall be given concerning reading out of electrical charge information from the respective pixels 200a-200c of odd numbered rows.

The gate driving circuit 212 supplies control signals to the gates of the TFTs 210a-210c that are connected to the gate lines 202a-202c, corresponding to the address signals that are supplied from the address signal generators 242a-242c. On the other hand, the multiplexer driving circuits 226a-226c output selecting signals and switch sequentially (i.e., turn ON and OFF in sequence) the FET switches 224a-224c according to address signals supplied from the address signal generators 242a-242c, and sequentially read out via the signal lines 204a-204c radiographic images as electric charges, which are retained in each of the pixels 200a-200c of odd number rows connected to the gate lines 202a-202c selected by the gate driving circuit 212.

Radiographic images read out from each of the pixels 200a-200c that are connected to the selected gate lines 202a-202c, after being amplified by the respective amplifiers 220a-220c, are sampled by the sample and hold circuits 222a-222c and via the FET switches 224a-224c are supplied to the A/D converters 228a-228c where they are converted into digital signals. The radiographic images converted into digital signals are temporally stored in the image memories 240a-240c of the cassette controllers 192a-192c (step S5).

In the same manner, the gate driving circuit 212, according to address signals supplied from the address signal generators 242a-242c, sequentially switches between gate lines 202a-202c that output control signals, and the radiographic images, which are made up of electrical charge information stored in respective pixels 200a-200c of odd number rows connected to each of the gate lines 202a-202c, are read out and stored in the image memories 240a-240c of the cassette controllers 192a-192c via the FET switches 224a-224c and the A/D converters 228a-228c.

An explanation has been given above concerning reading out of electrical charge information from the respective pixels 200a-200c of odd numbered rows.

Next, an explanation shall be given concerning reading out of electrical charge information from the respective pixels 200a-200c of even numbered rows.

Basically, reading out of electrical charge information from the respective pixels 200a-200c of even numbered rows is carried out by a similar method to the above-described reading out of electrical charge information from the respective pixels 200a-200c of odd numbered rows. More specifically, because the readout circuits 184a-184c and the readout circuits 186a-186c have the same circuit structure, in the explanations concerning the respective pixels 200a-200c of odd numbered rows, simply by switching respectively the words used for each of the structural elements internal to the signal lines 204a-204c and the readout circuits 184a-184c by the words used for each of the structural elements internal to the signal lines 206a-206c and the readout circuits 186a-186c, explanations are rendered of the method for reading out electrical charge information from each of the pixels 200a-200c of even number rows. Accordingly, such explanations have been omitted herein.

In the forgoing manner, the radiographic images stored in each of the image memories 240a-240c, together with the cassette ID information stored in the cassette ID memories 244a-244c, are transmitted by wireless communications via the communications devices 194a-194c.

In the descriptions of steps S4 and S5, a case was explained in which electrical charge information of each of the pixels 200a-200c of odd number rows and electrical charge information of each of the pixels 200a-200c of even number rows are read out simultaneously and stored in the image memories 240a-240c. Because such read out processing is not required to be a simultaneous control process performed in real time, as was required during irradiation of the radiation 16, in place of the aforementioned processing, readout processing can be carried out in a sequence from the pixels 200a-200c of odd number rows→the pixels 200a-200c of even number rows, or alternatively, from the pixels 200a-200c of even number rows→the pixels 200a-200c of odd number rows.

In step S6, when the image processor 288 of the console 22 receives each of the radiographic images and the cassette ID information via the communication device 280 and the controller 282, with reference to the connection order information stored in the connection order information managing unit 294, and the cassette ID information stored in the ID memory 286 and the received cassette ID information, the connection order of the respective radiation detection units 30a-30c is grasped, and together therewith, referring to the SID managing unit 296, the source-to-image distance (SID) between the radiation source 264 and each of the radiation conversion panels 172a-172c is specified. Next, the image processor 288, after having carried out image correction processing with respect to each of the radiographic images based on attenuation of the radiation 16 corresponding to the SID, generates a combined image in which portions of the images are overlapped, by connecting sequentially each of the radiographic images according to the connection order. In addition, the image processor stores in the image memory 290 the generated combined image (an elongate image-captured image) and each of the radiographic images that were used to carry out image combining.

In step S7, the controller 282 sends the elongate image-captured image stored in the image memory 290 to the display device 24 via the communications device 280, and the display device 24 displays the received elongate image-captured image.

The doctor or radiological technician visually confirms the radiographic image displayed on the display device 24, thereby confirming whether an appropriate elongate image-captured image of the subject 14 was obtained. In step S8, after completion of elongate image capturing with respect to the subject 14, the doctor or radiological technician turns OFF the power switches 168a-168c of the radiation detection units 30a-30c (see FIGS. 1, 2, 5A, FIGS. 6A-7A, and FIG. 13). Consequently, the electrical power sources 190a-190c stop the supply of power to each of the radiation detection units 30a-30c.

Next, the doctor or radiological technician takes out the connectors 32 from the connection terminals 124b, 124c, 126a, 126b, thereby separating and releasing the state of connection between each of the radiation detection units 30a-30c. Thereafter, the blocks 58a-58c, 60a-60c are fitted respectively into the step portions of the casings 34a-34c to restore the condition shown in FIGS. 5A and 5B.

As described above, in accordance with the radiographic image capturing system 10A and the radiographic image capturing apparatus 20A according to the first embodiment, a plurality of radiation detection units 30a-30c of one type and of the same form are connected sequentially through step portions 120a-120c, 122a-122c to thereby construct a single radiographic image capturing apparatus 20A, and by means of the radiographic image capturing apparatus 20A, elongate image capturing of a subject 14 is carried out. More specifically, portions of each of the radiation conversion panels 172a-172c are superimposed on each other, and together therewith, by connecting the radiation conversion panels 172a-172c together using the step portions 120a-120c, 122a-122c, whereby the respective casings 34a-34c are interconnected using the step portions 120a-120c, 122a-122c, in a state such that the irradiated surfaces 148a-148c thereof are flipped alternately in a sequence of front surfaces and rear surfaces, the image capturing surface 156 of the radiographic image capturing apparatus 20A is maintained in a substantially planar shape without the occurrence of bumps (steps) at connecting locations between each of the radiation detection units 30a-30c (casings 34a-34c).

In this case, the respective radiation detection units 30a-30b are prepared mutually with the same shape, such that even in the case of A surface irradiation, in which radiation 16 is applied externally with respect to the front surfaces 36a-36b, or in the case of B surface irradiation, in which radiation 16 is applied externally with respect to the rear surfaces 42a-42b thereof, electronic cassettes are enabled, which are capable of converting radiation 16 at the radiation conversion panels 172a-172c into radiographic images. Accordingly, with the first embodiment, concerning the respective radiation detection units 30a-30c of one type, by connecting the radiation detection units 30a-30c sequentially by means of the step portions 120a-120c, 122a-122c in a state wherein the irradiated surfaces 148a-148c are flipped alternately in a sequence of the front surface 36a→the rear surface 42b→the front surface 36c, the overall thickness of the radiographic image capturing apparatus 20A can be suppressed to the thickness of each of the respective radiation detection units 30a-30c, and bumps (steps) are not generated at connected locations therebetween.

Consequently, according to the first embodiment, it is possible to carry out elongate image capturing by connecting the plurality of radiation detection units 30a-30c without causing bumps (steps) to occur at connected locations therebetween. More specifically, with the first embodiment, although the radiation detection units 30a-30c are connected sequentially, an increase in scale of the radiographic image capturing apparatus 20A can be avoided, and the image capturing surface 156 can reliably be kept in a flat and planar form.

Further, with the first embodiment, since as described above, the radiographic image capturing apparatus 20A is constructed by interconnecting through the step portions 120a-120c, 122a-122c radiation detection units 30a-30c of one type, compared to a situation of interconnecting radiation detection units of different types, upon connection thereof, a problem that connection operations cannot be performed because radiation detection units of different types are not on hand does not arise.

Further, according to the first embodiment, because the radiation detection units 30a-30c are connected respectively and sequentially in such a manner that bumps (steps) at the connected locations therebetween do not occur, compared to the case in which bumps occur at connected locations between the electronic cassettes as in Japanese Laid-Open Patent Publication No. 2000-292546, a problem in which the electronic cassettes are damaged by shocks (e.g., shocks due to falling) caused at the bumps (steps) of the connected locations when connections between the electronic cassettes are removed can be avoided.

Furthermore, even in the case, as mentioned above, that radiation 16 is irradiated with respect to the front surfaces 36a-36c (A surface irradiation) or if radiation is irradiated with respect to the rear surfaces 42a-42c (B surface irradiation), in either case, because each of the radiation detection units 30a-30c forms an electronic cassette capable of carrying out image capturing, by flipping over sequentially and interconnecting each of the casings 34a-34c such that the irradiated surfaces 148a-148c are repeated alternately in a sequence of front and rear surfaces thereof, the radiographic image capturing apparatus 20A can be assembled together easily and in a short period of time. Additionally, because the radiographic image capturing apparatus 20A is constructed by connecting each of the casings 34a-34c through the step portions 120a-120c, 122a-122c, elongate image capturing can be carried out by applying radiation 16 at one time with respect to the subject 14, so that shortening of the image capturing time can be realized.

Still further, according to the first embodiment, for example, in the case that one of the casings with the front surface thereof serving as an irradiated surface and another of the casings with the rear surface thereof serving as an irradiated surface are interconnected through the step portions 120a-120c, 122a-122c, assuming that the one casing and the other casing are connected such that a portion on the side of the other casing proximate to the radiation conversion panel that is accommodated in the one casing, and a portion on the side of the one casing proximate to the radiation conversion panel that is accommodated in the other casing are superimposed (see FIGS. 1 through 4), radiographic images obtained respectively by each of the radiation conversion panels 172a-172c are image-combined, and when a single elongate radiographic image of the subject 14 is obtained, image gaps or missing portions at connected locations between each of the radiographic images can be avoided.

Consequently, according to the first embodiment, radiation detection units 30a-30c of one type are connected together sequentially, and without generating bumps or steps at the connected locations therebetween, the overall thickness of the radiographic image capturing apparatus 20A is suppressed to the thickness of each of the radiation detection units 30a-30c, and the image capturing surface 156 is maintained reliably in a planar condition, whereby any sense of discomfort to the subject 14 at the time of image capturing can be eliminated, and compared to conventional techniques, a thinner profile of the radiographic image capturing apparatus 20A can be realized. Further, because the radiographic image capturing apparatus 20A is constructed by interconnecting at the connecting sections each of the radiation detection units 30a-30c of one type, the time required for image capturing can also be shortened.

Each of the aforementioned radiation detection units 30a-30c forms an electronic cassette in which carrying out of image capturing is made possible respectively and even independently, and with the first embodiment, the above-described effects are obtained by interconnecting at the step portions 120a-120c, 122a-122c a plurality of electronic cassettes of this type.

Further, because the respective casings 34a-34c are connected together by interfitting each of the step portions 120a-120c, 122a-122c in a state in which each of the casings 34a-34c are flipped over sequentially, the respective casings 34a-34c can be connected together easily.

In this case, since the step portions 120a-120c, 122a-122c are formed easily simply by removing the blocks 58a-58c, 60a-60c from the casings 34a-34c, connections between the casings 34a-34c can be performed highly efficiently.

Furthermore, on the side surfaces 50a-50c, 52a-52c, handles 132a-132c, 142a-142c are disposed respectively at locations where the aforementioned step portions 120a-120c, 122a-122c are not formed, such that when the respective casings 34a-34c are connected, each of the casings 34a-34c can easily be flipped over, together with enabling the radiation detection units 30a-30c to be transported easily.

Further, in the aforementioned casings 34a-34c, surfaces proximate to the step portions 120a-120c, 122a-122c may be defined as the rear surfaces 42a-42c, whereas surfaces that are opposite to the rear surfaces 42a-42c and are distanced from the step portions 120a-120c, 122a-122c may be defined as the front surfaces 36a-36c. By predetermining the front surfaces 36a-36c and the rear surfaces 42a-42c in this manner, when the respective casings 34a-34c are flipped over sequentially, connections between each of the casings 34a-34c can be carried out effectively.

Further, by means of the irradiated surface determining units 246a-246c, since it is determined whether the irradiated surface 148a-148c is constituted by either of the front surface 36a-36c or the rear surface 42a-42c thereof, it is made clear whether the radiographic images obtained by each of the radiation conversion panels 172a-172c are images obtained by A surface irradiation, or alternatively, are images obtained by B surface irradiation. Thus, image processing can be carried out efficiently when a single elongate image of the subject 14 is formed by image-combining each of the radiographic images.

In this case, preferably, the irradiated surface determining units 246a-246c are capable of detecting whether the irradiated surface is constituted by either the front surface 36a-36c or the rear surface 42a-42c by using one of a gyroscope for detecting an angular speed of the panel accommodating units, a temperature sensor for detecting a temperature of the irradiated surfaces of the panel accommodating units, and a load sensor for detecting a load applied to the irradiated surfaces 148a-148c from the subject 14. Thus, by use of such sensors, it can easily be determined whether the radiographic images are radiographic images obtained by A surface irradiation, or alternatively, are radiographic images obtained by B surface irradiation.

Further, the connection order information generating units 250a-250c generate connection order information indicative of the connection order of the casings 34a-34c. Owing thereto, when a single elongate image of the subject 14 is formed by image-combining each of the radiographic images, by referring to the aforementioned connection order information, it can be specified whether the radiographic images obtained by each of the radiation conversion panels 172a-172c are images obtained by A surface irradiation, or alternatively, are images obtained by B surface irradiation. Consequently, formation of the single elongate image can be carried out highly efficiently.

Further, the image processor 288 of the console 22 corrects each of the radiographic images based on the connection order information including the determination result by the irradiated surface determining units 246a-246c. The image processor 288 combines the respective radiographic images after correction thereof and generates an elongate image-captured image. Therefore, an elongate captured image of uniform image quality can be obtained.

Further, if the respective controllers 196a-196c, as viewed in plan, are positioned in regions outside of the image capturing regions 40a-40c or the image capturing surface 156 of the radiographic image capturing apparatus 20A, then application of radiation 16 with respect to each of the controllers 196a-196c can be avoided.

More specifically, when application of radiation 16 is performed under a condition in which the controllers 196a-196c are arranged within each of the image capturing regions 40a-40c or within the image capturing surface 156, inconveniences arise in that the controllers 196a-196c become deteriorated due the radiation 16, or the presence of the controllers 196a-196c themselves becomes reflected in the radiographic image. Consequently, according to the first embodiment, by avoiding application of radiation 16 with respect to each of the controllers 196a-196c, the occurrence of such inconveniences can be prevented.

Further, because the respective casings 34a-34c are connected electrically or mechanically by the connectors 32, signals can be sent and received between the casings 34a-34c and connections between each of the casings 34a-34c can be provided reliably.

Furthermore, because the radiation conversion panels 172a-172c are constructed such that the photoelectric conversion layers 152a-152c are sandwiched between two scintillators 150a-150c, 154a-154c, by conversion of the radiation 16 into visible light by each of the two scintillators 150a-150c, 154a-154c, sensitivity and sharpness of the radiographic images can be improved, and as a result, the exposure dose of radiation 16 to the subject 14 during elongate image capturing can be reduced.

In the foregoing descriptions, a case has been explained in which synchronizing control signals are sent to the radiographic image capturing apparatus 20A from the console 22. However, each of the radiation detection units 30a-30c may generate such synchronizing control signals using the synchronizing controllers 248a-248c, and each of the synchronizing control signals may be transmitted to the console 22. In this case, because there is a possibility for timings of the radiation 16 to differ among each of the synchronizing controllers 248a-248c, the synchronizing processor 292 of the console 22, for example, sends to the radiation irradiating apparatus 18 a synchronizing control signal having the greatest delay from the timings indicated by each of the synchronizing control signals. Owing thereto, since radiation is irradiated from the radiation irradiation apparatus 18 after each of the radiation conversion panels 172a-172c have been placed in a state enabling storage of electric charges, synchronization can reliably be taken between the radiation detection units 30a-30c and the radiation irradiating apparatus 18.

Further, in the event there is a specific region of interest, it may be determined to capture that specific region by the radiation detection unit 30b, wherein the scintillators 150b, 154b of the radiation detection unit 30b are constituted by CsI, and connection order information, in which the connection order is such that the radiation detection unit 30b is located centrally, is registered beforehand in the connection order information managing unit 294. In this case, the controller 282 compares the connection order information transmitted from the radiographic image capturing apparatus 20A with the connection order information registered beforehand in the connection order information managing unit 294, and allows image capturing (i.e., sends synchronizing control signals) if both of such information are in agreement, and if they are different, notifies the doctor or radiological technician via the display device 24 that the radiation detection units 30a-30c have been connected in error.

As a result, an elongate desired image-captured image including a specific region therein can reliably be obtained. Further, as stated above, if the connection order of the respective radiation detection units 30a-30c is understood beforehand, by pre-registering the connection order information in the connection order information managing unit 294, it is possible for the console 22 to detect whether or not the actual connection condition is in a desired connection state, so that elongate image capturing can reliably be performed in accordance with the desired connection state.

Further, as described previously, a case has been explained in which radiographic images are sent after the connection order information has been sent with respect to the console 22 from the radiographic image capturing apparatus 20A. However, the connection order information and the radiographic images may be sent simultaneously, whereby, in the console 22, it can easily be grasped that the received radiographic images are images that pertain to the aforementioned connection order information.

Still further, in the above descriptions, a case has been explained in which determination results by the irradiated surface determining units 246a-246c are sent to the console 22 from the radiographic image capturing apparatus 20A in a form including the connection order information. However, in the event that the connection order of the radiation detection units 30a-30c, or the alignment sequence of the front surfaces 36a-36c and rear surfaces 42a-42c making up the image capturing surface 156, are known beforehand, then the connection order information generating units 250a-250c may generate and transmit to the console 22 connection order information indicative only of the connection order.

In the case that the connection order of the radiation detection units 30a-30c is not determined beforehand, and the connection order is determined for the first time when the radiation detection units 30a-30c are sequentially connected at the image capturing preparations carried out in step S2 as shown in FIG. 15, there is a fear that the console 22 will not recognize the alignment sequence of the front surfaces 36a-36c and the rear surfaces 42a-42c on the image capturing surface 156. Consequently, in such a situation, the irradiated surface determining units 246a-246c may determine the irradiated surfaces 148a-148c, and the connection order information generating units 250a-250c may transmit such a determination result to the console 22 in a form including the connection order information.

Further, in the description above, a case has been explained in which a single radiographic image capturing apparatus 20A is constructed by flipping over and connecting three radiation detection units 30a-30c sequentially, such that upper surfaces thereof are arranged in a sequence of the front surface 36a→the rear surface 42b→the front surface 36c. However, the first embodiment is not limited to this feature, and any plurality of radiation detection units may be connected sequentially such that upper surfaces thereof are arranged in a sequence of the front surface→the rear surface→the front surface→the rear surface . . . . Furthermore, the three radiation detection units 30a-30c can be flipped over and connected in a sequence of the rear surface 42a→the front surface 36b→the rear surface 42c.

Further, in the above descriptions, a case has been explained in which three radiation detection units 30a-30c are flipped over and connected together in sequence along one direction. However, of course, step portions, which are similar to the step portions 120a-120c, 122a-122c, may also be formed on the side surfaces 50a-50c and 52a-52c, whereby a single radiographic image capturing apparatus 20A can also be constructed by flipping over and connecting together in sequence a plurality of radiation detection units along a planar direction (i.e., in two directions).

The radiographic image capturing system 10A and the radiographic image capturing apparatus 20A according to the first embodiment are not limited by the aforementioned descriptions. The embodiments shown in FIGS. 17A to 19A can also be realized.

Figure 17A:
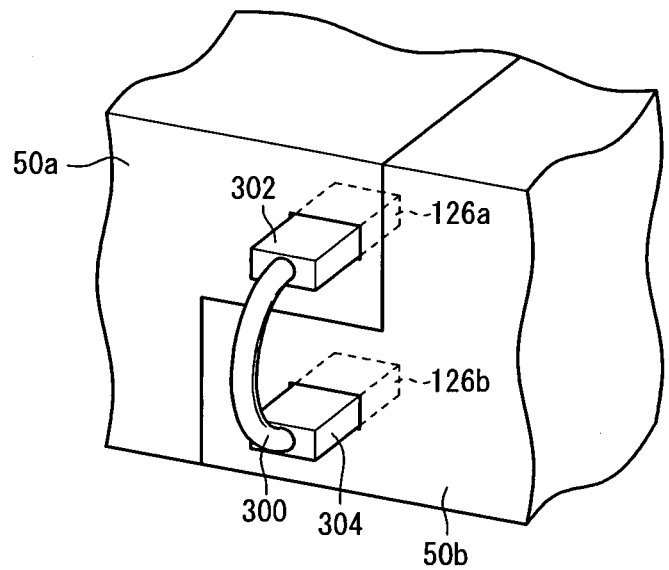
FIG. 17A and FIG. 17B are explanatory drawings showing other types of connections between respective radiation detection units.
Figure 17B:
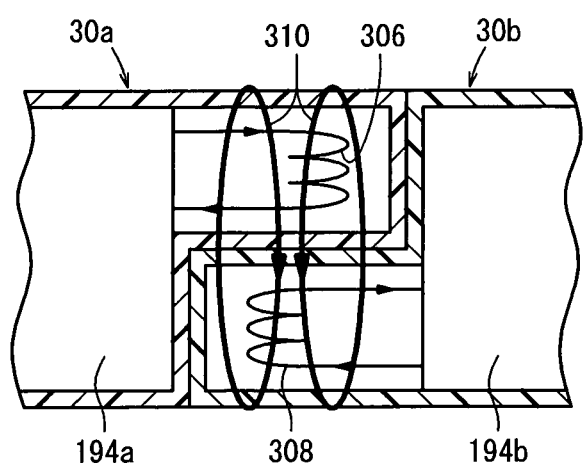

FIG. 17A illustrates a case in which the connection terminals 126a, 126b are optically connected by optical fiber cables 300, whereby transmission and reception of signals is carried out by optical communications. In this case, optical connectors 302, 304 are fitted into the connection terminals 126a, 126b. FIG. 17B illustrates a case in which the connection terminal 126a is replaced by a coil 306 and the connection terminal 126b is replaced by another coil 308. Current flows through the coils 306, 308 whereupon, by generation of a magnetic flux 310, transmission and reception of signals is carried out through a magnetic coupling between the coils 306, 308 caused by the magnetic flux 310. Transmission and reception of signals between each of the radiation detection units 30a-30c can be carried out either by the optical coupling of FIG. 17A or by the magnetic coupling of FIG. 17B.

Figure 18:
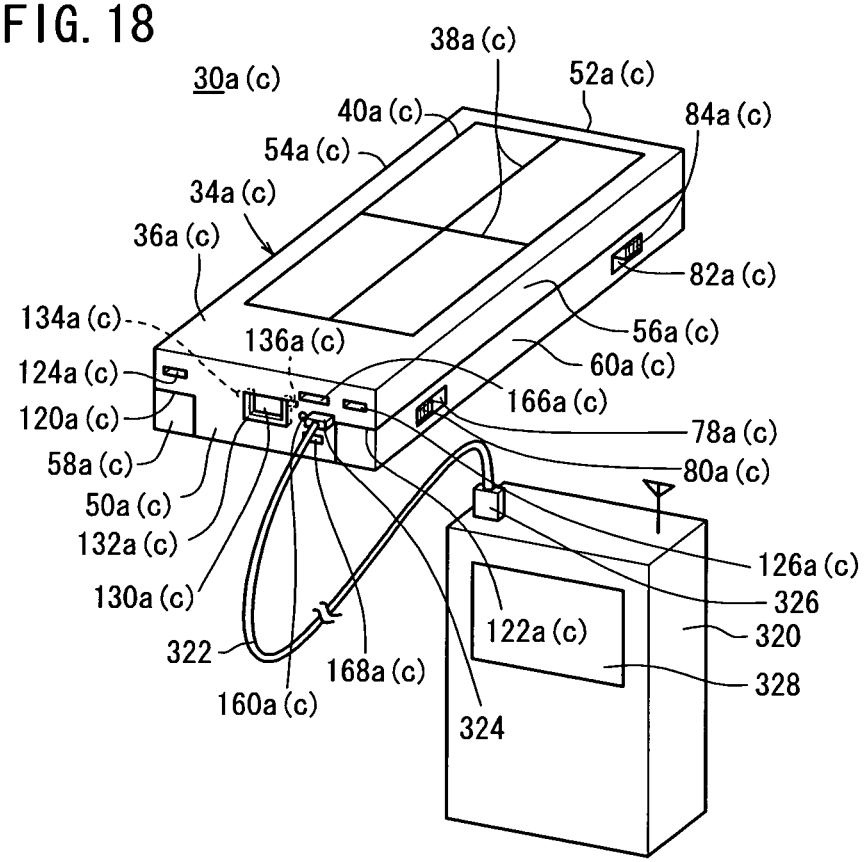
FIG. 18 is a perspective view showing a condition in which charging is carried out with respect to the radiation detection unit of FIG. 1.

FIG. 18 is a perspective view showing a charging processor for charging the electrical power sources 190a, 190c (see FIGS. 8 and 13) through a cradle 320, which is installed in a required location in a medical facility.

In this case, for example, a USB cable 322 having respective connectors 324, 326 is connected electrically between the cradle 320 and the radiation detection units 30a, 30c.

The cradle 320 is not only used for charging the electrical power sources 190a, 190c, but may also carry out transmission and reception of necessary information between the console 22 or the RIS 26 within the medical facility using a wireless or wired communications function of the cradle 320. Information sent and received thereby can include radiographic images, which are recorded in the image memories 240a, 240c of the radiation detection units 30a, 30c.

Further, a display unit 328 may be arranged on the cradle 320 for displaying on the display unit 328 necessary information including charged states of the radiation detection units 30a, 30c, or radiographic images acquired from the radiation detection units 30a, 30c.

Furthermore, a configuration can be provided in which the plurality of radiation detection units 30a, 30c are connected to a network, and charged states of each of the radiation detection units 30a, 30b connected to respective cradles 320 can be collected via the network, so as to enable the locations of radiation detection units 30a, 30c having usable charged states to be confirmed.

Figure 19A:
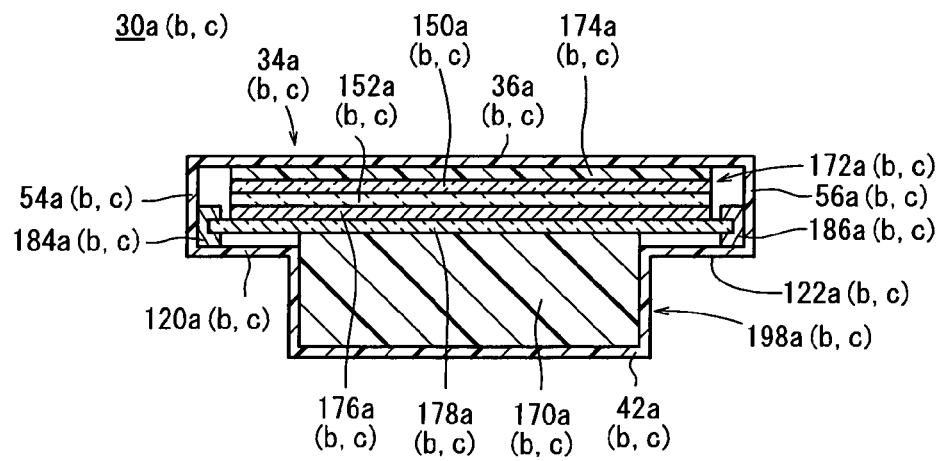
FIG. 19A and FIG. 19B are cross sectional views showing a condition in which a single scintillator is accommodated in a casing.
Figure 19B:
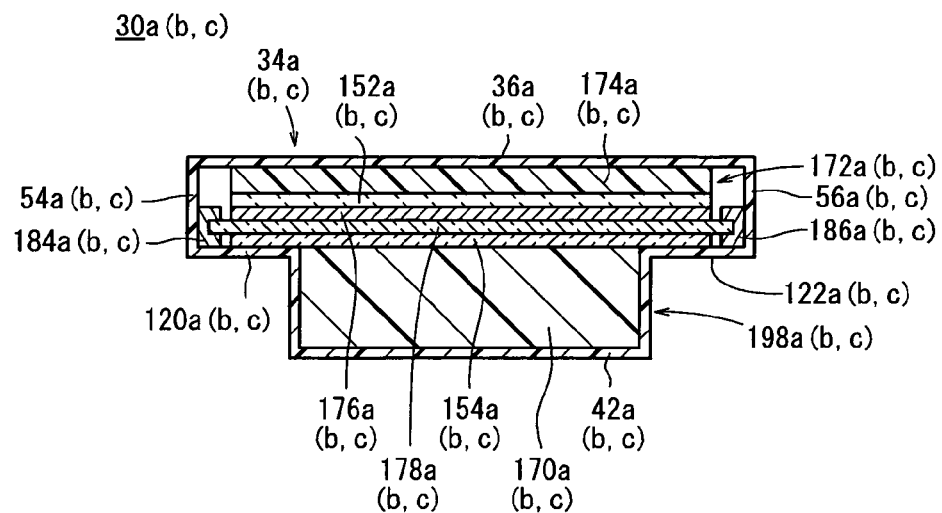

Still further, in the above descriptions, as shown in FIGS. 4, 9 and 10, a structure is provided in which the radiation conversion layers 152a-152c are inserted and sandwiched between two scintillators 150a-150c, 154a-154c. However, in place of such a structure, as shown in FIGS. 19A and 19B, single scintillators 150a-150c or single scintillators 154a-154c may be arranged inside the casings 34a-34c. In this case as well, in either one of A surface irradiation or B surface irradiation, conversion of radiation 16 into visible light is made possible.

In the case of FIG. 19A, because the scintillators 150a-150c and the photoelectric conversion layers 152a-152c are arranged sequentially with respect to the front surfaces 36a-36c, with A surface irradiation, a PSS (Penetration Side Sampling) system is formed, whereas with B surface irradiation, an ISS (Irradiation Side Sampling) system is formed. On the other hand, in the case of FIG. 19B, because the photoelectric conversion layers 152a-152c and the scintillators 150a-150c are arranged sequentially with respect to the front surfaces 36a-36c, with A surface irradiation, an ISS system is formed, whereas with B surface irradiation, a PSS system is formed.

Furthermore, the first embodiment can also be applied to acquisition of radiographic images using radiation conversion panels of a light readout type. With light readout type radiation conversion panels, when radiation is made incident on respective solid state detection elements, an electrostatic latent image is stored and recorded in the solid state detection elements. Then, when the electrostatic latent image is read out, reading light is applied to the radiation conversion panels and current values generated thereby are acquired as radiographic images. Such radiation conversion panels can be reused by erasing the radiographic image, which is in the form of a residual electrostatic latent image, by irradiating the radiation conversion panels with erasing light (see, Japanese Laid-Open Patent Publication No. 2000-105297).

The first radiographic image capturing apparatus 20A may comprise a water-resistant, hermetically sealed structure, thereby making the first radiographic image capturing apparatus 20A resistant to contamination by blood and bacteria. When necessary, the first radiographic image capturing apparatus 20A may be cleaned and sterilized for enabling repetitive use.

Further, the first embodiment is not limited to capturing of radiographic images in a medical institution, but can also be applied to capturing of images of subjects at disaster sites, home-based nursing sites, or further can be mounted on an examination vehicle and used for performing remote medical examinations. Also, the first embodiment is not limited to capturing of radiographic images related to medicine, but naturally can also be applied, for example, to capturing of radiographic images utilized in non-destructive testing of other types.

Next, a radiographic image capturing system 10B in relation to a second embodiment will be described with reference to FIGS. 20 through 22B.

In the radiographic image capturing system 10B, with respect to structural elements thereof that are the same as those of the radiographic image capturing system 10A according to the first embodiment (see FIGS. 1 through 19B), the same reference characters are used, and detailed descriptions of such features are omitted.

Figure 21A:
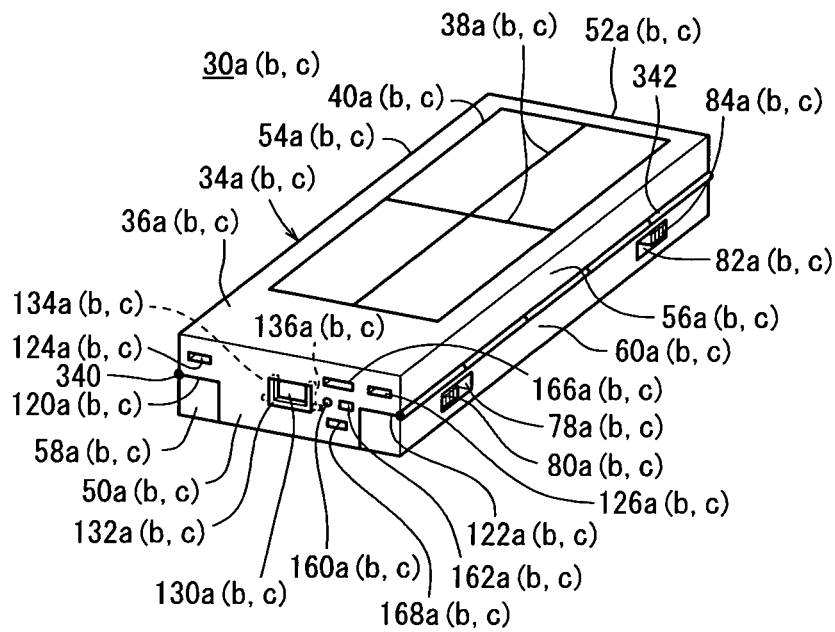
FIG. 21A and FIG. 21B are perspective views of a single radiation detection unit.
Figure 21B:
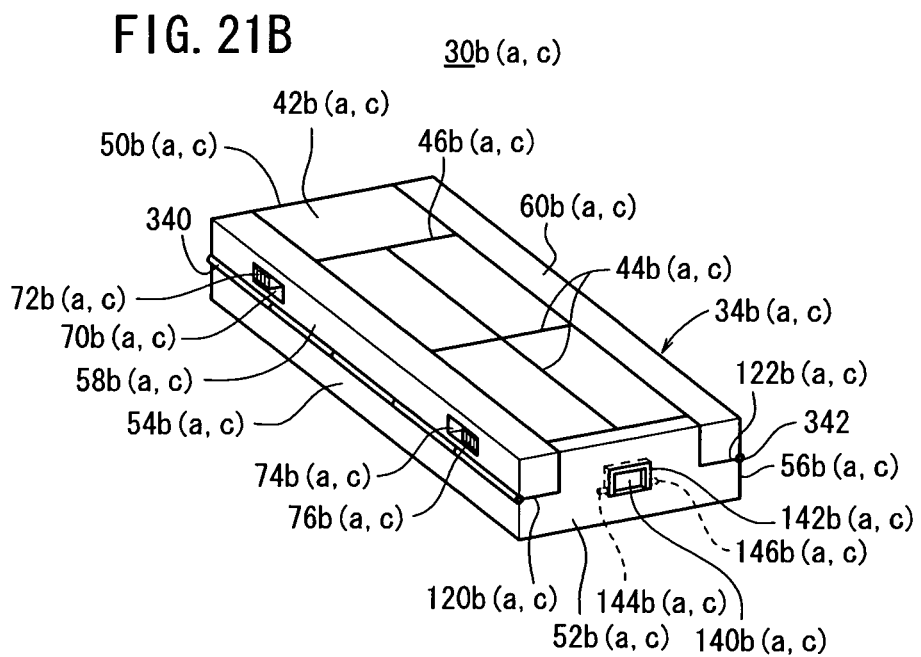
Figure 22A:
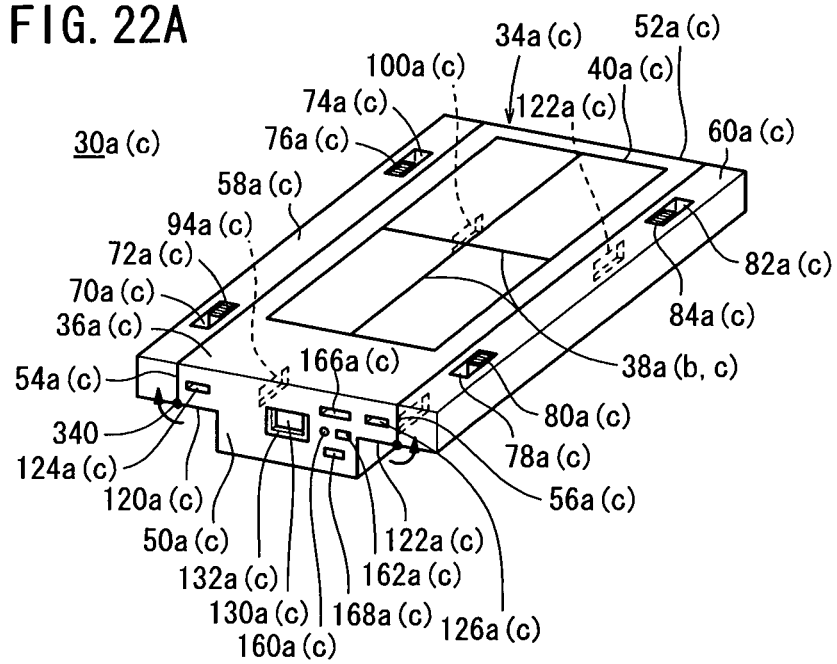
FIG. 22A is a perspective view showing a condition in which two blocks are rotated with respect to a single radiation detection unit.
Figure 22B:
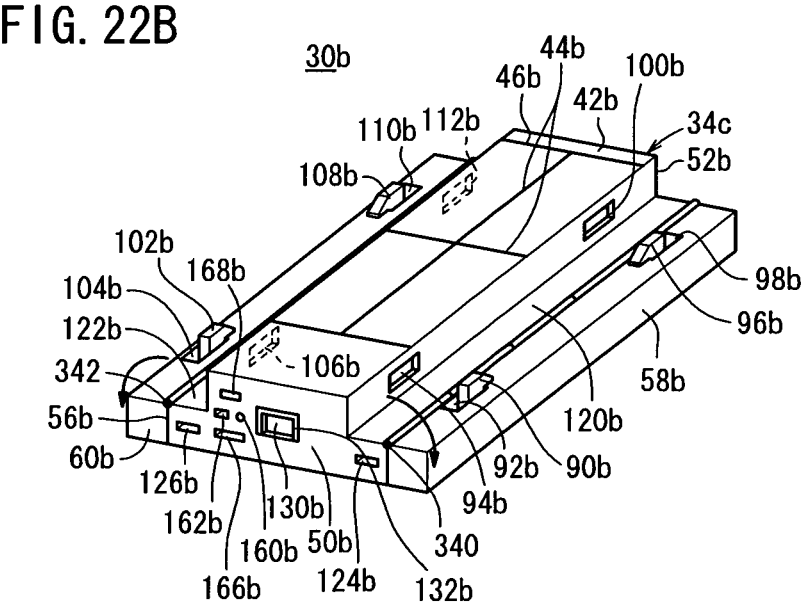
FIG. 22B is a perspective view showing a condition in which two blocks are rotated with respect to a single radiation detection unit, which is in a flipped over condition.

As shown in FIGS. 21A though 22B, the radiographic image capturing system 10B according to the second embodiment differs from the radiographic image capturing system 10A according to the first embodiment, in that hinges 340 are provided respectively at side surfaces 54a-54c, which connect the casings 34a-34c and the blocks 58a-58c, and hinges 342 are provided respectively at side surfaces 56a-56c, which connect the casings 34a-34c and the blocks 60a-60c.

In this case, under a condition in which the state of engagement between the claw members 90a-90c, 96a-96c and the holes 94a-94c, 100a-100c is released, by rotating the blocks 58a-58c about the hinges 340 with respect to the casings 34a-34c, the step portions 120a-120c are formed. Further, under a condition in which the state of engagement between the claw members 102a-102c, 108a-108c and the holes 106a-106c, 112a-112c is released, by rotating the blocks 60a-60c about the hinges 342 with respect to the casings 34a-34c, the step portions 122a-122c are formed.

In this manner, since by rotation of the blocks 58a-58c, 60a-60c, the step portions 120a-120a, 122a-122c can easily be formed, connections between the casings 34a-34c can be carried out highly efficiently. Further, because the blocks 58a-58c, 60a-60c do not separate away from the casings 34a-34c, loss and the like of the blocks 58a-58c, 60a-60c can be prevented.

Figure 20:
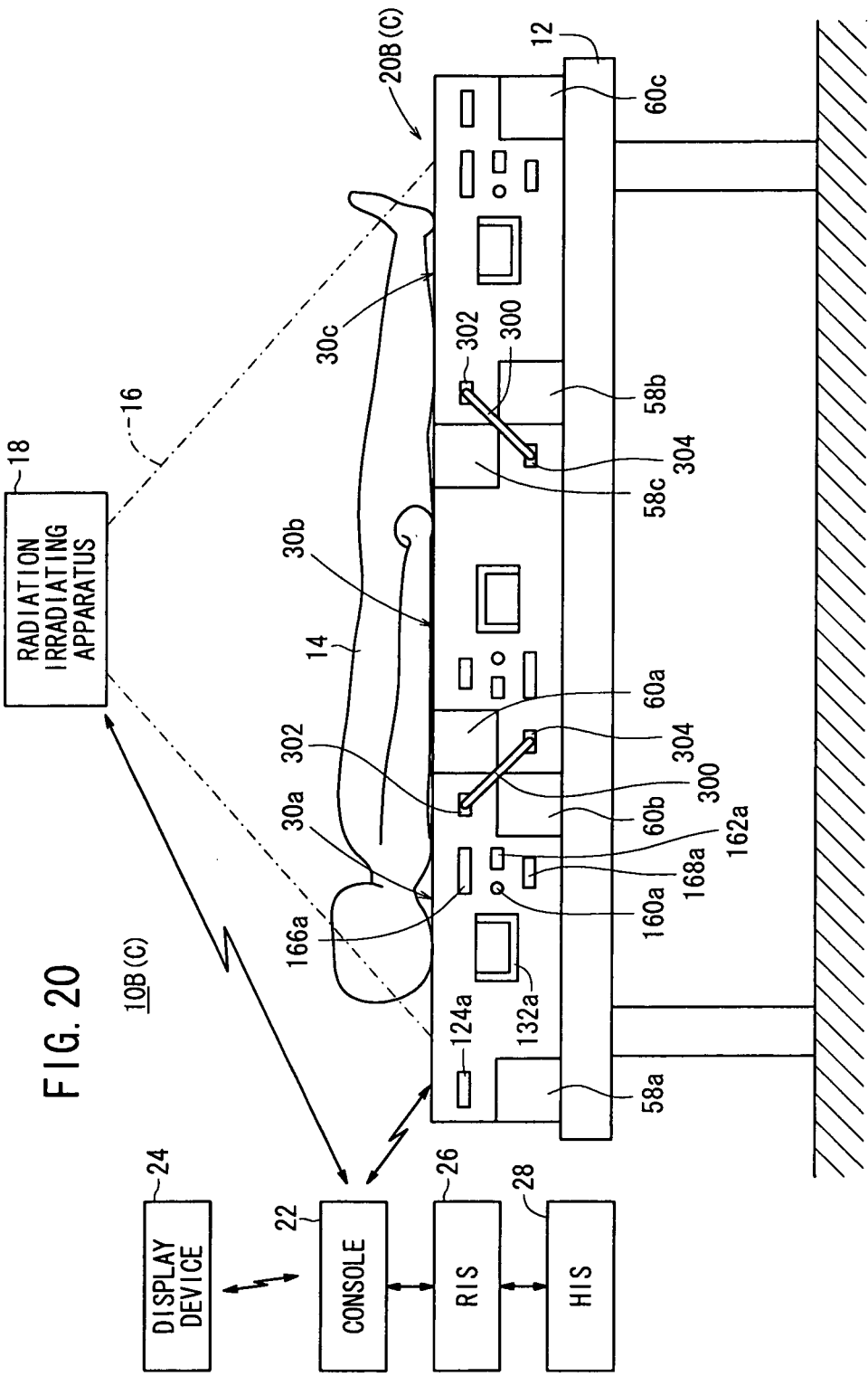
FIG. 20 is a schematic structural view of a radiographic image capturing system according to second and third embodiments of the present invention.

Further, compared to the first embodiment, with the second embodiment, when the step portions 120a-120c, 122a-122c are interfitted, the distance between the connection terminals 124a-124c, 126a-126c becomes longer, and connections by means of the connectors 32 is difficult. Thus, for example, as shown in FIG. 20, preferably the connection terminals 124a-124c, 126a-126c are optically joined by fitting optical connectors 302, 304 of optical fiber cables 300 into the connection terminals 124a-124c, 126a-126c.

Next, a radiographic image capturing system 10C in relation to a third embodiment will be described with reference to FIG. 20 and FIGS. 23 through 25B.

As shown in FIGS. 23 through 25B, the radiographic image capturing system 10C according to the third embodiment differs from the radiographic image capturing system 10B according to the second embodiment, in that the respective radiation detection units 30a-30c are constituted respectively by connecting block shaped controllers 196a-196c and block shaped panel portions 198a-198c through hinges (rotating mechanisms) 348. Accordingly, with the third embodiment, the panel portions 198a-198c function as casings (panel accommodating units), which accommodate radiation conversion panels 172a-172c therein.

In this case, the blocks 58a-58c are constituted by blocks 350 on the side of the controllers 196a-196c and blocks 352 on the side of the panel portions 198a-198c, whereas the blocks 60a-60c are constituted by blocks 354 on the side of the controllers 196a-196c and blocks 356 on the side of the panel portions 198a-198c.

Accordingly, each of the blocks 350 and each of the controllers 196a-196c are attached through hinges 340d as a part of the hinges 340, and each of the blocks 354 and each of the controllers 196a-196c are attached through hinges 342d as a part of the hinges 342. Further, each of the blocks 352 and each of the panel portions 198a-198c are attached through hinges 340e as a part of the hinges 340, and each of the blocks 356 and each of the panel portions 198a-198c are attached through hinges 342e as a part of the hinges 342.

Furthermore, recesses 360 are provided on side surfaces of the panel portion 198a-198c proximate to the hinges 348, with handles 362 being disposed in the recesses 360. A doctor or radiological technician can transport the radiation detection units 30a-30c while gripping the handles 362.

Figure 23:
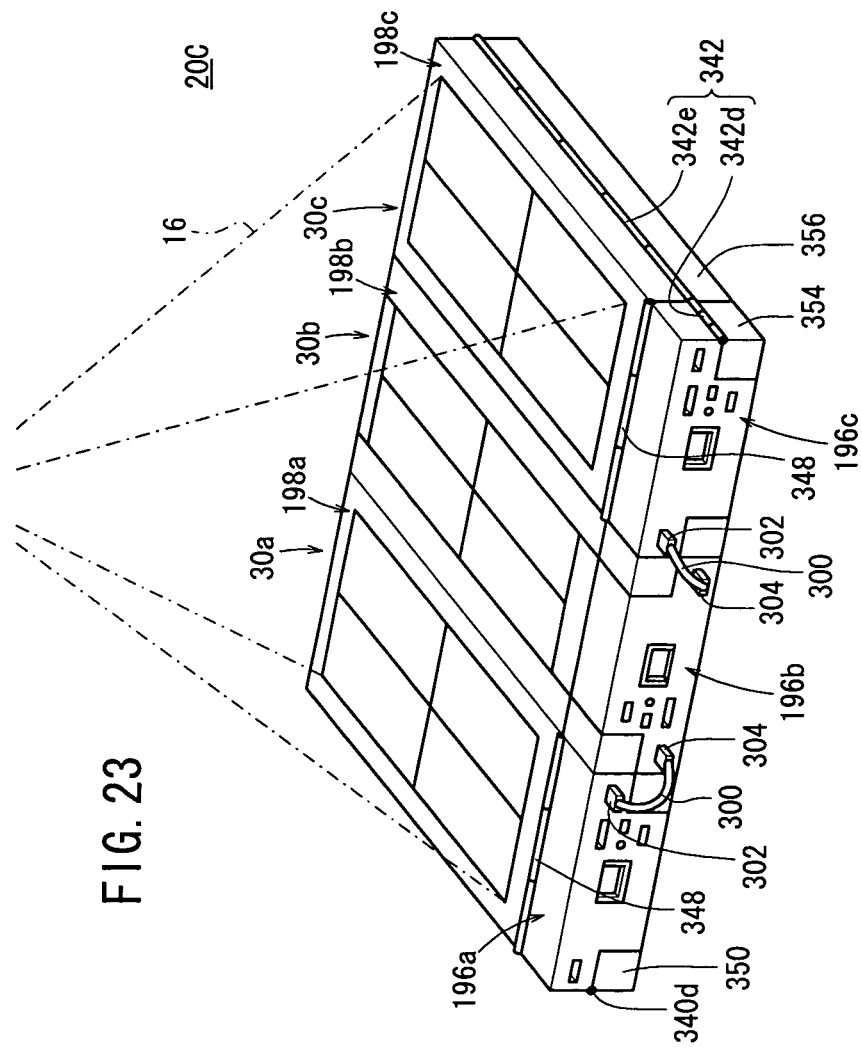
FIG. 23 is a perspective view of the radiographic image capturing apparatus of FIG. 20.
Figure 24A:
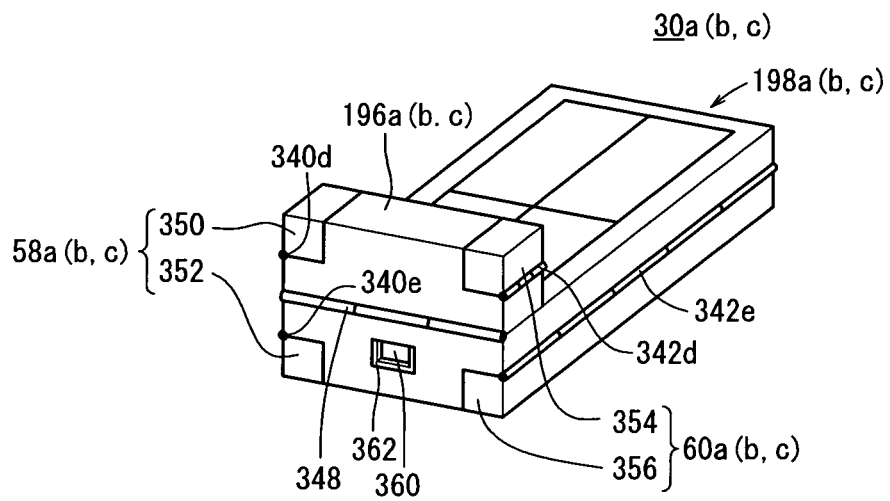
FIG. 24A and FIG. 24B are perspective views of a signal radiation detection unit that is used in the radiographic image capturing system according to the third embodiment.
Figure 24B:
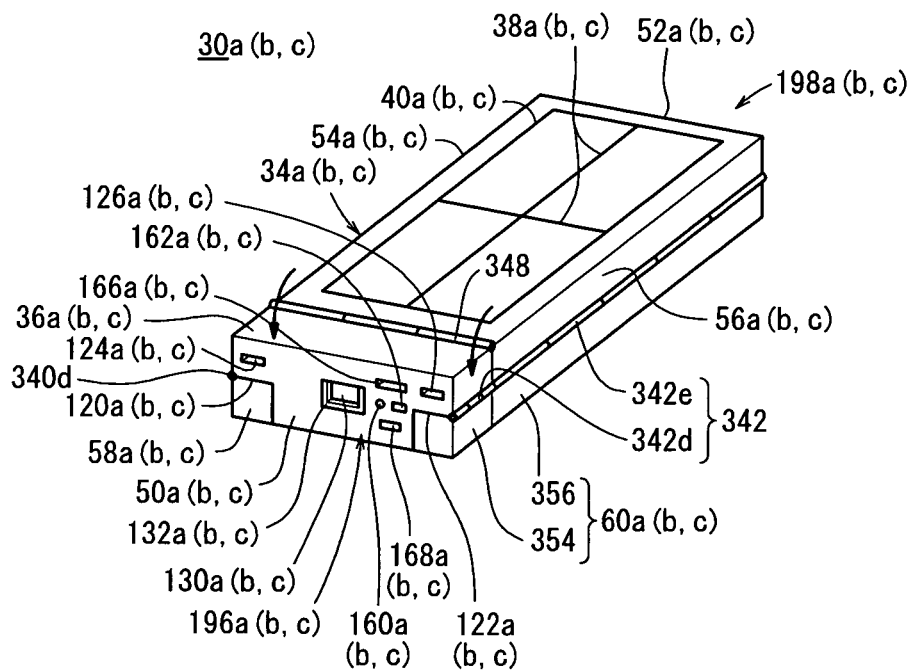

In the case that the respective radiation detection units 30a-30c shown in FIG. 24A are connected to thereby constitute a single radiographic image capturing apparatus 20C as shown in FIGS. 20 and 23, initially, a doctor or radiological technician rotates the controllers 196a-196c about the hinges 348 with respect to the panel portions 198a-198c. In this case, if the thickness of the controllers 196a-196c is the same as the thickness of the panel portions 198a-198c, upper surfaces of the respective radiation detection units 30a-30c can be provided with substantially planar shapes, as shown in FIG. 24B.

Figure 25A:
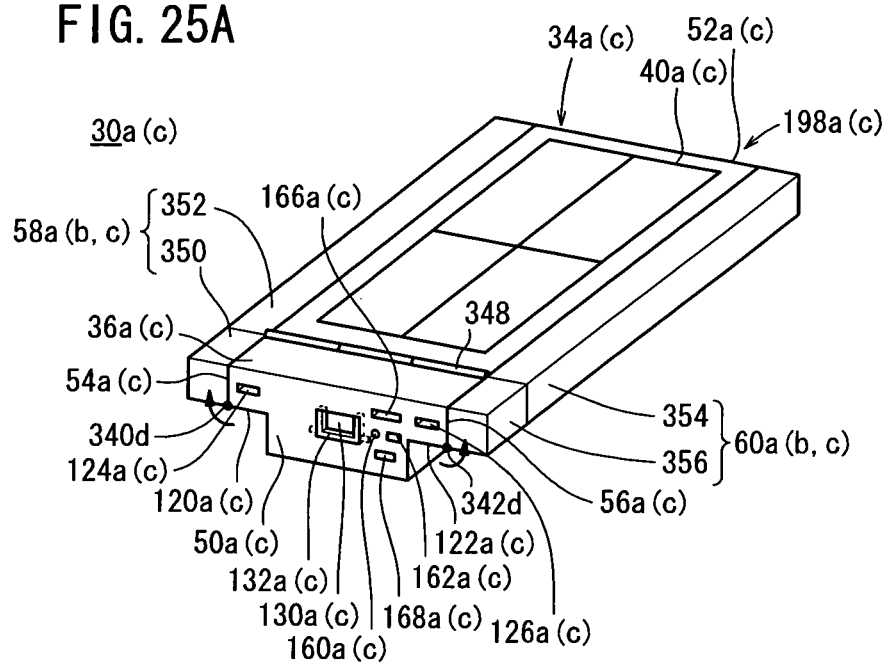
FIG. 25A is a perspective view showing a condition in which four blocks are rotated with respect to a single radiation detection unit.
Figure 25B:
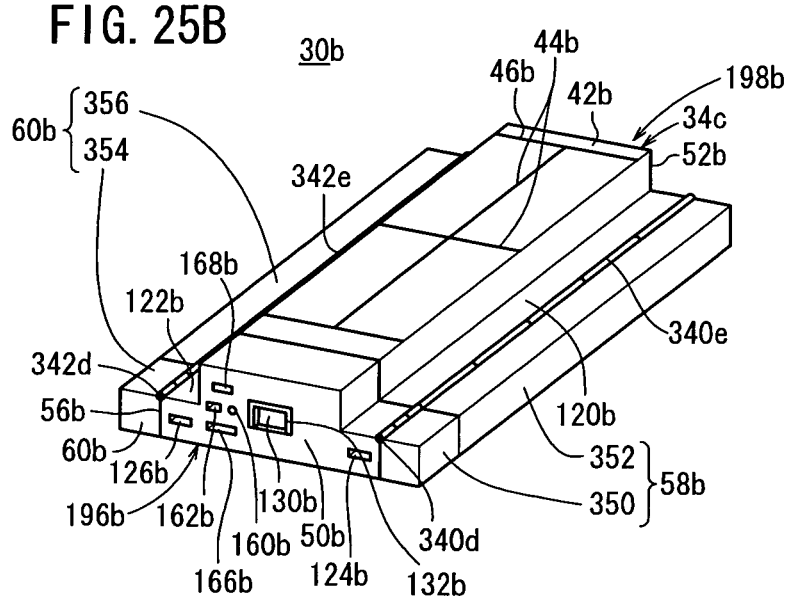
FIG. 25B is a perspective view showing a condition in which four blocks are rotated with respect to a single radiation detection unit, which is in a flipped over condition.

Next, as shown in FIGS. 25A and 25B, the doctor or radiological technician rotates the blocks 350 about the hinges 340d with respect to the controllers 196a-196c, and together therewith, rotates the blocks 352 about the hinges 340e with respect to the panel portions 198a-198c to thereby form the step portions 120a-120c. Similarly, the doctor or radiological technician rotates the blocks 354 about the hinges 342d with respect to the controllers 196a-196c, and together therewith, rotates the blocks 356 about the hinges 342e with respect to the panel portions 198a-198c to thereby form the step portions 122a-122c.

Next, in the sequence shown in FIGS. 20 and 23, the respective step portions 120a-120c, 122a-122c of the radiation detection units 30a-30c are fitted together, together with fitting the optical connectors 302, 304 of the optical fiber cables 300 respectively into the connection terminals 124b, 124c, 126a, 126b, to thereby construct the single radiographic image capturing apparatus 20C.

In this case as well, the same effects as those of the second embodiment are obtained. Further, because the controllers 196a-196c are rotated about the hinges 348 with respect to the panel portions 198a-198c, the controllers 196a-196c can reliably be prevented from being irradiated with radiation 16. Furthermore, because the thickness of each of the controllers 196a-196c is substantially the same as the thickness of the respective panel portions 198a-198c, during image capturing, the image capturing surface 156 and upper surfaces of the controllers 196a-196c are made substantially flush without the occurrence of bumps or steps at the connected locations therebetween. As a result, even if the subject comes into contact with the controllers 196a-196c, no sense of discomfort is felt.

Further, in the case that the radiographic image capturing apparatus 20C is disassembled and separated into each of the radiation detection units 30a-30c, a disassembly operation reverse to the aforementioned assembly operation may be performed. Further, although in FIGS. 23 to 25B, the manual operating elements 72a-72c, 76a-76c are not provided, it is a matter of course that manual operating elements 72a-72c, 76a-76c could be provided if desired.

The first aspect of the invention is not limited to the aforementioned embodiments, and it is a matter of course that various modified or additional structures could be adopted without deviating from the essence and gist of the first aspect of the invention.

Figure 26:
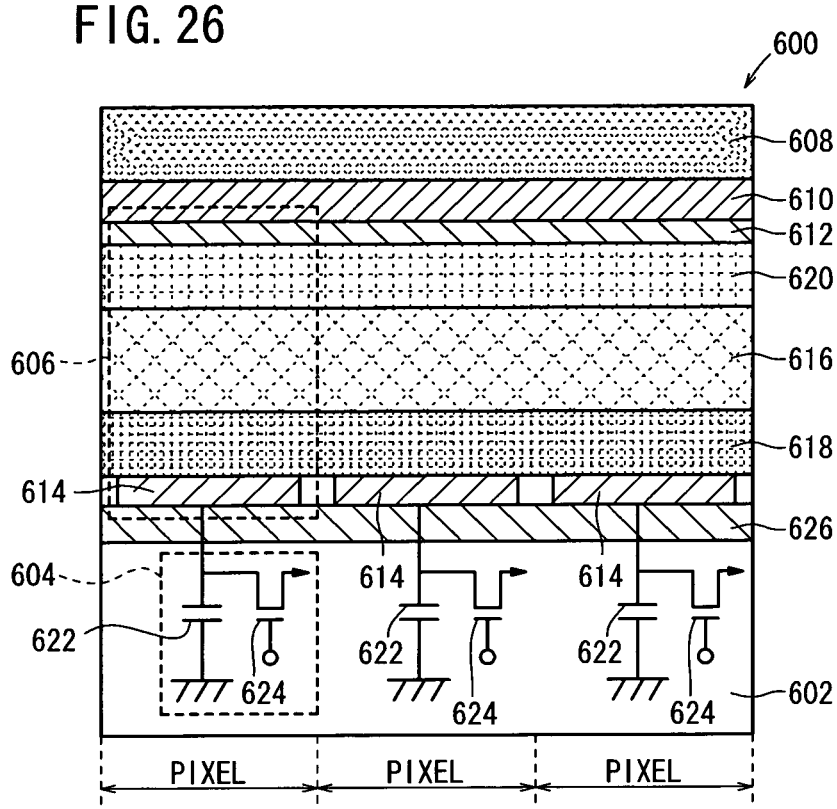
FIG. 26 is a view showing in outline form the configuration of three pixel portions of a radiation detector according to a modified example.
Figure 27:
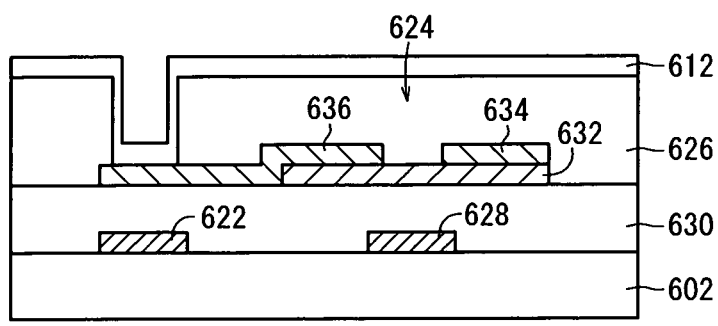
FIG. 27 is an outline structural view of a TFT and a charge storage element shown in FIG. 26.
Figure 28:
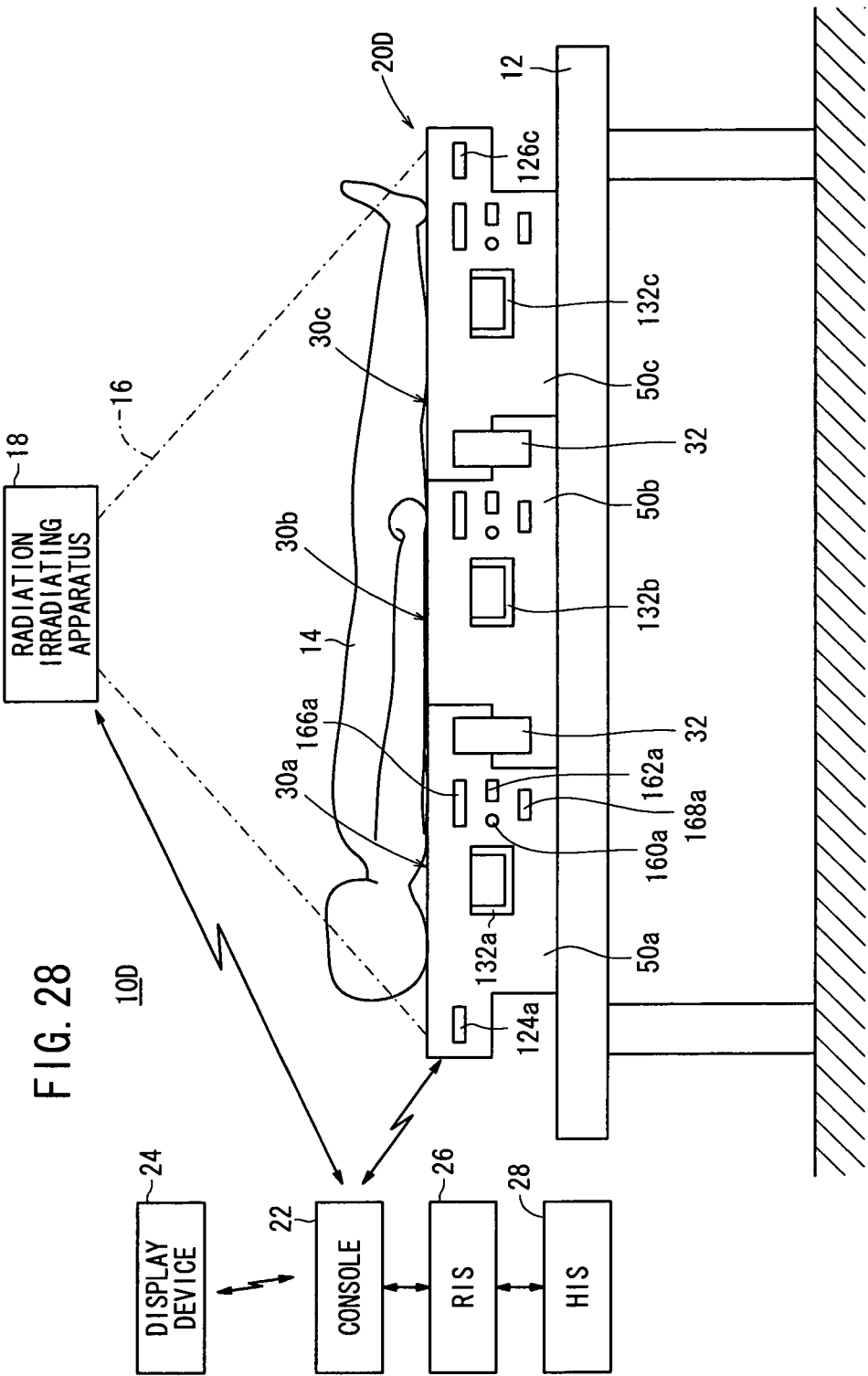
FIG. 28 is a schematic structural view of a radiographic image capturing system according to a fourth embodiment.

For example, the radiation conversion panels 172a-172c may be constituted by radiation detectors 600 according to the modified examples shown in FIGS. 26 and 27. FIG. 26 is a cross sectional schematic view showing in outline form a configuration of three pixel portions of the radiation detector 600 according to the modified example.

The radiation detector 600 is formed by sequentially stacking on an insulating substrate 602 signal output units 604 corresponding to the TFT layers 176a-176c (see FIGS. 7B, 9, 10, 19A and 19B) including switching elements, sensor units 606 corresponding to the photoelectric conversion layers 152a-152c including solid state detecting elements, and a scintillator 608 corresponding to the scintillators 150a-150c, 154a-154c. Respective pixel units are constituted by the signal output units 604 and the sensor units 606. The pixel units are arranged in rows and columns on the substrate 602, and are constituted so as to include overlapping areas between the signal output units 604 and the sensor units 606 in each of the pixel units.

The scintillator 608 is a fluorescent film, which is formed on the sensor units 606 through a transparent insulating film 610, and which converts radiation 16 into light and emits light. In FIG. 26, for example, in the case that the upper side (i.e., a side opposite to the side where the substrate 602 is positioned) defines a front surface 36a-36c side (see FIGS. 2-10, FIGS. 18-19B and FIGS. 21A-22A) and the lower side defines a rear surface 42a-42c side, and the radiation 16 is incident from above as A surface irradiation, then the radiation detector 600 functions as a PSS type of radiation detector, whereby the fluorescent body of the scintillator 608 converts the incident radiation 16 into light and emits light.

It is preferable that the wavelength range of light emitted by the scintillator 608 be a visible light range (wavelength of 360 nm to 830 nm). It is more preferable that the wavelength range of light include a green wavelength range in order to capture a monochromatic image using the radiation detector 600.

In the case that imaging is performed using X-rays as the radiation 16, it is preferable that the phosphor used for the scintillator 608 include cesium iodide (CsI). It is more preferable to use CsI(Tl) (thallium-added cesium iodide) having an emission spectrum of 420 nm to 600 nm upon emission of X-rays. The emission peak wavelength of CsI(Tl) in the visible light range is 565 nm.

The scintillator 608, for example, may be formed on a vapor deposition substrate by vapor deposition of a columnar crystal of CsI(Tl). As such, in the case that the scintillator 608 is formed by vapor deposition, an Al plate is generally used as the vapor deposition substrate in terms of the transmittance of X-rays and manufacturing costs, but the vapor deposition substrate is not limited to an Al plate. In the case that GOS is used as the scintillator 608, after the scintillator 608 is formed by applying GOS to a resin base, the scintillator 608 may be attached to a TFT active matrix substrate. Owing thereto, even if application of the GOS layer fails and GOS is not properly applied, the TFT active matrix substrate will not be damaged.

The sensor units 606 include an upper electrode 612, a lower electrode 614, and a photoelectric conversion film 616 provided between the upper electrode 612 and the lower electrode 614.

The upper electrode 612 requires that light, which is generated by the scintillator 608, be incident on the photoelectric conversion film 616. Therefore, it is preferable for the upper electrode 612 to be made of a conductive material that at least is transparent with respect to the emission wavelength of the scintillator 608. More specifically, it is preferable for the upper electrode 612 to be made of a transparent conducting oxide (TCO), which exhibits high transmittance with respect to visible light and has a small resistance value. A metal thin film, such as an Au thin film, may be used as the upper electrode 612. However, when the transmittance increases to 90% or more, the resistance value is likely to increase. Therefore, it is preferable for the upper electrode 612 to be made of TCO. For example, it is preferable for the upper electrode 612 to be made of ITO (Indium Tin Oxide), IZO, AZO, FTO, $SnO_2$, $TiO_2$, $ZnO_2$, etc. It is particularly preferable for the upper electrode 612 to be made of ITO, in terms of process simplicity, low resistance, and transparency. One upper electrode 612 may be common to all of the pixel units, or the upper electrode 612 may be divided into respective parts for each pixel unit.

The photoelectric conversion film 616 includes an organic photoconductor (OPC) that absorbs light emitted from the scintillator 608 and generates electric charges corresponding to the absorbed light. If the photoelectric conversion film 616 includes an organic photoconductor (an organic photoelectric conversion material) therein, the photoelectric conversion film 616 exhibits a narrow absorption spectrum in the visible light range and absorbs hardly any electromagnetic waves other than the light that is emitted from the scintillator 608. Therefore, it is possible to effectively reduce noise, which is generated due to absorption of radiation 16 by the photoelectric conversion film 616. The photoelectric conversion film 616 may include amorphous silicon (a-Si) instead of an organic photoconductor. In this case, the photoelectric conversion film 616 has a wide absorption spectrum and can efficiently absorb light that is emitted from the scintillator 608.

It is preferable that the absorption peak wavelength of the organic photoconductor forming the photoelectric conversion film 616 be close to the emission peak wavelength of the scintillator 608 in order to most effectively absorb light emitted from the scintillator 608. It is ideal that the absorption peak wavelength of the organic photoconductor is equal to the emission peak wavelength of the scintillator 608. However, when the difference between the absorption peak wavelength and the emission peak wavelength is small, it is possible to sufficiently absorb light emitted from the scintillator 608. More specifically, the difference between the absorption peak wavelength of the organic photoconductor and the emission peak wavelength of the scintillator 608 with respect to the radiation 16 is preferably equal to or less than 10 nm and more preferably, equal to or less than 5 nm.

Examples of organic photoconductors capable of satisfying the above-mentioned conditions include a quinacridone-based organic compound and a phthalocyanine-based organic compound. For example, the absorption peak wavelength of quinacridone in the visible light range is 560 nm. Therefore, when quinacridone is used as the organic photoconductor and CsI(Tl) is used as the material forming the scintillator 608, it is possible to reduce the difference between the peak wavelengths to 5 nm or less and substantially maximize the amount of charge generated by the photoelectric conversion film 616.

The sensor unit 606 includes an organic layer that is formed by laminating or mixing, for example, an electromagnetic wave absorption portion, a photoelectric conversion portion, an electron transport portion, a hole transport portion, an electron blocking portion, a hole blocking portion, a crystallization prevention portion, an electrode, and an interlayer contact improvement portion. It is preferable for the organic layer to include an organic p-type compound (organic p-type semiconductor) or an organic n-type compound (organic n-type semiconductor).

The organic p-type semiconductor is a donor-type organic semiconductor (compound), a representative example of which is a hole-transport-type organic compound, implying an organic compound that readily donates electrons. More specifically, in a case in which two organic materials are in contact with each other during use, one organic compound with a low ionization potential is used as the organic p-type semiconductor. Therefore, any organic compound may be used as the donor-type organic compound, as long as it exhibits an electron donating property.

The organic n-type semiconductor is an acceptor-type organic semiconductor (compound), a representative example of which is an electron-transport-type organic compound, implying an organic compound that readily accepts electrons. More specifically, in a case in which two organic compounds are in contact with each other during use, one organic compound with high electron affinity is used as the organic n-type semiconductor. Therefore, any organic compound may be used as the acceptor-type organic compound, as long as it exhibits an electron accepting property.

Materials applicable to the organic p-type semiconductor and the organic n-type semiconductor, as well as the structure of the photoelectric conversion film 616, have been described in detail in Japanese Laid-Open Patent Publication No. 2009-032854, and thus detailed descriptions of such features will be omitted. The photoelectric conversion film 616 may also include fullerene or carbon nanotubes.

It is preferable that the thickness of the photoelectric conversion film 616 be as large as possible in terms of absorption of light from the scintillator 608. However, when the thickness of the photoelectric conversion film 616 is greater than a predetermined value, the intensity of the electric field of the photoelectric conversion film 616 generated by the bias voltage applied from both ends of the photoelectric conversion film 616 is reduced, which makes it difficult to collect charges. Therefore, the thickness of the photoelectric conversion film 616 is preferably from 30 nm to 300 nm, more preferably from 50 nm to 250 nm, and most preferably from 80 nm to 200 nm.

One photoelectric conversion film 616 is common to all of the pixel units. However, the photoelectric conversion film 616 may be divided for each pixel unit. The lower electrode 614 is a thin film, which is divided for each pixel unit. However, one lower electrode 614 may be common to all of the pixel units. The lower electrode 614 may be appropriately made of a transparent or opaque conductive material, such as aluminum or silver. The thickness of the lower electrode 614 may be, for example, from 30 nm to 300 nm.

In the sensor unit 606, a predetermined bias voltage can be applied between the upper electrode 612 and the lower electrode 614 in order to move one of the charges (a hole and an electron) generated by the photoelectric conversion film 616 toward the upper electrode 612, and to move the other charge toward the lower electrode 614. In the radiation detector 600 according to such a modified example, a wiring line is connected to the upper electrode 612, and a bias voltage is applied to the upper electrode 612 through the wiring line. It is assumed that the polarity of the bias voltage is determined such that electrons generated in the photoelectric conversion film 616 move toward the upper electrode 612, whereas holes move toward the lower electrode 614. However, the polarity thereof may be reversed.

The sensor unit 606 forming each pixel unit may include at least the lower electrode 614, the photoelectric conversion film 616, and the upper electrode 612. In order to prevent an increase in dark current, it is preferable for at least one of an electron blocking film 618 and a hole blocking film 620 to be provided, and it is more preferable if both an electron blocking film 618 and a hole blocking film 620 are provided.

The electron blocking film 618 may be disposed between the lower electrode 614 and the photoelectric conversion film 616. When the bias voltage is applied between the lower electrode 614 and the upper electrode 612, an increase in dark current, due to the ingression of electrons from the lower electrode 614 into the photoelectric conversion film 616, can be prevented.

The electron blocking film 618 may be made of an electron donating organic material. In practice, the material used for the electron blocking film 618 may be selected according to the material that forms an adjacent electrode, and the material that forms an adjacent photoelectric conversion film 616. It is preferable for the material used for the electron blocking film 618 to have an electron affinity (Ea) that is at least 1.3 eV higher than the work function (Wf) of the material that forms the adjacent electrode, and to have an ionization potential (Ip) equal to or less than that of the material that forms the adjacent photoelectric conversion film 616. Materials applicable for use as the electron donating organic material have been described in detail in Japanese Laid-Open Patent Publication No. 2009-032854, and thus detailed descriptions of such materials will be omitted herein.

The thickness of the electron blocking film 618 is preferably from 10 nm to 200 nm, more preferably from 30 nm to 150 nm, and most preferably from 50 nm to 100 nm, in order to reliably obtain an effect of preventing dark current, as well as to prevent a reduction in the photoelectric conversion efficiency of the sensor unit 606.

The hole blocking film 620 may be disposed between the photoelectric conversion film 616 and the upper electrode 612. If a bias voltage is applied between the lower electrode 614 and the upper electrode 612, it is possible to prevent an increase in dark current due to ingression of holes from the upper electrode 612 into the photoelectric conversion film 616.

The hole blocking film 620 may be made of an electron accepting organic material. The thickness of the hole blocking film 620 is preferably from 10 nm to 200 nm, more preferably from 30 nm to 150 nm, and most preferably from 50 nm to 100 nm, in order to reliably obtain an effect of preventing dark current, as well as to prevent a reduction in the photoelectric conversion efficiency of the sensor unit 606.

In practice, the material used for the hole blocking film 620 may be selected according to the material that forms an adjacent electrode, and the material that forms an adjacent photoelectric conversion film 616. It is preferable for the material used for the hole blocking film 620 to have an ionization potential (Ip) that is at least 1.3 eV higher than the work function (Wf) of the material that forms the adjacent electrode, and to have an electron affinity (Ea) equal to or more than that of the material that forms the adjacent photoelectric conversion film 616. Materials applicable for use as the electron accepting organic material have been described in detail in Japanese Laid-Open Patent Publication No. 2009-032854, and thus detailed descriptions of such materials will be omitted herein.

In a case where the bias voltage is set such that, among the charges generated in the photoelectric conversion film 616, holes move toward the upper electrode 612 and electrons move toward the lower electrode 614, the positions of the electron blocking film 618 and the hole blocking film 620 may be reversed. In addition, it is not necessary to provide both the electron blocking film 618 and the hole blocking film 620. If either one of the electron blocking film 618 or the hole blocking film 620 is provided, the effect of preventing dark current can be obtained to a certain extent.

As shown in FIG. 27, the signal output unit 604 is provided on the surface of the substrate 602 so as to correspond to the lower electrode 614 of each pixel unit. The signal output unit 604 has a storage capacitor 622 that stores the charges moved to the lower electrode 614, and a TFT 624 that converts charges stored in the storage capacitor 622 into electric signals and outputs the electric signals. A region in which the storage capacitor 622 and the TFT 624 are formed has a portion that overlaps the lower electrode 614 as viewed in plan. In this way, in each pixel unit, the signal output unit 604 and the sensor unit 606 overlap each other in the thickness direction. It is possible to minimize the planar area of the radiation detector 600 (pixel unit), when the signal output unit 604 is formed such that the storage capacitor 622 and the TFT 624 are completely covered by the lower electrode 614.

The storage capacitor 622 is connected electrically to the corresponding lower electrode 614 through a conductive line, which is formed so as to pass through an insulating film 626 provided between the substrate 602 and the lower electrode 614. In this way, it is possible to cause charges captured by the lower electrode 614 to move toward the storage capacitor 622.

The TFT 624 is formed by laminating a gate electrode 628, a gate insulating film 630, and an active layer (channel layer) 632, and providing a source electrode 634 and a drain electrode 636 on the active layer 632 with a predetermined gap formed therebetween. The active layer 632 may be made of, for example, amorphous silicon, an amorphous oxide, an organic semiconductor material, or carbon nanotubes. However, the material that forms the active layer 632 is not limited to the aforementioned examples.

An oxide (for example, an In—O-based oxide) including at least one of In, Ga and Zn is preferable for use as the amorphous oxide, which is capable of forming the active layer 632. More preferably, an oxide (for example, an In—Zn—O-based oxide, an In—Ga—O-based oxide, or a Ga—Zn—O-based oxide) including at least two of In, Ga, and Zn is used as the amorphous oxide. Most preferably, an oxide including In, Ga, and Zn is used as the amorphous oxide. As an In—Ga—Zn—O-based amorphous oxide, preferably, an amorphous oxide having a composition represented by $InGaO_3(ZnO)_m$ (where m is a natural number smaller than 6) in a crystalline state is used, and more preferably, and $InGaZnO_4$ is used. The amorphous oxide, which is capable of forming the active layer 632, is not limited to the aforementioned examples.

A phthalocyanine compound, pentacene, or vanadyl phthalocyanine may be given as examples of the organic semiconductor material, which is capable of forming the active layer 632. However, the organic semiconductor material is not limited to these examples. The structure of the phthalocyanine compound has been described in detail in Japanese Laid-Open Patent Publication No. 2009-212389, and thus detailed descriptions of the phthalocyanine compound will be omitted herein.

When the active layer 632 of the TFT 624 is made of an amorphous oxide, an organic semiconductor material, or carbon nanotubes, radiation 16, such as X-rays or the like, are not absorbed thereby. Further, even if some radiation 16 is absorbed, the absorption amount will be very small. Therefore, it is possible to effectively prevent noise from being generated in the signal output unit 604.

In the case that the active layer 632 is made from carbon nanotubes, it is possible to improve the switching speed of the TFT 624, as well as to form the TFT 624 with low light absorptance in the visible light range. In addition, in the case that the active layer 632 is made from carbon nanotubes, if only a very small amount of metallic impurities become mixed within the active layer 632, the performance of the TFT 624 is reduced significantly. Therefore, it is necessary to separate and extract carbon nanotubes with very high purity using, for example, centrifugal separation, and then to form the active layer 632 with such high purity carbon nanotubes.

All of the aforementioned substances, i.e., amorphous oxide, the organic semiconductor material, carbon nanotubes, and the organic photoconductor, can be used for forming films at low temperatures. Thus, the substrate 602 is not limited to a substrate that possesses high heat resistance, such as a semiconductor substrate, a quartz substrate, or a glass substrate. A flexible substrate, such as a plastic substrate, an aramid substrate, or a bio-nanofiber substrate, may also be used as the substrate 602. More specifically, for example, a flexible substrate made from any of the following materials may be used, i.e., polyester, such as polyethylene terephthalate, polybutylene phthalate, or polyethylene naphthalate, polystyrene, polycarbonate, polyether sulfone, polyarylate, polyimide, polycycloolefin, norbornene resin, and polychlorotrifluoroethylene. When a flexible substrate made of plastic is used, it is possible to reduce the weight of the substrate, and thus, for example, such a structure has an advantage in terms of portability.

When the photoelectric conversion film 616 is formed from an organic photoconductor and the TFTs 624 are formed from an organic semiconductor material, it is possible to form films that make up the photoelectric conversion film 616 and the TFT 624 at low temperatures with respect to a flexible substrate (substrate 602) made of plastic. Also, it is possible to reduce the thickness and weight of the radiation detector 600 in its entirety, and consequently, it also is possible to reduce the thickness and weight of the cassette that houses the radiation detector 600 therein. Owing thereto, the radiation detection units 30*a*-30*c* (see FIGS. 1-12, FIG. 14, and FIGS. 18-25B), which accommodate radiation detectors 600 therein, can be made thin in profile and lightweight, so that connections between the radiation detection units 30*a*-30*c* can be made more easily, and it is unlikely for bumps or steps to occur at connected locations therebetween.

Further, in the radiation conversion panels 172*a*-172*c* (radiation detectors 600), the substrate 602 is constituted from a flexible substrate made from plastic. In the case that the photoelectric conversion film 616 made up from an organic photoconductor, and the TFTs 624 made up from an organic semiconductor material are formed respectively on such a flexible substrate, because such plastic and organic materials absorb hardly any radiation 16, irrespective of whether it is an ISS type or a PSS type, doses of radiation 16 that are only somewhat large in magnitude can still reach the radiation conversion panel 172*b* of the radiation detection unit 30*b*.

To elaborate more with respect to the above-mentioned effects, with the first through third embodiments, in order to obtain a single elongate image that does not exhibit image loss at joined locations (connected locations) therein, the radiation detection units 30*a*-30*c* are flipped over and connected sequentially, such that portions of the radiation conversion panels 172*a*-172*c* overlap each other and form a planar image capturing surface 156. As a result, there is a concern that the radiographic image density (i.e., the sensitivity of the radiation conversion panels 172*a*-172*c*) may differ, due to generation of steps that occur between the radiation conversion panels 172*a*-172*c*, differences in the magnification (distance between the radiation source 264 and the radiation conversion panels 172*a*-172*c*), and as a result of insufficient sensitivity at portions on the radiation conversion panel 172*b* that overlap with the radiation conversion panels 172*a*, 172*c*, which are distanced with respect to the irradiation direction of the radiation 16. In this case, it is necessary for the image processor 288 to combine each of the radiographic images to thereby obtain a single elongate image after having first carried out image correction processing responsive to the magnification and density.

In such a case, as noted earlier, by constructing the radiation conversion panels using plastic and organic materials, steps between the radiation conversion panels 172*a*-172*c* and insufficient sensitivity of the radiation conversion panel 172*b* can be reduced, and thus the required amount of image correction processing can be lessened or made unnecessary altogether.

Further, in the case that the radiation conversion panels 172*a*-172*c* are constructed using plastic and organic materials, if the radiation conversion panels 172*a*-172*c* (radiation detectors 600) are ISS type panels in which the substrate 602, the TFTs 624, the photoelectric conversion film 616 and the scintillators 150*a*-150*c*, 608 made of CsI are arranged in this order along the irradiation direction of the radiation 16, radiographic images of high quality and a single elongate image can easily be obtained.

Furthermore, because the radiation detection units 30*a*-30*c* are high cost electronic cassettes equipped with the radiation conversion panels 172*a*-172*c*, use thereof is not limited to applications in which the radiation detection units 30*a*-30*c* are connected together mutually. As noted above, since high quality radiographic images can easily be obtained if the radiation detection units 30*a*-30*c* are ISS type radiation conversion panels 172*a*-172*c* using plastic and organic materials together with CsI scintillators, the radiation detection units 30*a*-30*c* are convenient and useful even when utilized separately.

In addition, for example, an insulating layer for ensuring an insulating property, a gas barrier layer for preventing penetration of water or oxygen, and an undercoating layer for improving flatness or adhesion of the electrodes, for example, may be provided on the substrate 602.

Further, since aramid can be applied to a high-temperature process of 200 degrees or more, a transparent electrode material can be cured at high temperatures to have low resistance, and aramid can respond to automatic mounting of a driver IC, including a solder reflow process. In addition, the thermal expansion coefficient of aramid is close to that of ITO (indium tin oxide) or a glass substrate. Therefore, after an aramid substrate has been manufactured, warping of the aramid substrate is small, and the aramid substrate is less likely to experience cracking. In addition, aramid is capable of forming a substrate thinner than, for example, a glass substrate. Aramid may be laminated on an ultra-thin glass substrate in order to form the substrate 602.

The bio-nanofiber is a composite of a cellulose microfibril bundle (bacterial cellulose) generated by bacteria (*Acetobacter, Acetobacter Xylinum*) and a transparent resin. Such a cellulose microfibril bundle has a width of 50 nm, a size of one-tenth of the visible light wavelength, high strength, high elasticity, and a low thermal expansion coefficient. A transparent resin, such as an acrylic resin or an epoxy resin, is impregnated into bacterial cellulose, and is then cured in order to obtain a bio-nanofiber that has a light transmittance of about 90% at a wavelength of 500 nm, while including 60% to 70% fiber. The bio-nanofiber has a low thermal expansion coefficient (3 to 7 ppm), which is equal to that of a silicon crystal, a strength (460 MPa) similar to that of steel, high elasticity (30 GPa), and flexibility. Therefore, the bio-nanofiber is capable of forming a substrate 602, which may be thinner than, for example, a glass substrate.

In the present example, the signal output unit 604, the sensor unit 606, and the transparent insulating film 610 are formed sequentially on the substrate 602, and the scintillator 608 is bonded to the substrate 602 by an adhesive resin exhibiting low light absorptance, thereby forming the radiation detector 600.

In the radiation detector 600 according to the aforementioned modified example, since the photoelectric conversion film 616 is made of an organic photoconductor, and the active layer 632 of the TFT 624 is made of an organic semiconductor material, radiation 16 is hardly absorbed by the photoelectric conversion film 616 or the signal output unit 604. Therefore, it is possible to prevent a reduction in sensitivity with respect to the radiation 16 (see FIGS. 1, 2, 4 and 14).

Both the organic semiconductor material forming the active layer 632 of the TFT 624 and the organic photoconductor forming the photoelectric conversion film 616 can be used to form films at low temperatures. Therefore, the substrate 602 can be made of a plastic resin, aramid, or a bio-nanofiber that absorbs a small amount of radiation 16. Accordingly, it is possible to prevent a reduction in sensitivity with respect to such radiation 16.

Further, the radiation detectors 600 are disposed respectively inside of the casings 34*a*-34*c* (see FIGS. 5A-7A, FIGS. 8-10, FIGS. 18-19B and FIGS. 21A-22B), and for example, in a case where the substrate 602 is made of a plastic resin with high rigidity, aramid, or a bio-nanofiber, it is possible to reduce the thickness of the casings 34a-34c since the radiation detector 600 itself has high rigidity. In addition, in a case where the substrate 602 is made of a plastic resin, aramid, or a bio-nanofiber having high rigidity, because the radiation detector 600 also possesses flexibility, even when impacts are applied to the casings 34a-34c, the radiation detector 600 is less likely to become damaged due to its flexibility.

As noted above, as one example thereof, in FIG. 26, a PSS type of radiation detector 600 is shown, in which light emitted from the scintillator 608 is converted by the sensor unit 606 (photoelectric conversion film 616) into electric charges for reading the radiographic image, while the sensor unit 606 is positioned on the side opposite to the radiation irradiating apparatus 18 (see FIGS. 1 and 14).

The radiation detector 600, however, is not limited to such a structure. The radiation detector 600 may be of an ISS type of radiation detector. In this case, the insulating substrate 602, the signal output unit 604, the sensor unit 606, and the scintillator 608 are stacked sequentially along the irradiation direction of the radiation 16. Light emitted from the scintillator 608 is converted by the sensor unit 606 into electric charges for reading the radiographic image, while the sensor unit 606 is positioned on the same side as the radiographic image capturing apparatus 18. Typically, since the scintillator 608 emits light having higher intensity on a side on which it is irradiated by radiation 16 than on a back side, in an ISS type radiation detector 600, compared to a PSS type of radiation detector 600, the distance from the scintillator 608 to the photoelectric conversion film 616 over which the emitted light travels can be shorter than in a PSS type radiation detector 600. Thus, it is possible to reduce the diffusion or attenuation of such light, and as a result, the resolution of the radiographic image can be made higher.

Further, in the first through third embodiments, although the three radiation conversion panels 172a-172c are of the same type, even with panels of one type, in accordance with differences therein, such as (1) whether they are thin panels using plastic and organic materials or panels of normal thickness, (2) whether they are panels using GOS scintillators or panels using CsI scintillators, or (3) whether they are ISS type panels or PSS type panels, there are cases in which the magnification (radiation source 264 to panel distance), or in which the density (panel sensitivity) of the radiographic images differ. In such cases, it is necessary to combine the radiographic images into a single elongate image after an image correction process corresponding to the panel type has been carried out with respect to the radiographic images obtained by each of the radiation conversion panels 172a-172c.

Consequently, the connection order information generating unit 250 may transmit to the console 22 connection order information, which includes therein information concerning the types of the radiation conversion panels 172a-172c (i.e., the materials of the scintillators 150a-150c, 608, the materials of the photoelectric conversion layers 152a-152c or the photoelectric conversion film 616, the materials of the TFTs 210a-210c, 624, the materials of the substrates 178a-178c, 602, and a type classification indicative of an ISS type or a PSS type). Owing thereto, the image processor 288 of the console 22, after carrying out image correction processing with respect to the radiographic images obtained from the radiation conversion panels 172a-172c based on the connection order information including information concerning the types of radiation conversion panels 172a-172c, can combine the three radiographic images after image correction processing has been performed to thereby produce a single elongate image.

Next, descriptions shall be presented below, with reference to FIGS. 28 through 52, of preferred embodiments of a radiographic image capturing apparatus and a radiographic image capturing system (fourth through sixth embodiments) according to a second aspect of the invention. In the descriptions of the fourth through sixth embodiments, when appropriate and necessary, references may be made to the first through third embodiments (see FIGS. 1 though 27) as well.

First, explanations shall be given with reference to FIGS. 28 through 45B concerning a radiographic image capturing system 10D and a radiographic image capturing apparatus 20D according to a fourth embodiment.

As shown in FIGS. 28 through 34A, the fourth embodiment differs from the first through third embodiments (see FIGS. 1 to 27), in that two radiation detection units 30a, 30c of the same shape and thickness, and one radiation detection unit 30b having a different shape from the radiation detection units 30a, 30c but the same thickness are provided, wherein electronic cassettes of differing types are connected alternately along a line, such that a single radiographic image capturing apparatus 20D is constructed by electrically and mechanically connecting the electronic cassettes by two connectors 32.

A further detailed description shall be made concerning the respective radiation detection units 30a-30c according to the fourth embodiment.

In the radiation detection units 30a-30c, panel portions 198a-198c thereof are constituted by structural elements apart from the controllers 196a-196c (see FIGS. 36 through 38) in the interiors of the casings 34a-34c.

In this case, guide lines 38a-38c, which indicate an image capturing position for the subject 14, are formed respectively only on the front surfaces 36a-36c of the casings 34a-34c. Accordingly, guide lines and image capturing regions are not disposed on the rear surfaces 42a-42c that are opposed to the front surfaces 36a-36c. More specifically, in the fourth embodiment, the radiation detection units 30a-30c are electronic cassettes capable of converting radiation 16 into radiographic images, in which radiation 16 is applied from the exterior only with respect to the front surfaces 36a-36c thereof.

Figure 29:
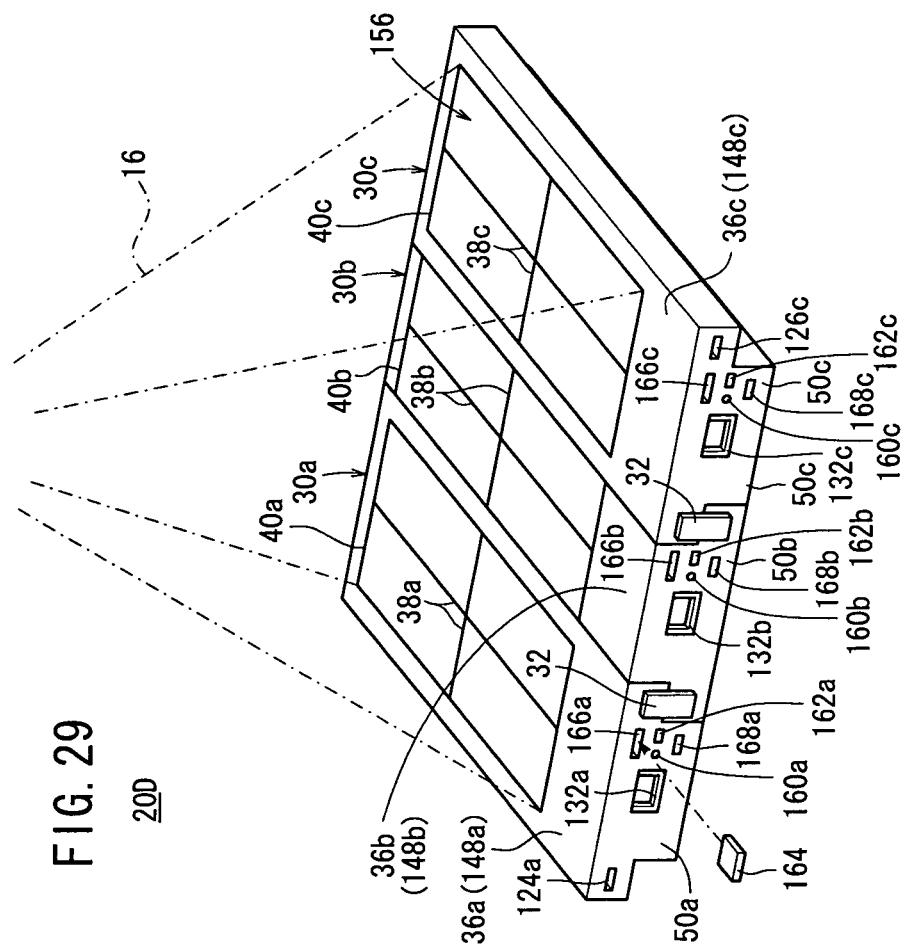
FIG. 29 is a perspective view of the radiographic image capturing apparatus of FIG. 28.
Figure 30:
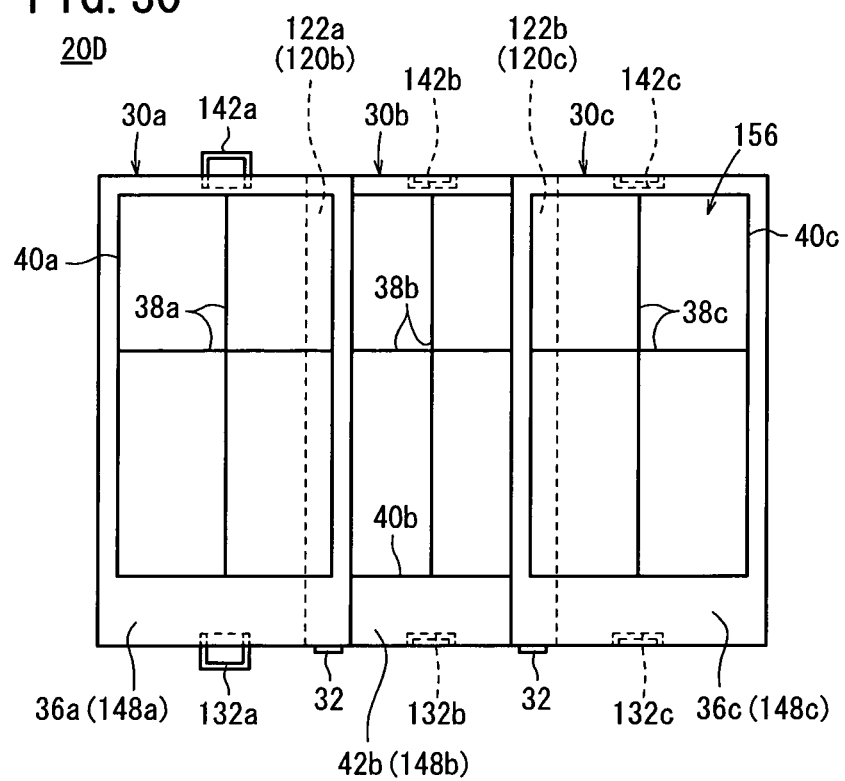
FIG. 30 is a plan view of the radiographic image capturing apparatus of FIG. 28.
Figure 31:
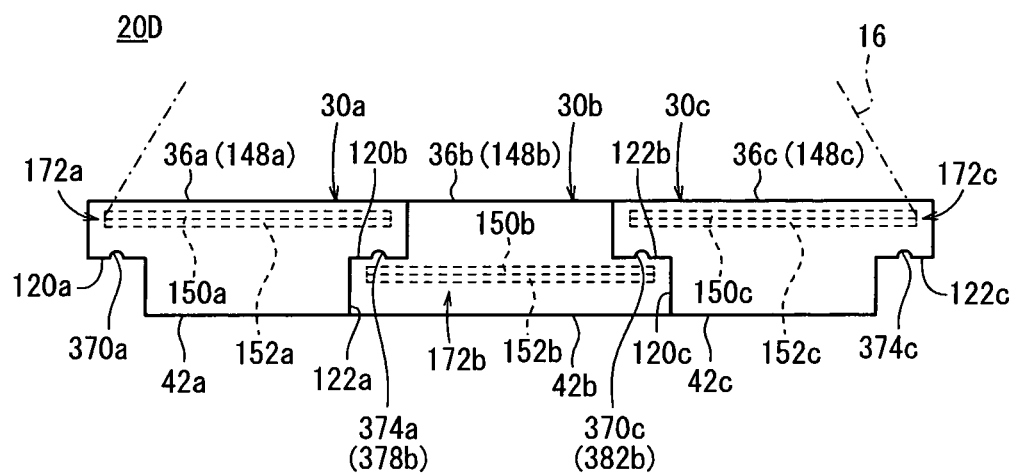
FIG. 31 is a side view showing schematically the radiographic image capturing apparatus of FIG. 28.
Figure 32A:
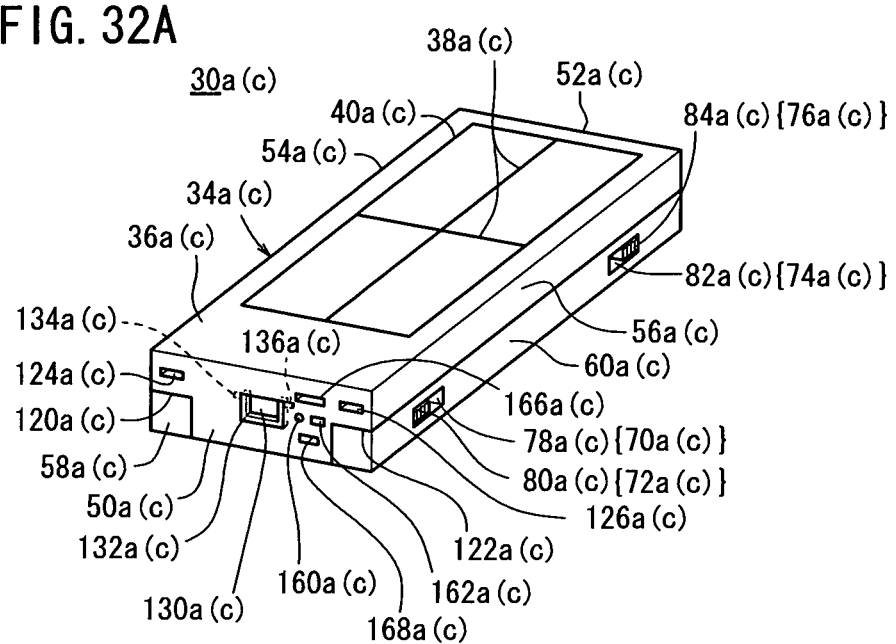
FIG. 32A is a perspective view of a single radiation detection unit.
Figure 32B:
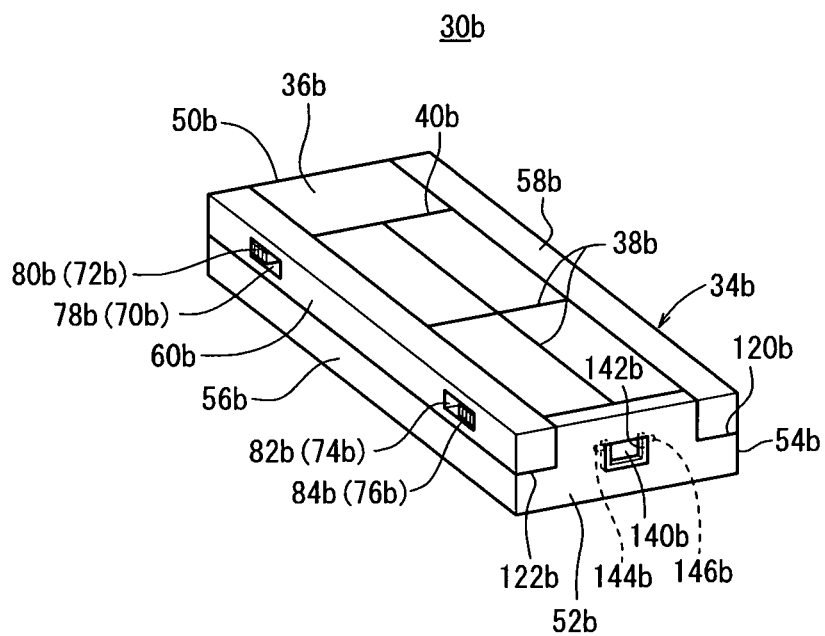
FIG. 32B is a perspective view of another single radiation detection unit, which differs from the radiation detection unit of FIG. 32A.

Further, as shown in FIGS. 29 and 30, even when the radiation detection units 30a-30c are connected, while the respective guide lines 38a-38c thereof do not overlap, portions of the radiation conversion panels 172a-172c, which are accommodated in the casings 34a-34c, do overlap with each other (see FIG. 31).

Furthermore, the front surfaces 36a-36c have mutually the same area, and irradiation fields of the radiation 16 are essentially of the same size for each. However, the sides of the rear surfaces 42a, 42c on side portions of the casings 34a, 34c are formed as blocks 58a, 58c, 60a, 60c which, when removed from the casings 34a, 34c, are capable of forming step portions 120a, 120c, 122a, 122c (see FIG. 33A). Together therewith, the sides of the front surface 36b on side portions of the casing 34b are formed as blocks 58b, 60b which, when removed from the casings 34b, are capable of forming step portions 120b, 122b (see FIG. 33B). During image capturing the area of the front surface 36b (second irradiated surface) is smaller compared to the areas of the front surfaces 36a, 36c (first irradiated surfaces). Accordingly, the guide lines 38b and the image capturing region 40b are displayed respectively only within a region that is not separable from the casing 34b, on the front surface 36b.

More specifically, in each of the casings 34a, 34c (first panel accommodating unit), surfaces proximate (i.e., joined) to the step portions 120a, 120c, 122a, 122c define the rear surfaces 42a, 42c, whereas surfaces opposed to the rear surfaces 42a, 42c and which are distanced from the step portions 120a, 120c, 122a, 122c define the front surfaces 36a, 36c (irradiated surfaces 148a, 148c). On the other hand, in the casing 34b (second panel accommodating unit), the surface proximate (i.e., joined) to the step portions 120a, 122b defines a front surface 36b (irradiated surface 148b), whereas the surface opposed to the front surface 36b and which is distanced from the step portions 120b, 122b defines a rear surface 42b.

Additionally, in the fourth embodiment, by separating the blocks 58a-58c, 60a-60c from the casings 34a-34c, on sides of the side surfaces 54a-54c, 56a-56c of the casings 34a-34c, step portions (connecting portions) 120a-120c, 122a-122c are formed respectively. Together therewith, on the front surface 36b of the casing 34b, (an image capturing region 40b of) the irradiated surface 148b is formed, which is smaller in area than (the image capturing regions 40a, 40c of) the irradiated surfaces 148a, 148c of the casings 34a, 34c.

On the step portions 120a, 120c, recesses 370a, 370c are formed respectively along the longitudinal direction of the blocks 58a, 58c, and in the blocks 58a, 58c, projections 372a, 372c, which are capable of fitting into the recesses 370a, 370c, are formed respectively. On the other hand, on the step portions 122a, 122c as well, recesses 374a, 374c, which are of the same shape as the recesses 370a, 370c, are formed respectively along the longitudinal direction of the blocks 60a, 60c, and in the blocks 60a, 60c, projections 376a, 376c, which are capable of fitting into the recesses 374a, 374c, are formed respectively.

On the step portion 120b, a projection 378b, which is the same shape as the projections 376a, 376c, is formed along the longitudinal direction of the block 58b, and in the block 58b, a recess 380b is formed, in which the projection 378b can be fitted. On the other hand, on the step portion 122b as well, a projection 382b, which is the same shape as the projections 376a, 376c, is formed along the longitudinal direction of the block 60b, and in the block 60b, a recess 384b is formed, in which the projection 382b can be fitted.

In the case that a single radiographic image capturing apparatus 20D is to be constructed by connecting together three of the radiation detection units 30a-30c, a doctor or radiological technician carries out the following assembly operations for the radiographic image capturing apparatus 20D as indicated below.

Figure 33A:
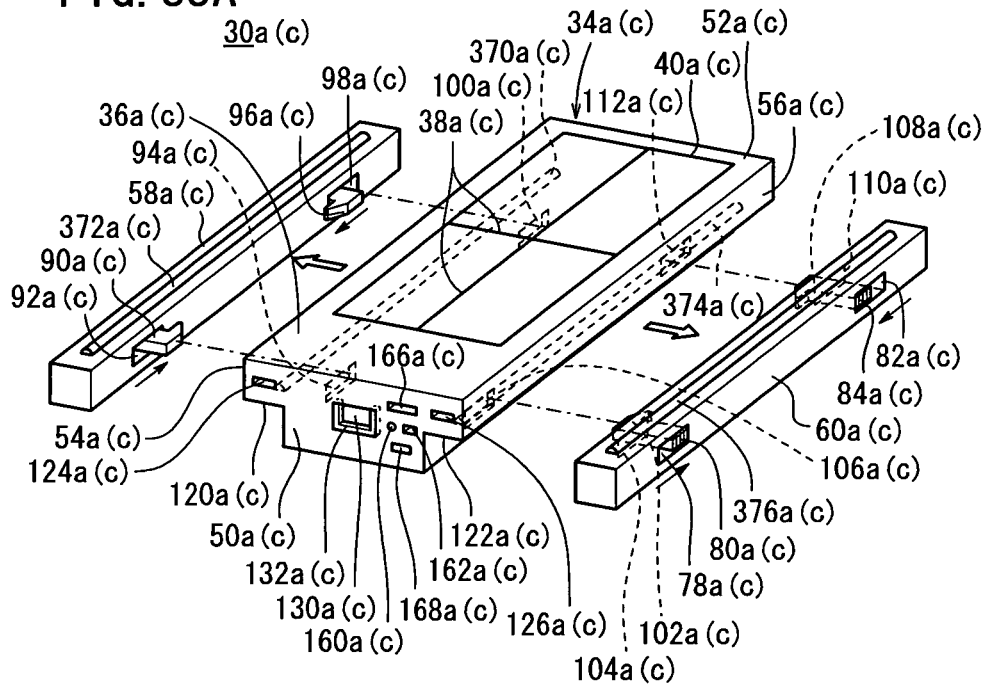
FIG. 33A is a perspective view showing a condition in which two blocks are separated from the radiation detection unit of FIG. 32A.
Figure 33B:
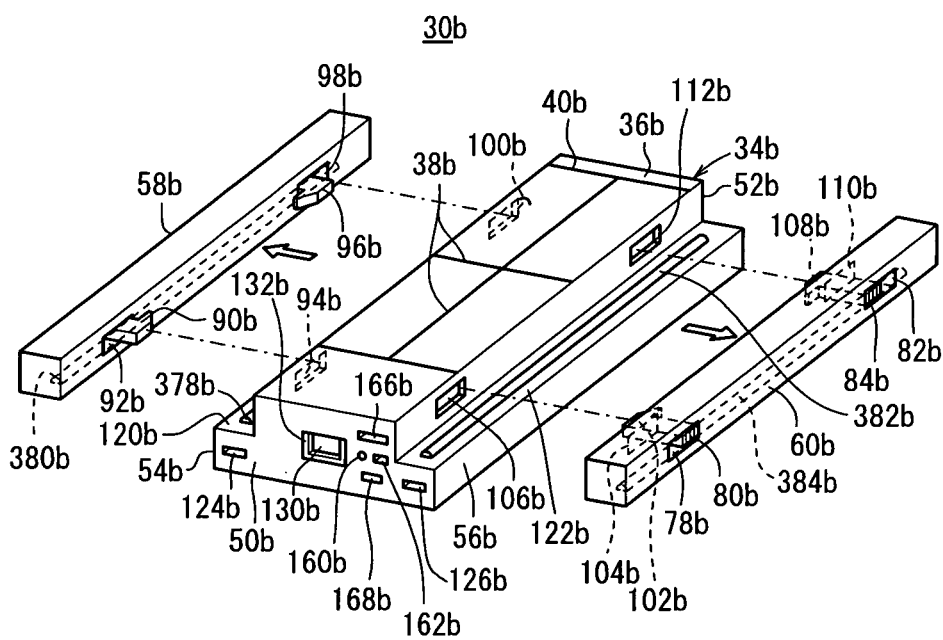
FIG. 33B is a perspective view showing a condition in which two blocks are separated from the radiation detection unit of FIG. 32B.

First, the blocks 58a-58c, 60a-60c are separated from the casings 34a-34c to expose and thereby form the step portions 120a-120c, 122a-122c (see FIGS. 33A and 33B). In this state, a doctor or radiological technician causes the step portion 122a of the casing 34a and the step portion 120b of the casing 34b to become interfitted, and together therewith, causes the step portion 122b of the casing 34b and the step portion 120c of the casing 34c to become interfitted (see FIGS. 34A and 34B).

In this case, the recess 374a on the side of the casing 34a and the projection 378b on the side of the casing 34b are fitted together, whereby the step portion 122a and the step portion 120b are interfitted reliably and without gaps in a mutually positioned condition. Further, the projection 382b on the side of the casing 34b and the recess 370c on the side of the casing 34c are fitted together, whereby the step portion 122b and the step portion 120c are interfitted reliably and without gaps in a mutually positioned condition.

Next, the doctor or radiological technician fits the substantially U-shaped connector 32 into the connection terminals 126a, 124b at the sides of the step portions 122a, 120b, and together therewith, fits the other connector 32 into the connection terminals 126b, 124c at the sides of the step portions 122b, 120c.

As a result of being assembled in this manner, in the radiographic image capturing apparatus 20D, the radiation detection units 30a-30c are connected in a sequence of the radiation detection unit 30a→the radiation detection unit 30b→the radiation detection unit 30c from the left side to the right side, whereby the electronic cassettes of different types are connected together alternately, as shown in FIGS. 28 through 31. Owing thereto, the upper surface of the radiographic image detecting apparatus 20D is formed by a sequence of the front surface 36a (first irradiated surface) →the front surface 36b (second irradiated surface)→the front surface 36c (first irradiated surface), such that irradiated surfaces of different areas are connected together alternately along one direction.

Further, as discussed above, because the respective casings 34a-34c are of uniform thickness, when the respective radiation detection units 30a-30c are connected together to construct the radiographic image capturing apparatus 20D, bumps (steps) do not occur at the connecting locations between each of the casings 34a-34c (i.e., at the interfitted location of the step portions 122a, 120b and the interfitted location of the step portions 122b, 120c on the upper surface of the radiographic image capturing apparatus 20D), the thickness of the radiographic image capturing apparatus 20D can be the same as the thickness of each of the radiation detection units 30a-30c, and the upper surface of the radiographic image capturing apparatus 20D can remain substantially planar or flat (see FIGS. 28 through 31).

Furthermore, in the case that radiation 16 is irradiated onto the upper surface of the radiographic image capturing apparatus 20D on which the subject 14 lies in a recumbent position (see FIGS. 28 and 29), the front surfaces 36a-36c make up irradiated surfaces 148a-148c to which radiation 16 is applied, and together therewith, an irradiated range of the radiation 16 (i.e., an irradiation field including the image capturing regions 40a-40c) is constituted as the image capturing surface (image capturing region) 156 of the radiographic image capturing apparatus 20D.

As shown in FIG. 31, in the interiors of the casings 34a-34c, in wide portions thereof at which the step portions 120a-120c, 122a-122c are not formed, radiation conversion panels 172a-172c, including scintillators 150a-150c and photoelectric conversion layers 152a-152c, and which convert radiation 16 into radiographic images, are accommodated respectively. In this case, in each of the casings 34a, 34b, the step portions 122a and the step portions 120b are interfitted, and together therewith the recess 374a and the projection 378b are fitted together, such that a portion on the side of the radiation conversion panel 172b proximate to the radiation conversion panel 172a overlaps (as viewed in plan) with a portion on the side of the radiation conversion panel 172a proximate to the radiation conversion panel 172b. Further, in each of the casings 34b, 34c as well, the step portions 122b and the step portions 120c are interfitted, and together therewith the recess 370c and the projection 382b are fitted together, such that a portion on the side of the radiation conversion panel 172c proximate to the radiation conversion panel 172b overlaps (as viewed in plan) with a portion on the side of the radiation conversion panel 172b proximate to the radiation conversion panel 172c.

Furthermore, in the case that one from among each of the radiation detection units 30a-30c is used separately as a single electronic cassette, radiation 16 is applied to one of the image capturing regions 40a-40c. In contrast thereto, with the radiographic image capturing apparatus 20D, which is constituted by interconnecting sequentially each of the radiation detection units 30a-30c, as stated above, radiation 16 is applied to an image capturing surface 156, which includes all of such image capturing regions 40a-40c. Moreover, as shown in FIG. 35, as viewed in plan, the image capturing regions 40a, 40c substantially match with the scintillators 150a, 150c (as well as with the photoelectric conversion layers 152a, 152c).

Figure 35:
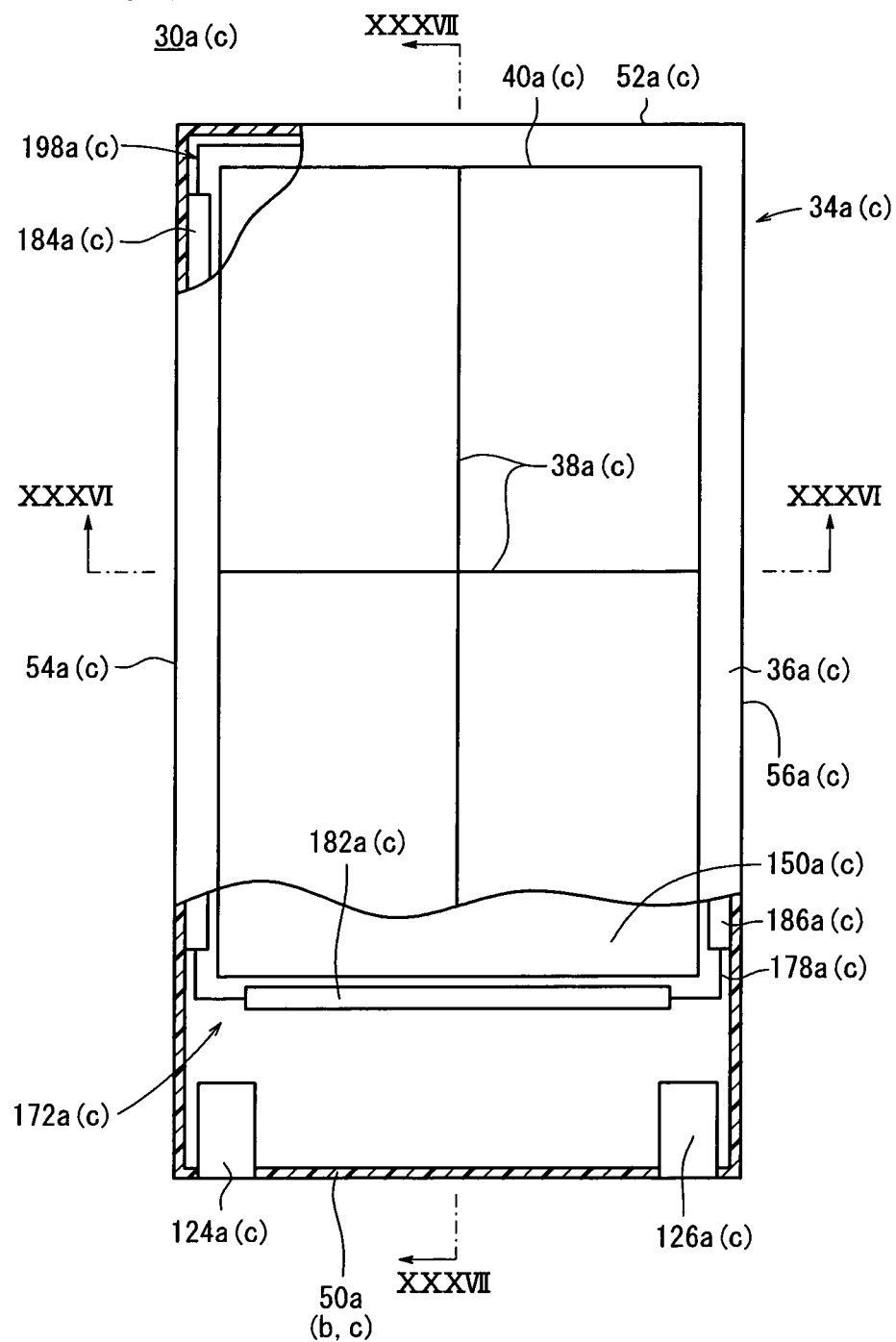
FIG. 35 is a plan view, partially broken away, of the radiation detection units of FIG. 28.
Figure 36:
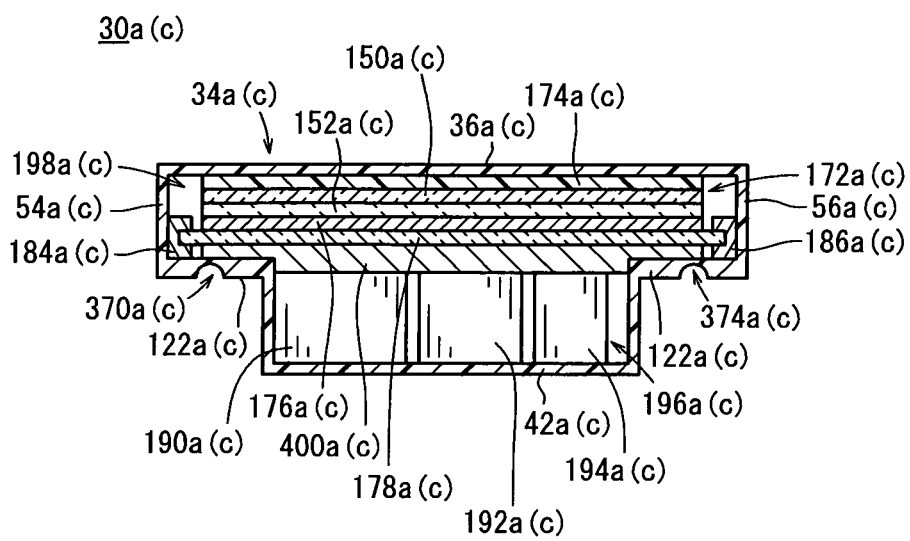
FIG. 36 is a cross sectional view taken along line XXXVI-XXXVI of FIG. 35.
Figure 37:
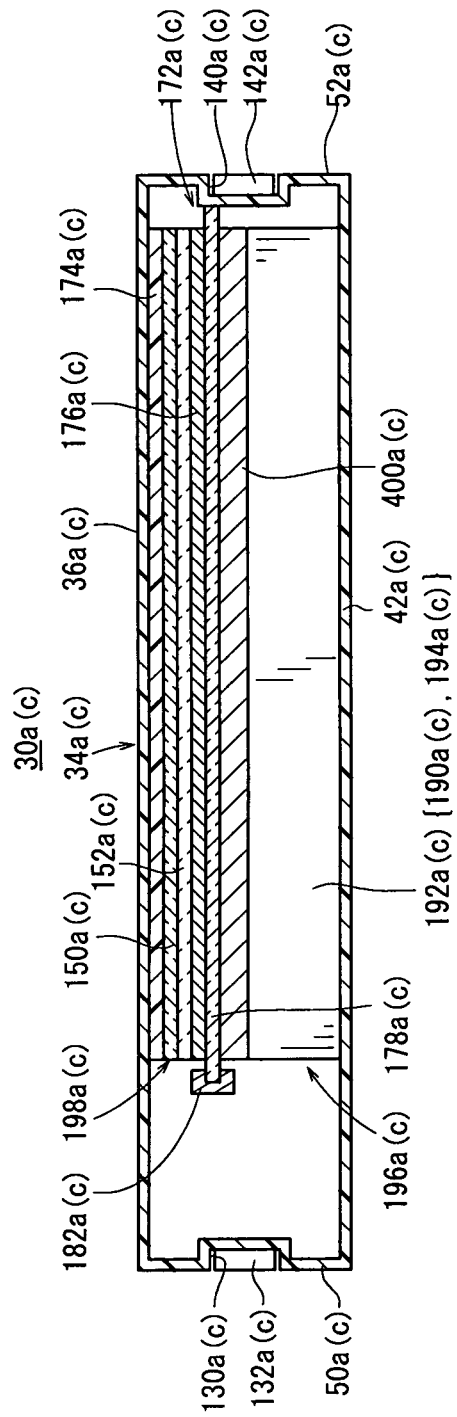
FIG. 37 is a cross sectional view taken along line XXXVII-XXXVII of FIG. 35.

As shown in FIGS. 35 through 37, in the radiation detection units 30a, 30c, in the interior of the casings 34a, 34c on the side of the narrow rear surfaces 42a, 42c thereof, there are arranged respectively electrical power sources 190a, 190c, cassette controllers 192a, 192c, and communications devices 194a, 194c. The aforementioned controllers 196a, 196c are constituted respectively by the electrical power sources 190a, 190c, the cassette controllers 192a, 192c, and the communications devices 194a, 194c.

Further, upwardly of the controllers 196a, 196c, there are arranged, in a state of contact with the radiation conversion panels 172a, 172c, radiation shielding members 400a, 400c of lead plate or the like, which prevent radiation 16 from penetrating therethrough. The radiation conversion panels 172a, 172c and shock absorbing members 174a, 174c are stacked sequentially from the radiation shielding members 400a, 400c toward the front surfaces 36a, 36c. The aforementioned controllers 196a, 196c are smaller (as viewed in plan) than the radiation shielding members 400a, 400c.

The radiation conversion panels 172a, 172c are constituted by substrates 178a, 178c such as glass substrates or the like which are transparent to light and transmissive to radiation, light transmissive TFT layers 176a, 176c on which a transparent electrode, etc. are formed, photoelectric conversion layers 152a, 152c and scintillators 150a, 150c, which are stacked in this order from the radiation shielding members 400a, 400c toward the shock absorbing members 174a, 174c.

The scintillators 150a, 150c initially convert radiation 16, which is irradiated from the front surfaces 36a, 36c and via the shock absorbing members 174a, 174c, into visible light.

The scintillators 150a, 150c are constituted, for example, from CsI or GOS. Further, in the case that elongate image capturing with respect to a subject 14 is carried out using the radiographic image capturing apparatus 20D, from within the elongate image capturing region (e.g., the entire body of the subject 14), scintillators 150a, 150c of the radiation detection units used to capture images of a specified region of interest may be constituted from CsI, whereas scintillators 150a, 150c of the other radiation detection units may be constituted from GOS.

Figure 38:
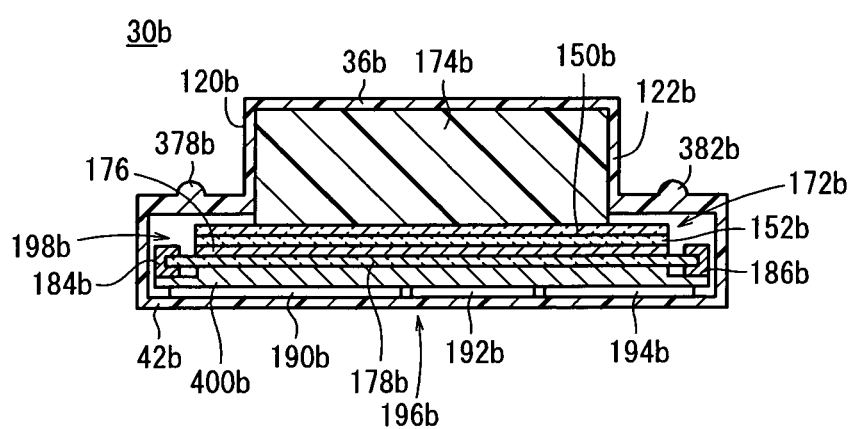
FIG. 38 is a cross sectional view showing the interior of the radiation detection unit of FIG. 33B.
Figure 39:
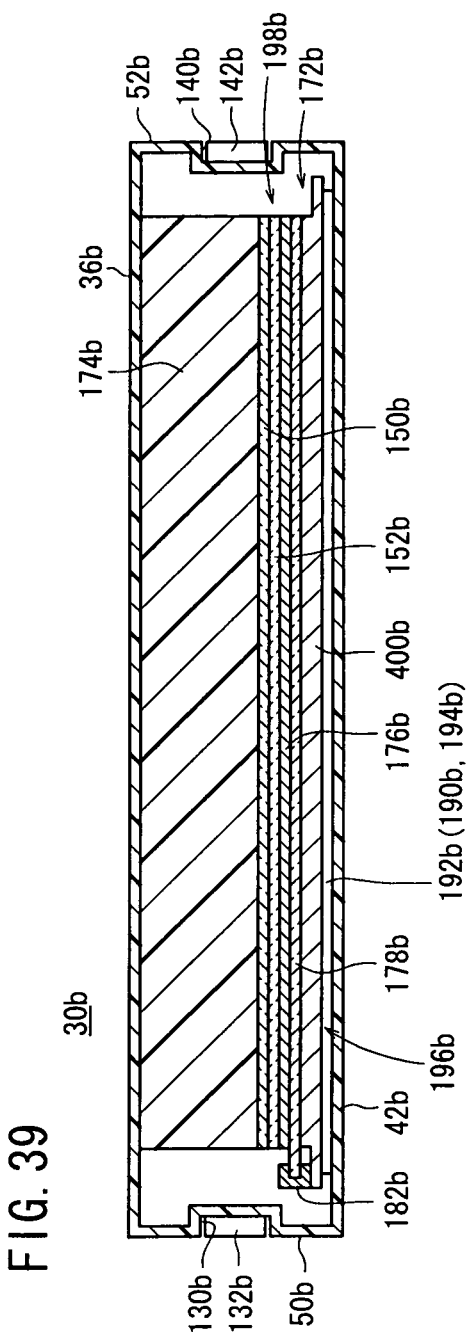
FIG. 39 is a cross sectional view showing the interior of the radiation detection unit of FIG. 33B.

Further, as shown in FIGS. 38 and 39, in the radiation detection unit 30b, in the interior of the casing 34b on the side of the wide rear surfaces 42b thereof, there are arranged respectively an electrical power source 190b, a cassette controller 192b, and a communications device 194b. In this case as well, the aforementioned controller 196b is constituted respectively by the electrical power source 190b, the cassette controller 192b, and the communications device 194b.

Further, upwardly of the controller 196b, there are arranged, in a state of contact with the radiation conversion panel 172b, a radiation shielding member 400b of lead plate or the like, which prevents radiation 16 from penetrating therethrough. The radiation conversion panel 172b and the shock absorbing member 174b are stacked sequentially from the radiation shielding member 400b toward the front surface 36b. The aforementioned controller 196b is smaller (as viewed in plan) than the radiation shielding member 400b.

The radiation conversion panel 172b is constituted by a substrate 178b such as a glass substrate or the like which is transparent to light and transmissive to radiation, a light transmissive TFT layer 176b on which a transparent electrode, etc. are formed, a photoelectric conversion layer 152b, and a scintillator 150b, which are stacked in this order from the radiation shielding member 400b toward the shock absorbing member 174b.

The scintillator 150b functions in the same manner as the scintillators 150a, 150c. Accordingly, the scintillator 150b may also be constituted by CsI or GOS. Further, in the event that image capturing of a specified region of interest is performed thereby, the scintillator 150b may be constituted by CsI. The photoelectric conversion layer 152b functions in the same manner as the photoelectric conversion layers 152a, 152c, and the TFT layer 176b functions in the same manner as the TFT layers 176a, 176c.

The indirect conversion type radiation conversion panels 172a-172c, as shown in FIGS. 35 to 39, function as PSS type radiation detectors, in which the scintillators 150a-150c and the photoelectric conversion layers 152a-152c, which make use of pixels 200a-200c, are arranged in this order with respect to the front surfaces 36a-36c.

Although indirect conversion type radiation conversion panels 172a-172c have been shown in FIGS. 35 to 39, a direct conversion type of radiation conversion panel can be adopted, in which the radiation dose is converted directly into electrical signals by means of solid state detecting elements made up from materials such as amorphous selenium (a-Se) or the like.

Further, the aforementioned cassette controllers 192a-192c control the radiation conversion panels 172a-172c via the driving circuits 182a-182c and the readout circuits 184a-184c. Furthermore, as stated above, the controllers 196a-196c are arranged in regions apart from the panel portions 198a-198c, which are irradiated with radiation 16, and due to the fact that radiation 16 is prevented from penetrating therethrough by the radiation shielding members 400a-400c.

Figure 40:
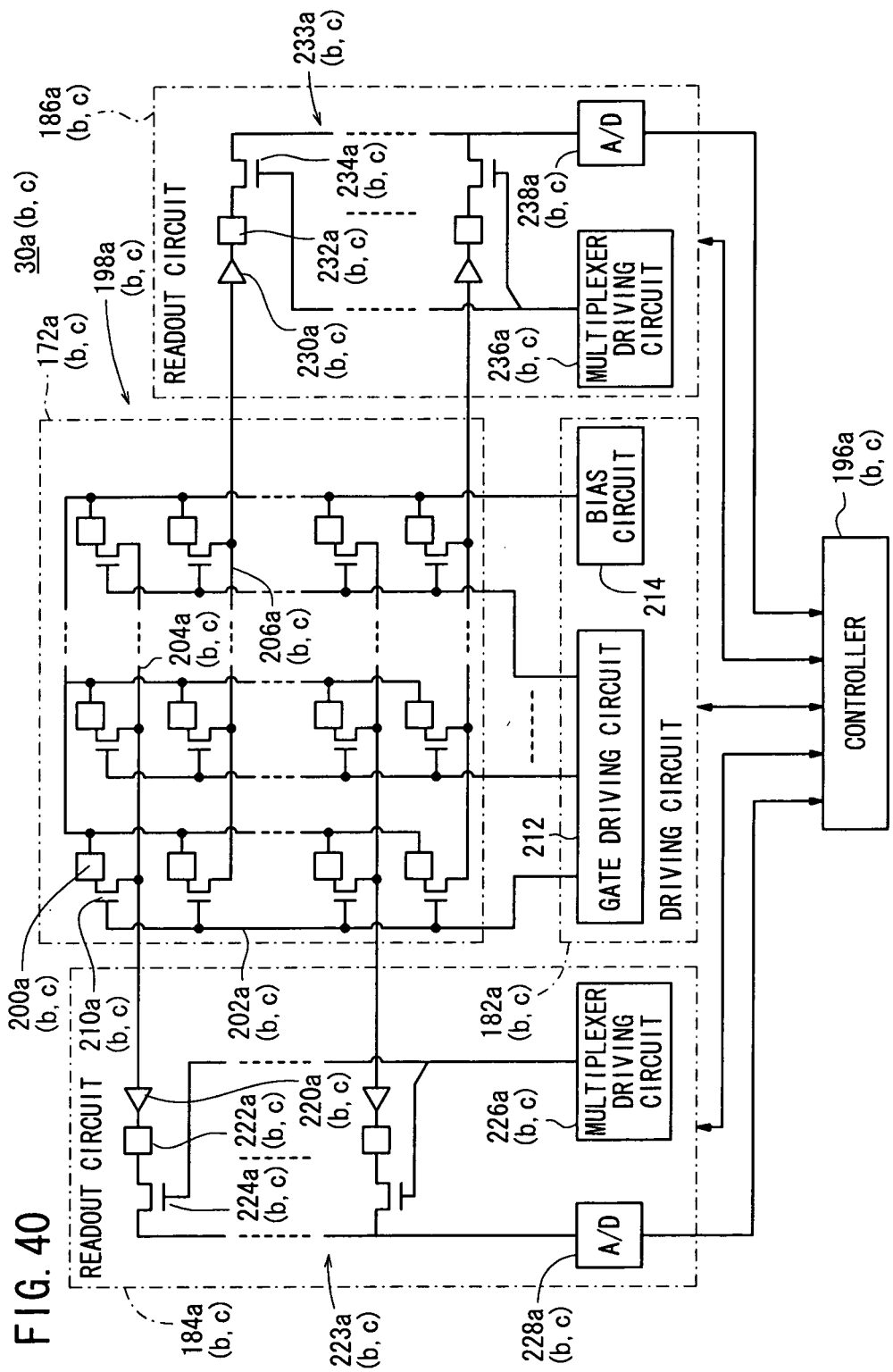
FIG. 40 is a block diagram of a panel accommodating unit.
Figure 41:
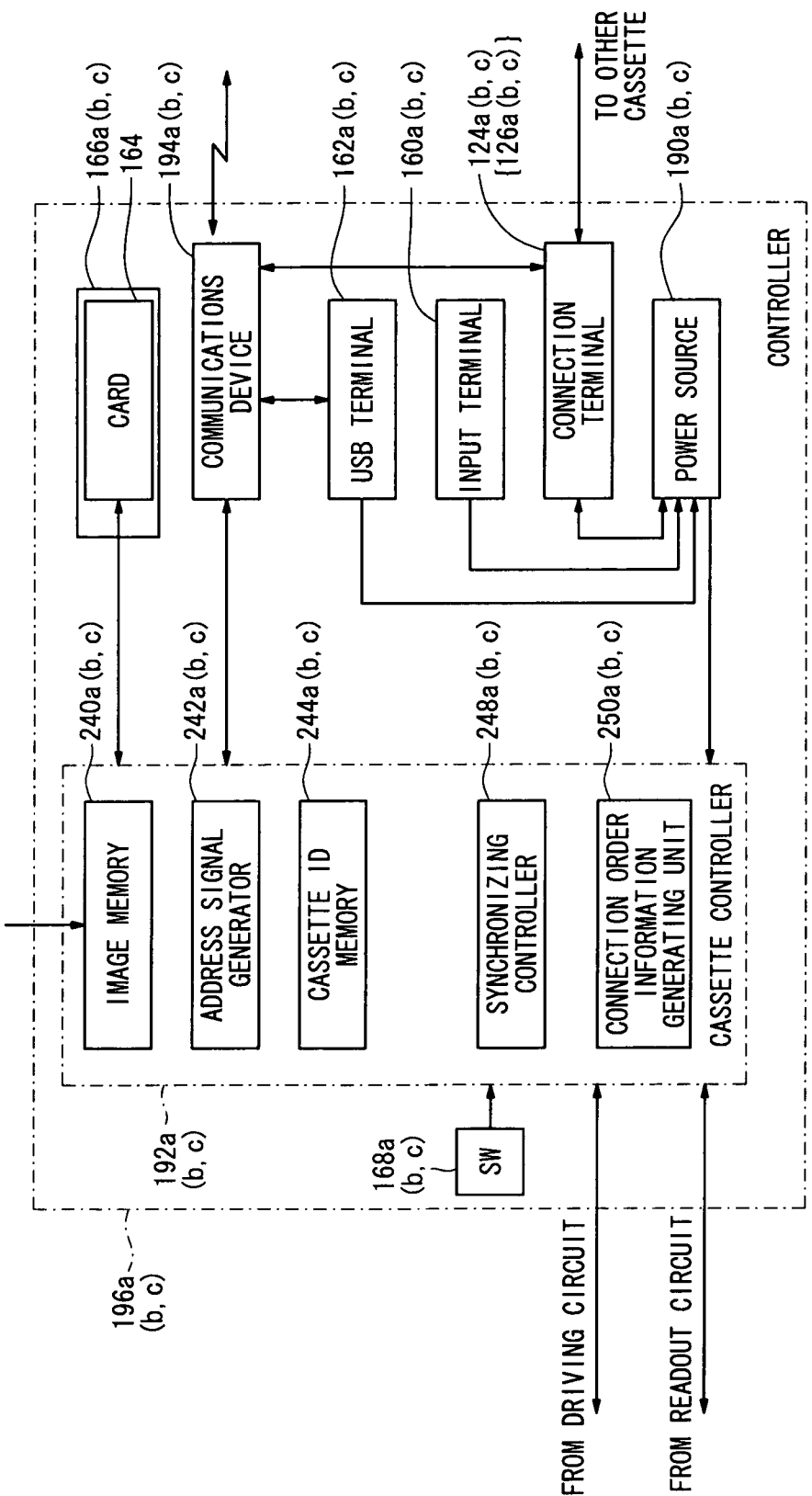
FIG. 41 is a block diagram of a controller.

Still further, as shown in FIGS. 40 and 41, the circuit structure and block diagram of the radiographic image capturing apparatus 20D, except for the sensors 180a-180c and the irradiated surface determining units 246a-246c, is essentially the same as the radiographic image capturing apparatus 20A-20C (see FIGS. 12 and 13).

Further, operations of the radiographic image capturing system 10D according to the fourth embodiment are generally the same as the radiographic image capturing system 10A-10C (see FIGS. 1 through 27), although each of steps S22, S24-S28, S4 and S8 (see FIGS. 15 and 16) are modified in the following manner.

Figure 34A:
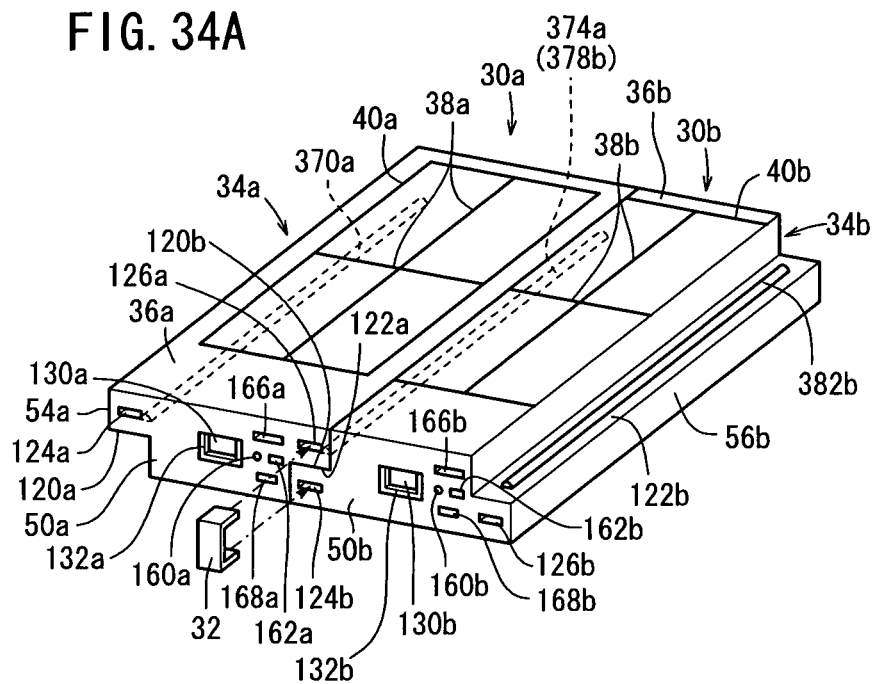
FIG. 34A is a perspective view showing a condition in which the radiation detection unit of FIG. 33A and the radiation detection unit of FIG. 33B are interconnected.
Figure 34B:
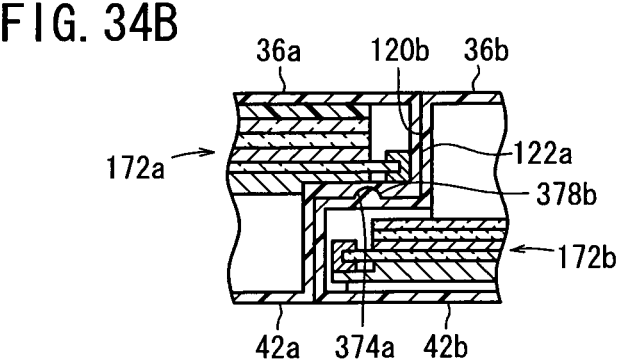
FIG. 34B is a cross sectional view showing a condition of a connection location between two radiation detection units.

More specifically, in step S22, a doctor or radiological technician interfits the step portion 122a of the casing 34a and the step portion 120b of the casing 34b, such that the recess 374a of the casing 34a is fitted together with the projection 378b of the casing 34b, and together therewith, interfits the step portion 122b of the casing 34b and the step portion 120c of the casing 34c, such that the projection 382b of the casing 34b is fitted together with the recess 370c of the casing 34b (see FIGS. 34A and 34B). Owing thereto, the step portion 122a and the step portion 120b are connected in a positioned state without gaps therebetween, and the step portion 122b and the step portion 120c similarly are connected in a positioned state without gaps therebetween.

Next, the doctor or radiological technician fits the connector 32 into the connection terminals 126a, 124b alongside the step portions 122a, 120b, and also fits the other connector 32 into the connection terminals 126b, 124c alongside the step portions 122b, 120c.

In this manner, the step portion 122a and the step portion 120b, as well as the step portion 122b and the step portion 120c, are fitted together respectively so that the recess 374a and the projection 378b, and also the projection 382b and the recess 370c, are interfitted. Then, after the respective radiation detection units 30a-30c have been connected together sequentially, by further fitting the connectors 32 into engagement with the connection terminals 124b, 124c, 126a, 126b, a single radiographic image capturing apparatus 20D having a substantially flat image capturing surface 156 can be constructed without causing bumps (or steps) to occur at the connected locations of the casings 34a-34c (see FIGS. 28 through 31).

The process of step S24 is not performed.

Additionally, in step S25, the connection order information generating units 250a-250c specify adjacent radiation detection units by carrying out transmission and reception of cassette ID information stored in the cassette ID memories 244a-244c between the adjacent radiation detection units via the communications devices 194a-194c and the connectors 32. Owing thereto, the connection order of each of the radiation detection units 30a-30c that make up the radiographic image capturing apparatus 20D can be specified.

In step S26, the connection order information generating units 250a-250c generate connection order information, which indicates the specified connection order, and the cassette ID information of the respective radiation detection units 30a-30c connected in the specified connection order. Thereafter, in step S27, the generated connection order information is sent to the console 22 via the communications devices 194a-194c. The connection order information managing unit 294 (see FIG. 14) of the console 22 stores the connection order information, which was received via the communications device 280 and the controller 282. Further, because the connection order information is information indicative of the connection order or the likes of the radiation detection units 30a-30c in the radiographic image capturing apparatus 20D, such information may also be transmitted with respect to the console 22 from any one of the communications devices 194a-194c from among the three radiation detection units 30a-30c.

In step S28, the controller 282, after having confirmed that the connection order information has been stored in the connection order information managing units 294, sends the SID (source-to-image distance) stored in the SID managing unit 296, and instruction signals to instruct setting of the irradiation field with respect to the radiation irradiating apparatus 18 via the communications device 280. After the SID and the instruction signals have been sent, the process of step S28 is the same as in the first through third embodiments, and therefore detailed explanations of such features shall be omitted herein.

In step S4, inside each of the radiation detection units 30a-30c, the scintillators 150a-150c that constitute the radiation conversion panels 172a-172c emit visible light of an intensity corresponding to the intensity of the radiation 16, and the respective pixels 200a-200c that make up the photoelectric conversion layers 152a-152c convert the visible light into electrical signals, which are stored as electric charges. Next, electrical charge information stored in the pixels 200a-200c, which represents a radiographic image of the subject 14, is read out according to address signals, which are supplied from the address signal generators 242a-242c of the cassette controllers 192a-192c to the gate driving circuit 212 and to the multiplexer driving circuits 226a-226c, 236a-236c. The process of step S4 carried out thereafter is the same as in the first through third embodiments, and therefore detailed explanations of such features shall be omitted herein.

In step S8, the doctor or radiological technician turns OFF the power switches 168a-168c of the radiation detection units 30a-30c (see FIGS. 28, 29, 32A, FIGS. 33A to 34A, and FIG. 41), and after the supply of power to each of the radiation detection units 30a-30c from the electrical power sources 190a-190c is halted, the connectors 32 are taken out from the connection terminals 124b, 124c, 126a, 126b, thereby separating and releasing the connected state of the respective radiation detection units 30a-30c. Thereafter, the doctor or radiological technician attaches the blocks 58a-58c, 60a-60c respectively with respect to the step portions 120a-120c, 122a-122c of the casings 34a-34c, such that the projections 372a, 372c and the recesses 370a, 370c, the projections 376a, 376c and the recesses 374a, 374c, the projection 378b and the recess 380b, and the projection 382b and the recess 384b are fitted together respectively, thereby restoring the condition shown in FIGS. 32A and 32B.

As described above, in accordance with the radiographic image capturing system 10D and the radiographic image capturing apparatus 20D according to the fourth embodiment, a plurality of radiation detection units 30a-30c of two types are repeated alternately and connected through the step portions 120a-120c, 122a-122c to thereby construct a single radiographic image capturing apparatus 20D, and by means of the radiographic image capturing apparatus 20D, elongate image capturing of a subject 14 is carried out.

More specifically, portions of each of the radiation conversion panels 172a-172c are superimposed on each other, and together therewith, by connecting the respective casings 34a-34c together using the step portions 120a-120c, 122a-122c, in a state such that irradiated surfaces 148a, 148c (first irradiated surfaces) and an irradiated surface 148b (second irradiated surface) thereof, areas of which are mutually different, are repeated alternately in succession, the image capturing surface 156, which includes the image capturing regions 40a-40c, of the radiographic image capturing apparatus 20D is maintained in a substantially planar shape without the occurrence of bumps (steps) at connecting locations between each of the radiation detection units 30a-30c (casings 34a-34c).

More specifically, with the fourth embodiment, for constituting the image capturing surface 156, by means of the step portions 120a-120c, 122a-122c, two types of radiation detection units 30a-30c are connected sequentially such that irradiated surfaces thereof are repeated alternately in a sequence of the first irradiated surface (irradiated surface 148a)→the second irradiated surface (irradiated surface 148b)→the first irradiated surface (irradiated surface 148c), whereby the overall thickness of the radiographic image capturing apparatus 20D can be suppressed to the thickness of each of the respective radiation detection units 30a-30c, and bumps (steps) are not generated at the connected locations therebetween.

Consequently, according to the fourth embodiment, similar to the first through third embodiments, it is possible to carry out elongate image capturing by connecting the plurality of radiation detection units 30a-30c without causing bumps (steps) to occur at connected locations therebetween. More specifically, in the fourth embodiment as well, by connecting the respective radiation detection units 30a-30c together sequentially, an increase in scale of the radiographic image capturing apparatus 20D can be avoided, and the image capturing surface 156 can reliably be kept in a flat and planar form.

In addition, because the radiographic image capturing apparatus 20D is constructed by connecting each of the casings 34a-34c through the step portions 120a-120c, 122a-122c, elongate image capturing can be carried out by application of radiation 16 one time with respect to the subject 14, and the time require to perform image capturing can be shortened.

Further, in the fourth embodiment as well, similar to the first through third embodiments, because the respective radiation detection units 30a-30c are connected respectively and sequentially in such a manner that bumps (steps) at the connected locations therebetween do not occur, compared to the case in which bumps occur at connected locations between the electronic cassettes as in Japanese Laid-Open Patent Publication No. 2000-292546, a problem in which the electronic cassettes could become damaged by shocks (e.g., shocks due to falling) caused at the bumps (steps) of the connected locations when connections between the electronic cassettes are removed can be avoided.

Further, according to the fourth embodiment of the present invention as well, for example, in the case that one casing and another casing are interconnected through the step portions 120a-120c, 122a-122c, assuming that the one casing and the other casing are connected such that a portion of the radiation conversion panel that is accommodated in the one casing, on the side of the other casing, and a portion of the radiation conversion panel that is accommodated in the other casing, on the side of the one casing overlap with each other (see FIGS. 28 through 31), when radiographic images obtained respectively by each of the radiation conversion panels 172a-172c are image-combined thereby to obtain a single elongate radiographic image of the subject 14, image gaps or missing portions at connected locations of each of the radiographic images can be prevented.

Consequently, according to the fourth embodiment, radiation detection units 30a-30c of two types are connected together alternately, and without generating bumps or steps at the connected locations therebetween, the overall thickness of the radiographic image capturing apparatus 20D is suppressed to the thickness of each of the radiation detection units 30a-30c, and the image capturing surface 156 is maintained reliably in a planar condition, whereby any sense of discomfort to the subject 14 at the time of image capturing can be eliminated, and together therewith, compared to conventional techniques, a thinner profile of the radiographic image capturing apparatus 20D can be realized. Further, because the radiographic image capturing apparatus 20D is constructed by interconnecting at the step portions 120a-120c, 122a-122c each of the radiation detection units 30a-30c of two types, the time required for image capturing can also be shortened.

Each of the aforementioned radiation detection units 30a-30c forms an electronic cassette in which carrying out of image capturing is made possible respectively and even independently, and also with the fourth embodiment, the above-described effects are obtained by interconnecting at the step portions 120a-120c, 122a-122c a plurality of electronic cassettes of this type.

Further, since the step portions 120a-120c, 122a-122c are formed easily simply by removing the blocks 58a-58c, 60a-60c from the casings 34a-34c, connections between the respective casings 34a-34c can be performed highly efficiently.

Furthermore, the recesses 370a, 370c, 374a, 374c are disposed on the step portions 120a, 120c and the projections 378b, 382b are provided on the step portions 120b, 122b that are interfitted with the step portions 120a, 120c. When the step portions 120a-120c, 122a-122c are interfitted such that the recesses 370a, 370c, 374a, 374c are fitted together with the projections 378b, 382b, the step portions 120a-120c, 122a-122c are interfitted in a positioned state without the formation of gaps therebetween. Accordingly, by providing the projections 378b, 382b and the recesses 370a, 370c, 374a, 374c, the casings 34a-34c can reliably and easily be connected.

In the casings 34a, 34c, surfaces proximate to the step portions 120a, 120c, 122a, 122c of the casings 34a, 34c define rear surfaces 42a, 42c, whereas surfaces opposite to the rear surface 42a, 42c and distanced from the step portions 120a, 120c, 122a, 122c define front surfaces 36a, 36c (irradiated surfaces 148a, 148c). Further, in the casing 34b, a surface proximate to the step portions 120b, 122b of the casing 34b defines the front surface 36b (irradiated surface 148b), whereas a surface opposite to the irradiated surface 148b and distanced from the step portions 120b, 122b defines a rear surface 42b. In this manner, by determining beforehand the front surfaces 36a-36c (irradiated surfaces 148a-148c) and the rear surfaces 42a-42c, connections of each of the casings 34a-34c can be carried out with good efficiency.

Furthermore, similar to the first through third embodiments, in the fourth embodiment as well, the connection order information generating units 250a-250c generate as connection order information the connection order between the respective casings 34a-34c. Owing thereto, when a single elongate image of the subject 14 is formed by image-combining each of the radiographic images, by referring to the aforementioned connection order information, it can be specified from which of the radiation conversion panels 172a-172c the radiographic images were obtained. Consequently, formation of the single elongate image can be carried out highly efficiently.

Further, the image processor 288 of the console 22 corrects each of the radiographic images based on the connection order information, and combines the respective radiographic images after correction thereof to generate an elongate image-captured image. Therefore, an elongate captured image of uniform image quality can be obtained.

Further, by disposing the controllers 196a-196c on the backs (rear surface 42a-42c sides) of the radiation conversion panels 172a-172c via the radiation shielding members 400a-400c, any concerns over radiation 16 being applied to the controllers 196a-196c can be avoided. Further, if the respective controllers 196a-196c, as viewed in plan, are smaller than the radiation conversion panels 172a-172c and the radiation shielding members 400a-400c, then application of radiation 16 with respect to each of the controllers 196a-196c can be avoided. More specifically, when application of radiation 16 is performed under a condition in which the controllers 196a-196c are arranged within each of the image capturing regions 40a-40c or within the image capturing surface 156, inconveniences arise in that the controllers 196a-196c become deteriorated due to radiation 16, or the presence of the controllers 196a-196c themselves becomes reflected in the radiographic image. Consequently, according to the fourth embodiment, by avoiding application of radiation 16 with respect to each of the controllers 196a-196c, the occurrence of such inconveniences can be prevented.

Further, in the case that there is a specified region of interest, capturing an image of the specified region using the radiation detection unit 30b is determined, and together therewith, the scintillator 150b of the radiation detection unit 30b is constituted by CsI, and connection order information, in which the connection order is such that the radiation detection unit 30b is located centrally, may be registered beforehand in the connection order information managing unit 294. In this case, the controller 282 compares the connection order information transmitted from the radiographic image capturing apparatus 20D with the connection order information registered beforehand in the connection order information managing unit 294, and allows image capturing (i.e., sends synchronizing control signals) if both of such information are in agreement, and if they are different, is capable of notifying the doctor or radiological technician via the display device 24 that the radiation detection units 30a-30c have been connected in error.

As a result, a desired elongate image-captured image including a specific region therein can reliably be obtained. Further, as stated above, if the connection order of the respective radiation detection units 30a-30c is understood beforehand, by pre-registering the connection order information in the connection order information managing unit 294, it is possible to detect, on the console 22, whether or not the actual connection condition is in a desired connection state, so that elongate image capturing can reliably be performed in accordance with the desired connection state.

Further, in the description above, a case has been explained in which a single radiographic image capturing apparatus 20D is constructed by connecting sequentially three radiation detection units 30a-30c, such that upper surfaces thereof are arranged in a sequence of the front surface 36a (first irradiated surface)→the front surface 36b (second irradiated surface) →the front surface 36c (first irradiated surfaces). However, the fourth embodiment is not limited to this feature, and any plurality of radiation detection units may be connected sequentially such that upper surfaces thereof are arranged in a sequence of the first irradiated surface→the second irradiated surface→the first irradiated surface→the second irradiated surface or the second irradiated surface→the first irradiated surface→the second irradiated surface→the first irradiated surface . . . .

Further, in the above descriptions, a case has been explained in which three radiation detection units 30a-30c are connected together sequentially along one direction. However, of course, step portions, which are similar to the step portions 120a-120c, 122a-122c, may also be formed on the side surfaces 50a-50c and 52a-52c, whereby a single radiographic image capturing apparatus 20D can also be constructed by connecting together sequentially a plurality of radiation detection units along a planar direction (i.e., in two directions).

The radiographic image capturing system 10D and the radiographic image capturing apparatus 20D according to the fourth embodiment are not limited by the aforementioned descriptions. The embodiments shown in FIGS. 42A to 45A can also be realized.

Figure 42A:
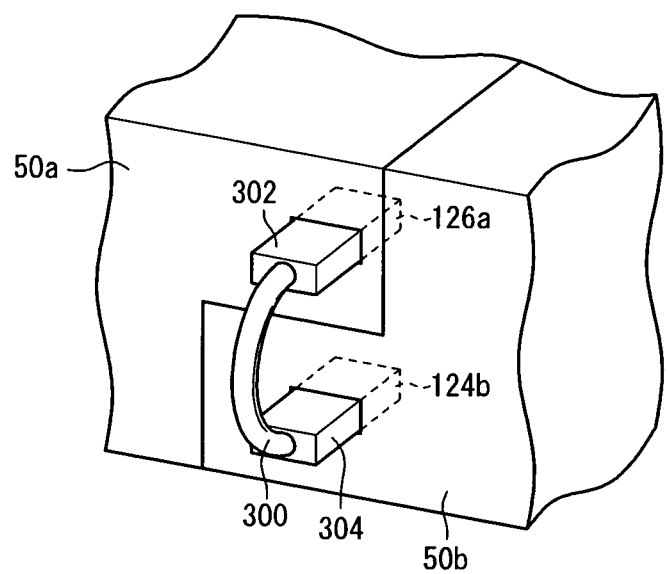
FIG. 42A and FIG. 42B are explanatory drawings showing other types of connections between respective radiation detection units.
Figure 42B:
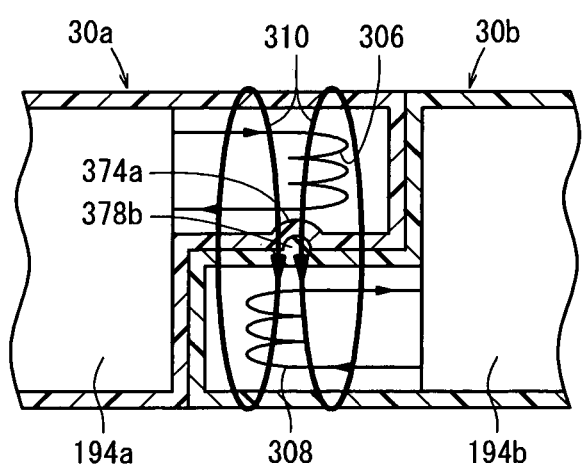

FIG. 42A, similar to FIG. 17A, illustrates a case in which the connection terminals 126a, 124b are optically connected by an optical fiber cable 300 and wherein optical connectors 302, 304 are fitted into the connection terminals 126a, 124b. Further, similar to FIG. 17B, FIG. 42B illustrates a case in which, by means of a magnetic flux 310, which is generated by electric currents that flow through the coils 306, 308, transmission and reception of signals is carried out through a magnetic coupling between the coils 306, 308. The connections of FIGS. 42A and 42B can achieve respectively each of the effects discussed with reference to FIGS. 17A and 17B.

Figure 43:
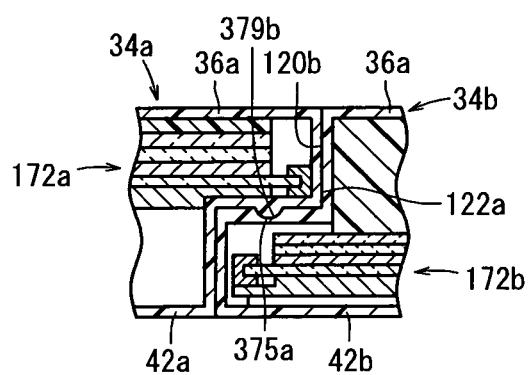
FIG. 43 is a cross sectional view showing another connection method for connecting two panel accommodating units.

FIG. 43 shows a case in which a projection 375a is provided on the step portion 122a of the casing 34a, and a recess 379b is provided on the step portion 120b of the casing 34b, wherein the step portions 122a, 120b are fitted together by interfitting the projection 375a and the recess 379b. In this case as well, by interfitting the projection 375a and the recess 379b, the step portions 122a, 120b can be interfitted reliably without gaps therebetween, and the casings 34a, 34b can be connected together.

Figure 44A:
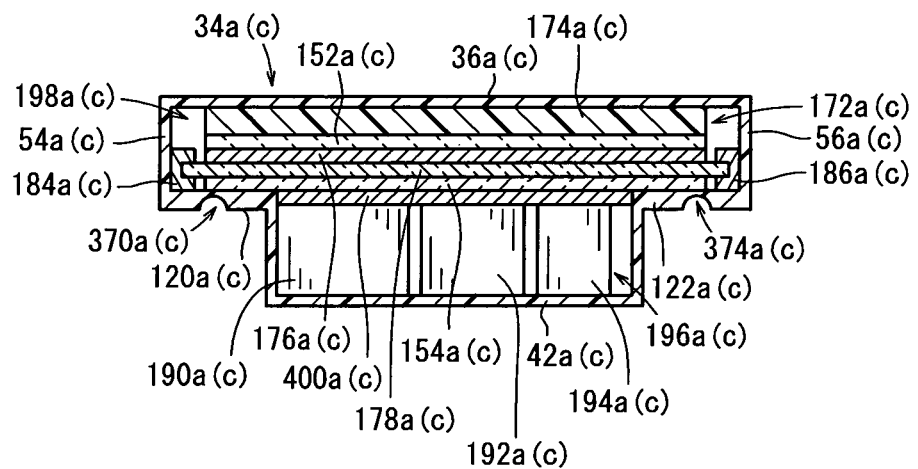
FIG. 44A and FIG. 44B are cross sectional views showing a condition in which a single scintillator is accommodated in a casing.
Figure 44B:
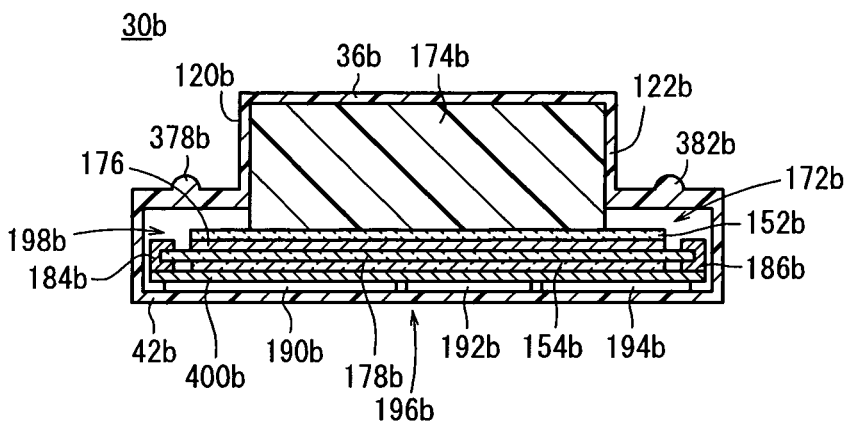

Further, in the above-described invention, as shown in FIG. 31 and in FIGS. 36 through 39, a structure is provided in which single scintillators 150a-150c are arranged therein. However, in place of this structure, as shown in FIGS. 44A and 44B, signal scintillators 154a-154c, which differ from the scintillators 150a-150c, may be arranged inside the casings 34a-34c. In this case, the scintillators 154a-154c initially convert radiation 16, which is irradiated from the front surfaces 36a-36c and through the shock absorbing members 174a-174c, the photoelectric conversion layers 152a-152c, the TFT layers 176a-176c and the substrates 178a-178c, into visible light. Accordingly, in this case as well, the photoelectric conversion layers 152a-152c can convert the aforementioned visible light into radiographic images.

In the case of FIGS. 44A and 44B, because the photoelectric conversion layers 152a-152c and the scintillators 154a-154c are positioned sequentially in this order with respect to the front surfaces 36a-36c, the radiation conversion panels 172a-172c are constructed as ISS type radiation detectors.

Figure 45A:
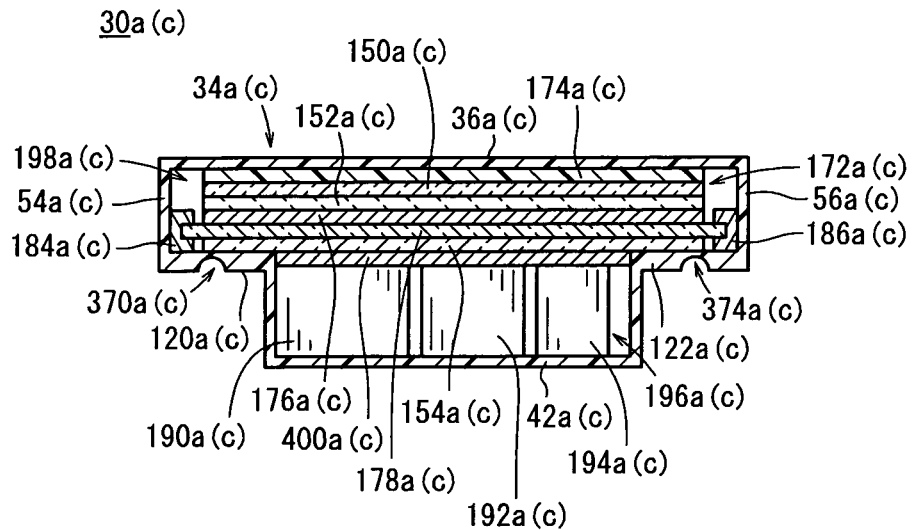
FIG. 45A and FIG. 45B are cross sectional views showing a condition in which two scintillators are accommodated in a casing.
Figure 45B:
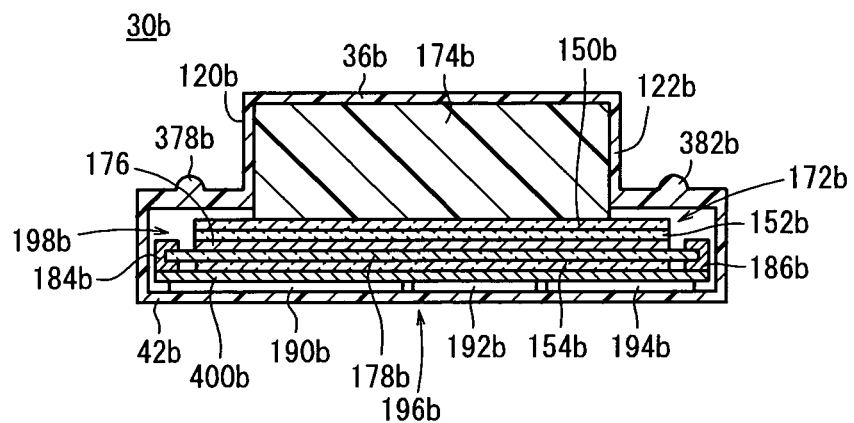
Figure 47A:
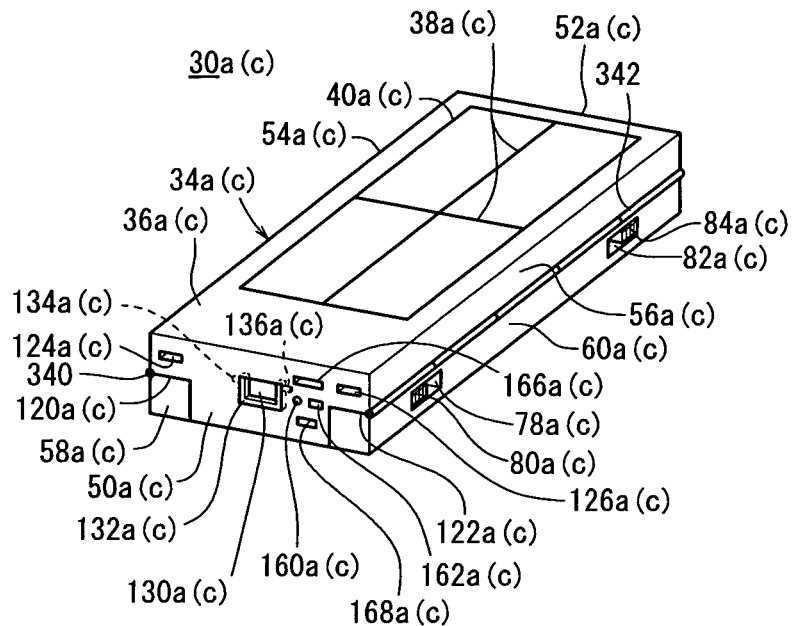
FIG. 47A is a perspective view of a signal radiation detection unit.
Figure 47B:
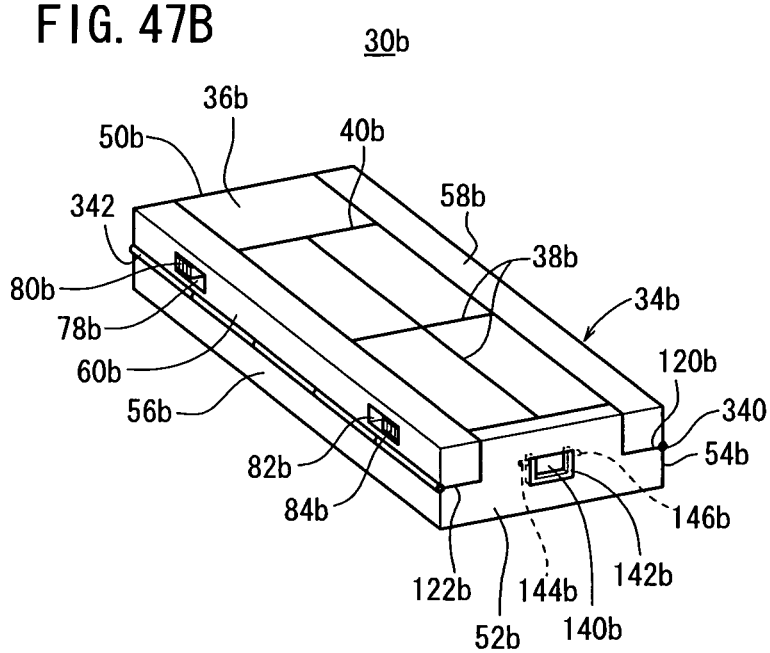
FIG. 47B is a perspective view of another single radiation detection unit, which differs from the radiation detection unit of FIG. 47A.
Figure 48A:
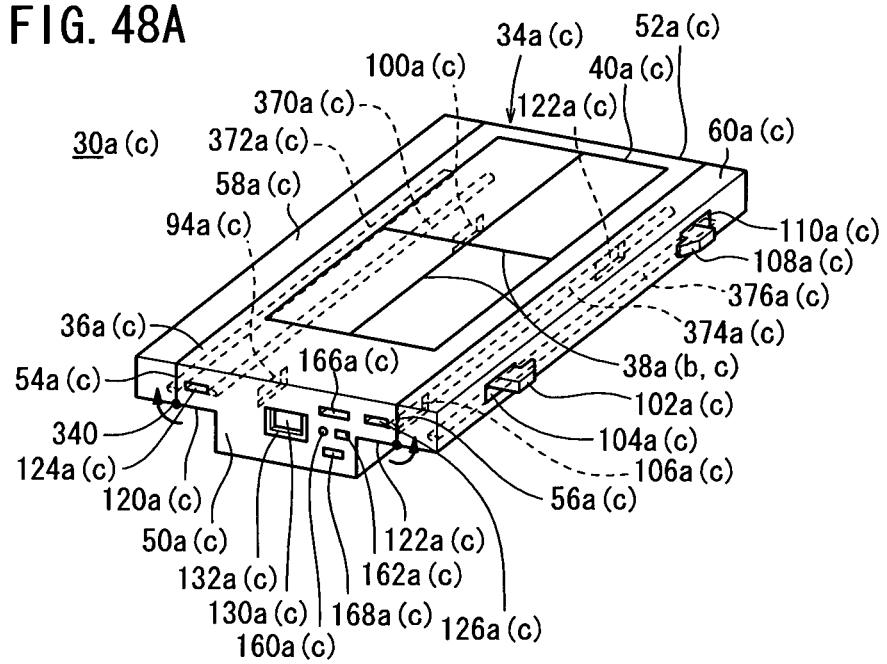
FIG. 48A is a perspective view showing a condition in which two blocks are rotated with respect to the radiation detection unit of FIG. 47A.
Figure 48B:
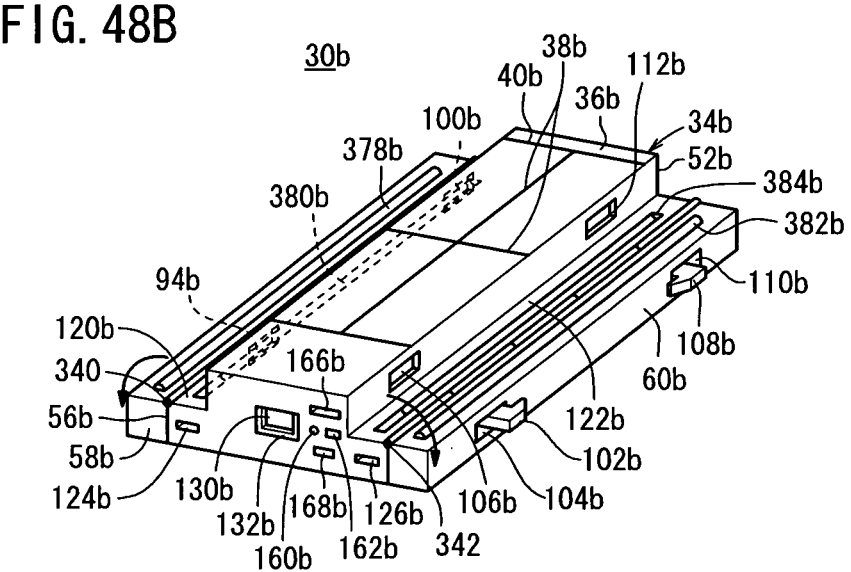
FIG. 48B is a perspective view showing a condition in which two blocks are rotated with respect to the radiation detection unit of FIG. 47B.
Figure 49:
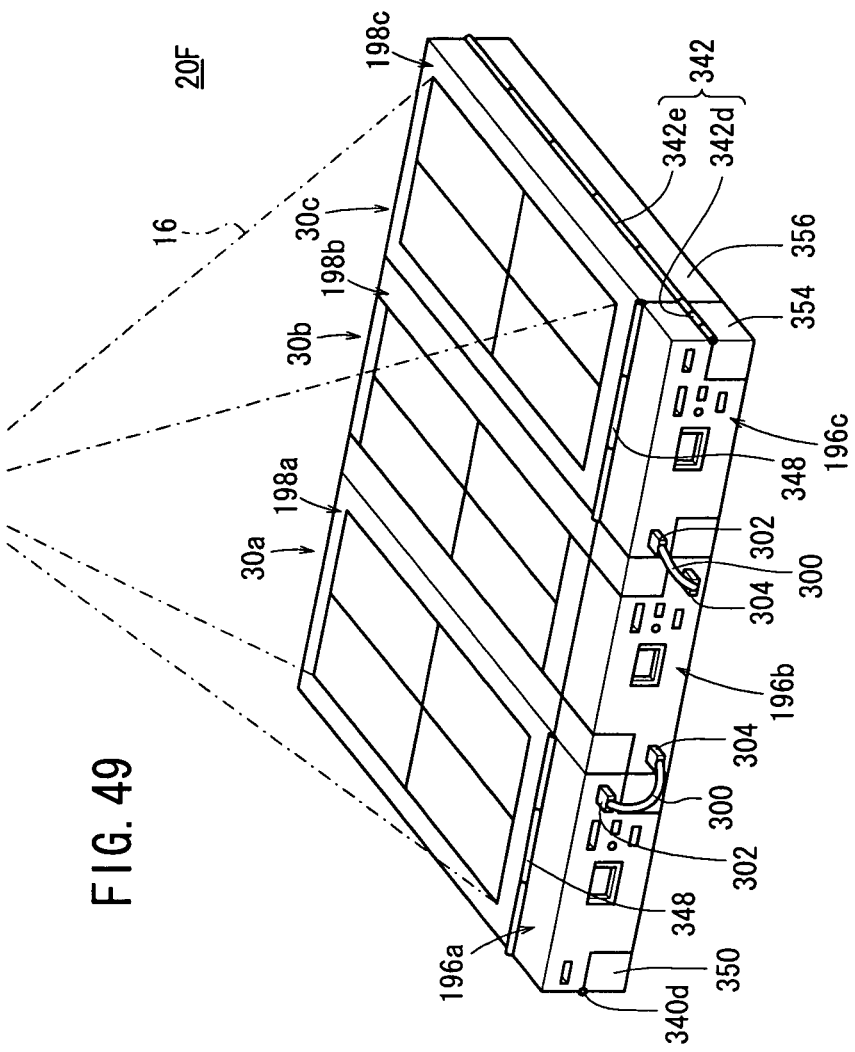
FIG. 49 is a perspective view of the radiographic image capturing apparatus of FIG. 46.
Figure 50A:
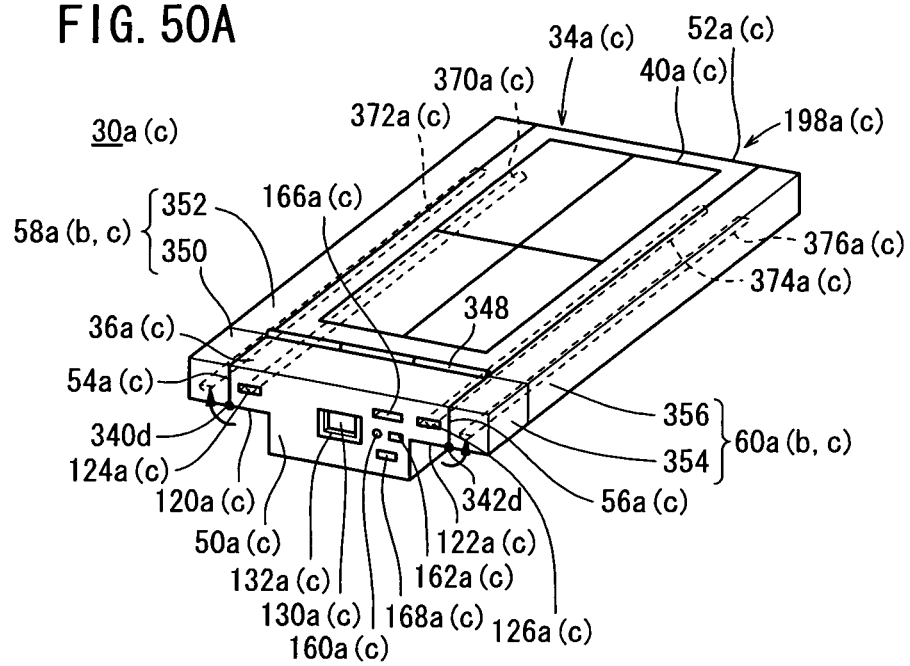
FIG. 50A is a perspective view showing a condition in which four blocks are rotated with respect to a single radiation detection unit.
Figure 50B:
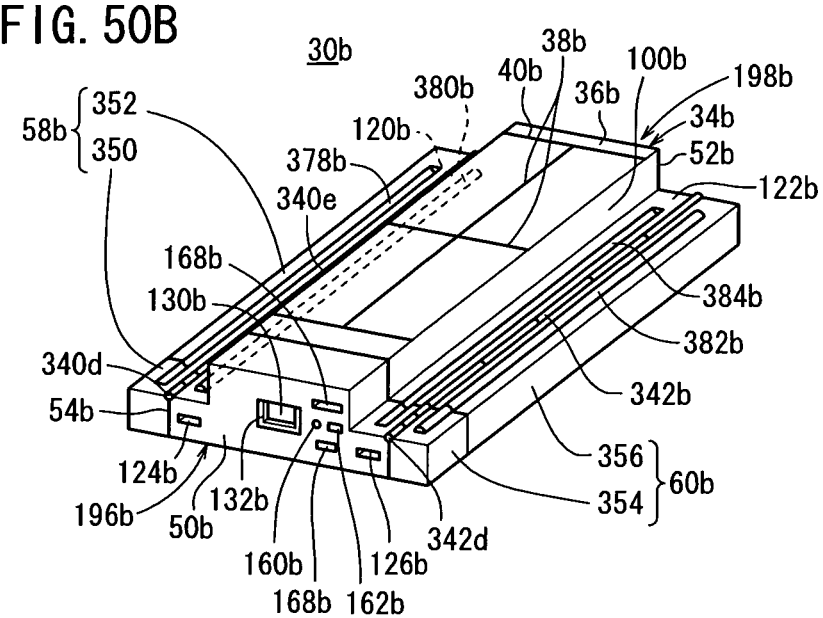
FIG. 50B is a perspective view showing a condition in which four blocks are rotated with respect to another single radiation detection unit, which differs from the radiation detection unit of FIG. 50A.

Further, as shown in FIGS. 45A and 45B, a structure may be provided in which the photoelectric conversion layers 152a-152c are each sandwiched between two scintillators 150a-150c, 154a-154c. In this case, each of the scintillators 150a-150c, 154a-154c converts radiation 16 into visible light, whereby the sensitivity and sharpness of the radiographic images can be enhanced, and as a result, the exposure dose of radiation 16 to the subject 14 during elongate image capturing can be lessened.

Furthermore, in the case of FIGS. 45A and 45B, because the scintillators 150a-150c, the photoelectric conversion layers 152a-152c and the scintillators 154a-154c are arranged in this order with respect to the front surfaces 36a-36c, in the radiation conversion panels 172a-172c, the positional relationship between the scintillators 150a-150c and the photoelectric conversion layers 152a-152c is a PSS type, whereas the positional relationship between the photoelectric conversion layers 152a-152c and the scintillators 154a-154c is an ISS type. Accordingly, the radiation conversion panels 172a-172c shown in FIGS. 45A and 45B are constituted as radiation detectors including both ISS and PSS types.

In the case of FIGS. 45A and 45B, the scintillators 150a-150c, 154a-154c may be constituted from the same materials, or alternatively, may be constituted from different materials. If constituted from different materials, certain ones of the scintillators may be made up from CsI, while the other scintillators may be made up from GOS. In the case that elongate image capturing is performed, within the elongate image capturing region, it is a matter of course that the scintillators 150a-150c, 154a-154c of radiation detection units that capture an image of a specified region of interest may be constituted from CsI, whereas the scintillators 150a-150c, 154a-154c of the other radiation detection units may be constituted from GOS.

Next, with reference to FIGS. 46 through 48B, explanations shall be made concerning a radiographic image capturing system 10E and a radiographic image capturing apparatus 20E according to a fifth embodiment.

As shown in FIGS. 47A to 48B, the radiographic image capturing system 10E and the radiographic image capturing apparatus 20E according to the fifth embodiment differ from the radiographic image capturing system 10D and the radiographic image capturing apparatus 20D according to the fourth embodiment (see FIGS. 28 through 45B), in that, similar to the case of the second embodiment (see FIGS. 20 through 22B), hinges 340 are provided respectively on side surfaces 54a-54c for connecting together the casings 34a-34c and the blocks 58a-58c, and together therewith, hinges 342 are provided respectively on side surfaces 56a-56c for connecting together the casings 34a-34c and the blocks 60a-60c.

Also, the fifth embodiment differs from the fourth embodiment, in that recesses 380b, 384b are formed respectively on the step portions 120b, 122b whereas projections 378b, 382b are formed respectively on the blocks 58b, 60b.

Owing thereto, when the step portions 122a of the casing 34a and the step portions 120b of the casing 34b are interfitted, the recess 374a and the projection 378b are fitted together, and the projection 376a and the recess 380b are fitted together. Therefore, the step portions 122a and the step portions 120b can be interfitted (connected) in a state of being positioned with high accuracy.

Further, when the step portions 122b of the casing 34b and the step portions 120c of the casing 34c are interfitted, the recess 384b and the projection 372c are fitted together, and the projection 382b and the recess 370c are fitted together. Therefore, the step portions 122b and the step portions 120c can be interfitted (connected) in a state of being positioned with high accuracy.

In the fifth embodiment, in comparison to the fourth embodiment, when the step portions 120a-120c, 122a-122c are interfitted, the distance between the connection terminals 124a-124c, 126a-126c becomes longer, so that connections by means of the connectors 32 is problematic. Thus, for example, as shown in FIG. 46, preferably the connection terminals 124a-124c, 126a-126c are optically joined by fitting optical connectors 302, 304 of optical fiber cables 300 into the connection terminals 124a-124c, 126a-126c.

Next, a radiographic image capturing system 10F and a radiographic image capturing apparatus 20F in relation to a sixth embodiment will be described with reference to FIGS. 46 and FIGS. 49 through 51.

The radiographic image capturing system 10F and the radiographic image capturing apparatus 20F according to the sixth embodiment differ from the radiographic image capturing system 10E and the radiographic image capturing apparatus 20E according to the fifth embodiment (see FIGS. 46 to 48B), in that, similar to the third embodiment (see FIGS. 23 though 25), each of the radiation detection units 30a-30c is constructed by connecting together block shaped controllers 196a-196c and block shaped panel portions 198a-198c via hinges (rotating mechanisms) 348. Accordingly, with the sixth embodiment, the panel portions 198a-198c function as casings (panel accommodating units), which accommodate radiation conversion panels 172a-172c therein. When constructed in this manner, in the sixth embodiment as well, the same effects as those of the third and fifth embodiments can be obtained.

Further, with the sixth embodiment, as shown in FIG. 51, the controllers 196a-196c may be arranged respectively on the panel portions 198a-198c. In this case, the controllers 196a-196c are fixed on the panel portions 198a-198c at locations where radiation 16 is not irradiated. In this case, although the controllers 196a-196c cannot be rotated by the hinges 348, application of radiation 16 with respect to the controllers 196a-196c can reliably be avoided.

Further, in the case of FIG. 51, the controllers 196a-196c are arranged on the panel portions 198a-198c, whereby the substantive thickness of the panel portions 198a-198c becomes larger. However, because a complex structure such as hinges 348 does not exist, an effect is obtained in that the structure of the apparatus overall can be simplified. Further, in the forgoing explanations, dependent on whether the surfaces are surfaces proximate to the step portions 120a-120c, 122a-122c, or alternatively, surfaces distanced from the step portions 120a-120c, 122a-122c, it is determined whether such surfaces are defined as front surfaces 36a-36c or rear surfaces 42a-42c.

The fourth through sixth embodiments are not limited by the foregoing definitions. In the case that the step portions 120a-120c, 122a-122c are formed on the side surfaces 54a-54c, 56a-56c, from among the two opposite surfaces that are joined to the side surfaces 50a-50c, 52a-52c, 54a-54c, 56a-56c, one of such surfaces may form the front surfaces 36a-36c, while the other of such surfaces may form the rear surfaces 42a-42c.

Figure 52:
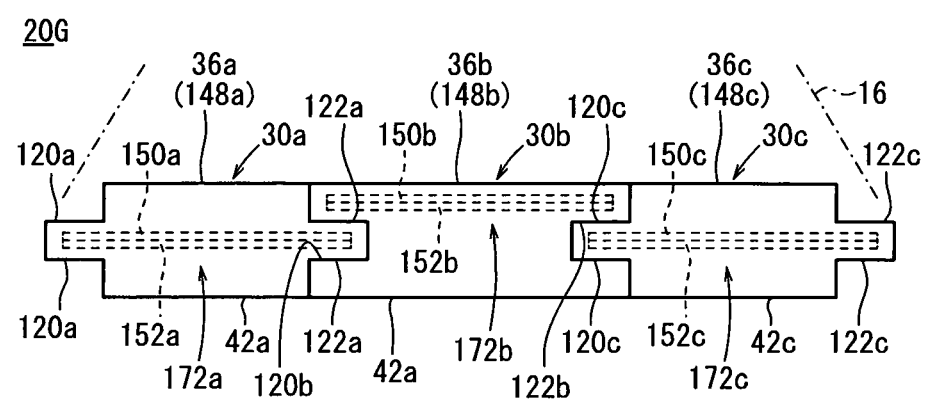
FIG. 52 is a side view showing schematically another radiographic image capturing apparatus.

Accordingly, as shown in FIG. 52, in the radiographic image capturing apparatus 20G, a structure can be provided in which, by providing projections that project in horizontal directions at intermediate portions of the side surfaces 54a, 54c, 56a, 56c of the radiation detection units 30a, 30c, step portions 120a, 120c, 122a, 122c are formed respectively on front surface 36a, 36c sides and rear surface 42a, 42c sides, whereas by providing grooves in which the projections can be fitted at intermediate portions of the side surfaces 54b, 56b of the radiation detection unit 30b, step portions 120b, 122b are formed.

In this case as well, by interfitting the projections and the grooves, since the step portions 122a and the step portions 120b, as well as the step portions 122b and the step portions 120c, are fitted together respectively, in the same manner as explained concerning the fourth through sixth embodiments, the thickness of the radiographic image capturing apparatus 20G can be made the same as the thickness of each of the radiation detection units 30a-30c without the occurrence of bumps or steps at the connected locations between the casings 34a-34c, together with maintaining the upper surface of the radiographic image capturing apparatus 20G in a substantially planar condition. Accordingly, each of the aforementioned effects, owing to the fact that bumps (or steps) do not occur at the connected locations, can easily be obtained.

The second aspect of the invention is not limited to the aforementioned embodiments, and it is a matter of course that various modified or additional structures could be adopted without deviating from the essence and gist of the second aspect of the invention.

For example, in at least the radiation conversion panels 172a, 172c (the radiation detectors 600 of FIG. 26), on sides thereof irradiated with radiation 16, the substrate 602 (see FIGS. 26 and 27) may be constituted from a flexible substrate made from plastic, and on the flexible substrate, a photoelectric conversion film 616 made up from an organic photoconductor, and TFTs 624 made up from an organic semiconductor material are formed respectively. In this case, because such plastic and organic materials absorb hardly any radiation 16, irrespective of whether it is an ISS type or a PSS type, doses of radiation 16 that reaches the radiation conversion panel 172b of the radiation detection unit 30b can increase as much as possible. Further, as noted previously, if such plastic and organic materials are used, because at least the radiation conversion panels 172a, 172c can be made thin in profile, bumps or steps at connected locations between the radiation detection units 30a-30c can be kept small.

To elaborate more with respect to the above-mentioned effects, with the fourth through sixth embodiments, in order to obtain a single elongate image that does not exhibit image loss at joined locations (connected locations) therein, electronic cassettes (radiation detection units 30a-30c) of two types are connected alternately, such that portions of the radiation conversion panels 172a-172c overlap each other, thereby forming a planar image capturing surface 156. As a result, there are concerns that the magnification (distance between the radiation source 264 and the radiation conversion panels 172a-172c) may differ due to generation of steps that occur between the radiation conversion panels 172a-172c, and/or the radiographic image density (i.e., the sensitivity of the radiation conversion panels 172a-172c) may differ due to insufficient sensitivity at portions on the radiation conversion panel 172b that overlap with the radiation conversion panels 172a, 172c and which are distanced with respect to the irradiation direction of the radiation 16. In this case, it is necessary for the image processor 288 to combine each of the radiographic images to thereby obtain a single elongate image, after having first carried out image correction processing responsive to the magnification and density.

In such a case, as noted earlier, by constructing the radiation conversion panels 172a, 172c using plastic and organic materials at least on sides thereof irradiated with radiation 16, steps between the radiation conversion panels 172a-172c and insufficient sensitivity of the radiation conversion panel 172b can be reduced, and thus the required amount of image correction processing can be lessened or made unnecessary altogether.

Further, in the case that at least one type of the radiation conversion panels (i.e., one of the types of the radiation conversion panels 172a, 172c, or the radiation conversion panel 172b) are constructed using plastic and organic materials, and if such panels are ISS type panels, in which the substrates 602, the TFTs 624, the photoelectric conversion films 616, and the scintillators 608 made of CsI are arranged in this order along the irradiation direction of the radiation 16, radiographic images of high quality and a single elongate image can easily be obtained. Of course, if all of the radiation conversion panels 172a-172c are constructed using plastic and organic materials, and if such panels are ISS type panels in which CsI scintillators 150a-150c are adopted, then radiographic images of high quality in each of the radiation conversion panels 172a-172c can be obtained.

Further, in the fourth through sixth embodiments, the two radiation conversion panels 172a, 172c need not be of the same type as the one radiation conversion panel 172b. Cases may also occur in which the panel types are mixed, for example, (1) a combination of thin panels using plastic and organic materials and panels of normal thickness, (2) a combination of panels using GOS scintillators and panels using CsI scintillators, or (3) a combination of ISS type panels and PSS type panels. Owing thereto, cases may be obtained in which, depending on the types of panels, the magnification (radiation source 264 to panel distance), or the density (panel sensitivity) of the radiographic images, may differ. In such cases, it is necessary to combine the radiographic images into a single elongate image, after an image correction process corresponding to the panel type has been carried out with respect to the radiographic images obtained by each of the radiation conversion panels 172a-172c.

Consequently, the connection order information generating unit 250 may transmit to the console 22 connection order information, which includes therein information concerning the types of radiation conversion panels 172a-172c (i.e., the materials of the scintillators 150a-150c, 608, the materials of the photoelectric conversion layers 152a-152c or the photoelectric conversion film 616, the materials of the TFTs 210a-210c, 624, the materials of the substrates 178a-178c, 602, and a type classification indicative of an ISS type or a PSS type). Owing thereto, the image processor 288 of the console 22, after carrying out image correction processing with respect to the radiographic images obtained from the radiation conversion panels 172a-172c, and based on the connection order information including information concerning the types of radiation conversion panels 172a-172c, can combine the three radiographic images after image correction processing has been performed, to thereby produce a single elongate image.

Further, in the case that the scintillator is made up from columnar crystal structured CsI(Tl), preferably such a scintillator is used as the scintillator 150b of the radiation conversion panel 172b. This is because, since radiation 16 having a spread of a degree consistent with the radiation source 264 is applied to the subject 14, at locations separated from the center axis of the radiation 16 (e.g., at locations of the radiation conversion panels 172a or the radiation conversion panels 172c), if a columnar crystal structured scintillator were used, the radiation 16 is incident thereto at an inclination with respect to such columnar portions, and as a result, within the scintillator, the incident radiation straddles between the columns to emit light, leading to a concern that crosstalk could be caused thereby.

Next, descriptions shall be presented below, with reference to FIGS. 53 through 73, of a radiographic image capturing apparatus and a radiographic image capturing system (seventh through twelfth embodiments) according to a third aspect of the invention.

First, a radiographic image capturing system 10H and a radiographic image capturing apparatus 20H shall be described with reference to FIGS. 53 through 67B.

Figure 53:
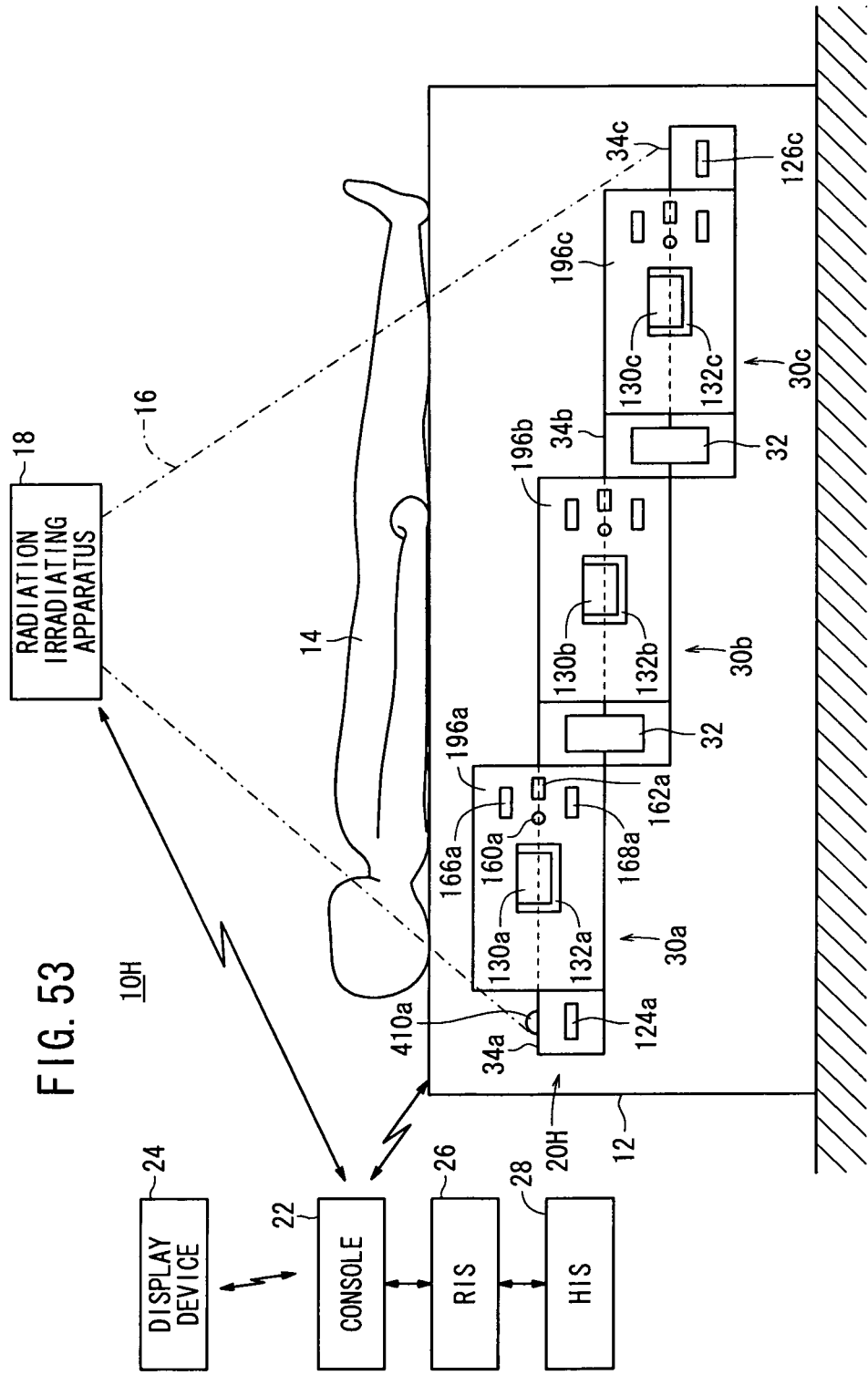
FIG. 53 is a schematic structural view of a radiographic image capturing system according to a seventh embodiment.

In the seventh embodiment, as shown in FIG. 53, the radiographic image capturing apparatus 20H includes three radiation detection units 30a-30c of one type and the same shape and two connectors (connecting means) 32, which are arranged in the interior of the image capturing base 12, the radiation detection units 30a-30c being electrically and mechanically connected by the connectors 32.

More specifically, the seventh embodiment differs from the first through sixth embodiments (see FIGS. 1 through 52), in that concerning the radiation detection units 30a-30c, which make up electronic cassettes of the same one type and the same shape, as shown in FIGS. 53 through 58B, by connection in a overlapping fashion a portion of the radiation detection unit 30a and a portion of the radiation detection unit 30b, and connecting in an overlapping fashion a portion of the radiation detection unit 30b and a portion of the radiation detection unit 30c, the radiation detection units are connected in a sequence of the first radiation detection unit 30a→the second radiation detection unit 30b→the third radiation detection unit 30c, and furthermore, a single radiographic image capturing apparatus 20H is constructed by electrically and mechanically connecting the radiation detection units by means of the two connectors 32.

Next, further detailed descriptions concerning each of the radiation detection units 30a-30c shall be presented.

In each of the radiation detection units 30a-30c, portions thereof in which the radiation conversion panels 172a-172c are arranged are constituted as panel portions 198a-198c. More specifically, in the seventh embodiment, the casings 34a-34c and interior portions of the casings 34a-34c together make up the panel portions 198a-198c.

In one side of each outer frame (i.e., in the one side proximate to each side surface 54a-54c) indicative of image capturing regions 40a-40c on front surfaces 36a-36c of the casing 34a-34c, a projection 410a-410c is formed.

With respect thereto, on rear surfaces 42a-42c opposite to the front surfaces 36a-36c, on sides proximate to the side surfaces 56a-56c thereof, and at locations inside of the image capturing regions 40a-40c as viewed in plan, recesses 412a-

Figure 55:
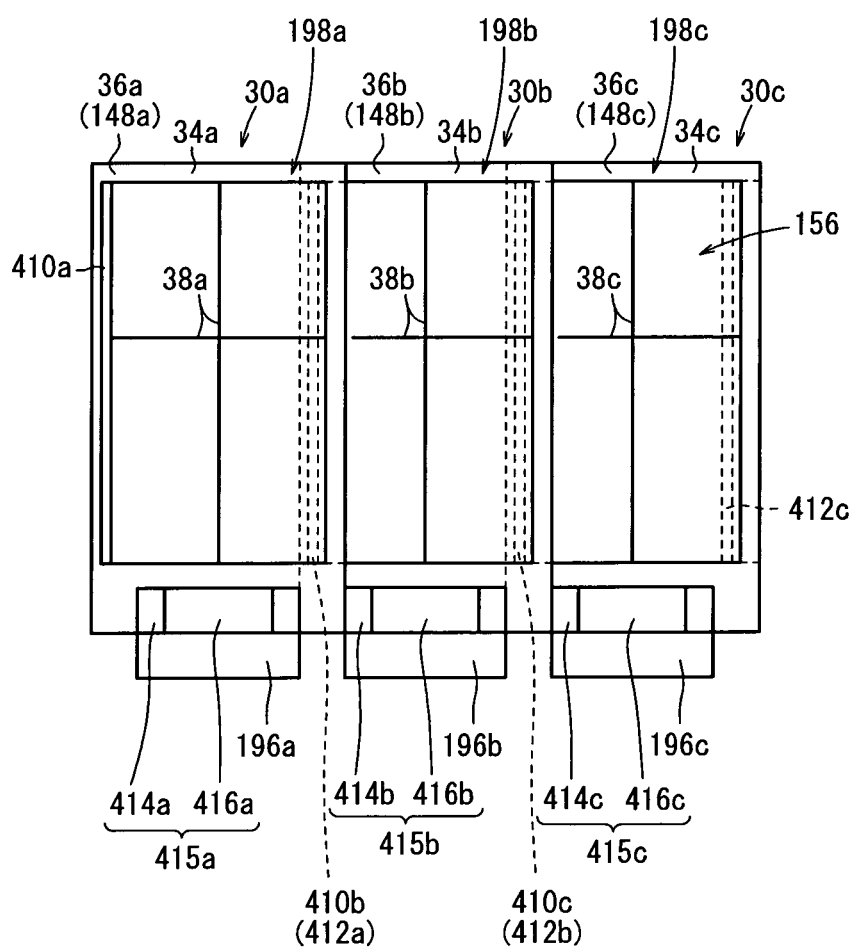
FIG. 55 is a plan view of the radiographic image capturing apparatus of FIG. 53.
Figure 58A:
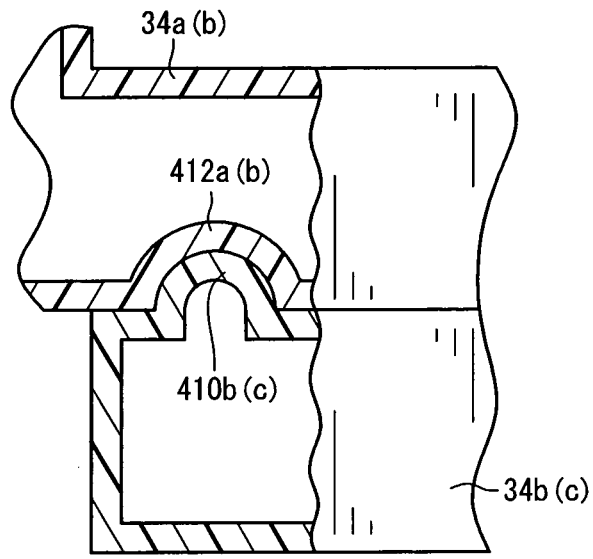
FIG. 58A is a cross sectional view showing a condition of a connection location between two radiation detection units.

412c, which are formed parallel to the projections 410a-410c and with which the projections 410a-410c are capable of being interfitted, are provided respectively (see FIGS. 55 and 58A).

In the seventh embodiment as well, guide lines and image capturing regions are not provided on the rear surfaces 42a-42c. Accordingly, the radiation detection units 30a-30c form electronic cassettes that are capable of converting radiation 16 into radiographic images, in which the front surfaces 36a-36c thereof define irradiated surfaces 148a-148c to which radiation 16 is applied, such that radiation 16 is applied from the exterior only with respect to such irradiated surfaces 148a-148c.

Figure 54:
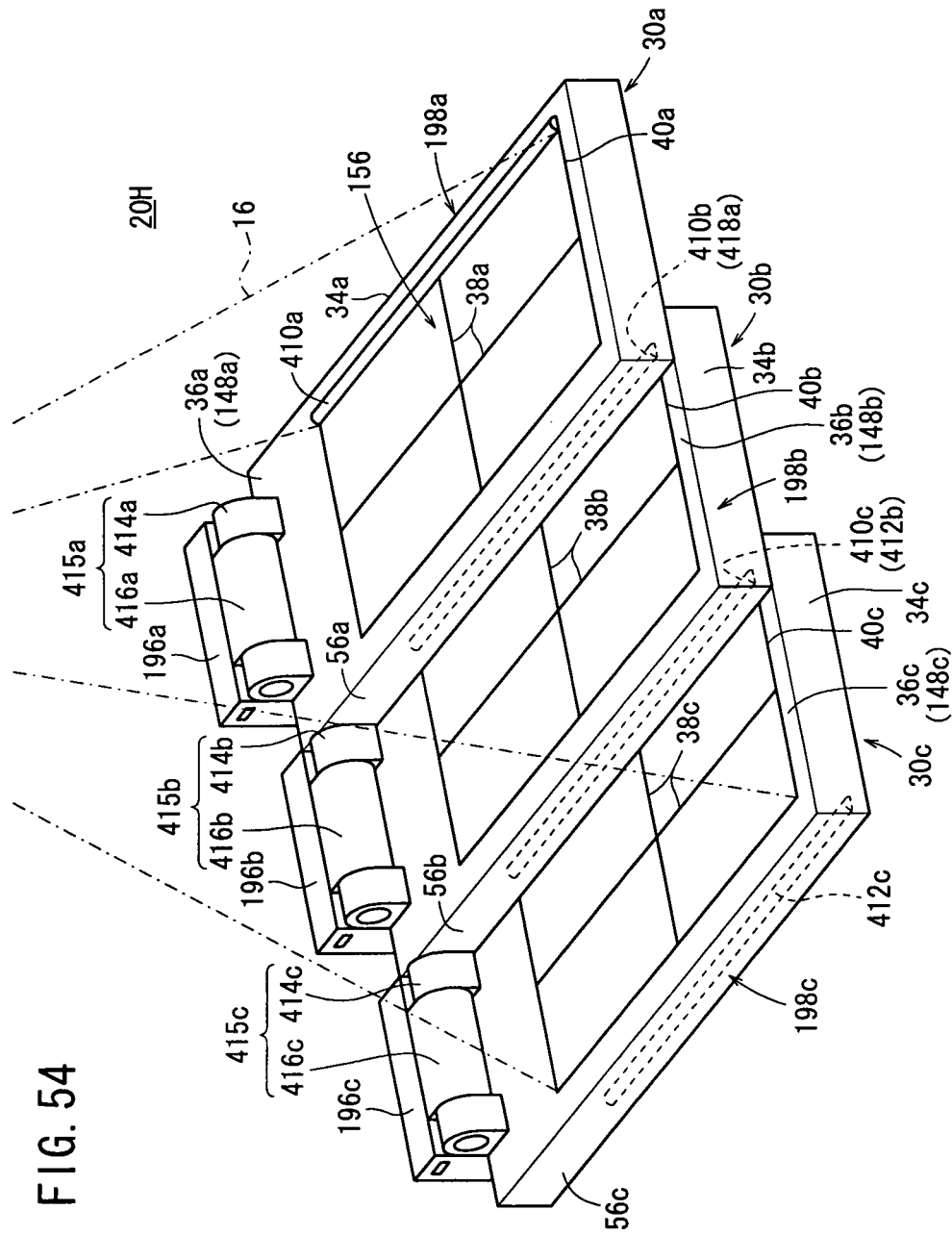
FIG. 54 is a perspective view of the radiographic image capturing apparatus of FIG. 53.
Figure 58B:
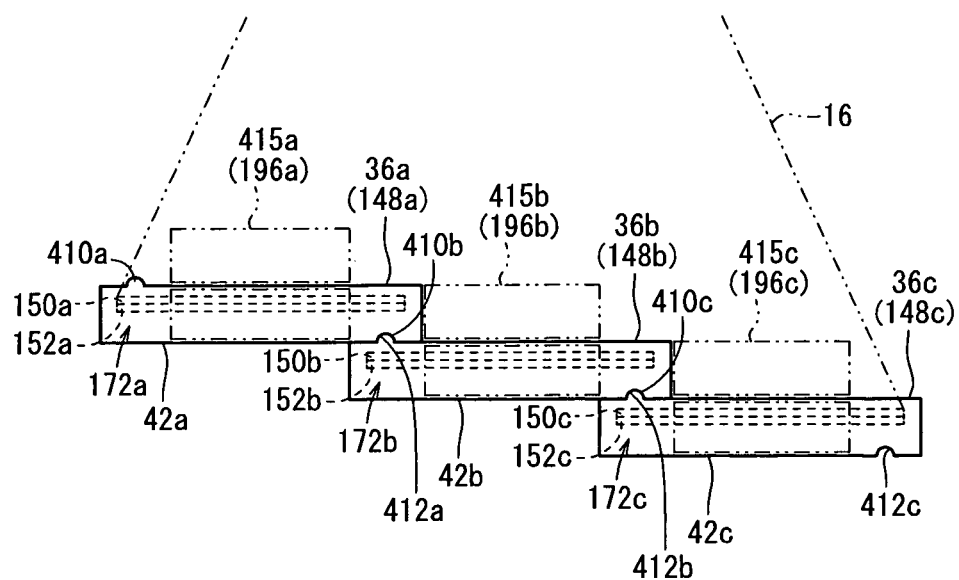
FIG. 58B is a side view showing schematically the radiographic image capturing apparatus of FIG. 53.

Further, as shown in FIGS. 54, 55 and 58B, when the radiation detection units 30a-30c are connected, portions of each of the guide lines 38a-38c are superimposed on each other, and together therewith, portions of the radiation conversion panels 172a-172c that are accommodated in the casings 34a-34c as well are superimposed on each other. On the other hand, at times of elongate image capturing, the controllers 196a-196c and (image capturing regions 40a-40c of) the panel portions 198a-198c are not superimposed.

Furthermore, in the casings 34a-34c, outer peripheries of the front surfaces 36a-36c and outer peripheries of the rear surfaces 42a-42c are connected respectively by the four side surfaces 50a-50c, 52a-52c, 54a-54c and 56a-56c.

Figure 56A:
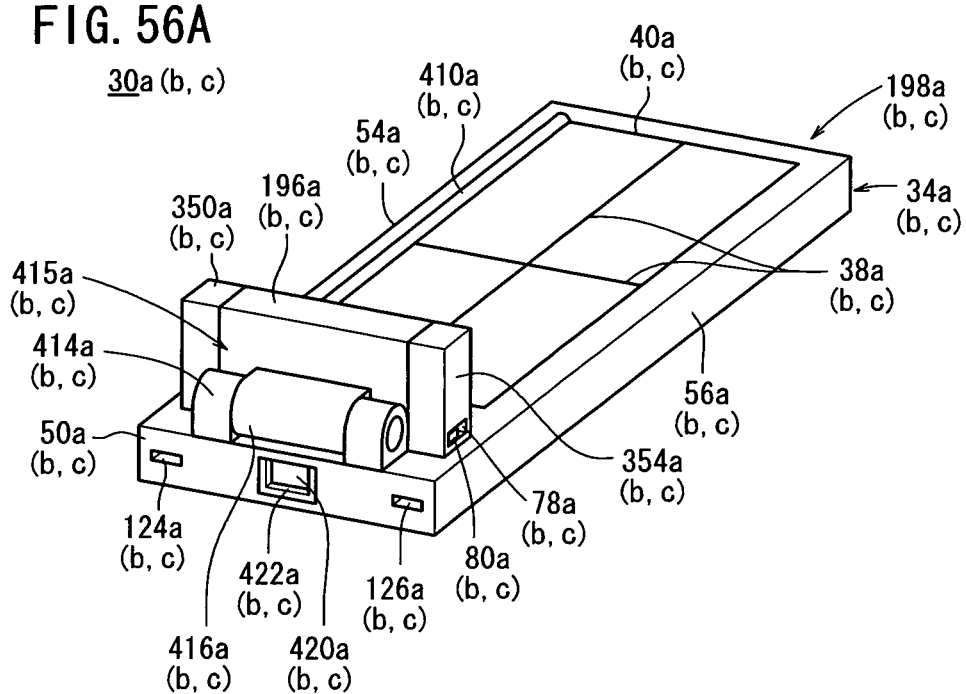
FIG. 56A and FIG. 56B are perspective views of a single radiation detection unit.

In center portions of the side surfaces 50a-50c, recesses 420a-420c are formed respectively, with handles 422a-422c being arranged within the recesses 420a-420c (see FIG. 56A). A doctor or radiological technician, by rotating the base edge sides of the handles 422a-422c, is capable of gripping the handles 422a-422c and transporting the radiation detection units 30a-30c.

Further, at locations on the side surfaces 50a-50c proximate to sides of the side surfaces 54a-54c, connection terminals 124a-124c in which connectors 32 can be fitted are arranged respectively, whereas at locations on the side surfaces 50a-50c proximate to sides of the side surfaces 56a-56c, connection terminals 126a-126c in which connectors 32 can be fitted are arranged respectively.

On sides of the front surfaces 36a-36c proximate to the side surfaces 50a-50c, hinges (rotating mechanisms) 415a-415c are disposed, such that through the hinges 415a-415c, block shaped controllers 196a-196c for controlling the radiation conversion panels 172a-172c are connected respectively to the panel portions 198a-198c (casings 34a-34c).

In this case, the hinges 415a-415c include two projections 414a-414c disposed respectively on the front surfaces 36a-36c, and shaft members 416a-416c that penetrate through the two projections 414a-414c. The controllers 196a-196c are axially supported by center portions of the shaft members 416a-416c between the two projections 414a-414c. Further, the entire length of each of the hinges 415a-415c is set to be shorter than the horizontal width (i.e., the width along the left-right direction of FIGS. 53-57B) of the image capturing regions 40a-40c. More specifically, as viewed from the side in FIGS. 53 and 58B, and as viewed in plan in FIG. 55, the length of each of the hinges 415a-415c when the respective casings 34a-34c are connected is set to be shorter than the width of each of the casings 34a-34c, and consequently, the hinges 415a-415c are disposed respectively between the projections 410a-410c and the recesses 412a-412c.

The horizontal width (span) of the controllers 196a-196c is set substantially the same length as the total length of the hinges 415a-415c. More specifically, as viewed from the side in FIGS. 53 and 58B, and as viewed in plan in FIG. 55, the width of the controllers 196a-196c, at a time of connection of each of the respective casings 34a-34c, similar to that of the hinges 415a-415c, is set to be shorter than the width of each of the casings 34a-34c. Accordingly, the controllers 196a-196c, as viewed from the side in FIG. 58B, are arranged respectively between the projections 410a-410c and the recesses 412a-412c.

Figure 56B:
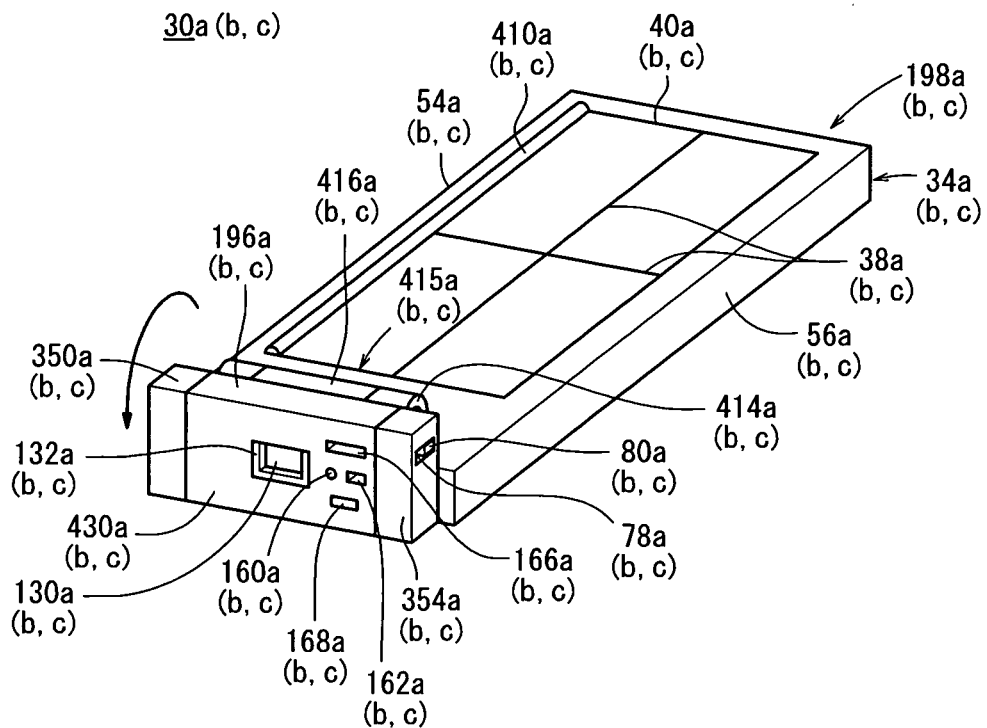

Further, the height of the controllers 196a-196c is set to a height that is substantially the same as the height from the rear surfaces 42a-42c of the casings 34a-34c to a position on the upper side of the shaft members 416a-416c, when the controllers 196a-196c are rotated about the shaft members 416a-416c from the position of FIG. 56A to the position of FIG. 56B.

Blocks 350a-350c are removably attached on sides of the controllers 196a-196c proximate to the side surfaces 54a-54c, while blocks 354a-354c are removably attached on sides of the controllers 196a-196c proximate to the side surfaces 56a-56c (see FIGS. 56A through 57A).

In this case, recesses 74a-74c are disposed respectively on the blocks 350a-350c, with manual operating elements 76a-76c being disposed in the recesses 74a-74c. Further, on sides of the blocks 350a-350c adjacent to the controllers 196a-196c, claw members 96a-96c connected to the manual operating elements 76a-76c are arranged respectively, penetrating through holes 98a-98c. At locations in the controllers 196a-196c confronting the holes 98a-98c, holes 100a-100c are formed with which the claw members 96a-96c are engageable.

On the other hand, recesses 78a-78c, which are arranged oppositely from the recesses 74a-74c, are disposed respectively on the blocks 354a-354c, with manual operating elements 80a-80c being disposed in the recesses 78a-78c. Further, on sides of the blocks 354a-354c adjacent to the controllers 196a-196c, similar to the claw members 96a-96c, claw members 108a-108c connected to the manual operating elements 80a-80c are arranged respectively, penetrating through holes 110a-110c. At locations in the controllers 196a-196c confronting the holes 110a-110c, holes 112a-112c are formed with which the claw members 108a-108c are engageable.

Further, in the controllers 196a-196c, on side surfaces thereof opposite to the side surfaces that are supported axially by the shaft members 416a-416c, respective recesses 130a-130c are formed at substantially central portions, with handles 132a-132c being arranged in the recesses 130a-130c. A doctor or radiological technician, by rotating the base edge sides of the handles 132a-132c, is capable of gripping the handles 132a-132c and thereby can easily rotate the controllers 196a-196c about the shaft members 416a-416c.

Furthermore, on the aforementioned side surfaces of the controllers 196a-196c, apart from the recesses 130a-130c and the handles 132a-132c, there are provided respectively input terminals 160a-160c, USB terminals 162a-162c, card slots 166a-166c, and electrical power switches 168a-168c.

In the event the three radiation detection units 30a-30c are to be connected to thereby construct a single radiographic image capturing apparatus 20H, a doctor or radiological technician performs the following assembly operations for the radiographic image capturing apparatus 20H.

First, as shown in FIG. 56A, in a state in which the controllers 196a-196c are arranged on the front surfaces 36a-36c of the casings 34a-34c, and together therewith, the blocks 350a-350c, 354a-354c are attached respective to the controllers 196a-196c, the doctor or radiological technician, while gripping the handles 132a-132c, rotates the controllers 196a-196c about the shaft members 416a-416c to the position shown in FIG. 56B. Owing thereto, as viewed in plan, the controllers 196a-196c are arranged on outer sides of the panel portions 198a-198c. Further, by rotating the controllers 196a-196c, a situation occurs in which the connection terminals 124a-124c, 126a-126c temporarily cannot be viewed from the exterior.

Figure 57A:
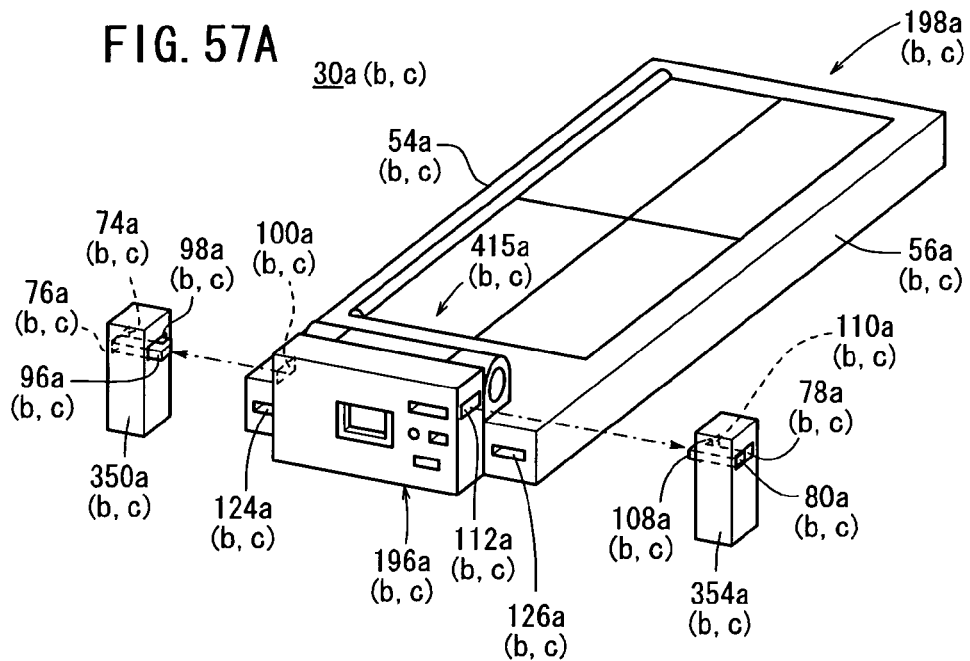
FIG. 57A is a perspective view showing a condition in which two blocks are separated from the radiation detection unit of FIGS. 56A and 56B.

Next, the doctor or radiological technician separates the blocks 350a-350c, 354a-354c respectively from the controllers 196a-196c (see FIG. 57A). As a result, the connection terminals 124a-124c, 126a-126c become exposed again to the exterior and can be viewed.

Figure 57B:
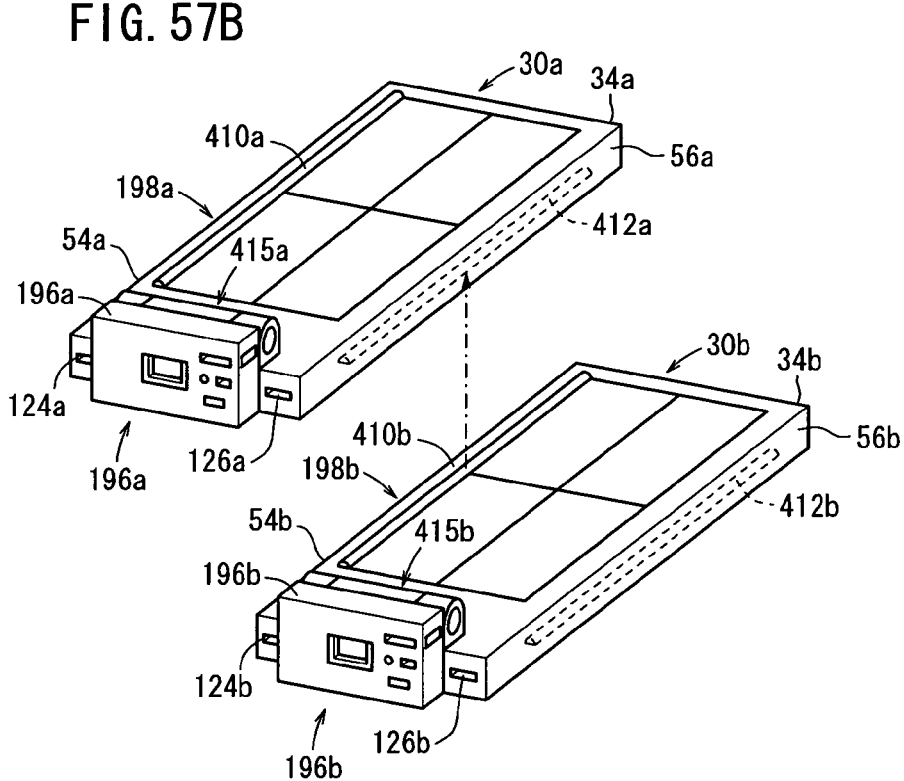
FIG. 57B is a perspective view showing a condition in two radiation detection units are connected together.

In this condition, the doctor or radiological technician fits together the recess 412a of the casing 34a and the projection 410b of the casing 34b, and also fits together the recess 412b of the casing 34b and the projection 410c of the casing 34c (see FIGS. 57B and 58A).

By interfitting of the recess 412a and the projection 410b, the casing 34a and the casing 34b are interconnected with a step occurring at the connection location. Also, by interfitting of the recess 412b and the projection 410c, the casing 34b and the casing 34c are interconnected with a step occurring at the connection location. At this time, the side surface 56a of the casing 34a that makes up the step portion between the casing 34a and the casing 34b is in contact with (abuts against) the side part of the hinge 415b, whereas the side surface 56b of the casing 34b that makes up the step portion between the casing 34b and the casing 34c is in contact with (abuts against) the side part of the hinge 415c (see FIGS. 54 and 58B).

As a result thereof, the rear surface 42a of the casing 34a and the front surface 36b of the casing 34b are fitted (connected) together reliably without gaps in a state of mutual positioning therebetween. Further, the rear surface 42b of the casing 34b and the front surface 36c of the casing 34c also are fitted (connected) together reliably without gaps in a state of mutual positioning therebetween.

Next, the doctor or radiological technician fits the substantially U-shaped connector 32 into the connection terminals 126a, 124b, and together therewith, fits the other connector 32 into the connection terminals 126b, 124c.

By being assembled in this manner, with the radiographic image capturing apparatus 20H, the radiation detection units 30a-30c are connected in a sequence of the radiation detection unit 30a→the radiation detection unit 30b→the radiation detection unit 30c from the left side to the right side as shown in FIGS. 53 and 55, and electronic cassettes of one type are connected, to thereby result, on the upper surface of the radiographic image capturing apparatus 20H, in a sequence (of first irradiated surfaces) of the front surface 36a→the front surface 36b→the front surface 36c.

Further, as noted earlier, the controllers 196a-196c are disposed on outer sides of the panel portions 198a-198c as viewed in plan by the hinges 415a-415c (see FIGS. 54 and 55), so that with the radiographic image capturing apparatus 20H, by superimposing and connecting portions of the radiation detection units 30a-30c, without the image capturing regions 40a-40c and the image capturing surface 156 overlapping with the controllers 196a-196c, a condition is made possible in which elongate image capturing can be carried out with respect to the subject 14.

Furthermore, in the case that radiation 16 is irradiated onto the upper surface of the radiographic image capturing apparatus 20H on which the subject 14 lies in a recumbent position (see FIGS. 53 and 54), the front surfaces 36a-36c make up irradiated surfaces 148a-148c to which radiation 16 is applied, and together therewith, an irradiated range of the radiation 16 (i.e., an irradiation field including the image capturing regions 40a-40c) is constituted as the image capturing surface (image capturing region) 156 of the radiographic image capturing apparatus 20H. Since, as stated above, the image capturing region 156 does not overlap with the controllers 196a-196c, the controllers 196a-196c are not irradiated with radiation 16, and as a result, deterioration of the controllers 196a-196c caused by such radiation 16 is prevented, and the controllers 196a-196c can be prevented from being reflected in the radiographic images.

As shown in FIG. 58B, in the interiors of the casings 34a-34c, radiation conversion panels 172a-172c having scintillators 150a-150c and photoelectric conversion layers 152a-152c, and which are capable of converting radiation 16 into radiographic images, are accommodated respectively.

The image capturing regions 40a-40c, as viewed in plan (see FIG. 59), roughly match with the scintillators 150a-150c (as well as the photoelectric conversion layers 152a-152c). Further, as noted earlier, projections 410a-410c are formed in the sides of the guide lines 38a-38c that make up the image capturing regions 40a-40c, whereas recesses 412a-412c are provided at locations inwardly of the image capturing regions 40a-40c as viewed in plan.

Owing thereto, when the recesses 412a and the projections 410b are interfitted, the casing 34a and the casing 34b are connected such that a portion on the radiation conversion panel 172a on the side of the radiation conversion panel 172b becomes superimposed (as viewed in plan) with a portion on the radiation conversion panel 172b on the side of the radiation conversion panel 172a. Further, when the recesses 412b and the projections 410c are interfitted, the casing 34b and the casing 34c are connected such that a portion on the radiation conversion panel 172b on the side of the radiation conversion panel 172c becomes superimposed (as viewed in plan) with a portion on the radiation conversion panel 172c on the side of the radiation conversion panel 172b.

Furthermore, in the case that the respective radiation detection units 30a-30c are used separately as single individual electronic cassettes, radiation 16 is irradiated respectively onto the image capturing regions 40a-40c. In contrast thereto, with the radiographic image capturing apparatus 20H, which is made up by connecting sequentially each of the radiation detection units 30a-30c, as stated earlier, radiation 16 is irradiated onto the image capturing surface 156 including all of the image capturing regions 40a-40c.

Figure 59:
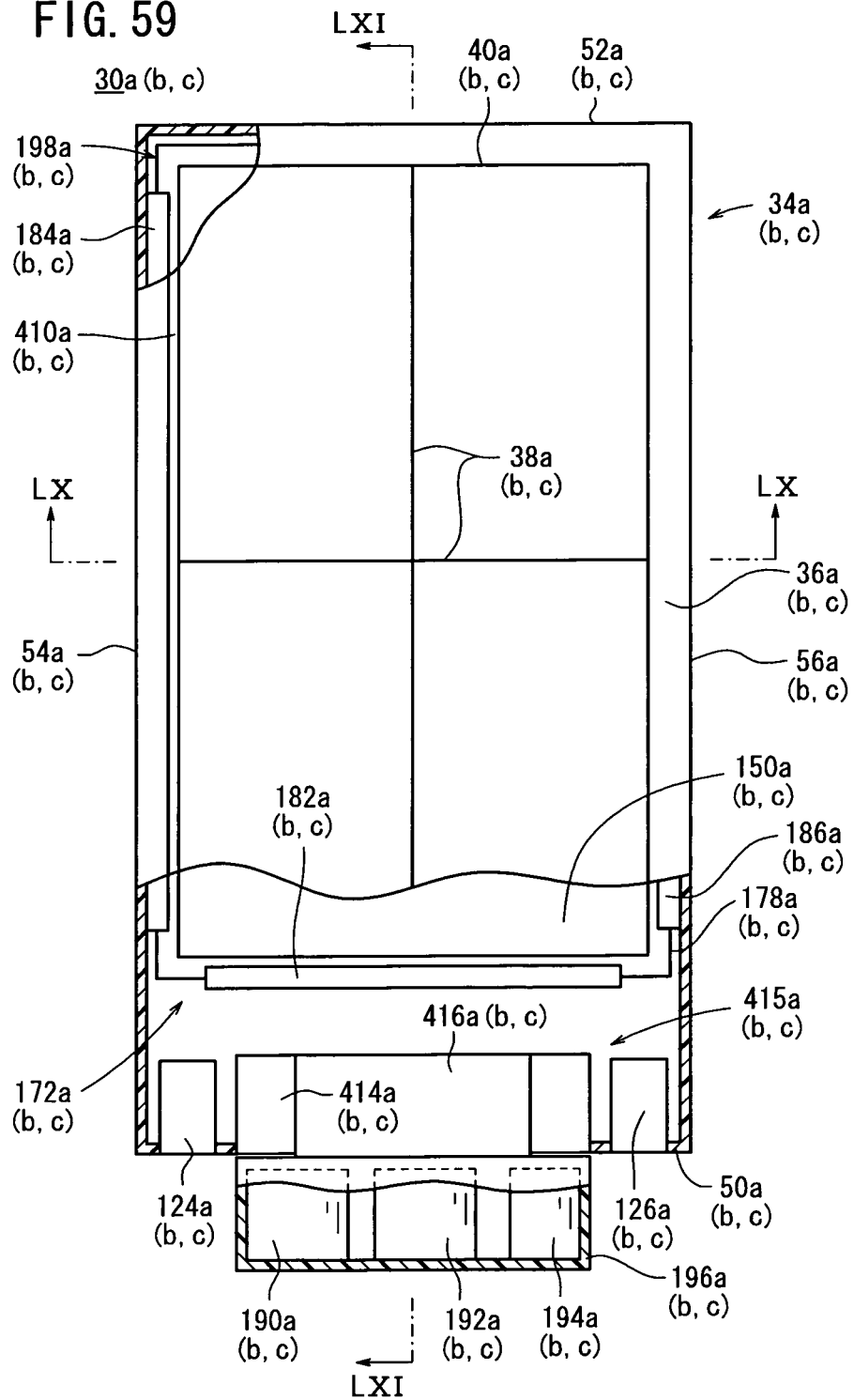
FIG. 59 is a plan view, partially broken away, of the radiation detection units of FIG. 53.
Figure 60:
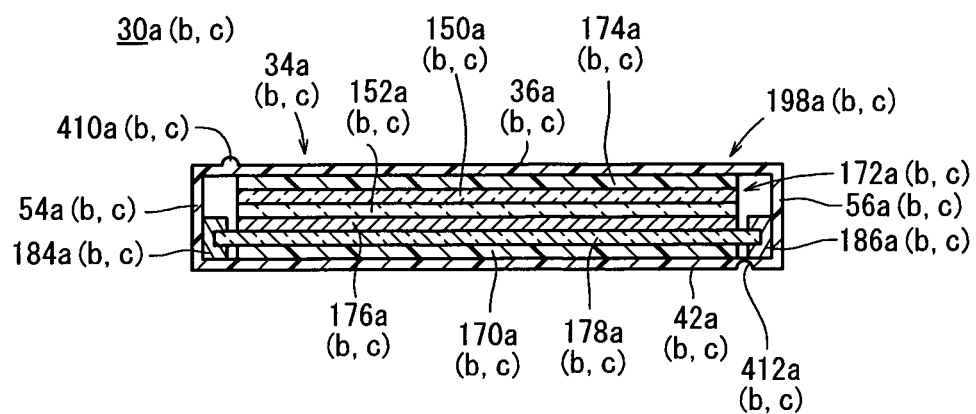
FIG. 60 is a cross sectional view taken along line LX-LX of FIG. 59.
Figure 61:
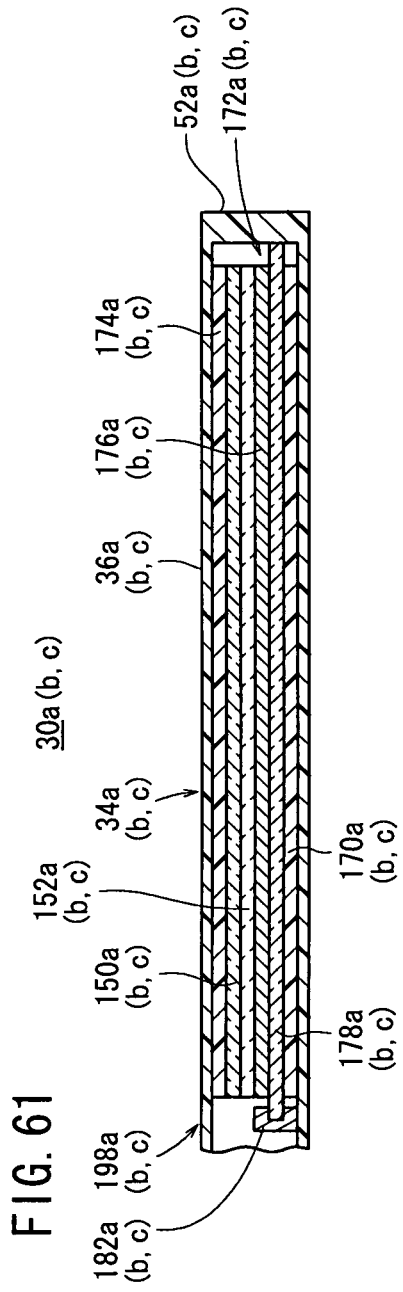
FIG. 61 is a cross sectional view taken along line LXI-LXI of FIG. 59.

As shown in FIGS. 59-61, in the interior of the controllers 196a-196c, there are disposed electrical power sources 190a-190c, cassette controllers 192a-192c, and communications devices 194a-194c. Transmission and reception of signals between the controllers 196a-196c and the panel portions 198a-198c (casings 34a-34c) is carried out, for example, via non-illustrated cables that penetrate through the projections 414a-414c and the shaft members 416a-416c.

On the other hand, in the interior of the casings 34a-34c that make up the panel portions 198a-198c, shock absorbing members 170a-170c, radiation conversion panels 172a-172c, and additional shock absorbing members 174a-174c are stacked in this order from the rear surfaces 42a-42c toward the front surfaces 36a-36c.

The shock absorbing members 170a-170c absorb (buffer) shocks that are caused by loads, when such loads are imparted to the casings 34a-34c from the exterior. The shock absorbing members 174a-174c, in the case that the radiation detection units 30a-30c are used separately, absorb (buffer) shocks that are caused by loads, when such loads are imparted to the front surfaces 36a-36c from the subject 14.

The radiation conversion panels 172a-172c are constituted by stacking optically transparent and radiation transmissive substrates 178a-178c comprising glass substrates or the like, optically transparent TFT layers 176a-176c on which transparent electrodes and the like are formed, the photoelectric conversion layers 152a-152c, and the scintillators 150a-150c, in this order from the shock absorbing members 170a-170c toward the shock absorbing members 174a-174c.

The scintillators 150a-150c first convert radiation 16, which has been irradiated from the front surfaces 36a-36c and through the shock absorbing members 174a-174c, into visible light.

The scintillators 150a, 150c are constituted, for example, from CsI or GOS. Further, in the case that elongate image capturing with respect to a subject 14 is carried out using the radiographic image capturing apparatus 20H, from within the elongate image capturing region (e.g., the entire body of the subject 14), scintillators 150a-150c of the radiation detection units used to capture images of a specified region of interest may be constituted from CsI, whereas scintillators 150a-150c of the other radiation detection units may be constituted from GOS.

Figure 62:
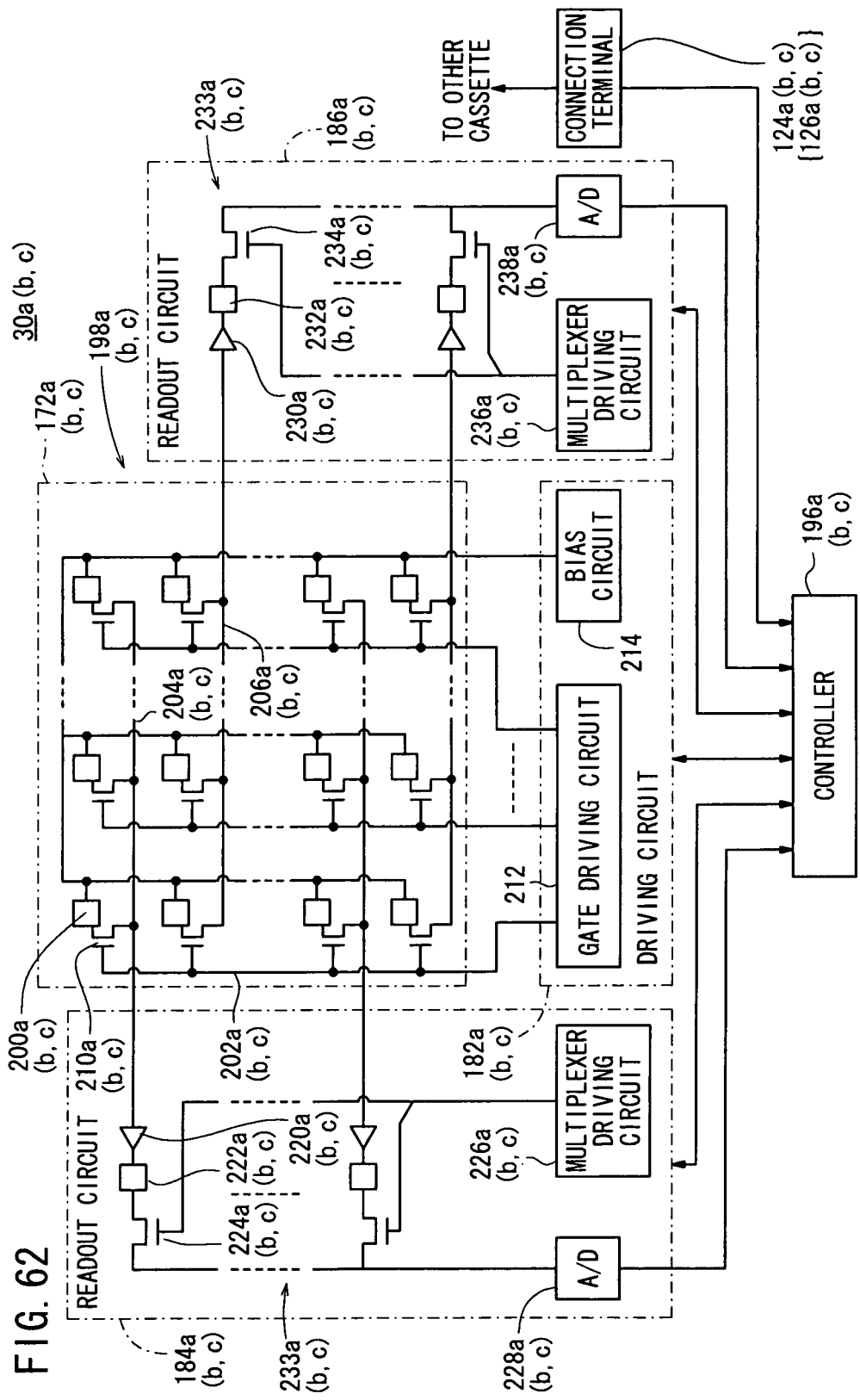
FIG. 62 is a block diagram of a panel accommodating unit.
Figure 63:
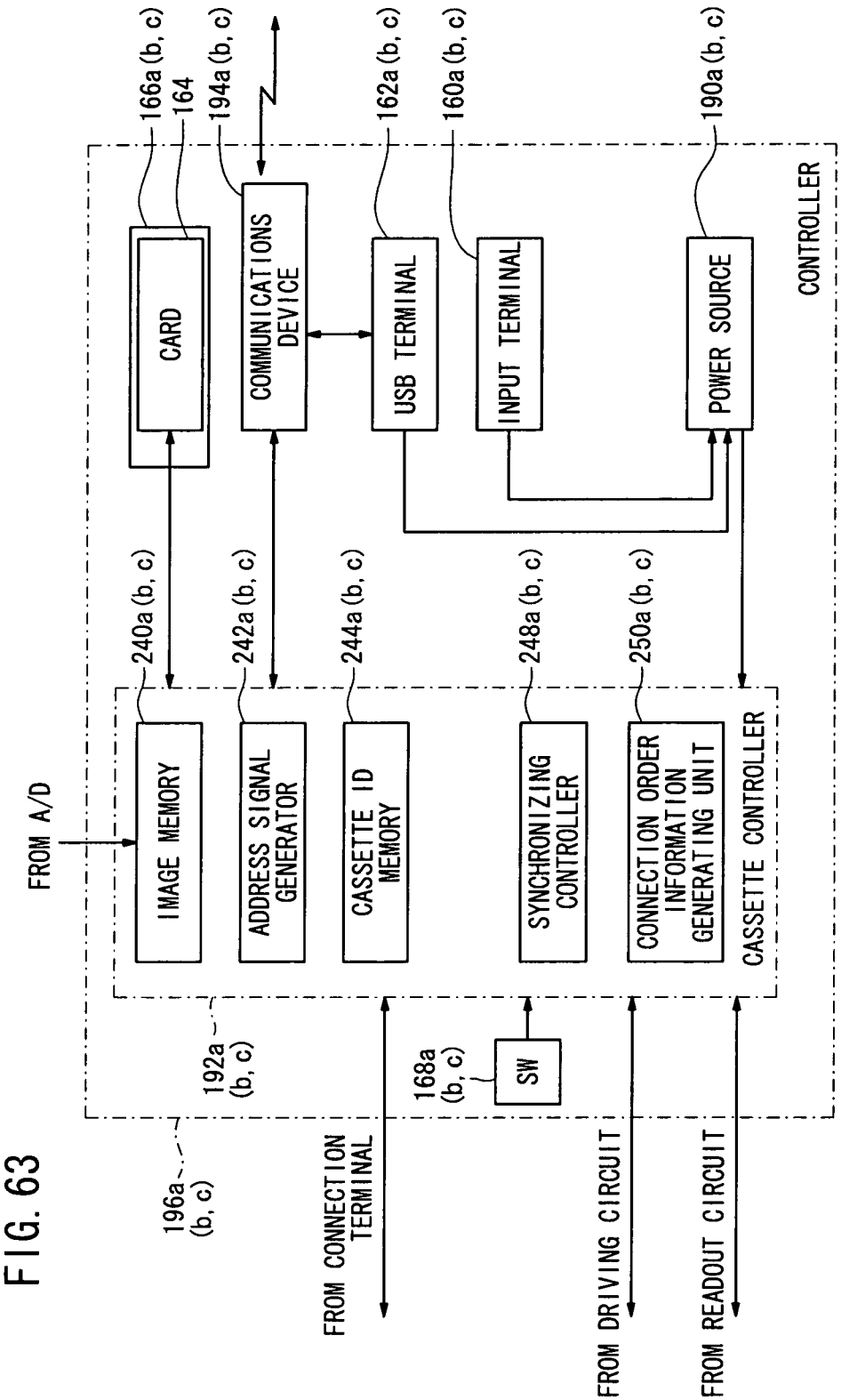
FIG. 63 is a block diagram of a controller.
Figure 64:
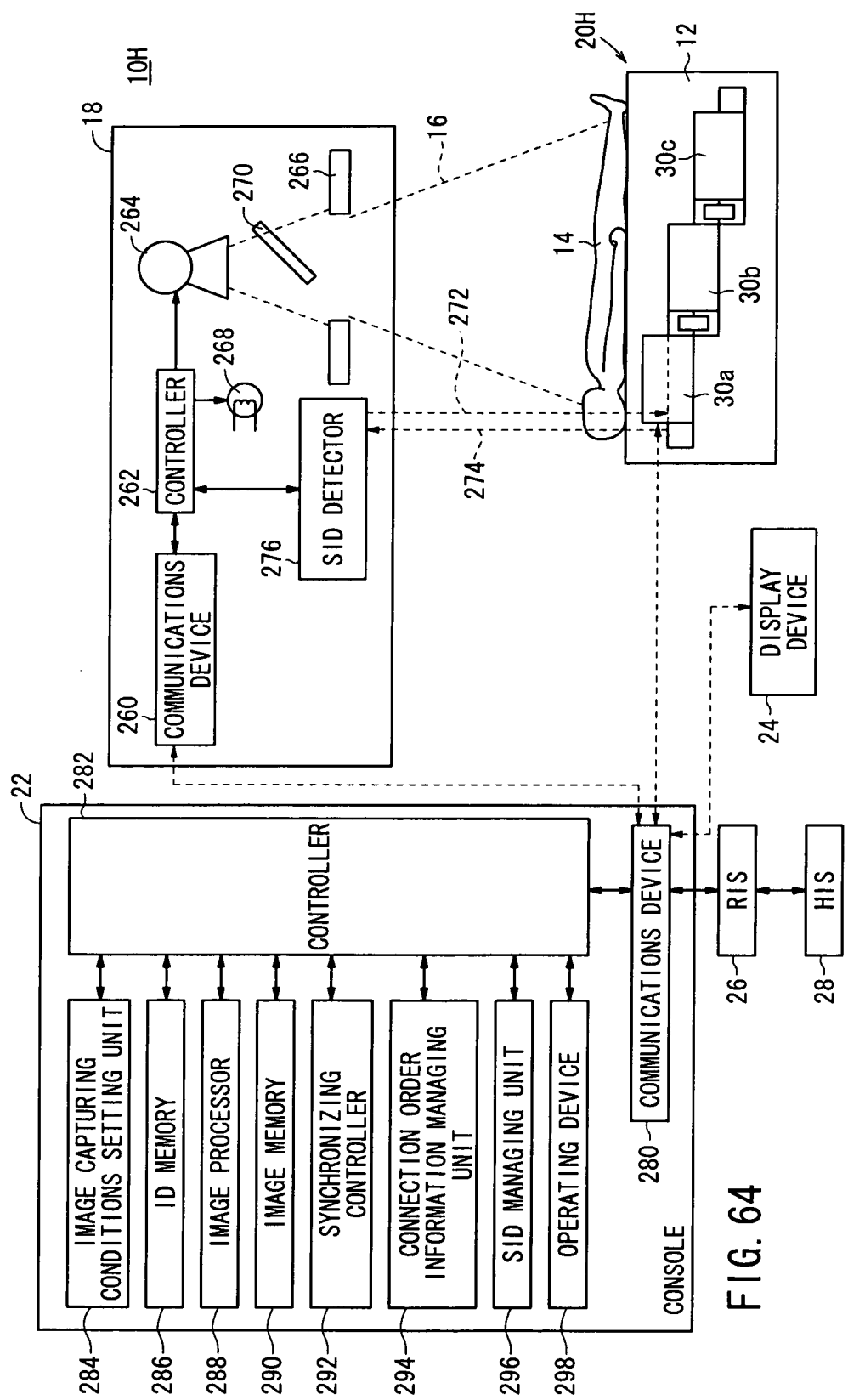
FIG. 64 is a block diagram showing details of the radiographic image capturing system of FIG. 53.

Further, as shown in FIGS. 62 and 63, the circuit structure and block diagram of the radiographic image capturing apparatus 20H is essentially the same as the radiographic image capturing apparatus 20D-20G (see FIGS. 40 and 41), except that the controllers 196a-196c are connected to other electronic cassettes (radiation detection units 30a-30c) via the connection terminals 124a-124c, 126a-126c and the connectors 32.

Further, as shown in FIGS. 53, 54 and 58B, with the radiographic image capturing apparatus 20H, portions of each of the radiation detection units 30a-30c are superimposed mutually and connected sequentially, so that between each of the radiation detection units 30a-30c, the heights thereof differ along the vertical direction. Consequently, in the aforementioned connection order information, together with the connection order, there may be included a sequence of the height in the vertical direction (for example, concerning the radiation detection unit 30a, information indicating that the connection order thereof is first, and that it is the highest in sequence).

Furthermore, with the radiographic image capturing apparatus 20H, the distances of each of the radiation conversion panels 172a-172c with respect to the radiation source 264 differ mutually from each other, and portions among the adjacent radiation conversion panels are mutually superimposed. As a result, if image combining is carried out simply by connecting together in sequence each of the radiographic images according to the connection order of the radiation detection units 30a-30c, there is a concern that the combined image obtained thereby will be an image exhibiting non-uniform image quality.

Consequently, the image processor 288 initially refers to the connection order information stored in the connection order information managing unit 294, and the cassette ID information stored in the ID memory 286, thereby grasping the connection order of the respective radiation detection units 30a-30c, and together therewith, referring to the SID managing unit 296, specifies the SID (source-to-image distance) between the radiation source 264 and each of the radiation conversion panels 172a-172c.

Next, the image processor 288, taking into consideration the differing attenuation of the radiation 16 corresponding to the SID, and after the image correction processing is carried out in view of the attenuation factor of radiation 16 with respect to each of the radiographic images, performs image combining in which the respective radiographic images are connected sequentially in accordance with the connection order information. As stated earlier, since portions among the adjacent radiation conversion panels are mutually superimposed, when the radiographic images are connected, portions of the images are superimposed on each other. However, by performing the aforementioned image correction processing beforehand, a combined image (i.e., an elongate image-captured image of the subject 14 produced by elongate image capturing), the image quality of which is uniformly equalized, can be obtained.

The elongate image-captured image obtained in this manner is stored in the image memory 290, together with each of the radiographic images that were used to perform image combining.

Further, operations of the radiographic image capturing system 10H according to the seventh embodiment, generally, are the same as those of the radiographic image capturing systems 10A to 10F according to the first through sixth embodiments (see FIGS. 1 through 52), with the exception that each of steps S2 and S8 (see FIGS. 15 and 16) are modified, as explained below.

More specifically, in sub-step S21 of step S2, concerning each of the radiation detection units 30a-30c, the doctor or radiological technician grasps the handles 132a-132c thereof, and while grasping, rotates the controllers 196a-196c about the shaft members 416a-416c, from the position shown in FIG. 56A until reaching the position shown in FIG. 56B. As a result, the controllers 196a-196c are arranged on outer sides of the panel portions 198a-198c.

Next, the doctor or radiological technician, with respect to the controllers 196a-196c after rotation thereof, displaces the manual operating elements 76a-76c to move the claw members 96a-96c, such that the condition of engagement between the claw members 96a-96c and the holes 100a-100c is released, and thereby separates the blocks 350a-350c from the controllers 196a-196c (see FIG. 57A). In the same manner, the doctor or radiological technician displaces the manual operating elements 80a-80c to move the claw members 108a-108c, such that the condition of engagement between the claw members 108a-108c and the holes 112a-112c is released, and thereby separates the blocks 354a-354c from the controllers 196a-196c.

In step S22, the doctor or radiological technician fits together the rear surface 42a of the casing 34a and the front surface 36b of the casing 34b such that the recess of the casing 34a and the projection 410b of the casing 34b are interfitted, and fits together the rear surface 42b of the casing 34b and the front surface 36c of the casing 34c such that the recess 412b of the casing 34b and the projection 410c of the casing 34c are interfitted (see FIGS. 57B and 58A). Owing thereto, the side surface 56a of the casing 34a and the side surface 54b side of the hinge 415b abut against each other, and also the side surface 56b of the casing 34b and the side surface 54c side of the hinge 415c abut against each other, so that the rear surface 42a of the casing 34a and the front surface 36b of the casing 34b are connected in a positioned state without gaps therebetween, and further, the rear surface 42b of the casing 34b and the front surface 36c of the casing 34c are connected in a positioned state without gaps therebetween.

Next, the doctor or radiological technician fits one connector 32 into the connection terminals 126a, 124b, and fits another connector 32 into the connection terminals 126b, 124c.

In this manner, after the respective radiation detection units 30a-30c have been connected sequentially, such that the recess 412a and the projection 410b, and the recess 412b and the projection 410c are interfitted respectively, and together therewith, the side surface 56a and the hinge 415b, and the side surface 56b and the hinge 415c abut against one another respectively, and by fitting the connectors 32 into engagement with the connection terminals 124b, 124c, 126a, 126b, a single radiographic image capturing apparatus 20H can be constructed in which the image capturing surface 156 is formed on the irradiated surfaces 148a-148c without causing the image capturing regions 40a-40c and the image capturing surface 156 to overlap with the controllers 196a-196c (see FIGS. 53 through 55 and FIG. 58B).

In step S23, the doctor or radiological technician places and accommodates the radiographic image capturing apparatus 20H in the image capturing base 12, and after the subject has been placed in a recumbent position on the image capturing base 12, the doctor or radiological technician turns on the electric power switches 168a-168c. As a result, supply of power from the electrical power sources 190a-190c (see FIGS. 59 and 63) with respect to each of the radiation detection units 30a-30c is initiated.

The process of step S24 is not performed.

Additionally, in step S25, the connection order information generating units 250a-250c specify adjacent radiation detection units by carrying out transmission and reception of cassette ID information stored in the cassette ID memories 244a-244c between the adjacent radiation detection units via the connectors 32. Owing thereto, the connection order of each of the radiation detection units 30a-30c that make up the radiographic image capturing apparatus 20H can be specified.

The processes of step S26 through step S28 are the same as those of steps S26 to S28 in the fourth embodiment, and therefore explanations of such processes shall be omitted herein.

In step S8, the subject 14 is released from the image capturing base and the doctor or radiological technician turns OFF the power switches 168a-168c of the radiation detection units 30a-30c (see FIGS. 53, 56B and 63), and after the supply of power to each of the radiation detection units 30a-30c from the electrical power sources 190a-190c is halted, the radiographic image capturing apparatus 20H is taken out from the image capturing base 12, and the connectors 32 are removed from the connection terminals 124b, 124c, 126a, 126b, thereby separating and releasing the connected state of the respective radiation detection units 30a-30c. Thereafter, the doctor or radiological technician reattaches the blocks 350a-350c, 354a-354c respectively with respect to the controllers 196a-196c, and next, while grasping the handles 132a-132c, rotates the controllers 196a-196c about the shaft members 416a-416c from the position shown in FIG. 56B until reaching the position of FIG. 56A.

As described above, in accordance with the radiographic image capturing system 10H and the radiographic image capturing apparatus 20H according to the seventh embodiment, a plurality of casings 34a-34c are connected sequentially such that portions of the respective radiation conversion panels 172a-172c overlap each other, whereas the respective controllers 196a-196c do not overlap with each other. More specifically, even if portions of the image capturing regions 40a-40c overlap one another, the controllers 196a-196c, which do not contribute to detection of radiation 16 (i.e., conversion into radiographic images), do not overlap with the image capturing regions 40a-40c (image capturing surface 156) of the respective radiation detection units 30a-30c. Thus, the controllers 196a-196c are not superimposed on the image capturing regions 40a-40c, and also it is possible to carry out elongate image capturing while preventing deterioration to the controllers 196a-196c caused by irradiation with radiation 16, and to prevent the presence of the controllers 196a-196c from being reflected in the radiographic images. Further, because a single radiographic image capturing apparatus 20H is constituted by connecting each of the casings 34a-34c using the projections 410a-410c and the recesses 412a-412c, elongate image capturing can be carried out by applying radiation 16 at one time with respect to the subject 14, so that shortening of the image capturing time can be realized.

Further, with the seventh embodiment, for example, in the case that one casing and another casing are connected through the projections 410a-410c and the recesses 412a-412c, if the one casing and the other casing are connected together such that a portion on the radiation conversion panel accommodated in the one casing proximate to the side of the other casing overlaps with a portion on the radiation conversion panel accommodated in the other casing proximate to the side of the one casing, and such that each of the controllers 196a-196c do not overlap, when a single elongate radiographic image of the subject 14 is obtained by combining each of the radiographic images obtained respectively by each of the radiation conversion panels 172a-172c, image gaps at the connected locations between each of the radiographic images can be prevented.

Further, when the respective casings 34a-34c are interconnected, if the horizontal width (span) of the controllers 196a-196c is set to be shorter than the horizontal width of each of the casings 34a-34c, as viewed in plan or from the sides thereof, the respective casings 34a-34c can be connected together assuredly.

The aforementioned respective radiation detection units 30a-30c form electronic cassettes in which carrying out of ordinary image capturing is made possible respectively and even independently, and with the seventh embodiment as well, the above-described effects are obtained by interconnecting a plurality of electronic cassettes of this type by means of the projections 410a-410c and the recesses 412a-412c.

Further, because the projections 410a-410c are provided on front surfaces that serve as irradiated surfaces 148a-148c of the casings 34a-34c, whereas the recesses 412a-412c are provided on rear surfaces 42a-42c thereof, and the respective casings 34a-34c are connected together by interfitting the projections 410a-410c and the recesses 412a-412c, when the respective radiographic images are image-combined and a single elongate image is obtained, image gaps occurring at locations where the respective radiographic images are joined can reliably be prevented, and the respective casings 34a-34c can reliably and easily be connected together.

As a result of providing the projections 410a-410c on the front surfaces 36a-36c, while also providing the recesses 412a-412c on the rear surfaces 42a-42c thereof, backlash or slippage of the casings 34a-34c, in the case of independent usage of the respective radiation detection units 30a-30c, can be prevented.

Furthermore, each of the radiation detection units 30a-30c includes, respectively, the rotatable hinges 415a-415c by which the controllers 196a-196a are rotatable with respect to the casings 34a-34c, wherein by rotating the respective controllers 196a-196c with respect to the casings 34a-34c through the hinges 415a-415c, when irradiated with radiation 16, the controllers 196a-196c are arranged respectively so as not to overlap with the casings 34a-34c. Owing thereto, overlapping between the respective controllers 196a-196c and the respective image capturing regions 40a-40c (image capturing surface 156) can reliably be prevented.

In this case, on each of the controllers 196a-196c, blocks 350a-350c, 354a-354c are disposed which are removable from the controllers 196a-196c, so that by removing the blocks 350a-350c, 354a-354c respectively from the controllers 196a-196c, interfitting of the projections 410a-410c and the recesses 412a-412c is made possible (allowed), and therefore the connections between the casings 34a-34c can be performed efficiently.

In the foregoing explanations, a case has been described in which the radiographic image capturing apparatus 20H is accommodated in the image capturing base 12. However, assuming that the casings are thin walled and have a thickness of a degree enabling them to be flexible, it is possible to arranged the radiographic image capturing apparatus 20H directly between the subject 14 and the image capturing base 12. In this case, because bumps (steps) between the aforementioned casings 34a-34c are small, any sense of discomfort to the subject 14 during the image-capturing can be alleviated.

Further, in the foregoing explanations, a case has been described in which a single radiographic image capturing apparatus 20H is constituted by connecting sequentially three radiation detection units 30a-30c such that they are connected in a sequence of the front surface 36a→the front surface 36b→the front surface 36c. However, the seventh embodiment is not limited by this description, and any plural number of radiation detection units may be connected together sequentially.

The radiographic image capturing system 10H and the radiographic image capturing apparatus 20H according to the seventh embodiment is not limited by the foregoing descriptions, and the embodiments shown in FIGS. 65A-67B also can be realized.

Figure 65A:
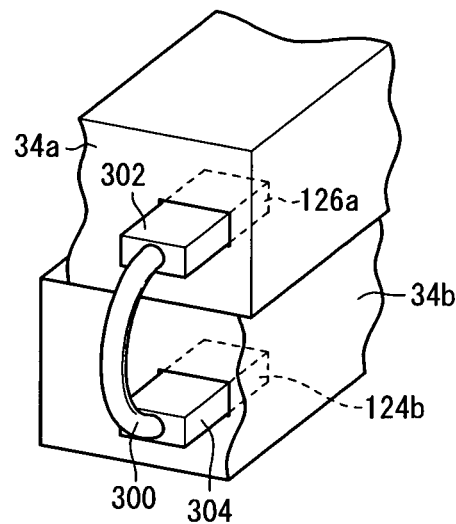
FIG. 65A and FIG. 65B are explanatory drawings showing other types of connections between respective radiation detection units.
Figure 65B:
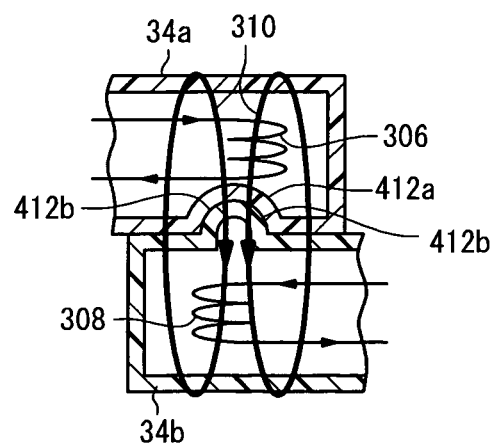

FIG. 65A, similar to FIG. 42A, illustrates a case in which the connection terminals 126a, 124b are optically connected by optical fiber cables 300. Further, similar to FIG. 42B, FIG. 65B illustrates a case in which, by means of a magnetic flux 310, which is generated by electric currents that flow through the coils 306, 308, transmission and reception of signals is carried out through a magnetic coupling between the coils 306, 308. In the case of FIGS. 65A and 65B as well, the same effects achieved respectively in the embodiments of FIGS. 17A, 17B, 42A and 42B can be obtained.

Figure 66:
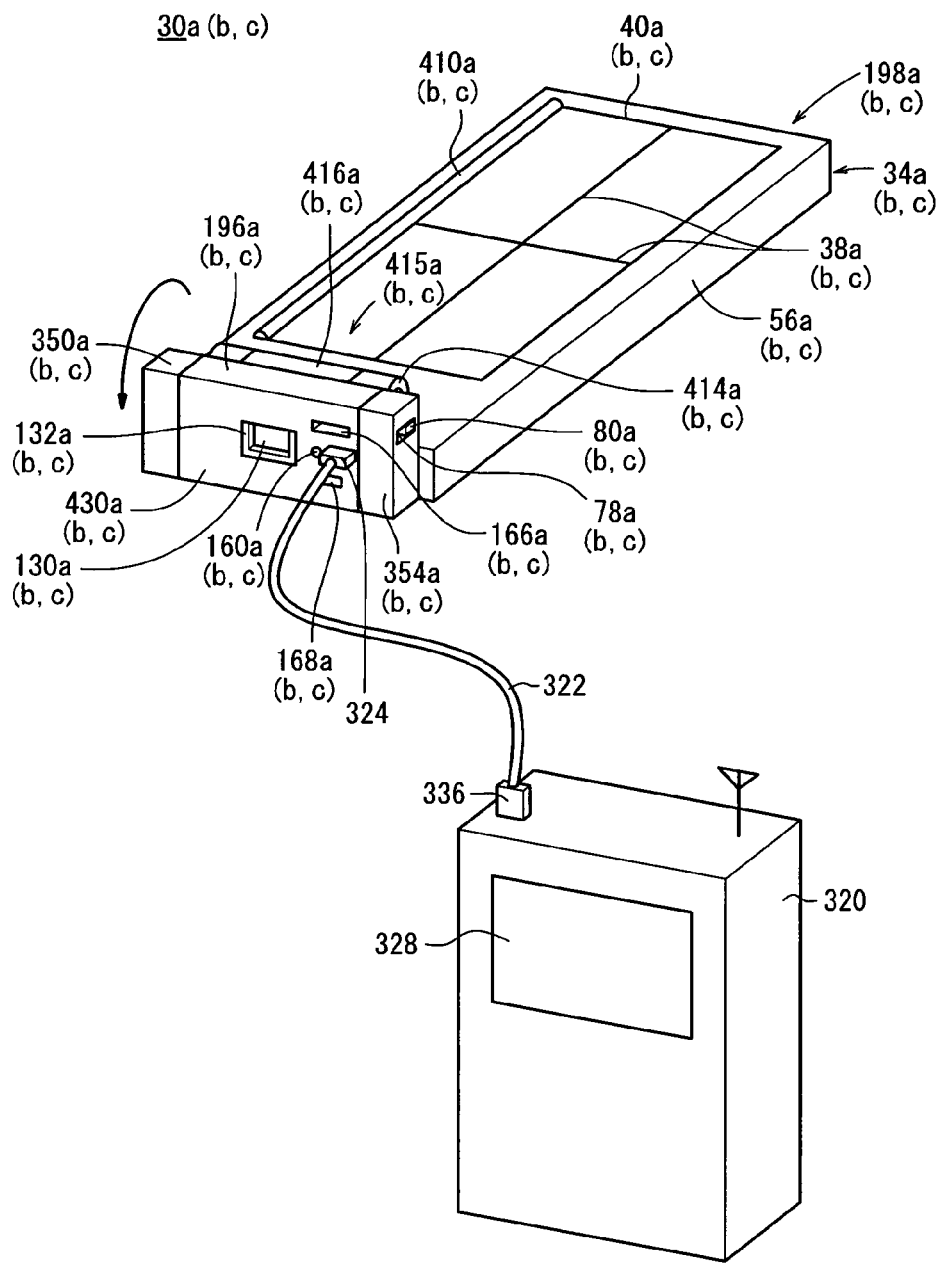
FIG. 66 is a perspective view showing a condition in which charging is carried out with respect to the radiation detection unit of FIG. 53.

FIG. 66 is a perspective view showing a charging process for charging the electrical power sources 190a-190c (see FIG. 59) through a cradle 320. When a USB cable 322 having respective connectors 324, 326 is connected electrically between the cradle 320 and the radiation detection units 30a-30c, the same effects as in FIG. 18 can be obtained.

Figure 67A:
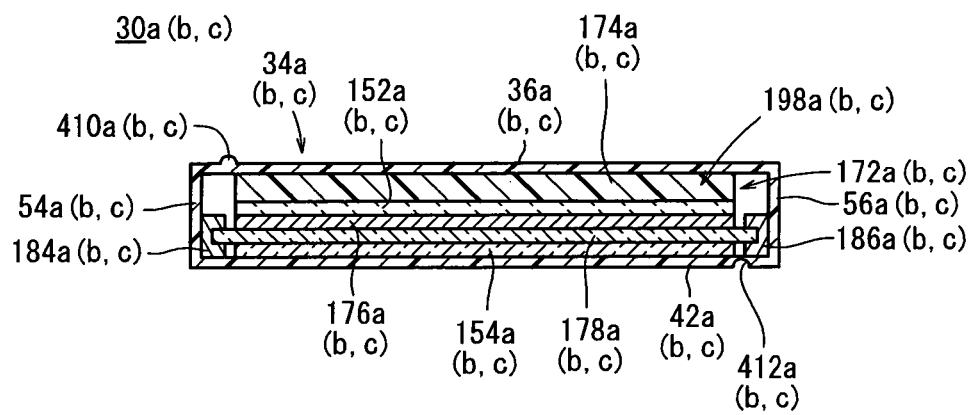
FIG. 67A is a cross sectional view showing a condition in which a single scintillator is accommodated in a casing.

Further, in the above descriptions, a structure is provided in which individual scintillators 150a-150c are arranged, as shown in FIGS. 58B, 60 and 61. However, in place of such a structure, as shown in FIG. 67A, similar to the case of FIGS. 44A and 44B, another single scintillator 154a-154c may be arranged inside the casings 34a-34c. In this case, the scintillators 154a-154c are capable of first converting radiation 16, which is irradiated from the front surfaces 36a-36c and via the shock absorbing members 174a-174c, the photoelectric conversion layers 152a-152c, the TFT layers 176a-176c and the substrates 178a-178c, into visible light, and therefore the same effects as in the case of FIGS. 44A and 44B can be obtained.

Figure 67B:
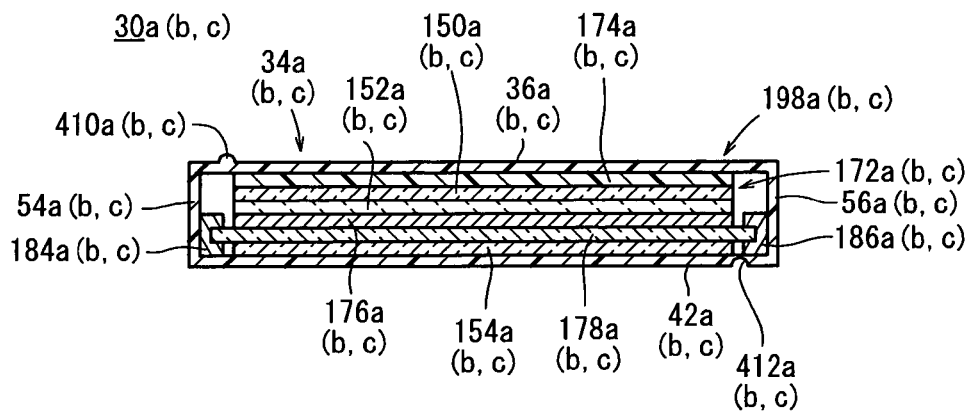
FIG. 67B is a cross sectional view showing a condition in which two scintillators are accommodated in a casing.

Further, as shown in FIG. 67B, similar to the case of FIGS. 45A and 45B, a structure may be provided in which the photoelectric conversion layers 152a-152c are sandwiched between two scintillators 150a-150c, 154a-154c. In this case, because radiation is converted into visible light by each of the scintillators 150a-150c, 154a-154c, the same effects as in the case of FIGS. 45A and 45B can be obtained.

Figure 68:
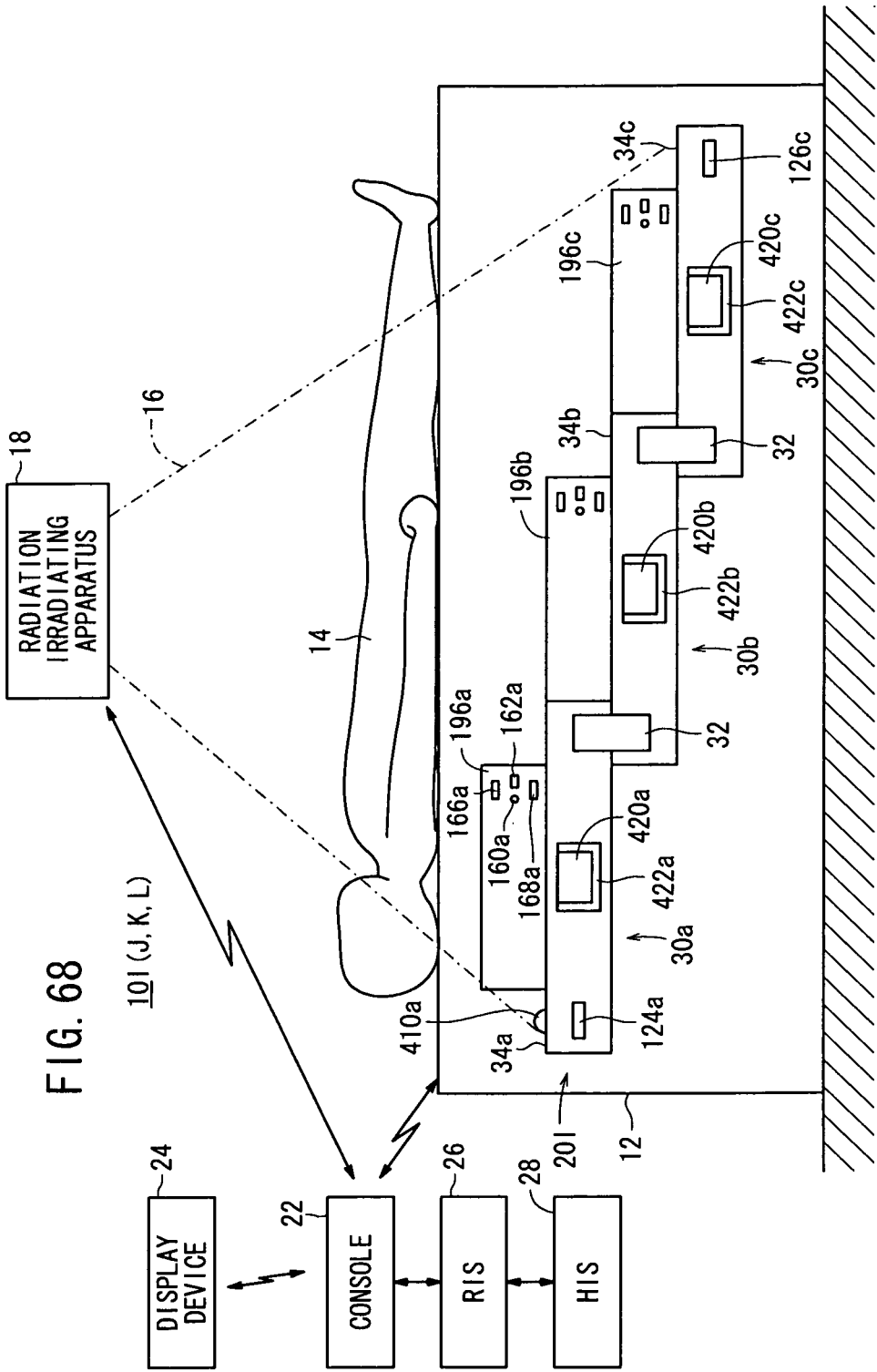
FIG. 68 is a schematic structural view of a radiographic image capturing system according to an eighth embodiment.
Figure 69:
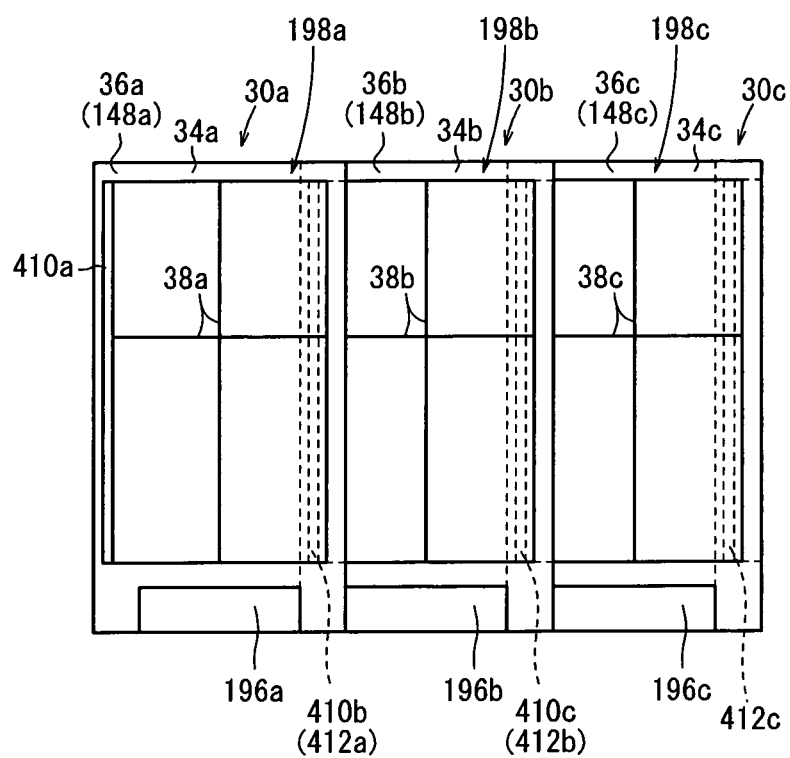
FIG. 69 is a plan view of the radiographic image capturing apparatus of FIG. 68.

Next, with reference to FIGS. 68 and 69, explanations shall be made concerning a radiographic image capturing system 10I and a radiographic image capturing apparatus 20I according to an eighth embodiment.

As shown in FIGS. 68 and 69, the radiographic image capturing system 10I and the radiographic image capturing apparatus 20I according to the eighth embodiment differ from the radiographic image capturing system 10H and the radiographic image capturing apparatus 20H according to the seventh embodiment (see FIGS. 53 through 67B), in that, in the radiographic image capturing apparatus 20I, the controllers 196a-196c are arranged respectively at locations on sides of the side surfaces 50a-50c, and at regions outside of the image capturing regions 40a-40c on the front surfaces 36a-36c.

Accordingly, in the radiation detection units 30a-30c, the hinges 415a-415c are not provided, and the controllers 196a-196c simply are fixed on side surfaces 50a-50c of the front surfaces 36a-36c. Further, the blocks 350a-350c, 354a-354c are not provided on the controllers 196a-196c.

In this case, when the recesses 412a and the projections 410b, and also the recesses 412b and the projections 410c, are interfitted respectively, the side surface 56a and the controller 196b abut against each other, and together therewith, the side surface 56b and the controller 196c abut against each other. Therefore, the rear surface 42a of the casing 34a and the front surface 36b of the casing 34b, and the rear surface 42b of the casing 34b and the front surface 36c of the casing 34c, are connected together respectively in a positioned state without gaps therebetween.

In this case, merely by interfitting respectively the recess 412a and the projection 410b, and the recess 412b and the projection 410c, the respective casings 34a-34c can be connected together highly precisely. Further, in this case as well, because the controllers 196a-196c are not superimposed on the image capturing surface 156 (image capturing regions 40a-40c), elongate image capturing can be carried out while preventing deterioration to the controllers 196a-196c due to exposure to radiation 16, and also preventing the presence of the controllers 196a-196c from being reflected in the radiographic images.

Further, with the eighth embodiment, because the controllers 196a-196c are not rotated through hinges 415a-415c as in the seventh embodiment, the controllers 196a-196c are disposed on the panel portions 198a-198c, so that the thickness of the panel portions 198a-198c becomes substantially larger. However, with the eighth embodiment, because a complex structure including hinges 415a-415c does not exist, an effect is achieved in that the structure of the apparatus overall can be simplified.

Figure 70:
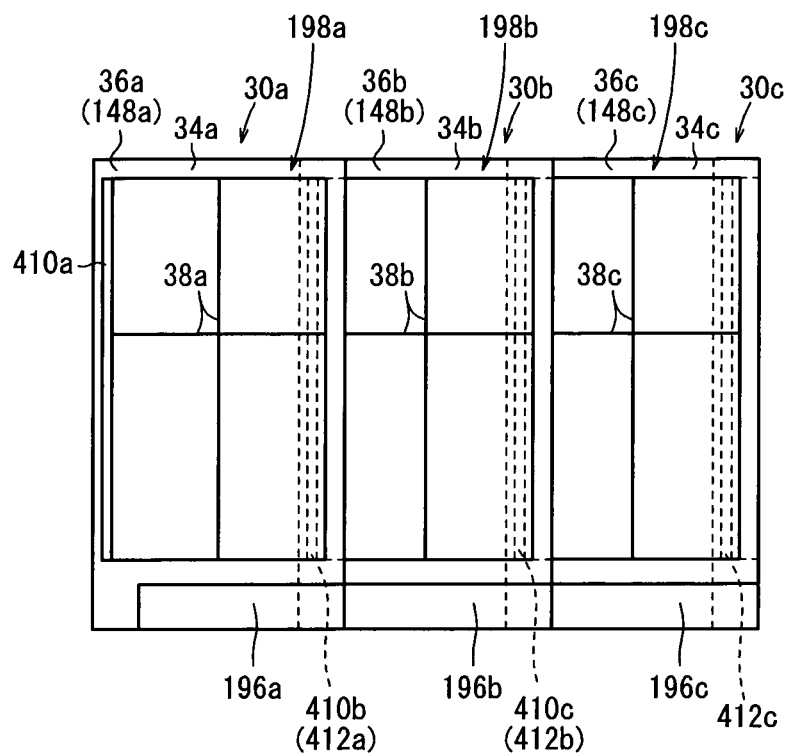
FIG. 70 is a plan view of another radiographic image capturing apparatus.

Next, with reference to FIGS. 68 and 70, explanations shall be made concerning a radiographic image capturing system 10J and a radiographic image capturing apparatus 20J according to a ninth embodiment.

The radiographic image capturing system 10J and the radiographic image capturing apparatus 20J according to the ninth embodiment differ from the radiographic image capturing system 10I and the radiographic image capturing apparatus 20I according to the eighth embodiment, in that the controllers 196a-196c extend to the side surfaces 56a-56c. Further, in the ninth embodiment, structural elements of the radiographic image capturing apparatus 20J are the same as those of the eighth embodiment, and in comparison with the eighth embodiment, the only difference is that side portions of the controllers 196a-196c extend to the side surfaces 56a-56c as viewed from the side in FIG. 68. Accordingly, in FIG. 68, illustration of the radiographic image capturing apparatus 20J itself has been omitted.

In this case, when the recess 412*a* and the projection 410*b*, as well as the recess 412*b* and the projection 410*c*, are fitted together, the side surface 56*a* and the controller 196*b* come into abutment, and the side surface 56*b* and the controller 196*c* also come into abutment with each other. Accordingly, the rear surface 42*a* of the casing 34*a* and the front surface 36*b* of the casing 34*b*, as well as the rear surface 42*b* of the casing 34*b* and the front surface 36*c* of the casing 34*c*, are connected respectively without gaps in a condition of being positioned with high accuracy. In this case as well, the same effects as those of the eighth embodiment are obtained.

If the heights of the respective controllers 196*a*-196*c* are higher than the heights of the respective controllers 196*a*-196*c* shown in FIG. 68, then the side surface 56*a* and the controller 196*a* abut against the controller 196*b*, and the side surface 56*b* and the controller 196*b* abut against the controller 196*c*. Therefore, the rear surface 42*a* and the front surface 36*b*, and the rear surface 42*b* and the front surface 36*c* can be connected respectively without gaps therebetween, in a state of being positioned with even greater accuracy.

Figure 71:
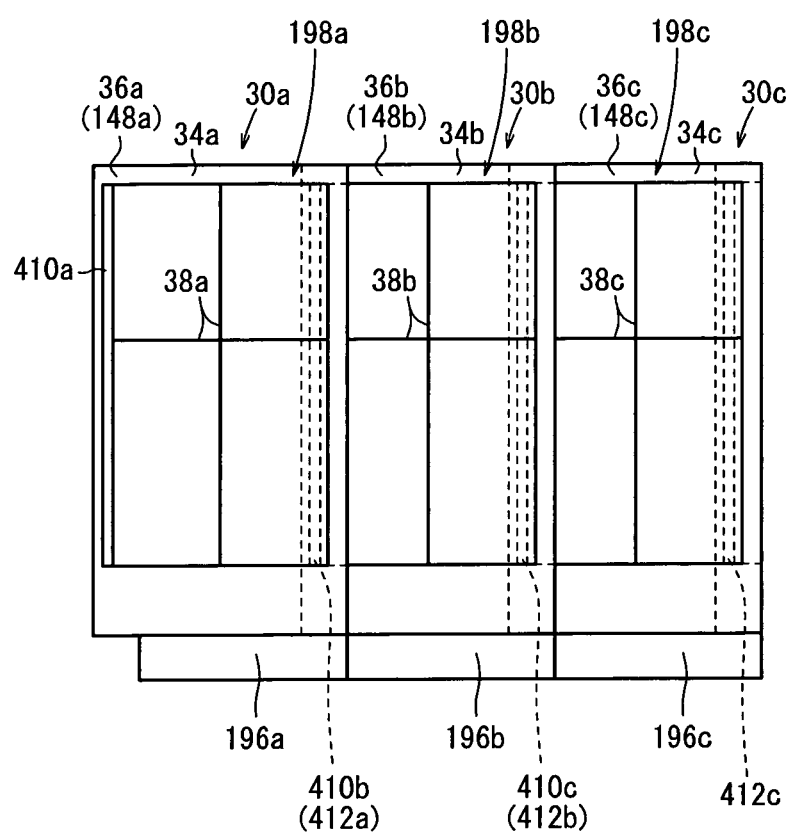
FIG. 71 is a plan view of another radiographic image capturing apparatus.

Next, with reference to FIGS. 68 and 71, explanations shall be made concerning a radiographic image capturing system 10K and a radiographic image capturing apparatus 20K according to a tenth embodiment.

The radiographic image capturing system 10K and the radiographic image capturing apparatus 20K according to the tenth embodiment differ from the radiographic image capturing system 10K and the radiographic image capturing apparatus 20K according to the ninth embodiment, in that the controllers 196*a*-196*c* are fixedly attached to the side surfaces 50*a*-50*c*.

In this case, when the recess 412*a* and the projection 410*b*, as well as the recess 412*b* and the projection 410*c*, are fitted together, the controller 196*a* and the controller 196*b* abut against each other, and the controller 196*b* and the controller 196*c* abut against each other. Accordingly, in this case as well, the rear surface 42*a* of the casing 34*a* and the front surface 36*b* of the casing 34*b*, and the rear surface 42*b* of the casing 34*b* and the front surface 36*c* of the casing 34*c*, are connected without gaps in a state of being positioned with high accuracy, so that the same effects as those of the ninth embodiment are obtained.

Figure 72:
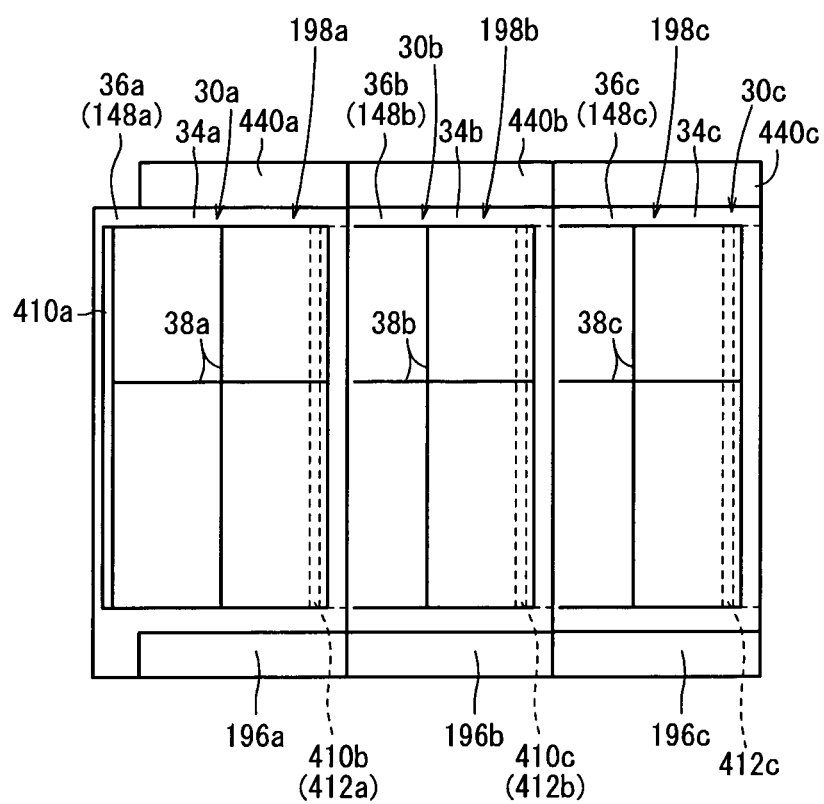
FIG. 72 is a plan view of another radiographic image capturing apparatus.

Next, with reference to FIGS. 68 and 72, explanations shall be made concerning a radiographic image capturing system 10L and a radiographic image capturing apparatus 20L according to an eleventh embodiment.

The radiographic image capturing system 10L and the radiographic image capturing apparatus 20L according to the eleventh embodiment differ from the radiographic image capturing system 10J and the radiographic image capturing apparatus 20J according to the tenth embodiment, in that controllers 440*a*-440*c* having the same functions as the controllers 196*a*-196*c* are fixedly attached to the side surfaces 52*a*-52*c* in opposition to the controllers 196*a*-196*c*.

In this case, when the recess 412*a* and the projection 410*b*, as well as the recess 412*b* and the projection 410*c*, are fitted together, the controller 196*a* and the controller 196*b*, the controller 196*b* and the controller 196*c*, the controller 440*a* and the controller 440*b*, and the controller 440*b* and the controller 440*c*, abut respectively against each other. Accordingly, compared to the tenth embodiment, the rear surface 42*a* of the casing 34*a* and the front surface 36*b* of the casing 34*b*, and the rear surface 42*b* of the casing 34*b* and the front surface 36*c* of the casing 34*c*, are connected together without gaps, in a state of being positioned with even greater accuracy.

Figure 73:
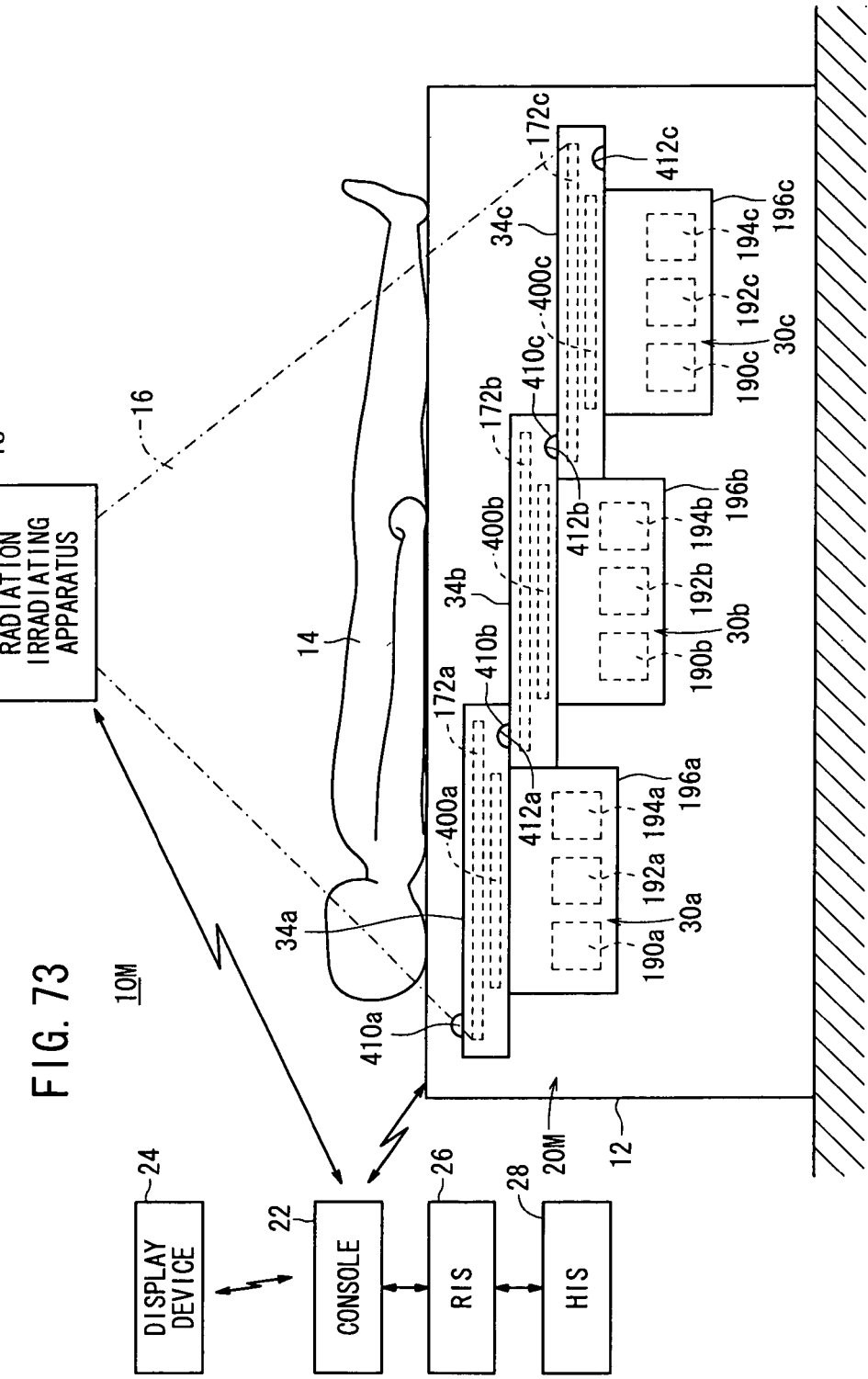
FIG. 73 is a side view of another radiographic image capturing apparatus.

Next, with reference to FIG. 73, explanations shall be made concerning a radiographic image capturing system 10M and a radiographic image capturing apparatus 20M according to a twelfth embodiment.

The radiographic image capturing system 10M and the radiographic image capturing apparatus 20M according to the twelfth embodiment differ from the radiographic image capturing systems 10H through 10L according to the seventh through eleventh embodiments, in that controllers 196*a*-196*c* are disposed on the rear surfaces 42*a*-42*c* of the casings 34*a*-34*c*, and further in that radiation shielding members 400*a*-400*c* of lead plate or the like, which prevent transmission of radiation 16, are disposed on rear portions (proximate to the rear surfaces 42*a*-42*c*) of the radiation conversion panels 172*a*-172*c* in the interiors of the casings 34*a*-34*c*.

In this case, the horizontal width (span) of the controllers 196*a*-196*c* is set shorter than the horizontal width of the radiation conversion panels 172*a*-172*c* as viewed from the side. Further, the controllers 196*a*-196*c* are fixedly attached to the rear surfaces 42*a*-42*c*, so as to be positioned directly beneath the radiation shielding members 400*a*-400*c*.

In this case, when the recess 412*a* and the projection 410*b*, as well as the recess 412*b* and the projection 410*c*, are fitted together, the controller 196*a* and the casing 34*b* abut against each other, and the controller 196*b* and the casing 34*c* abut against each other. Accordingly, in this case as well, the rear surface 42*a* of the casing 34*a* and the front surface 36*b* of the casing 34*b*, and the rear surface 42*b* of the casing 34*b* and the front surface 36*c* of the casing 34*c*, can be connected without gaps in a state of being positioned with high accuracy.

With the radiographic image capturing apparatus 20M constructed in this manner, the controllers 196*a*-196*c* are arranged behind the radiation conversion panels 172*a*-172*c* via the radiation shielding members 400*a*-400*c*, and furthermore, because the controllers 196*a*-196*c* are smaller than the radiation conversion panels 172*a*-172*c*, during image capturing, any concerns over the controllers 196*a*-196*c* being irradiated with radiation 16 can reliably be prevented (avoided).

The third aspect of the invention is not limited to the aforementioned embodiments, and it is a matter of course that various modified or additional structures could be adopted without deviating from the essence and gist of the third aspect of the invention.

For example, among the three radiation conversion panels 172*a*-172*c*, portions of which overlap each other, in at least two of the radiation conversion panels 172*a*, 172*b* (radiation detectors 600) on the irradiation side of the radiation 16, if the substrates 602 thereof are constituted from a flexible substrate made of plastic, and photoelectric conversion films 616 made of an organic photoconductor, and TFTs 624 made from an organic semiconductor material are formed respectively, because such plastic and organic materials absorb hardly any radiation 16, irrespective of whether they are an ISS type or a PSS type, doses of radiation 16 that reaches the radiation conversion panels 172*b*, 172*c* can increase as much as possible. Further, as noted previously, if such plastic and organic materials are used, because at least the radiation conversion panels 172*a*, 172*b* can be made thin in profile, bumps or steps at connected locations between the radiation detection units 30*a*-30*c* can be kept small.

To elaborate more with respect to the above-mentioned effects, with the seventh through twelfth embodiments, in order to obtain a single elongate image that does not exhibit image loss at joined locations (connected locations) therein, the radiation detection units 30*a*-30*c* are connected such that portions of the radiation conversion panels 172*a*-172*c* overlap each other. As a result, there are concerns that the magnification (distance between the radiation source 264 and the radiation conversion panels 172a-172c) may differ due to generation of steps that occur between the radiation conversion panels 172a-172c, and/or the radiographic image density (i.e., the sensitivity of the radiation conversion panels 172a-172c) may differ as a result of insufficient sensitivity at portions on the radiation conversion panel 172b that overlap with the radiation conversion panel 172a and at portions on the radiation conversion panel 172c that overlap with the radiation conversion panel 172b. In this case, it is necessary for the image processor 288 to combine each of the radiographic images to thereby obtain a single elongate image, after having first carried out image correction processing responsive to the magnification and density.

In such a case, as noted earlier, by constructing the radiation conversion panels 172a, 172b using plastic and organic materials at least on sides thereof irradiated with radiation 16, steps between the radiation conversion panels 172a-172c and insufficient sensitivity of the radiation conversion panels 172b, 172c can be reduced, and thus the required amount of image correction processing can be lessened or made unnecessary altogether.

Further, in the case that at least the radiation conversion panels 172a, 172b are constructed using plastic and organic materials, and additionally, if such panels are ISS type panels, in which the substrates 602, the TFTs 624, the photoelectric conversion films 616, and the scintillators 608 made of CsI are arranged in this order along the irradiation direction of the radiation 16, radiographic images and a single elongate image of high quality can easily be obtained. Of course, if all of the radiation conversion panels 172a-172c are constructed using plastic and organic materials, and such panels are ISS type panels in which CsI scintillators 150a-150c are adopted, then radiographic images of high quality in each of the radiation conversion panels 172a-172c can be obtained.

Furthermore, with the seventh through twelfth embodiments, although the three radiation conversion panels 172a-172c are of the same type, even if the panels are of one type, cases may also occur in which the magnification ratio (distance between the radiation source 264 and the panels) differ, and the density of the radiographic images (panel sensitivity) are different, depending on differences such as, for example, (1) whether thin panels using plastic and organic materials or panels of normal thickness are used, (2) whether panels using GOS scintillators or panels using CsI scintillators are employed, or (3) whether the panels are ISS type panels or PSS type panels. In such cases, it is necessary to combine the radiographic images to obtain a single elongate image, after an image correction process corresponding to the panel type has been carried out with respect to the radiographic images obtained by each of the radiation conversion panels 172a-172c.

Consequently, the connection order information generating units 250a-250c may transmit to the console 22 connection order information, which includes therein information concerning the types of radiation conversion panels 172a-172c (i.e., the materials of the scintillators 150a-150c, 608, the materials of the photoelectric conversion layers 152a-152c or the photoelectric conversion film 616, the materials of the TFTs 210a-210c, 624, the materials of the substrates 178a-178c, 602, and a type classification indicative of an ISS type or a PSS type). Owing thereto, the image processor 288 of the console 22, after carrying out image correction processing with respect to the radiographic images obtained from the radiation conversion panels 172a-172c, and based on the connection order information including information concerning the types of radiation conversion panels 172a-172c, can combine the three radiographic images after image correction processing has been performed, to thereby produce a single elongate image.

Further, in the case that a scintillator made up from columnar crystal structured CsI(Tl) is used, preferably such a scintillator is used as the scintillator 150b of the radiation conversion panel 172b. This is because, since radiation 16 having a spread of a degree consistent with the radiation source 264 is applied to the subject 14, at locations separated from the center axis of the radiation 16 (e.g., at locations of the radiation conversion panels 172a or the radiation conversion panels 172c), if a columnar crystal structured scintillator were used, the radiation 16 is incident thereto at an inclination with respect to such columnar portions, and as a result, within the scintillator, the incident radiation straddles between the columns to emit light, leading to a concern that crosstalk could be caused thereby.

Furthermore, the seventh through twelfth embodiments are not limited to the connected conditions shown in FIGS. 53 through 73, insofar as the connected state therebetween is one in which the controllers 196a-196c do not overlap with the panel sections 198a-198c. For example, on the casing 34b, by placing the controller 196b thereof on the upper side of FIG. 55, the controllers 196a-196c can be arranged in a staggered manner. In such a case, the hinge 415b is disposed on the casing 34b on the upper side of FIG. 55, or alternatively, by disposing the projections 410b, 410c and the recesses 412a, 412b on the casings 34a-34c in such a way that the radiation detection unit 30b can be connected to the other radiation detection units 30a, 30b in an upended state, the aforementioned structure, in which the controllers 196a-196c are arranged in a staggered manner, can be realized.

Although certain preferred embodiments of the present invention have been shown and described in detail, it should be understood that various changes and modifications may be made to the embodiments without departing from the scope of the invention as set forth in the appended claims.

What is claimed is:

1. A radiographic image capturing apparatus having a plurality of radiation detection units equipped with radiation conversion panels capable of converting radiation into radiographic images and panel accommodating units accommodating the radiation conversion panels therein, and connecting sections for connecting each of the radiation detection units together respectively, wherein:

the panel accommodating units each include, respectively, a front surface transmissive to the radiation, a rear surface opposed to the front surface, and side surfaces disposed between the front surface and the rear surface;

the connecting sections comprise step portions, which are formed at the side surfaces;

the front surfaces of each of the panel accommodating units comprise irradiated surfaces that are irradiated with the radiation that has passed through the subject, and regions within the irradiated surfaces, which are irradiated by the radiation, make up image capturing regions capable of converting the radiation into radiographic images;

each of the panel accommodating units comprises a first panel accommodating unit having a first irradiated surface, and a second panel accommodating unit having a second irradiated surface;

in the first panel accommodating unit, a surface proximate to step portions of the first panel accommodating unit comprises the rear surface, and a surface opposed to the rear surface and distanced from the step portions makes up the first irradiated surface;

in the second panel accommodating unit, a surface proximate to step portions of the second panel accommodating unit makes up the second irradiated surface, and a surface opposed to the second irradiated surface and distanced from the step portions comprises the rear surface; and by interfitting the step portions so that portions of each of the radiation conversion panels are superimposed, and that irradiated surfaces are repeated alternately in a sequence of the first irradiated surface and the second irradiated surface, an image capturing surface of the radiographic image capturing apparatus, which is constituted to include the respective image capturing regions, is maintained in a substantially planar condition.

2. The radiographic image capturing apparatus according to claim 1, wherein in interior of each of the panel accommodating units, the radiation conversion panel, a radiation shielding member that prevents passage of the radiation therethrough, and a controller for controlling the radiation conversion panel are arranged in this order from the front surface toward the rear surface.

3. The radiographic image capturing apparatus according to claim 2, wherein the controllers are smaller than the radiation conversion panels as viewed in plan.

4. A radiographic image capturing apparatus having a plurality of radiation detection units equipped with radiation conversion panels capable of converting radiation into radiographic images, panel accommodating units accommodating the radiation conversion panels therein, and controllers for controlling the radiation conversion panels, together with connecting sections for connecting each of the radiation detection units together respectively, wherein:

the panel accommodating units each include, respectively, a front surface transmissive to the radiation, a rear surface opposed to the front surface, and side surfaces disposed between the front surface and the rear surface;

the front surfaces each comprise irradiated surfaces that are irradiated with the radiation that has passed through the subject, and regions within the irradiated surfaces, which are irradiated by the radiation, make up image capturing regions capable of converting the radiation into radiographic images;

the connecting sections comprise projections, which are disposed on the front surfaces on a side thereof proximate to one of the side surfaces, and recesses, which are disposed on the rear surfaces on a side thereof proximate to another of the side surfaces confronting the one of the side surfaces;

each of the controllers are arranged respectively at regions outside of the image capturing regions on the front surfaces of the panel accommodating units, and as viewed from a side surface thereof, between the projections and the recesses, or between the projections and the other of the side surfaces; and by interfitting the recess of one of the panel accommodating units and the projection of another of the panel accommodating units, such that portions of each of the radiation conversion panels are superimposed, and that the controllers do not overlap therewith respectively, the panel accommodating units are interconnected sequentially, and together therewith, a side of the one of the panel accommodating units proximate to the other of the panel accommodating units abuts against the controller that is arranged on the other of the panel accommodating units.

5. The radiographic image capturing apparatus according to claim 4, wherein:

each of the controllers is arranged on a side surface of the panel accommodating unit, and as viewed from the side surface, is arranged between the projection and the other of the side surfaces; and in case that the recess of the one of the panel accommodating units and the projection of the other of the panel accommodating units are interfitted, the controller arranged on the one panel accommodating unit abuts against the controller arranged on the other of the panel accommodating units.

6. The radiographic image capturing apparatus according to claim 4, wherein:

the one side surface and the other side surface on each of the controllers are constituted respectively as blocks, which are removable from the controllers; and by removing each of the blocks from the controllers, the recesses of the one panel accommodating unit and the projections of the other panel accommodating unit become capable of being interfitted.

7. The radiographic image capturing apparatus according to claim 4, wherein in case that the recess of the one of the panel accommodating units and the projection of the other of the panel accommodating units are interfitted, the panel accommodating units are interconnected sequentially with a step occurring at each connection location, while the portions of each of the radiation conversion panels are superimposed.

* * * * *